(12) United States Patent
Tamura et al.

(10) Patent No.: US 12,021,422 B2
(45) Date of Patent: Jun. 25, 2024

(54) ARMATURE WITH WINDING SEGMENTS HAVING CONDUCTORS ENGAGED WITH END PLATES SECURED TO AN ARMATURE CORE

(71) Applicant: DENSO CORPORATION, Kariya (JP)

(72) Inventors: Akito Tamura, Kariya (JP); Hiroshi Endou, Kariya (JP)

(73) Assignee: DENSO CORPORATION, Kariya (JP)

( * ) Notice: Subject to any disclaimer, the term of this patent is extended or adjusted under 35 U.S.C. 154(b) by 322 days.

(21) Appl. No.: 17/551,137

(22) Filed: Dec. 14, 2021

(65) Prior Publication Data

US 2022/0109358 A1 Apr. 7, 2022

Related U.S. Application Data

(63) Continuation of application No. PCT/JP2020/023314, filed on Jun. 12, 2020.

(30) Foreign Application Priority Data

Jun. 14, 2019 (JP) .................................. 2019-111599

(51) Int. Cl.
| | |
|---|---|
| *H02K 21/22* | (2006.01) |
| *H02K 1/14* | (2006.01) |
| *H02K 3/04* | (2006.01) |
| *H02K 3/47* | (2006.01) |
| *H02K 23/56* | (2006.01) |

(52) U.S. Cl.
CPC .............. *H02K 21/22* (2013.01); *H02K 1/14* (2013.01); *H02K 3/04* (2013.01); *H02K 3/47* (2013.01); *H02K 23/56* (2013.01)

(58) Field of Classification Search
CPC .. H02K 1/14; H02K 3/04; H02K 3/47; H02K 21/22; H02K 23/56
USPC ................................................... 310/89, 90.5
See application file for complete search history.

(56) References Cited

U.S. PATENT DOCUMENTS

| | | | |
|---|---|---|---|
| 2007/0138897 A1 | 6/2007 | Asaba et al. | |
| 2014/0210284 A1* | 7/2014 | Banba | H02K 1/185 310/43 |
| 2014/0210306 A1* | 7/2014 | Suzuki | H02K 5/15 310/216.134 |

(Continued)

FOREIGN PATENT DOCUMENTS

| | | |
|---|---|---|
| JP | S55-97161 A | 7/1980 |
| JP | S61-156454 U | 9/1986 |

(Continued)

*Primary Examiner* — Rashad H Johnson
(74) *Attorney, Agent, or Firm* — Oliff PLC

(57) ABSTRACT

An armature includes a multiphase stator winding assembly that includes multiphase stator windings. Each of the multiphase stator windings includes a plurality of winding segments. Each of the winding segments includes a conductor. The conductor of each of the winding segments of each of the multi-phase windings is wound along an armature core while being engaged with a corresponding at least one of first protrusions and a corresponding at least one of second protrusions, and extending along one of radially inner and outer peripheral surfaces of the armature core. The first protrusions extend axially from a first end plate of the armature core, and the second protrusions extend axially from a second end plate of the armature core.

10 Claims, 66 Drawing Sheets

(56) References Cited

U.S. PATENT DOCUMENTS

| | | | |
|---|---|---|---|
| 2020/0106338 A1* | 4/2020 | Ishida | H02K 16/02 |
| 2020/0161939 A1* | 5/2020 | Takahashi | H02K 17/16 |
| 2020/0185997 A1* | 6/2020 | Hirasawa | H02K 7/14 |
| 2020/0328639 A1* | 10/2020 | Takahashi | H02K 21/22 |
| 2020/0328640 A1* | 10/2020 | Takahashi | H02K 1/14 |
| 2020/0328658 A1* | 10/2020 | Takahashi | H02K 21/14 |
| 2020/0331343 A1* | 10/2020 | Takahashi | H02K 21/22 |
| 2020/0336027 A1* | 10/2020 | Takahashi | H02K 11/33 |
| 2020/0336031 A1* | 10/2020 | Takahashi | H02K 1/279 |
| 2020/0336033 A1* | 10/2020 | Takahashi | H02P 21/20 |
| 2020/0403467 A1* | 12/2020 | Takahashi | H02K 21/14 |
| 2020/0403468 A1* | 12/2020 | Takahashi | H02K 9/197 |
| 2021/0175780 A1* | 6/2021 | Sano | H02K 5/1735 |
| 2021/0234415 A1* | 7/2021 | Taniguchi | H02K 1/2791 |
| 2021/0249916 A1* | 8/2021 | Takahashi | H02K 3/28 |
| 2021/0249922 A1* | 8/2021 | Takahashi | H02K 1/28 |
| 2021/0265885 A1* | 8/2021 | Takahashi | H02K 21/22 |
| 2021/0273511 A1* | 9/2021 | Takahashi | H02K 1/2791 |
| 2021/0288531 A1* | 9/2021 | Takahashi | H02K 5/1675 |
| 2021/0328488 A1* | 10/2021 | Takahashi | H02K 21/125 |
| 2021/0367465 A1* | 11/2021 | Takahashi | H02P 27/08 |
| 2021/0367494 A1* | 11/2021 | Takahashi | H02K 15/022 |
| 2021/0384782 A1* | 12/2021 | Tsuchiya | H02K 3/47 |
| 2021/0384784 A1* | 12/2021 | Takahashi | H02K 1/2791 |
| 2021/0384786 A1* | 12/2021 | Tamura | H02K 3/47 |
| 2021/0384789 A1* | 12/2021 | Mawatari | H02K 3/28 |
| 2021/0384794 A1* | 12/2021 | Tamura | H02K 3/522 |
| 2021/0391761 A1* | 12/2021 | Takahashi | H02K 21/14 |
| 2022/0006339 A1* | 1/2022 | Takahashi | H02K 3/28 |
| 2022/0006358 A1* | 1/2022 | Takahashi | H02K 11/0094 |
| 2022/0021249 A1* | 1/2022 | Takahashi | H02K 1/04 |
| 2022/0021267 A1* | 1/2022 | Takahashi | H02K 5/203 |
| 2022/0029484 A1* | 1/2022 | Takahashi | H02K 21/22 |
| 2022/0037947 A1* | 2/2022 | Takahashi | H02K 1/187 |
| 2022/0094236 A1* | 3/2022 | Takahashi | H02K 11/33 |
| 2022/0140685 A1* | 5/2022 | Mawatari | H02K 3/04 310/195 |
| 2022/0140714 A1* | 5/2022 | Mawatari | H02K 3/28 310/264 |
| 2022/0140715 A1* | 5/2022 | Mawatari | H02K 21/22 310/152 |
| 2022/0181930 A1* | 6/2022 | Tsuchiya | H02K 15/03 |
| 2022/0181935 A1* | 6/2022 | Tamura | H02K 3/28 |
| 2022/0181959 A1* | 6/2022 | Takahashi | H02K 21/22 |
| 2022/0194210 A1* | 6/2022 | Takahashi | B60K 1/02 |
| 2022/0200408 A1* | 6/2022 | Takahashi | H02K 11/0141 |
| 2022/0200421 A1* | 6/2022 | Takahashi | H01F 7/02 |
| 2022/0209633 A1* | 6/2022 | Takahashi | H02K 3/14 |
| 2022/0216760 A1* | 7/2022 | Takahashi | H02K 21/14 |
| 2022/0271596 A1* | 8/2022 | Takahashi | H02K 15/095 |
| 2022/0271633 A1* | 8/2022 | Takahashi | H02K 3/30 |
| 2022/0286007 A1* | 9/2022 | Takahashi | H02K 1/27 |
| 2023/0039361 A1* | 2/2023 | Mawatari | H02K 3/47 |

FOREIGN PATENT DOCUMENTS

| | | |
|---|---|---|
| JP | H04-010553 U | 1/1992 |
| JP | 2001-267167 A | 9/2001 |

* cited by examiner

COMPARATIVE EXAMPLES

FIG.33(a)   FIG.33(b)   FIG.33(c)
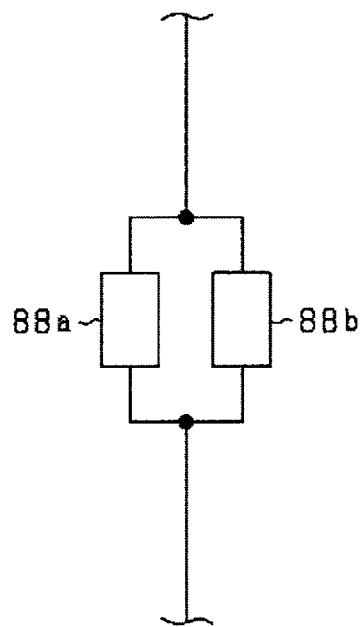
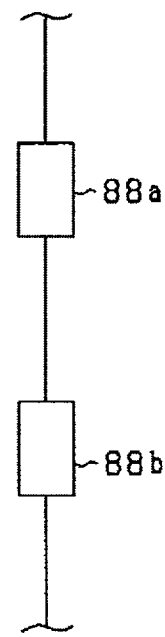
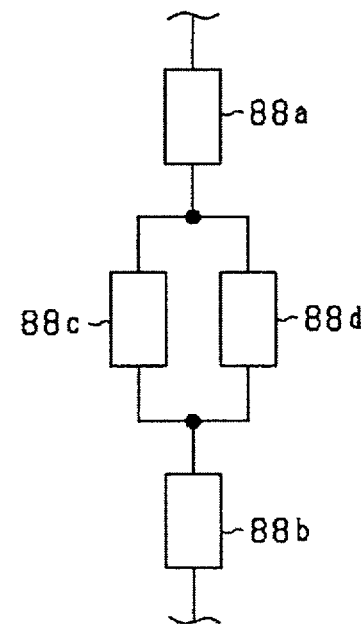
FIG.34
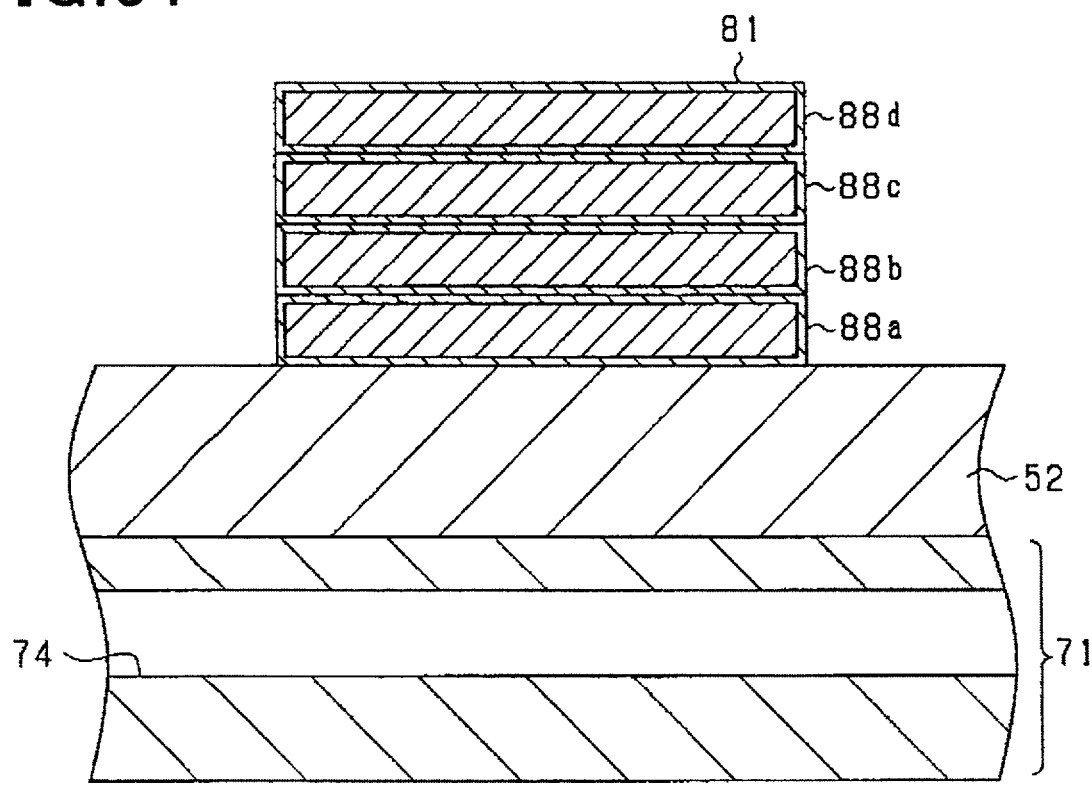

ARMATURE WITH WINDING SEGMENTS HAVING CONDUCTORS ENGAGED WITH END PLATES SECURED TO AN ARMATURE CORE

CROSS REFERENCE TO RELATED DOCUMENT

The present application is a bypass continuation application of a currently pending international application No. PCT/JP2020/023314 filed on Jun. 12, 2020 designating the United States of America, the entire disclosure of which is incorporated herein by reference, the international application being based on and claiming the benefit of priority of Japanese Patent Application No. 2019-111599 filed on Jun. 14, 2019.

TECHNICAL FIELD

This disclosure in this application relates generally to armatures for a rotating electrical machine.

BACKGROUND ART

A known slot-less motor includes a stator core serving as an armature core, and coils, i.e., armature coils, directly wound in and around the stator core. The technology described in Japanese Utility Model Application Publication No. H4-10553 discloses a stator that is comprised of a cylindrical stator core, first and second nonmagnetic coil plates mounted to respective axial ends of the stator core, first hooks, and second hooks. The first hooks protrude radially outward from the first nonmagnetic coil plate, and the second hooks protrude radially outward from the second non-magnetic coil plate while facing the respective first hooks. Each coil is wound around a corresponding pair of the first and second hooks.

SUMMARY

The stator, i.e., armature, disclosed in the above utility-model publication is configured such that each first hook protrudes radially outward from the first nonmagnetic coil plate, and each second hook protrudes radially outward from the second nonmagnetic coil plate. This configuration of the stator may result in gaps between the respective coils and the stator core. This may result in the stator having a radially larger size.

The gaps created between the respective coils and the stator core may make it harder for heat generated from the coils to be transferred to the stator core. There may be therefore room for improvement in heat dissipation.

From the above viewpoint, this disclosure mainly aims to provide armatures, each of which is designed to enable an armature winding to be properly wound around an armature core.

Various exemplary aspects disclosed in this specification respectively use different technical means for achieving their objects. The objects, features, and beneficial advantages in this specification will be apparent from the following detailed descriptions and the appended drawings.

A first measure for solving the problem is an armature. The armature includes a multiphase stator winding assembly comprising multiphase stator windings. Each of the multiphase stator windings includes a plurality of winding segments. The armature includes a tubular cylindrical armature core having first and second ends in an axial direction thereof, and having a radially inner peripheral surface and a radially outer peripheral surface. The armature includes a pair of first and second end plates secured to the respective first and second ends of the armature core. Each of the first and second end plates has an outer major surface. The armature includes a plurality of first protrusions extending from the outer major surface of the first end plate in the axial direction of the armature core. The first protrusions are arranged on the outer major surface at predetermined intervals in a circumferential direction of the armature core. The armature includes a plurality of second protrusions extending from the outer major surface of the second end plate in the axial direction of the armature core, the second protrusions being arranged on the outer major surface at predetermined intervals in the circumferential direction of the armature core.

Each of the winding segments includes a conductor. The conductor of each of the winding segments of each of the multi-phase windings is wound along the armature core while
(1) Being engaged with a corresponding at least one of the first protrusions and a corresponding at least one of the second protrusions
(2) Extending along one of the radially inner and outer peripheral surfaces of the armature core The armature according to the first measure includes the first and second end plates secured to the respective first and second ends of the armature core. The conductor of each of the winding segments of each of the multi-phase windings is wound along the armature core while
(i) Being engaged with a corresponding at least one of the first protrusions and a corresponding at least one of the second protrusions
(ii) Extending along one of the radially inner and outer peripheral surfaces of the armature core Each of the winding segments is configured as a concentrated winding.

Each of the first and second protrusions is disposed on the outer major surface of the corresponding one of the first and second end plates while extending from the outer major surface in the axial direction of the armature core. This enables the conductor of each winding segment to be in more intimate contact with the outer or inner peripheral surface of the armature core as compared with a comparative armature core with radially extending protrusions. This results in less gaps between each winding segment and the outer or inner peripheral surface of the armature core, thus preventing the armature from having a radially larger size due to the gaps and the heat dissipation of the armature from decreasing.

This therefore makes it possible to efficiently wind each phase winding of the armature winding assembly around the armature core.

In a second measure for solving the problem, which depends on the first measure, at least each of the first and second protrusions is made from a non-magnetic material.

The second measure makes it possible to reduce a risk of the occurrence of cogging torque due to the first and second protrusions.

In a third measure for solving the problem, which depends on the first measure, each of the first and second protrusions has a portion that is in contact with the conductor of a corresponding one of the winding segments of a corresponding one of the multiphase windings. Each of the first and second protrusions includes an insulating layer mounted to at least the portion thereof.

This configuration of the armature according to the third measure makes it possible to reliably implement insulation of the armature winding assembly to ground. Even if there is damage in an insulating layer of a portion of at least one conductor, which is engaged with a corresponding pair of the first protrusions or second protrusions, it is possible to maintain the insulation of the armature winding assembly to ground.

In a fourth measure for solving the problem, which depends on the first measure, the conductor of each of the winding segments of each of the multi-phase windings is wound along the armature core while (1) Being engaged with a corresponding at least one of the first protrusions and a corresponding at least one of the second protrusions
(2) Extending along the outer peripheral surface of the armature core The armature core has an outer diameter.

Each of the first and second end plates has an outer diameter that is identical to the outer diameter of the armature core.

Each of the first and second end plates has a rounded outer corner located farther away from to the armature core than an inner corner thereof is.

Each of the first and second end plates according to the fourth measure has the rounded corner, so that the conductor of each winding segment, which extends in the first direction parallel to the axial direction of the armature core along the outer peripheral surface of the armature core, is bent from the first direction to the second direction perpendicular to the first direction at each rounder corner.

This results in the conductor along the rounded corner being bent gentler.

This therefore makes it possible to reduce the level of bending stress applied to the bent portion of the conductor of each winding segment while the conductor of each winding segment is in intimate contact with the outer peripheral surface of the armature core.

In a fifth measure for solving the problem, which depends on the first measure, the conductor of each of the winding segments of each of the multi-phase windings is wound along the armature core while 1. Being engaged with a corresponding at least one of the first protrusions and a corresponding at least one of the second protrusions
2. Extending along the inner peripheral surface of the armature core The armature core has an inner diameter.

Each of the first and second end plates has an inner diameter that is identical to the inner diameter of the armature core.

Each of the first and second end plates has a rounded inner corner located farther away from the armature core than an outer corner thereof.

Each of the first and second end plates according to the fifth measure has the rounded corner, so that the conductor of each winding segment, which extends in the first direction parallel to the axial direction of the armature core along the inner peripheral surface of the armature core, is bent from the first direction to the second direction perpendicular to the first direction at each rounder corner.

This results in the conductor along the rounded corner being bent gentler.

This therefore makes it possible to reduce the level of bending stress applied to the bent portion of the conductor of each winding segment while the conductor of each winding segment is in intimate contact with the inner peripheral surface of the armature core.

In a sixth measure for solving the problem, which depends on the first measure, each of the winding segments of each of the multiphase windings includes a pair of first and second bridges. The first bridge is located to face the outer major surface of the first end plate and extending in the circumferential direction of the armature core. The second bridge is located to face the outer major surface of the second end plate and extending in the circumferential direction of the armature core.

Each of the first and second protrusions has an end. The armature further includes a first annular member mounted to the ends of the respective first protrusions, and a second annular member mounted to the ends of the respective second protrusions. The first annular member is located to abut or face the first bridge of the conductor of each of the winding segments. The second annular member is located to abut or face the second bridge of the conductor of each of the winding segments.

The configuration of the armature according to the sixth measure makes it possible for the first annular member to hold the first bridges of the first protrusions from an opposite side of the first end plate. Similarly, the configuration of the armature according to the sixth measure makes it possible for the second annular member to hold the second bridges of the second protrusions from an opposite side of the second end plate.

This therefore prevents the winding segments engaged with the first and second protrusions from being distributed in the axial direction of the armature core.

In a seventh measure for solving the problem, which depends on the first measure, each of the winding segments of each of the multiphase windings includes first and second bridges. The first bridge is located to face the outer major surface of the first end plate and extending in the circumferential direction of the armature core. The second bridge being located to face the outer major surface of the second end plate and extending in the circumferential direction of the armature core.

Each of the first protrusions has an end, an engagement portion with which the conductor of a corresponding one of the winding segments of a corresponding one of the multiphase windings is engaged, and a first margin located closer to the end than to the engagement portion.

The first margin of each of the first protrusions is located to abut or face the first bridge of the conductor of a corresponding one of the winding segments of a corresponding one of the multiphase windings.

Each of the second protrusions has an end, and an engagement portion with which the conductor of a corresponding one of the winding segments of a corresponding one of the multiphase windings is engaged, and a second margin located closer to the end than the engagement portion.

The second margin of each of the second protrusions is located to abut or face the second bridge of the conductor of a corresponding one of the winding segments of a corresponding one of the multiphase windings.

The configuration of the armature according to the seventh measure makes it possible for the first margins to hold the first bridges of the winding segments from an opposite side of the first end plate. Similarly, the configuration of the armature according to the seventh measure makes it possible for the second margins to hold the second bridges of the winding segments from an opposite side of the second end plate.

This therefore prevents the winding segments engaged with the first and second protrusions from being distributed in the axial direction of the armature core.

This also makes it possible for the first and second margins to hold the winding segments.

The first margin of each of the first protrusions is bent to hold the first bridge of a corresponding one of the winding segments, and the second margin of each of the second protrusions is bent to hold the second bridge of a corresponding one of the winding segments.

This enables each conductor to be reliably engaged with a corresponding at least one of the first protrusions and with a corresponding at least one of the second protrusions while preventing an increase in the length of the armature in the axial direction.

For example, the first margin of each of the first protrusions can be divided into two margin portions, and the divided two margin portions of each of the first protrusions are bent opposingly to face the first bridge of a corresponding one of the winding segments. Similarly, the second margin of each of the second protrusions may be divided into two margin portions, and the divided two margin portions of each of the second protrusions are bent opposingly to face the second bridge of a corresponding one of the winding segments.

In an eighth measure for solving the problem, which depends on the first measure, the first protrusions are arranged on the outer major surface of the first end plate at regular intervals in the circumferential direction of the armature core. The second protrusions are arranged on the outer major surface of the second end plate at the regular intervals in the circumferential direction of the armature core. The second protrusions are respectively numbered 1 to n. The winding segments of the respective multiphase windings include n/2 first winding segments, the conductor of each of the n/2 first winding segments being wound along (1) A corresponding pair of an odd-numbered first protrusion and a following even-numbered first protrusion in the first protrusions (2) A corresponding pair of an odd-numbered second protrusion and a following even-numbered second protrusion in the second protrusions n/2 second winding segments, the conductor of each of the n/2 second winding segments are wound along (1) A corresponding pair of an even-numbered first protrusion and a following odd-numbered first protrusion in the first protrusions (2) A corresponding pair of an even-numbered second protrusion and a following odd-numbered second protrusion in the second protrusions Each of the n/2 first winding segments includes first-layer bridges as the first and second bridges thereof. Each of the n/2 second winding segments includes second-layer bridges as the first and second bridges thereof. The second-layer bridges of each of the n/2 second winding segments are arranged to overlap an adjacent pair of the first-layer bridges in the axial direction of the armature core.

In the armature of the eighth measure, the conductor of each of the n/2 first winding segments is wound along (i) the corresponding pair of the odd-numbered first protrusion and the following even-numbered first protrusion in the first protrusions and (ii) the corresponding pair of the odd-numbered second protrusion and the following even-numbered second protrusion in the second protrusions.

In addition, the conductor of each of the n/2 second winding segments are wound along (i) the corresponding pair of the even-numbered first protrusion and a following odd-numbered first protrusion in the first protrusions and (ii) the corresponding pair of the even-numbered second protrusion and the following odd-numbered second protrusion in the second protrusions.

In particular, the second-layer bridges of each of the n/2 second winding segments are arranged to overlap an adjacent pair of the first-layer bridges in the axial direction of the armature core. This results in the n/2 first winding segments and the n/2 second winding segments being efficiently assembled to the armature core while intersecting with one another in the circumferential direction of the armature core.

In a ninth measure for solving the problem, which depends on the first measure, the multiphase windings are three-phase windings. Adjacent ends of two first bridges of different phases included in the first bridges of all the phases are interposed between each adjacent pair of the first protrusions on the outer major surface of the first end plate. Adjacent ends of two second bridges of different phases included in the second bridges of all the phases are interposed between each adjacent pair of the second protrusions on the outer major surface of the second end plate.

The armature of the ninth measure makes it possible to provide the armature winding assembly comprised of the three-phase windings using the n/2 first winding segments and the n/2 second winding segments.

A tenth measure for solving the problem is an armature. The armature includes a multiphase stator winding assembly comprising multiphase stator windings. Each of the multiphase stator windings comprising a plurality of winding segments. The armature includes a tubular armature core having first and second ends in an axial direction thereof, and having an outer surface portion. The armature includes a pair of first and second end plates secured to the respective first and second ends of the armature core. Each of the first and second end plates has an outer major surface. The armature includes a plurality of first protrusions extending from the outer major surface of the first end plate in the axial direction of the armature core. The first protrusions are arranged on the outer major surface at predetermined intervals in a circumferential direction of the armature core. The armature includes a plurality of second protrusions extending from the outer major surface of the second end plate in the axial direction of the armature core. The second protrusions are arranged on the outer major surface at predetermined intervals in the circumferential direction of the armature core.

Each of the winding segments includes a conductor, and the conductor of each of the winding segments of each of the multi-phase windings is wound along the armature core while (1) Being engaged with a corresponding at least one of the first protrusions and a corresponding at least one of the second protrusions (2) Extending along the outer surface portion of the armature core The number of the first protrusions is n, n being an integer more than or equal to 2.

The number of the second protrusions is n. The armature core has a polygonal shape in a transverse cross section perpendicular to the axial direction thereof. The outer surface portion of the armature core with the polygonal shape in the transverse cross section has n or 2×n sides. Each of the first protrusions is arranged at a predetermined first circumferential position. The first circumferential position of each of the first protrusions is axially aligned with a corner of a corresponding adjacent pair of the sides of the outer surface portion of the armature core. Each of the second protrusions is arranged at a predetermined second circumferential position. The second circumferential position of each of the second protrusions is axially aligned with a corner of a corresponding adjacent pair of the sides of the outer side surface of the armature core.

The winding segments are wound along the outer peripheral surface of the armature core to be used for an outer-rotor rotating electrical machine, so that the multiply wound conductors along the outer peripheral surface of the armature core may have larger intervals there between in the circumferential direction of the armature cor. This may result in the multiply wound conductors being distributed in the circumferential direction of the armature core.

From this viewpoint, as described above, the armature core according to the tenth measure has a polygonal shape with n or 2×n sides in the transverse cross section. In addition, each of the first protrusions is arranged at the predetermined first circumferential position on the outer major surface of the first end plate, and the first circumferential position of each of the first protrusions is axially aligned with the corner of a corresponding adjacent pair of the outer sides of the outer surface portion of the armature core.

Similarly, each of the second protrusions is arranged at the predetermined second circumferential position on the outer major surface of the second end plate, and the second circumferential position of each of the second protrusions is axially aligned with the corner of a corresponding adjacent pair of the outer sides of the outer surface portion of the armature core.

This prevents the interval between each adjacent pair of the conductors of the respective winding segments from becoming larger.

BRIEF DESCRIPTION OF THE DRAWINGS

The above-described object, and other objects, features, or beneficial advantages in this disclosure will be apparent from the appended drawings or the following detailed discussion.

In the drawings:

FIGS. 33($a$) to 33($c$) are views, each of which illustrates connections of conductors constituting a conductor group in the ninth modification;

FIG. 34 is a view which illustrates a stack of four conductors in the ninth modification;

EMBODIMENTS

Figure 1:
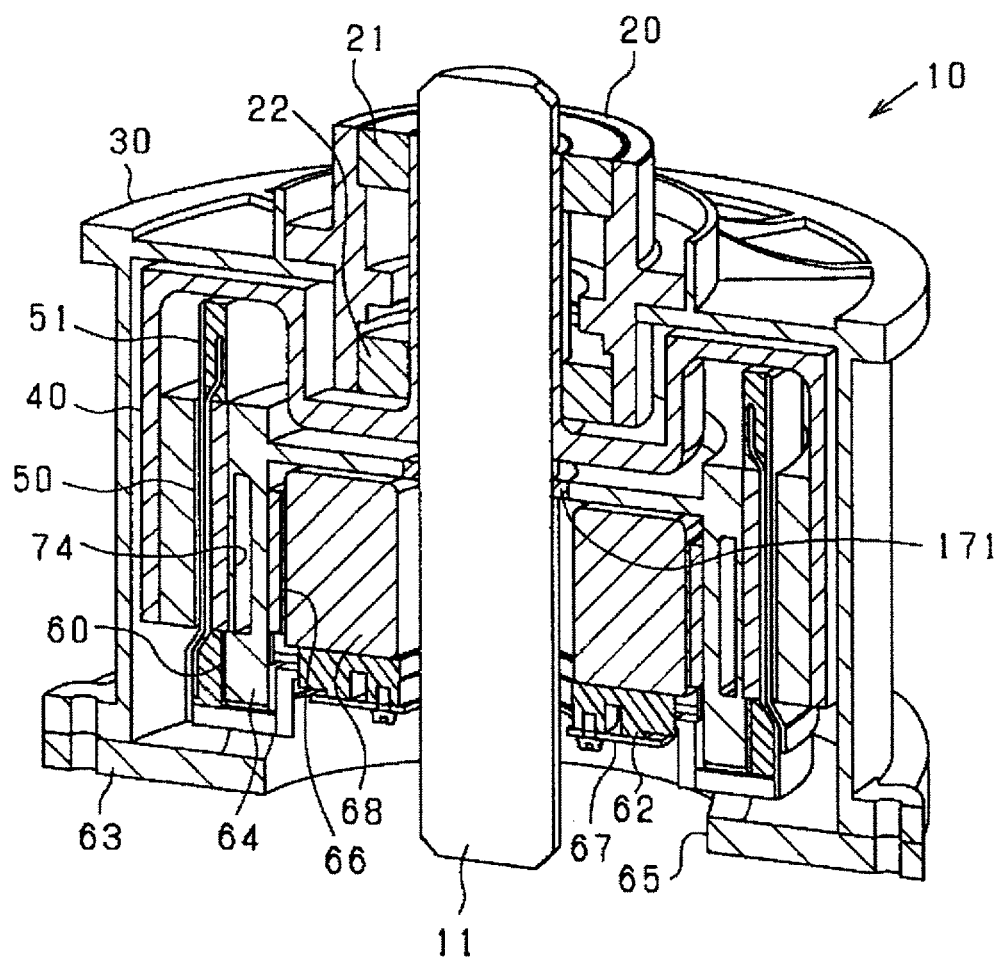
FIG. 1 is a perspective longitudinal sectional view of a rotating electrical machine.

The embodiments will be described below with reference to the drawings. Parts of the embodiments functionally or structurally corresponding to each other or associated with each other will be denoted by the same reference numbers or by reference numbers which are different in the hundreds place from each other. The corresponding or associated parts may refer to the explanation in the other embodiments.

The rotating electrical machine in the embodiments is configured to be used, for example, as a power source for vehicles. The rotating electrical machine may, however, be used widely for industrial, automotive, domestic, office automation, or game applications. In the following embodiments, the same or equivalent parts will be denoted by the same reference numbers in the drawings, and explanation thereof in detail will be omitted.

First Embodiment

Figure 2:
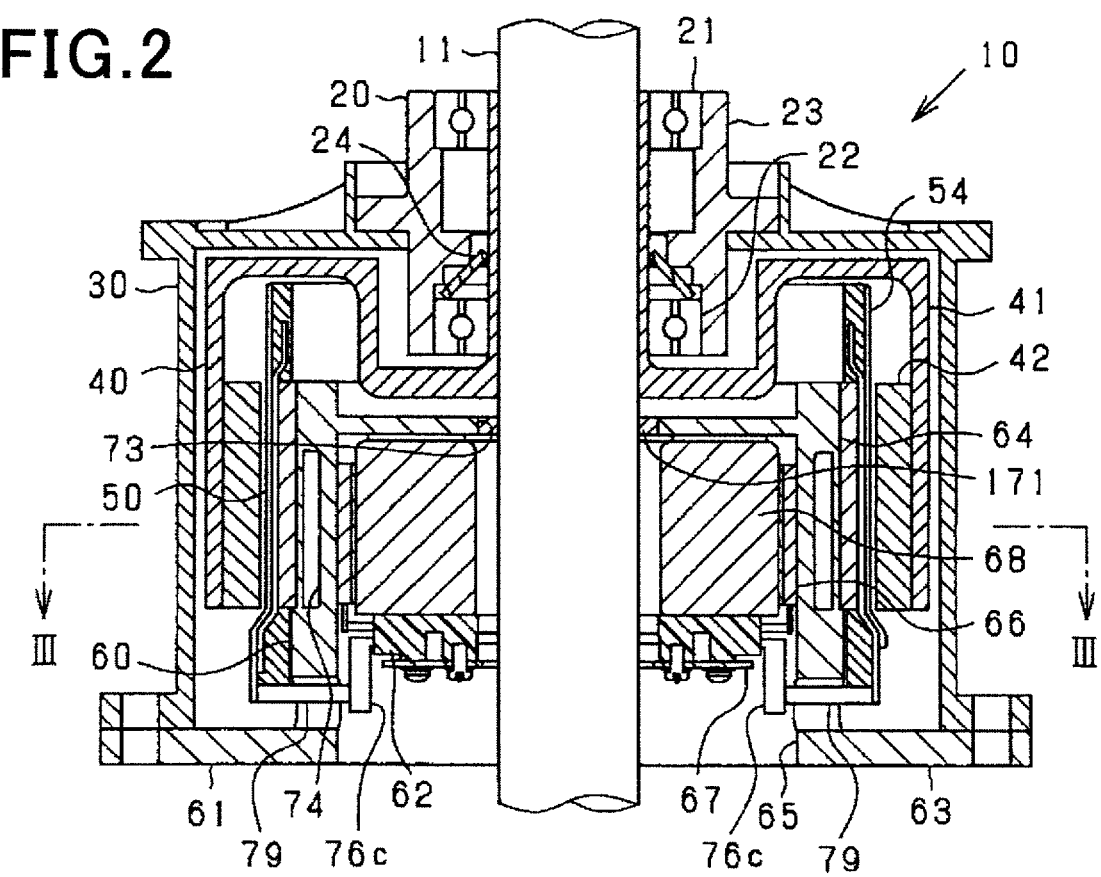
FIG. 2 is a longitudinal sectional view of a rotating electrical machine.
Figure 3:
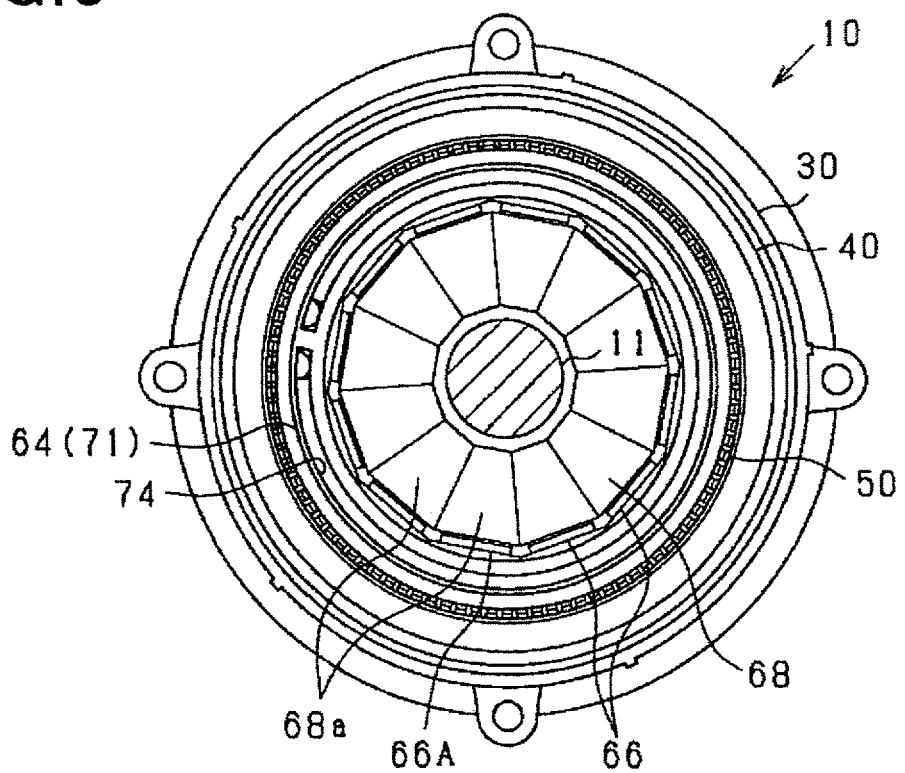
FIG. 3 is a sectional view taken along the line/HILT in FIG. 2.
Figure 4:
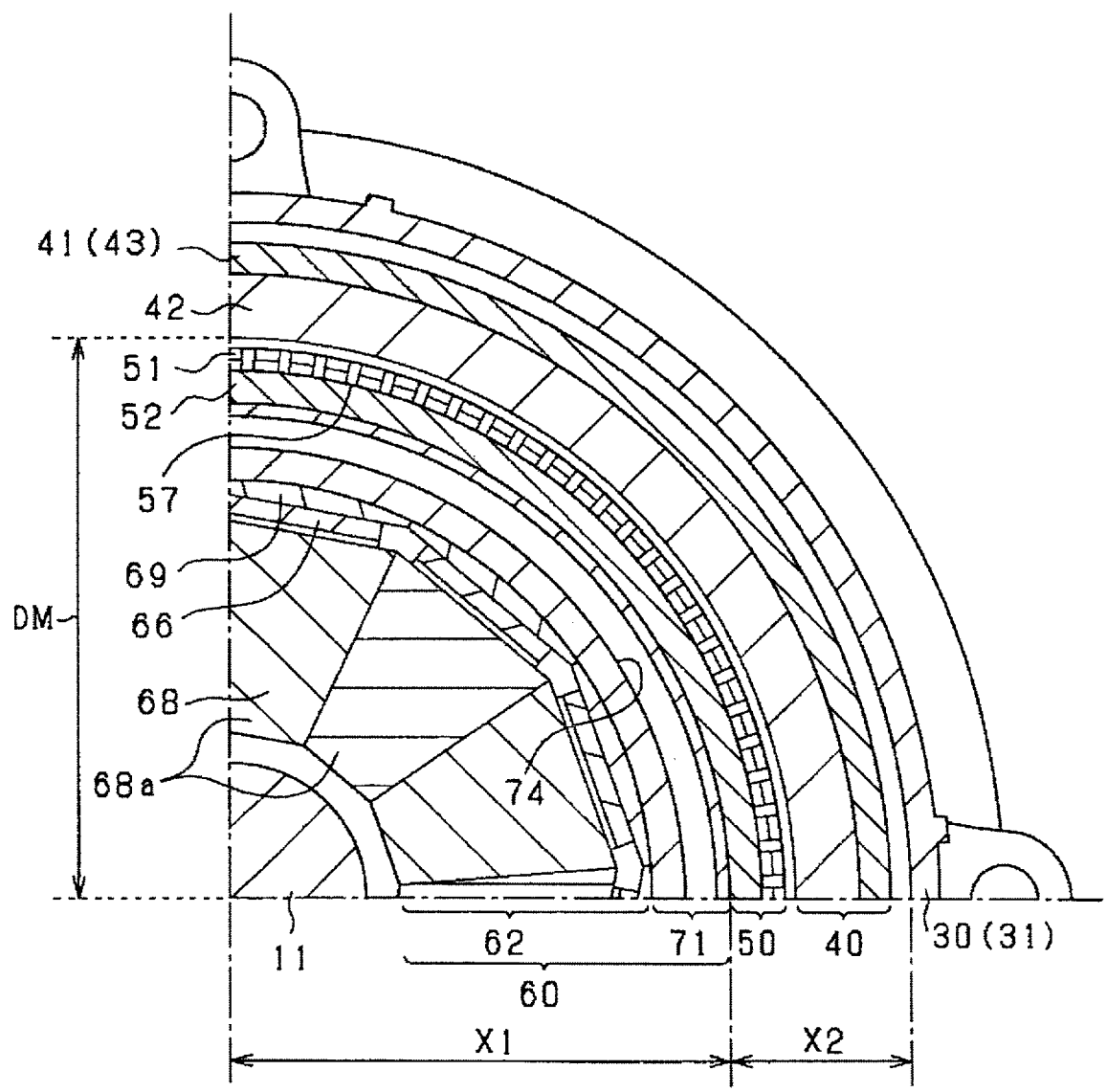
FIG. 4 is a partially enlarged sectional view of FIG. 3.
Figure 5:
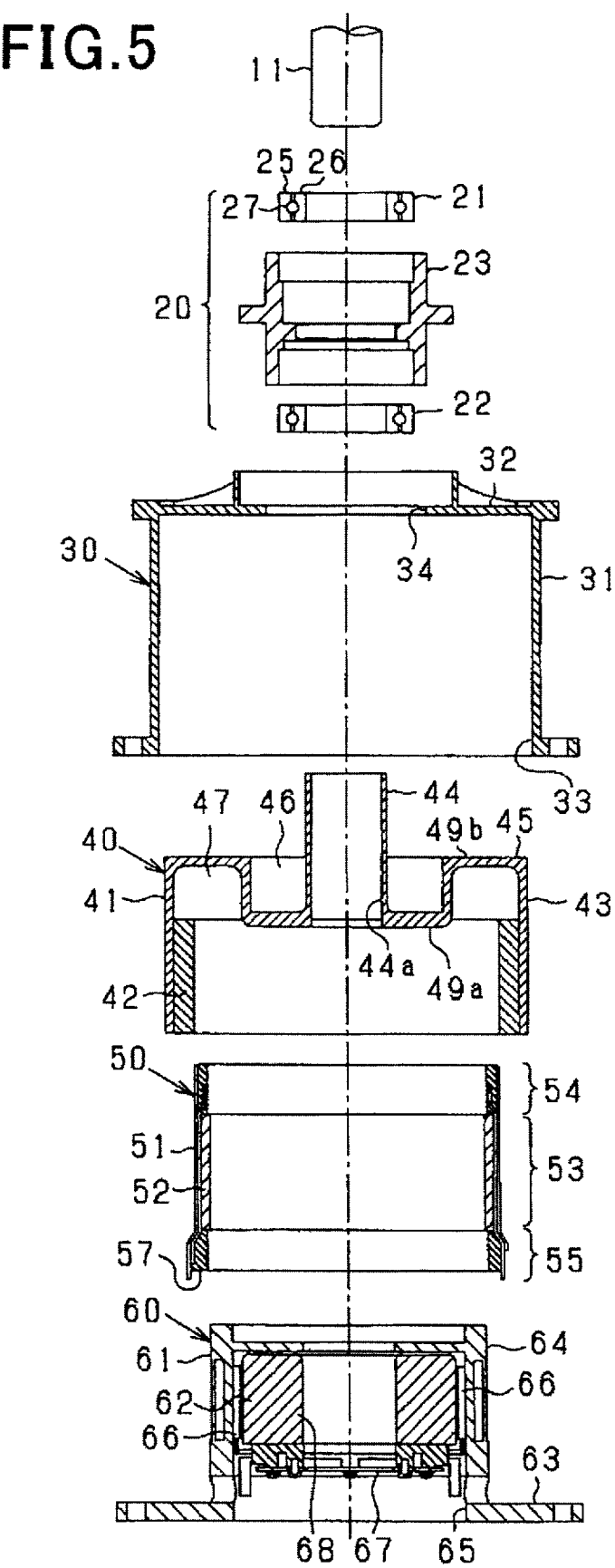
FIG. 5 is an exploded view of a rotating electrical machine.

The rotating electrical machine 10 in this embodiment is a synchronous polyphase ac motor having an outer rotor structure (i.e., an outer rotating structure). The outline of the rotating electrical machine 10 is illustrated in FIGS. 1 to 5. FIG. 1 is a perspective longitudinal sectional view of the rotating electrical machine 10. FIG. 2 is a longitudinal sectional view along the rotating shaft 11 of the rotating electrical machine 10. FIG. 3 is a transverse sectional view (i.e., sectional view taken along the line III-III in FIG. 2) of the rotating electrical machine 10 perpendicular to the rotating shaft 11. FIG. 4 is a partially enlarged sectional view of FIG. 3. FIG. 5 is an exploded view of the rotating electrical machine 10. FIG. 3 omits hatching showing a section except the rotating shaft 11 for the sake of simplicity of the drawings. In the following discussion, a lengthwise direction of the rotating shaft 11 will also be referred to as an axial direction. A radial direction from the center of the rotating shaft 11 will be simply referred to as a radial direction. A direction along a circumference of the rotating shaft 11 about the center thereof will be simply referred to as a circumferential direction.

The rotating electrical machine 10 includes the bearing unit 20, the housing 30, the rotor 40, the stator 50, and the inverter unit 60. These members are arranged coaxially with each other together with the rotating shaft 11 and assembled in a given sequence to complete the rotating electrical machine 10. The rotating electrical machine 10 in this embodiment is equipped with the rotor 40 working as a magnetic field generator or a field system and the stator 50 working as an armature and engineered as a revolving-field type rotating electrical machine.

The bearing unit 20 includes two bearings 21 and 22 arranged away from each other in the axial direction and the retainer 23 which retains the bearings 21 and 22. The bearings 21 and 22 are implemented by, for example, radial ball bearings each of which includes the outer race 25, the inner race 26, and a plurality of balls 27 disposed between the outer race 25 and the inner race 26. The retainer 23 is of a cylindrical shape. The bearings 21 and 22 are disposed radially inside the retainer 23. The rotating shaft 11 and the rotor 40 are retained radially inside the bearings 21 and 22 to be rotatable. The bearings 21 and 22 are used as a set of bearings to rotatably retain the rotating shaft 11.

Each of the bearings 21 and 22 holds the balls 27 using a retainer, not shown, to keep a pitch between the balls 27 constant. Each of the bearings 21 and 22 is equipped with seals on axially upper and lower ends of the retainer and also has non-conductive grease (e.g., non-conductive urease grease) installed inside the seals. The position of the inner race 26 is mechanically secured by a spacer to exert constant inner precompression on the inner race 26 in the form of a vertical convexity.

The housing 30 includes the cylindrical peripheral wall 31. The peripheral wall 31 has a first end and a second end opposed to each other in an axial direction thereof. The peripheral wall 31 has the end surface 32 on the first end and the opening 33 in the second end. The opening 33 occupies the entire area of the second end. The end surface 32 has formed in the center thereof the circular hole 34. The bearing unit 20 is inserted into the hole 34 and fixed using a fastener, such as a screw or a rivet. The hollow cylindrical rotor 40 and the hollow cylindrical stator 50 are disposed in an inner space defined by the peripheral wall 31 and the end surface 32 within the housing 30. In this embodiment, the rotating electrical machine 10 is of an outer rotor type, so that the stator 50 is arranged radially inside the cylindrical rotor 40 within the housing 30. The rotor 40 is retained in a cantilever form by a portion of the rotating shaft 11 close to the end surface 32 in the axial direction.

The rotor 40 includes the hollow cylindrical magnetic holder 41 and the annular magnet unit 42 disposed radially inside the magnet holder 41. The magnet holder 41 is of substantially a cup-shape and works as a magnet holding member. The magnet holder 41 includes the tubular cylinder 43, the attaching portion 44 which is of a cylindrical shape and smaller in diameter than the cylinder 43, and the intermediate portion 45 connecting the cylinder 43 and the attaching portion 44 together. The cylinder 43 has the magnet unit 42 secured to an inner peripheral surface thereof.

The magnet holder 41 is made of cold rolled steel (SPCC), forging steel, or carbon fiber reinforced plastic (CFRP) which have a required degree of mechanical strength.

The rotating shaft 11 passes through the through-hole 44a of the attaching portion 44. The attaching portion 44 is secured to a portion of the rotating shaft 11 disposed inside the through-hole 44a. In other words, the magnet holder 41 is secured to the rotating shaft 11 through the attaching portion 44. The attaching portion 44 may preferably be joined to the rotating shaft 11 using concavities and convexities, such as a spline joint or a key joint, welding, or crimping, so that the rotor 40 rotates along with the rotating shaft 11.

The bearings 21 and 22 of the bearing unit 20 are secured radially outside the attaching portion 44. The bearing unit 20 is, as described above, fixed on the end surface 32 of the housing 30, so that the rotating shaft 11 and the rotor 40 are retained by the housing 30 to be rotatable. The rotor 40 is, thus, rotatable within the housing 30.

The rotor 40 is equipped with the attaching portion 44 arranged only at one of ends thereof opposed to each other in the axial direction of the rotor 40. This cantilevers the rotor 40 on the rotating shaft 11. The attaching portion 44 of the rotor 40 is rotatably retained at two points of supports using the bearings 21 and 22 of the bearing unit 20 which are located away from each other in the axial direction. In other words, the rotor 40 is held to be rotatable using the two bearings 21 and 22 which are separate at a distance away from each other in the axial direction on one of the axially opposed ends of the magnet holder 41. This ensures the stability in rotation of the rotor 40 even though the rotor 40 is cantilevered on the rotating shaft 11. The rotor 40 is retained by the bearings 21 and 22 at locations which are away from the center intermediate between the axially opposed ends of the rotor 40 in the axial direction thereof.

The bearing 22 of the bearing unit 20 which is located closer to the center of the rotor 40 (a lower one of the bearings 21 and 22 in the drawings) is different in dimension of a gap between each of the outer race 25 and the inner race and the balls 27 from the bearing 21 which is located farther away from the center of the rotor 40 (i.e., an upper one of the bearings 21 and 22). For instance, the bearing 22 closer to the center of the rotor 40 is greater in the dimension of the gap from the bearing 21. This minimizes adverse effects on the bearing unit 20 which arise from deflection of the rotor 40 or mechanical vibration of the rotor 40 Due to imbalance resulting from parts tolerance at a location close to the center of the rotor 40. Specifically, the bearing 22 closer to the center of the rotor 40 is engineered to have dimensions of the gaps or plays increased using precompression, thereby absorbing the vibration generating in the cantilever structure. The precompression may be provided by either fixed position preload or constant pressure preload. In the case of the fixed position preload, the outer race 25 of each of the bearings 21 and 22 is joined to the retainer 23 using press-fitting or welding. The inner race 26 of each of the bearings 21 and 22 is joined to the rotating shaft 11 by press-fitting or welding. The precompression may be created by placing the outer race 25 of the bearing 21 away from the inner race 26 of the bearing 21 in the axial direction or alternatively placing the outer race 25 of the bearing 22 away from the inner race 26 of the bearing 22 in the axial direction.

In the case of the constant pressure preload, a preload spring, such as a wave washer 24, is arranged between the bearing 22 and the bearing 21 to create the preload directed from a region between the bearing 22 and the bearing 21 toward the outer race 25 of the bearing 22 in the axial direction. In this case, the inner race 26 of each of the bearing 21 and the bearing 22 is joined to the rotating shaft 11 using press fitting or bonding. The outer race 25 of the bearing 21 or the bearing 22 is arranged away from the outer race 25 through a given clearance. This structure exerts pressure, as produced by the preload spring, on the outer race 25 of the bearing 22 to urge the outer race 25 away from the bearing 21. The pressure is then transmitted through the rotating shaft 11 to urge the inner race 26 of the bearing 21 toward the bearing 22, thereby bringing the outer race 25 of each of the bearings 21 and 22 away from the inner race 26 thereof in the axial direction to exert the preload on the bearings 21 and 22 in the same way as the fixed position preload.

The constant pressure preload does not necessarily need to exert the spring pressure, as illustrated in FIG. 2, on the outer race 25 of the bearing 22, but may alternatively be created by exerting the spring pressure on the outer race 25 of the bearing 21. The exertion of the preload on the bearings 21 and 22 may alternatively be achieved by placing the inner race 26 of one of the bearings 21 and 22 away from the rotating shaft 11 through a given clearance therebetween and joining the outer race 25 of each of the bearings 21 and 22 to the retainer 23 using press-fitting or bonding.

Further, in the case where the pressure is created to bring the inner race 26 of the bearing 21 away from the bearing 22, such pressure is preferably additionally exerted on the inner race 26 of the bearing 22 away from the bearing 21. Conversely, in the case where the pressure is created to bring the inner race 26 of the bearing 21 close to the bearing 22, such pressure is preferably additionally exerted on the inner race 26 of the bearing 22 to bring it close to the bearing 21.

In a case where the rotating electrical machine 10 is used as a power source for a vehicle, there is a risk that mechanical vibration having a component oriented in a direction in which the preload is created may be exerted on the preload generating structure or that a direction in which the force of gravity acts on an object to which the preload is applied may be changed. In order to alleviate such a problem, the fixed position preload is preferably used in the case where the rotating electrical machine 10 is mounted in the vehicle.

The intermediate portion 45 includes the annular inner shoulder 49a and the annular outer shoulder 49b. The outer shoulder 49b is arranged outside the inner shoulder 49a in the radial direction of the intermediate portion 45. The inner shoulder 49a and the outer shoulder 49b are separate from each other in the axial direction of the intermediate portion 45. This layout results in a partial overlap between the cylinder 43 and the attaching portion 44 in the radial direction of the intermediate portion 45. In other words, the cylinder 43 protrudes outside a base end portion (i.e., a lower portion, as viewed in the drawing) of the attaching portion 44 in the axial direction. The structure in this embodiment enables the rotor 40 to be retained by the rotating shaft 11 at a location closer to the center of gravity of the rotor 40 than a case where the intermediate portion 45 is shaped to be flat without any shoulder, thereby ensuring the stability in operation of the rotor 40.

In the above-described structure of the intermediate portion 45, the rotor 40 has the annular bearing housing recess 46 which is formed in an inner portion of the intermediate portion 45 and radially surrounds the attaching portion 44. The bearing housing recess 46 has a portion of the bearing unit 20 disposed therein. The rotor 40 also has the coil housing recess 47 which is formed in an outer portion of the intermediate portion 45 and radially surrounds the bearing housing recess 46. The coil housing recess 47 has disposed therein the coil end 54 of the stator winding 51 of the stator 50, which will be described later in detail. The housing recesses 46 and 47 are arranged adjacent each other in the axial direction. In other words, a portion of the bearing unit 20 is laid to overlap the coil end 54 of the stator winding 51 in the axial direction. This enables the rotating electrical machine 10 to have a length decreased in the axial direction.

The intermediate portion 45 extends or overhangs outward from the rotating shaft 11 in the radial direction. The intermediate portion 45 is equipped with a contact avoider which extends in the axial direction and avoids a physical contact with the coil end 54 of the stator winding 51 of the stator 50. The intermediate portion 45 will also be referred to as an overhang.

The coil end 54 may be bent radially inwardly or outwardly to have a decreased axial dimension, thereby enabling the axial length of the stator 50 to be decreased. A direction in which the coil end 54 is bent is preferably determined depending upon installation thereof in rotor 40. In the case where the stator 50 is installed radially inside the rotor 40, a portion of the coil end 54 which is inserted into the rotor 40 is preferably bent radially inwardly. A coil end opposite the coil end 54 may be bent either inwardly or outwardly, but is preferably bent to an outward side where there is an enough space in terms of the production thereof.

The magnet unit 42 working as a magnetic portion is made up of a plurality of permanent magnets which are disposed radially inside the cylinder 43 to have different magnetic poles arranged alternately in a circumferential direction thereof. The magnet unit 42, thus, has a plurality of magnetic poles arranged in the circumferential direction. The magnet unit 42 will also be described later in detail.

The stator 50 is arranged radially inside the rotor 40. The stator 50 includes the stator winding 51 wound in a substantially cylindrical (annular) form and the stator core 52 used as a base member arranged radially inside the stator winding 51. The stator winding 51 is arranged to face the annular magnet unit 42 through a given air gap therebetween. The stator winding 51 includes a plurality of phase windings each of which is made of a plurality of conductors which are arranged at a given pitch away from each other in the circumferential direction and joined together. In this embodiment, two three-phase windings: one including a U-phase winding, a V-phase winding, and a W-phase winging and the other including an X-phase winding, a Y-phase winding, and a Z-phase winding are used to complete the stator winding 51 as a six-phase winding.

The stator core 52 is formed by an annular stack of magnetic steel plates made of soft magnetic material and mounted radially inside the stator winding 51. The magnetic steel plates are, for example, silicone nitride steel plates made by adding a small percent (e.g., 3%) of silicone nitride to iron. The stator winding 51 corresponds to an armature winding. The stator core 52 corresponds to an armature core.

The stator winding 51 overlaps the stator core 52 in the radial direction and includes the coil side portion 53 disposed radially outside the stator core 52 and the coil ends 54 and 55 overhanging at ends of the stator core 52 in the axial direction. The coil side portion 53 faces the stator core 52 and the magnet unit 42 of the rotor 40 in the radial direction. The stator 50 is arranged inside the rotor 40. The coil end 54 that is one (i.e., an upper one, as viewed in the drawings) of the axially opposed coil ends 54 and 55 and arranged close to the bearing unit 20 is disposed in the coil housing recess 47 defined by the magnet holder 41 of the rotor 40. The stator 50 will also be described later in detail.

The inverter unit 60 includes the unit base 61 secured to the housing 30 using fasteners, such as bolts, and a plurality of electrical components 62 mounted on the unit base 61.

The unit base 61 is made from, for example, carbon fiber reinforced plastic (CFRP). The unit base 61 includes the end plate 63 secured to an edge of the opening 33 of the housing 30 and the casing 64 which is formed integrally with the end plate 63 and extends in the axial direction. The end plate 63 has the circular opening 65 formed in the center thereof. The casing 64 extends upward from a peripheral edge of the opening 65.

The stator 50 is arranged on an outer peripheral surface of the casing 64. Specifically, an outer diameter of the casing 64 is selected to be identical with or slightly smaller than an inner diameter of the stator core 52. The stator core 52 is attached to the outer side of the casing 64 to complete a unit made up of the stator 50 and the unit base 61. The unit base 61 is secured to the housing 30, so that the stator 50 is unified with the housing 50 in a condition where the stator core 52 is installed on the casing 64.

The stator core 52 may be bonded, shrink-fit, or press-fit on the unit base 61, thereby eliminating positional shift of the stator core 52 relative to the unit base 61 both in the circumferential direction and in the axial direction.

The casing 64 has a radially inner storage space in which the electrical components 62 are disposed. The electrical components 62 are arranged to surround the rotating shaft 11 within the storage space. The casing 64 functions as a storage space forming portion. The electrical components 62 include the semiconductor modules 66, the control board 67, and the capacitor module 68 which constitute an inverter circuit.

The unit base 61 serves as a stator holder (i.e., an armature holder) which is arranged radially inside the stator 50 and retains the stator 50. The housing 30 and the unit base 61 define a motor housing for the rotating electrical machine 10. In the motor housing, the retainer 23 is secured to a first end of the housing 30 which is opposed to a second end of the housing 30 through the rotor 40 in the axial direction. The second end of the housing 30 and the unit base 61 are joined together. For instance, in an electric-powered vehicle, such as an electric automobile, the motor housing is attached to a side of the vehicle to install the rotating electrical machine 10 in the vehicle.

Figure 6:
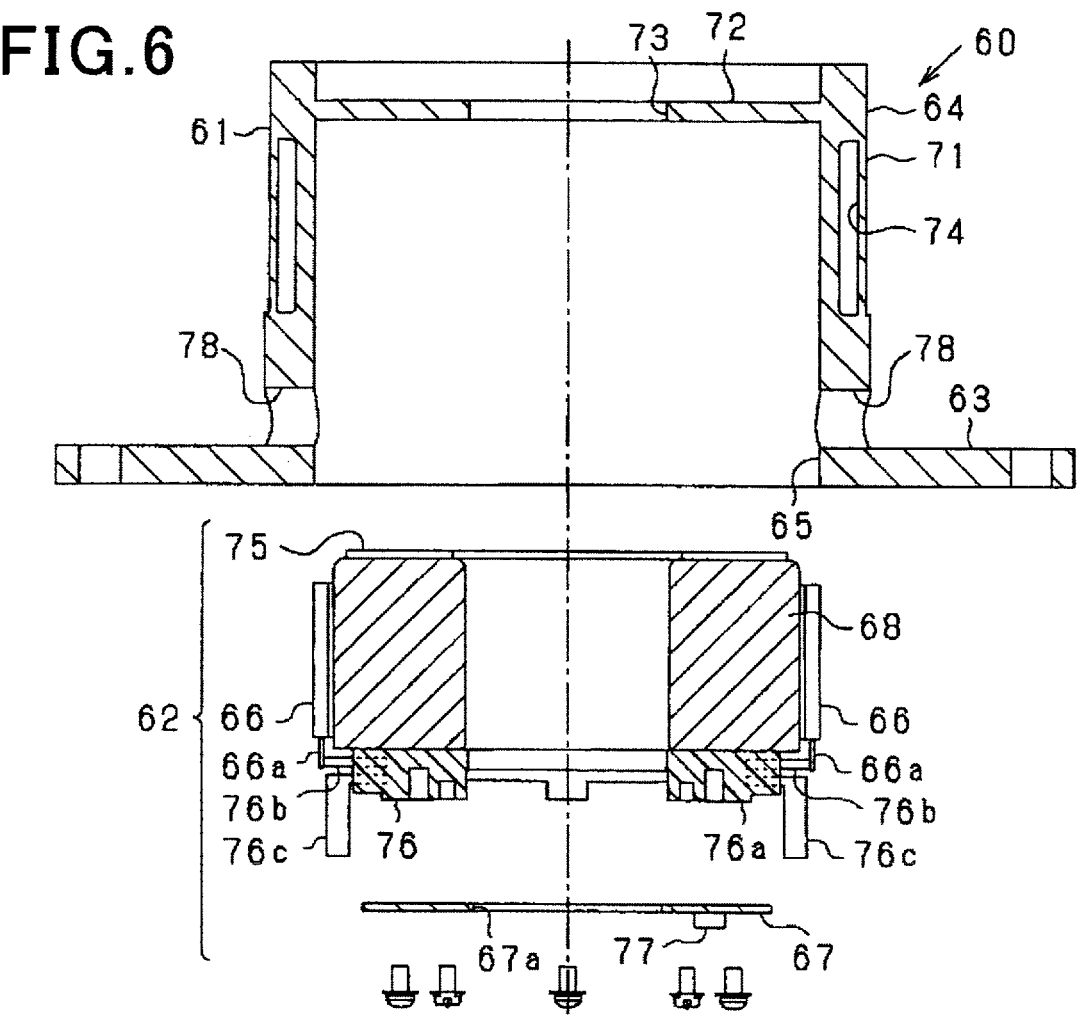
FIG. 6 is an exploded view of an inverter unit.

The inverter unit 60 will be also be described using FIG. 6 that is an exploded view in addition to FIGS. 1 to 5.

The casing 64 of the unit base 61 includes the cylinder 71 and the end surface 72 that is one of ends of the cylinder 71 which are opposed to each other in the axial direction of the cylinder 71 (i.e., the end of the casing 64 close to the bearing unit 20). The end of the cylinder 71 opposed to the end surface 72 in the axial direction is shaped to fully open to the opening 65 of the end plate 63. The end surface 72 has formed in the center thereof the circular hole 73 through which the rotating shaft 11 is insertable. The hole 73 has fitted therein the sealing member 171 which hermetically seals an air gap between the hole 73 and the outer periphery of the rotating shaft 11. The sealing member 171 is preferably implemented by, for example, a resinous slidable seal.

The cylinder 71 of the casing 64 serves as a partition which isolates the rotor 40 and the stator 50 arranged radially outside the cylinder 71 from the electrical components 62 arranged radially inside the cylinder 71. The rotor 40, the stator 50, and the electrical components 62 are arranged radially inside and outside the cylinder 71.

The electrical components 62 are electrical devices making up the inverter circuit equipped with a motor function and a generator function. The motor function is to deliver electrical current to the phase windings of the stator winding 51 in a given sequence to turn the rotor 40. The generator function is to receive a three-phase ac current flowing through the stator winding 51 in response to the rotation of the rotating shaft 11 and generate and output electrical power. The electrical components 62 may be engineered to perform either one of the motor function and the generator function. In a case where the rotating electrical machine 10 is used as a power source for a vehicle, the generator function provides a regenerative function to output a regenerated electrical power.

Specifically, the electrical components 62, as demonstrated in FIG. 4, include the hollow cylindrical capacitor module 68 arranged around the rotating shaft 11 and the semiconductor modules 66 mounted on the capacitor module 68. The capacitor module 68 has a plurality of smoothing capacitors 68a connected in parallel to each other. Specifically, each of the capacitors 68a is implemented by a stacked-film capacitor which is made of a plurality of film capacitors stacked in a trapezoidal shape in cross section. The capacitor module 68 is made of the twelve capacitors 68a arranged in an annular shape.

The capacitors 68a may be produced by preparing a long film which has a given width and is made of a stack of films and cutting the long film into isosceles trapezoids each of which has a height identical with the width of the long film and whose short bases and long bases are alternately arranged. Electrodes are attached to the thus produced capacitor devices to complete the capacitors 68a.

The semiconductor module 66 includes, for example, a semiconductor switch, such as a MOSFET or an IGBT and is of substantially a planar shape. In this embodiment, the rotating electrical machine 10 is, as described above, equipped with two sets of three-phase windings and has the inverter circuits, one for each set of the three-phase windings. The electrical components 62, therefore, include a total of twelve semiconductor modules 66 which are arranged in an annular form to make up the semiconductor module group 66A.

The semiconductor modules 66 are interposed between the cylinder 71 of the casing 64 and the capacitor module 68. The semiconductor module group 66A has an outer peripheral surface placed in contact with an inner peripheral surface of the cylinder 71. The semiconductor module group 66A also has an inner peripheral surface placed in contact with an outer peripheral surface of the capacitor module 68. This causes heat, as generated in the semiconductor modules 66, to be transferred to the end plate 63 through the casing 64, so that it is dissipated from the end plate 63.

The semiconductor module group 66A preferably has the spacers 69 disposed radially outside the outer peripheral surface thereof, i.e., between the semiconductor modules 66 and the cylinder 71. A combination of the capacitor modules 68 is so arranged as to have a regular dodecagonal section extending perpendicular to the axial direction thereof, while the inner periphery of the cylinder 71 has a circular transverse section. The spacers 69 are, therefore, each shaped to have a flat inner peripheral surface and a curved outer peripheral surface. The spacers 69 may alternatively be formed integrally with each other in an annular shape and disposed radially outside the semiconductor module group 66A. The spacers 69 are highly thermally conductive and made of, for example, metal, such as aluminum or heat dissipating gel sheet. The inner periphery of the cylinder 71 may alternatively be shaped to have a dodecagonal transverse section like the capacitor modules 68. In this case, the spacers 69 are each preferably shaped to have a flat inner peripheral surface and a flat outer peripheral surface.

In this embodiment, the cylinder 71 of the casing 64 has formed therein the coolant path 74 through which coolant flows. The heat generated in the semiconductor modules 66 is also released to the coolant flowing in the coolant path 74. In other words, the casing 64 is equipped with a cooling mechanism. The coolant path 74 is, as clearly illustrated in FIGS. 3 and 4, formed in an annular shape and surrounds the electrical components 62 (i.e., the semiconductor modules 66 and the capacitor module 68). The semiconductor modules 66 are arranged along the inner peripheral surface of the cylinder 71. The coolant path 74 is laid to overlap the semiconductor modules 66 in the radial direction.

The stator 50 is arranged outside the cylinder 71. The electrical components 62 are arranged inside the cylinder 71. This layout causes the heat to be transferred from the stator 50 to the outer side of the cylinder 71 and also transferred from the electrical components 62 (e.g., the semiconductor modules 66) to the inner side of the cylinder 71. It is possible to simultaneously cool the stator 50 and the semiconductor modules 66, thereby facilitating dissipation of thermal energy generated by heat-generating members of the rotating electrical machine 10.

Further, at least one of the semiconductor modules 66 which constitute part or all of the inverter circuits serving to energize the stator winding 51 to drive the rotating electrical machine is arranged in a region surrounded by the stator core 52 disposed radially outside the cylinder 71 of the casing 64. Preferably, one of the semiconductor modules 66 may be arranged fully inside the region surrounded by the stator core 52. More preferably, all the semiconductor modules 66 may be arranged fully in the region surrounded by the stator core 52.

At least a portion of the semiconductor modules 66 is arranged in a region surrounded by the coolant path 74. Preferably, all the semiconductor modules 66 may be arranged in a region surrounded by the yoke 141.

The electrical components 62 include the insulating sheet 75 disposed on one of axially opposed end surfaces of the capacitor module 68 and the wiring module 76 disposed on the other end surface of the capacitor module 68. The capacitor module 68 has two axially-opposed end surfaces: a first end surface and a second end surface. The first end surface of the capacitor module 68 closer to the bearing unit 20 faces the end surface 72 of the casing 64 and is laid on the end surface 72 through the insulating sheet 75. The second end surface of the capacitor module 68 closer to the opening 65 has the wiring module 76 mounted thereon.

The wiring module 76 includes the resin-made circular plate-shaped body 76a and a plurality of bus bars 76b and 76c embedded in the body 76a. The bus bars 76b and 76c electrically connect the semiconductor modules 66 and the capacitor module 68 together. Specifically, the semiconductor modules 66 are equipped with the connecting pins 66a extending from axial ends thereof. The connecting pins 66a connect with the bus bars 76b radially outside the body 76a. The bus bars 76c extend away from the capacitor module 68 radially outside the body 76a and have top ends connecting with the wiring members 79 (see FIG. 2).

The capacitor module 68, as described above, has the insulating sheet 75 mounted on the first end surface thereof. The capacitor module 68 also has the wiring module 76 mounted on the second end surface thereof. The capacitor module 68, therefore, has two heat dissipating paths which extend from the first and second end surfaces of the capacitor module 68 to the end surface 72 and the cylinder 71. Specifically, a heat dissipating path is defined which extends from the first end surface to the end surface 72. Another heat dissipating path is defined which extends from the second end surface to the cylinder 71. This enables the heat to be released from the end surfaces of the capacitor module 68 other than the outer peripheral surface on which the semiconductor modules 66 are arranged. In other words, it is possible to dissipate the heat not only in the radial direction, but also in the axial direction.

The capacitor module 68 is of a hollow cylindrical shape and has the rotating shaft 11 arranged therewithin at a given interval away from the inner periphery of the capacitor module 68, so that heat generated by the capacitor module 68 will be dissipated from the hollow cylindrical space. The rotation of the rotating shaft 11 usually produces a flow of air, thereby enhancing cooling effects.

The wiring module 76 has the disc-shaped control board 67 attached thereto. The control board 67 includes a printed circuit board (PCB) on which given wiring patterns are formed and also has ICs and the control device 77 mounted thereon. The control device 77 serves as a controller and is made of a microcomputer. The control board 67 is secured to the wiring module 76 using fasteners, such as screws. The control board 67 has formed in the center thereof the hole 67a through which the rotating shaft 11 passes.

The wiring module 76 has a first surface and a second surface opposed to each other in the axial direction, that is, a thickness-wise direction of the wiring module 76. The first surface faces the capacitor module 68. The wiring module 76 has the control board 67 mounted on the second surface thereof. The bus bars 76c of the wiring module 76 extend from one of surfaces of the control board 67 to the other. The control board 67 may have cut-outs for avoiding physical interference with the bus bars 76c. For instance, the control board 67 may have the cut-outs formed in portions of the circular outer edge thereof.

The electrical components 62 are, as described already, arranged inside the space surrounded by the casing 64. The housing 30, the rotor 40, and the stator 50 are disposed outside the space in the form of layers. This structure serves to shield against electromagnetic noise generated in the inverter circuits. Specifically, the inverter circuit works to control switching operations of the semiconductor modules 66 in a PWM control mode using a given carrier frequency. The switching operations usually generate electromagnetic noise against which the housing 30, the rotor 40, and the stator 50 which are arranged outside the electrical components 62 shield.

Further, at least a portion of the semiconductor modules 66 is arranged inside the region surrounded by the stator core 52 located radially outside the cylinder 71 of the casing 64, thereby minimizing adverse effects of magnetic flux generated by the semiconductor modules 66 on the stator winding 51 as compared with a case where the semiconductor modules 66 and the stator winding 51 are arranged without the stator core 52 interposed therebetween. The magnetic flux created by the stator winding 51 also hardly affects the semiconductor modules 66. It is more effective that the whole of the semiconductor modules 66 are located in the region surrounded by the stator core 52 disposed radially outside the cylinder 71 of the casing 64. When at least a portion of the semiconductor modules 66 is surrounded by the coolant path 74, it offers a beneficial advantage that the heat produced by the stator winding 51 or the magnet unit 42 is prevented from reaching the semiconductor modules 66.

The cylinder 71 has the through-holes 78 which are formed near the end plate 63 and through which the wiring members 79 (see FIG. 2) pass to electrically connect the stator 50 disposed outside the cylinder 71 and the electrical components 62 arranged inside the cylinder 71. The wiring members 79, as illustrated in FIG. 2, connect with ends of the stator winding 51 and the bus bars 76c of the wiring module 76 using crimping or welding techniques. The wiring members 79 are implemented by, for example, bus bars whose joining surfaces are preferably flattened. A single through-hole 78 or a plurality of through-holes 78 are preferably provided. This embodiment has two through-holes 78. The use of the two through-holes 78 facilitates the ease with which terminals extending from the two sets of the three-phase windings are connected by the wiring members 79, and is suitable for achieving multi-phase wire connections.

The rotor 40 and the stator 50 are, as described already in FIG. 4, arranged within the housing 30 in this order in a radially inward direction. The inverter unit 60 is arranged radially inside the stator 50. If a radius of the inner periphery of the housing 30 is defined as d, the rotor 40 and the stator 50 are located radially outside a distance of d×0.705 away from the center of rotation of the rotor 40. If a region located radially inside the inner periphery of the stator 50 (i.e., the inner circumferential surface of the stator core 52) is defined as a first region X1, and a region radially extending from the inner periphery of the stator 50 to the housing 30 is defined as a second region X2, a cross-sectional area of the first region X1 is set greater than that of the second region X2. In a region where the magnet unit 42 of the rotor 40 overlaps the stator winding 51, the volume of the first region X1 is larger than that of the second region X2.

The rotor 40 and the stator 50 are fabricated as a magnetic circuit component assembly. In the housing 30, the first region X1 which is located radially inside the inner peripheral surface of the magnetic circuit component assembly is larger in volume than the region X2 which lies between the inner peripheral surface of the magnetic circuit component assembly and the housing 30 in the radial direction.

Next, the structures of the rotor 40 and the stator 50 will be described below in more detail.

Typical rotating electrical machines are known which are equipped with a stator with an annular stator core which is made of a stack of steel plates and has a stator winding wound in a plurality of slots arranged in a circumferential direction of the stator core. Specifically, the stator core has teeth extending in a radial direction thereof at a given interval away from a yoke. Each slot is formed between the two radially adjacent teeth. In each slot, a plurality of conductors are arranged in the radial direction in the form of layers to form the stator winding.

However, the above-described stator structure has a risk that when the stator winding is energized, an increase in magnetomotive force in the stator winding may result in magnetic saturation in the teeth of the stator core, thereby restricting torque density in the rotating electrical machine. In other words, rotational flux, as created by the energization of the stator winding of the stator core, is thought of as concentrating on the teeth, which has a risk of causing magnetic saturation.

Generally, IPM (Interior Permanent Magnet) rotors are known which have a structure in which permanent magnets are arranged on a d-axis of a d-q axis coordinate system, and a rotor core is placed on a q-axis of the d-q axis coordinate system. Excitation of a stator winding near the d-axis will cause an excited magnetic flux to flow from a stator to a rotor according to Fleming's rules. This causes magnetic saturation to occur widely in the rotor core on the q-axis.

Figure 7:
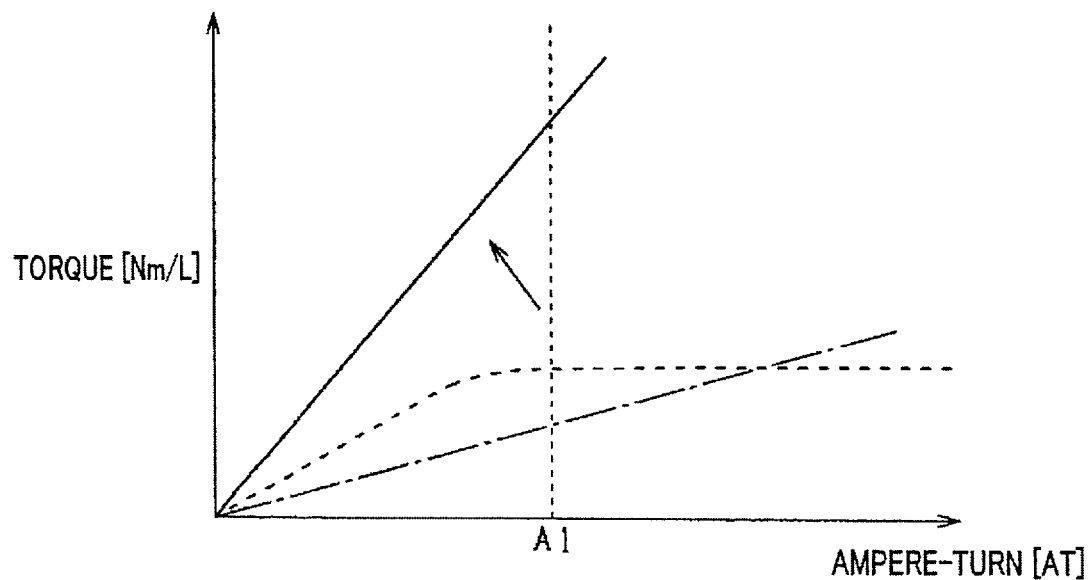
FIG. 7 is a torque diagrammatic view which demonstrates a relationship between ampere-turns and torque density in a stator winding.

FIG. 7 is a torque diagrammatic view which demonstrates a relationship between an ampere-turn (AT) representing a magnetomotive force created by the stator winding and a torque density (Nm/L). A broken line indicates characteristics of a typical IPM rotor-rotating electrical machine. FIG. 7 shows that in the typical rotating electrical machine, an increase in magnetomotive force in the stator will cause magnetic saturation to occur at two places: the tooth between the slots and the q-axis rotor (i.e., the rotor core on the q-axis), thereby restricting an increase in torque. In this way, a design value of the ampere-turn is restricted at μl in the typical rotating electrical machine.

In order to alleviate the above problem in this embodiment, the rotating electrical machine 10 is designed to have an additional structure, as will be described below, in order to eliminate the restriction arising from the magnetic saturation. Specifically, as a first measure, the stator 50 is designed to have a slot-less structure for eliminating the magnetic saturation occurring in the teeth of the stator core of the stator and also to use an SPM (Surface Permanent Magnet) rotor for eliminating the magnetic saturation occurring in a q-axis core of the IPM rotor. The first measure serves to eliminate the above described two places where the magnetic saturation occurs, but however, may result in a decrease in torque in a low-current region (see an alternate long and short dash line in FIG. 7). In order to alleviate this problem, as a second measure, a polar anisotropic structure is employed to increase the length of a magnetic path of magnets in the magnet unit 42 of the rotor 40 to enhance a magnetic force in order to increase a magnetic flux in the SPM rotor to minimize the torque decrease.

Additionally, as a third measure, a flattened conductor structure is employed to decrease a thickness of conductors of the coil side portion 53 of the stator winding 51 in the radial direction of the stator 50 for compensating for the torque decrease. The above magnetic force-enhanced polar anisotropic structure is thought of as resulting in a flow of large eddy current in the stator winding 51 facing the magnet unit 42. The third measure is, however, to employ the flattened conductor structure in which the conductors have a decreased thickness in the radial direction, thereby minimizing the generation of the eddy current in the stator winding 51 in the radial direction. In this way, the above first to third structures are, as indicated by a solid line in FIG. 7, expected to greatly improve the torque characteristics using high-magnetic force magnets and also alleviate a risk of generation of a large eddy current resulting from the use of the high-magnetic force magnets.

Additionally, as a fourth measure, a magnet unit is employed which has a polar anisotropic structure to create a magnetic density distribution approximating a sine wave. This increases a sine wave matching percentage using pulse control, as will be described later, to enhance the torque and also results in a moderate change in magnetic flux, thereby minimizing an eddy-current loss (i.e., a copper loss caused by eddy current) as compared with radial magnets.

The sine wave matching percentage will be described below. The sine wave matching percentage may be derived by comparing a waveform, a cycle, and a peak value of a surface magnetic flux density distribution measured by actually moving a magnetic flux probe on a surface of a magnet with those of a sine wave. The since wave matching percentage is given by a percentage of an amplitude of a primary waveform that is a waveform of a fundamental wave in a rotating electrical machine to that of the actually measured waveform, that is, an amplitude of the fundamental wave to which a harmonic component is added. An increase in the sine wave matching percentage will cause the waveform in the surface magnetic flux density distribution to approach the waveform of the sine wave. When an electrical current of a primary sine wave is delivered by an inverter to a rotating electrical machine equipped with magnets having an improved sine wave matching percentage, it will cause a large degree of torque to be produced, combined with the fact that the waveform in the surface magnetic flux density distribution of the magnet is close to the waveform of a sine wave. The surface magnetic flux density distribution may alternatively be derived using electromagnetic analysis according to Maxwell's equations.

As a fifth measure, the stator winding 51 is designed to have a conductor strand structure made of a bundle of wires. In the conductor strand structure of the stator winding 51, the wires are connected parallel to each other, thus enabling a high current or large amount of current to flow in the stator winding 51 and also minimizing an eddy current occurring in the conductors widened in the circumferential direction of the stator 50 more effectively than the third measure in which the conductors are flattened in the radial direction because each of the wires has a decreased transverse sectional area. The use of the bundle of the wires will cancel an eddy current arising from magnetic flux occurring according to Ampere's circuital law in response to the magnetomotive force produced by the conductors.

The use of the fourth and fifth measures minimizes the eddy-current loss resulting from the high magnetic force produced by the high-magnetic force magnets provided by the second measure and also enhance the torque.

Figure 8:
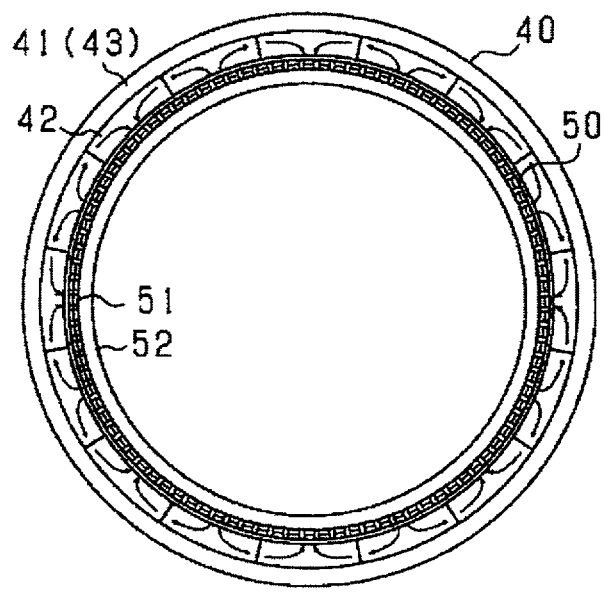
FIG. 8 is a transverse sectional view of a rotor and a stator.
Figure 9:
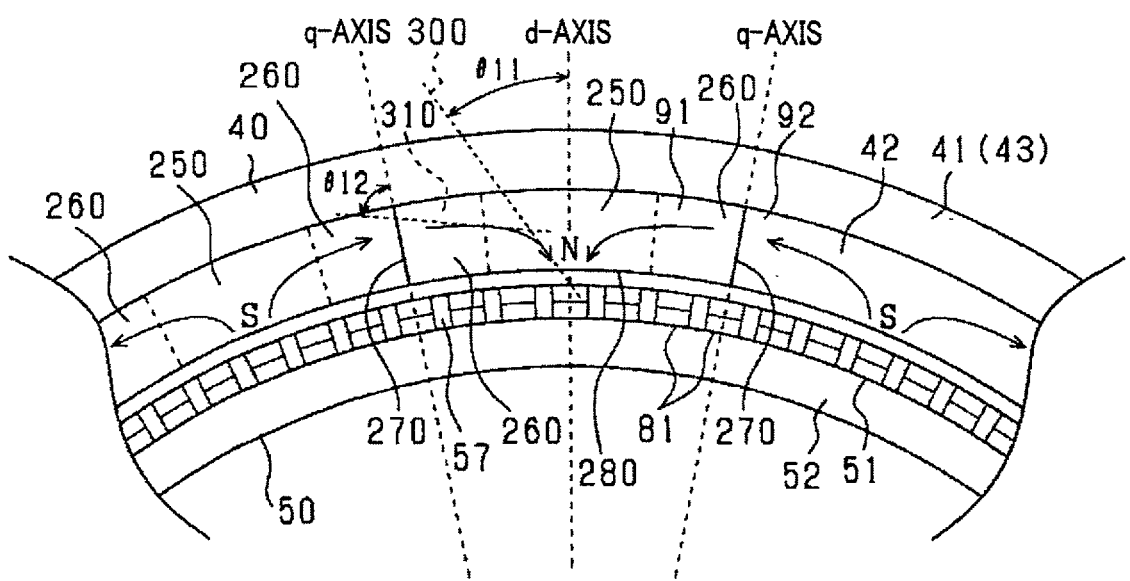
FIG. 9 is an enlarged view of part of FIG. 8.
Figure 10:
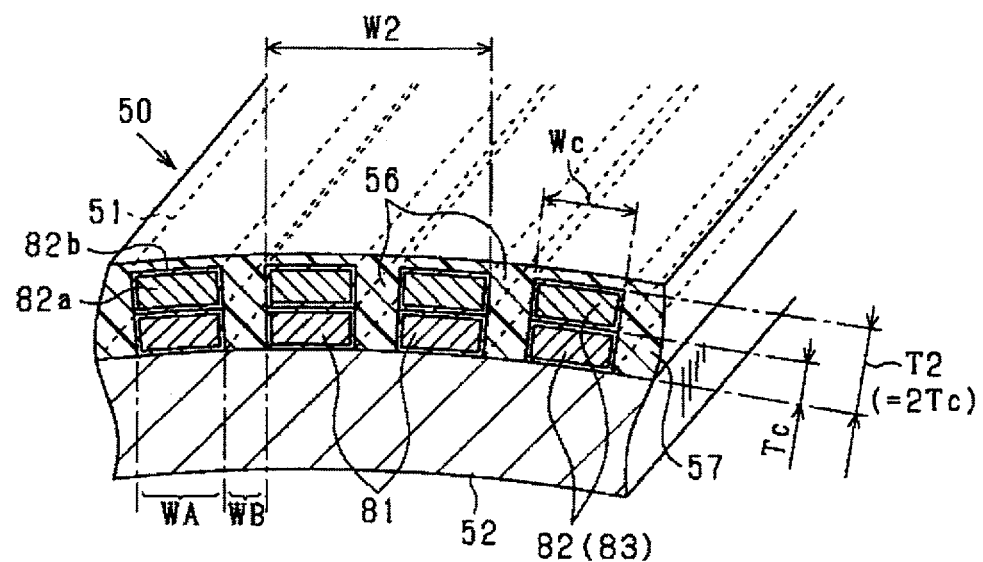
FIG. 10 is a transverse sectional view of a stator.
Figure 11:
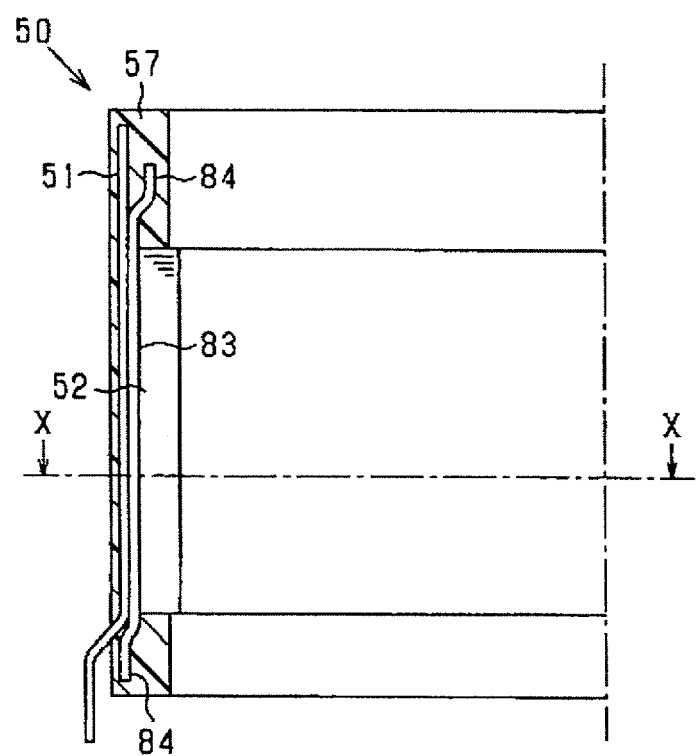
FIG. 11 is a longitudinal sectional view of a stator.
Figure 12:
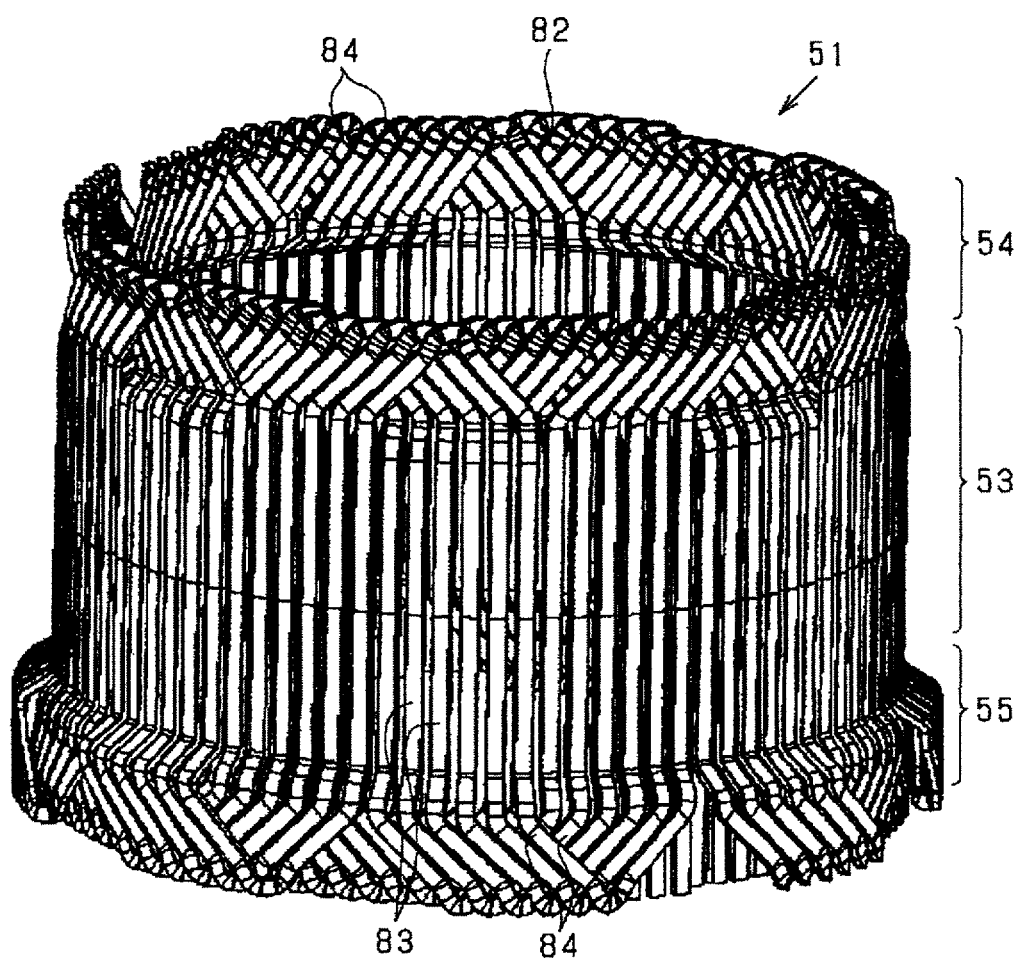
FIG. 12 is a perspective view of a stator winding.

The slot-less structure of the stator 50, the flattened conductor structure of the stator winding 51, and the polar anisotropic structure of the magnet unit 42 will be described below. The slot-less structure of the stator 50 and the flattened conductor structure of the stator winding 51 will first be discussed. FIG. 8 is a transverse sectional view illustrating the rotor 40 and the stator 50. FIG. 9 is a partially enlarged view illustrating the rotor 40 and the stator 50 in FIG. 8. FIG. 10 is a transverse sectional view of the stator 50 taken along the line X-X in FIG. 11. FIG. 11 is a longitudinal sectional view of the stator 50. FIG. 12 is a perspective view of the stator winding 51. FIGS. 8 and 9 indicate directions of magnetization of magnets of the magnet unit 42 using arrows.

The stator core 52 is, as clearly illustrated in FIGS. 8 to 11, of a cylindrical shape and made of a plurality of magnetic steel plates stacked in the axial direction of the stator core 52 to have a given thickness in a radial direction of the stator core 52. The stator winding 51 is mounted on the outer periphery of the stator core 52 which faces the rotor 40. The outer peripheral surface of the stator core 52 facing the rotor 40 serves as a conductor mounting portion (i.e., a conductor area). The outer peripheral surface of the stator core 52 is shaped as a curved surface without any irregularities. A plurality of conductor groups 81 are arranged on the outer peripheral surface of the stator core 52 at given intervals away from each other in the circumferential direction of the stator core 52. The stator core 52 functions as a back yoke that is a portion of a magnetic circuit working to rotate the rotor 40. The stator 50 is designed to have a structure in which a tooth (i.e., a core) made of a soft magnetic material is not disposed between a respective two of the conductor groups 81 arranged adjacent each other in the circumferential direction (i.e., the slot-less structure). In this embodiment, a resin material of the sealing member 57 is disposed in the space or gap 56 between a respective adjacent two of the conductor groups 81. In other words, the stator 50 has an inter-conductor member which is disposed between the conductor groups 81 arranged adjacent each other in the circumferential direction of the stator 50 and made of a non-magnetic material. The inter-conductor members serve as the sealing members 57. Before the sealing members 57 are placed to seal the gaps 56, the conductor groups 81 are arranged in the circumferential direction radially outside the stator core 52 at a given interval away from each other through the gaps 56 that are conductor-to-conductor regions. This makes up the slot-less structure of the stator 50. In other words, each of the conductor groups 81 is, as described later in detail, made of two conductors 82. An interval between a respective two of the conductor groups 81 arranged adjacent each other in the circumferential direction of the stator 50 is occupied only by a non-magnetic material. The non-magnetic material, as referred to herein, includes a non-magnetic gas, such as air, or a non-magnetic liquid. In the following discussion, the sealing members 57 will also be referred to as inter-conductor members.

The structure, as referred to herein, in which the teeth are respectively disposed between the conductor groups 81 arrayed in the circumferential direction means that each of the teeth has a given thickness in the radial direction and a given width in the circumferential direction of the stator 50, so that a portion of the magnetic circuit, that is, a magnet magnetic path lies between the adjacent conductor groups 81. In contrast, the structure in which no tooth lies between the adjacent conductor groups 81 means that there is no magnetic circuit between the adjacent conductor groups 81.

The stator winding (i.e., the armature winding) 51, as illustrated in FIG. 10, has a given thickness T2 (which will also be referred to below as a first dimension) and a width W2 (which will also be referred to below as a second dimension). The thickness T2 is given by a minimum distance between an outer side surface and an inner side surface of the stator winding 51 which are opposed to each other in the radial direction of the stator 50. The width W2 is given by a dimension of a portion of the stator winding 51 which functions as one of multiple phases (i.e., the U-phase, the V-phase, the W-phase, the X-phase, the Y-phase, and the Z-phase in this embodiment) of the stator winding 51 in the circumferential direction. Specifically, in a case where the two conductor groups 81 arranged adjacent each other in the circumferential direction in FIG. 10 serve as one of the three phases, for example, the U-phase winding, a distance between the circumferentially outermost ends of the two circumferentially adjacent conductor groups 81 is the width W2. The thickness T2 is smaller than the width W2.

The thickness T2 is preferably set smaller than the sum of widths of the two conductor groups 81 within the width W2. If the stator winding 51 (more specifically, the conductor 82) is designed to have a true circular transverse section, an oval transverse section, or a polygonal transverse section, the cross section of the conductor 82 taken in the radial direction of the stator 50 may be shaped to have a maximum dimension W12 in the radial direction of the stator 50 and a maximum dimension W11 in the circumferential direction of the stator 50.

The stator winding 51 is, as can be seen in FIGS. 10 and 11, sealed by the sealing members 57 which are formed by a synthetic resin mold. Specifically, the stator winding 51 and the stator core 52 are put in a mold together when the sealing members 57 are molded by the resin. The resin may be considered as a non-magnetic material or an equivalent thereof whose Bs (saturation magnetic flux density) is zero.

As a transverse section is viewed in FIG. 10, the sealing members 57 are provided by placing synthetic resin in the gaps 56 between the conductor groups 81. The sealing members 57 serve as insulators arranged between the conductor groups 81. In other words, each of the sealing members 57 functions as an insulator in one of the gaps 56. The sealing members 57 occupy a region which is located radially outside the stator core 52, and includes all the conductor groups 81, in other words, which is defined to have a dimension larger than that of each of the conductor groups 81 in the radial direction.

As a longitudinal section is viewed in FIG. 11, the sealing members 57 lie to occupy a region including the turns 84 of the stator winding 51. Radially inside the stator winding 51, the sealing members 57 lie in a region including at least a portion of the axially opposed ends of the stator core 52. In this case, the stator winding 51 is fully sealed by the resin except for the ends of each phase winding, i.e., terminals joined to the inverter circuits.

The structure in which the sealing members 57 are disposed in the region including the ends of the stator core 52 enables the sealing members 57 to compress the stack of the steel plates of the stator core 52 inwardly in the axial direction. In other words, the sealing members 57 work to firmly retain the stack of the steel plates of the stator core 52. In this embodiment, the inner peripheral surface of the stator core 52 is not sealed using resin, but however, the whole of the stator core 52 including the inner peripheral surface may be sealed using resin.

In a case where the rotating electrical machine 10 is used as a power source for a vehicle, the sealing members 57 are preferably made of a high heat-resistance fluororesin, epoxy resin, PPS resin, PEEK resin, LCP resin, silicone resin, PAI resin, or PI resin. In terms of a linear coefficient expansion to minimize breakage of the sealing members 57 due to an expansion difference, the sealing members 57 are preferably made of the same material as that of an outer film of the conductors of the stator winding 51. The silicone resin whose linear coefficient expansion is twice or more those of other resins is preferably excluded from the material of the sealing members 57. In a case of electrical products, such as electric vehicles equipped with no combustion engine, PPO resin, phenol resin, or FRP resin which resists 180° C. may be used, except in fields where an ambient temperature of the rotating electrical machine is expected to be not higher than 100° C.

The degree of torque outputted by the rotating electrical machine 10 is usually proportional to the degree of magnetic flux. In a case where a stator core is equipped with teeth, a maximum amount of magnetic flux in the stator core is restricted depending upon the saturation magnetic flux density in the teeth, while in a case where the stator core is not equipped with teeth, the maximum amount of magnetic flux in the stator core is not restricted. Such a structure is, therefore, useful for increasing an amount of electrical current delivered to the stator winding 51 to increase the degree of torque produced by the rotating electrical machine 10.

This embodiment employs the slot-less structure in which the stator 50 is not equipped with teeth, thereby resulting in a decrease in inductance of the stator 50. Specifically, a stator of a typical rotating electrical machine in which conductors are disposed in slots isolated by teeth from each other has an inductance of approximately 1 mH, while the stator 50 in this embodiment has a decreased inductance of 5 to 60 pH. The rotating electrical machine 10 in this embodiment is of an outer rotor type, but has a decreased inductance of the stator 50 to decrease a mechanical time constant Tm. In other words, the rotating electrical machine 10 is capable of outputting a high degree of torque and designed to have a decreased value of the mechanical time constant Tm. If inertia is defined as J, inductance is defined as L, torque constant is defined as Kt, and back electromotive force constant is defined as Ke, the mechanical time constant Tm is calculated according to the equation of Tm=(J×L)/(Kt×Ke). This shows that a decrease in inductance L will result in a decrease in mechanical time constant Tm.

Each of the conductor groups 81 arranged radially outside the stator core 52 is made of a plurality of conductors 82 whose transverse section is of a flattened rectangular shape and which are disposed on one another in the radial direction of the stator core 52. Each of the conductors 82 is oriented to have a transverse section meeting a relation of radial dimension<circumferential dimension. This causes each of the conductor groups 81 to be thin in the radial direction. A conductive region of the conductor group 81 also extends inside a region occupied by teeth of a typical stator. This creates a flattened conductive region structure in which a sectional area of each of the conductors 82 is increased in the circumferential direction, thereby alleviating a risk that the amount of thermal energy may be increased by a decrease in sectional area of a conductor arising from flattening of the conductor. A structure in which a plurality of conductors are arranged in the circumferential direction and connected in parallel to each other is usually subjected to a decrease in sectional area of the conductors by a thickness of a coated layer of the conductors, but however, has beneficial advantages obtained for the same reasons as described above. In the following discussion, each of the conductor groups 81 or each of the conductors 82 will also be referred to as a conductive member.

The stator 50 in this embodiment is, as described already, designed to have no slots, thereby enabling the stator winding 51 to be designed to have a conductive region of an entire circumferential portion of the stator 50 which is larger in size than a non-conductive region unoccupied by the stator winding 51 in the stator 50. In typical rotating electrical machines for vehicles, a ratio of the conductive region/the non-conductive region is usually one or less. In contrast, this embodiment has the conductor groups 81 arranged to have the conductive region substantially identical in size with or larger in size than the non-conductive region. If the conductor region, as illustrated in FIG. 10, occupied by the conductor 82 (i.e., the straight section 83 which will be described later in detail) in the circumferential direction is defined as WA, and a conductor-to-conductor region that is an interval between a respective adjacent two of the conductors 82 is defined as WB, the conductor region WA is larger in size than the conductor-to-conductor region WB in the circumferential direction.

The conductor group 81 of the stator winding 51 has a thickness in the radial direction thereof which is smaller than a circumferential width of a portion of the stator winding 51 which lies in a region of one magnetic pole and serves as one of the phases of the stator winding 51. In the structure in which each of the conductor groups 81 is made up of the two conductors 82 stacked in the form of two layers lying on each other in the radial direction, and the two conductor groups 81 are arranged in the circumferential direction within a region of one magnetic pole for each phase, a relation of Tc×2<Wc×2 is met where Tc is the thickness of each of the conductors 82 in the radial direction, and Wc is the width of each of the conductors 82 in the circumferential direction. In another structure in which each of the conductor groups 81 is made up of the two conductors 82, and each of the conductor groups 81 lies within the region of one magnetic pole for each phase, a relation of Tc×2<Wc is preferably met. In other words, in the stator winding 51 which is designed to have conductor portions (i.e., the conductor groups 81) arranged at a given interval away from each other in the circumferential direction, the thickness of each conductor portion (i.e., the conductor group 81) in the radial direction is set smaller than the width of a portion of the stator winding 51 lying in the region of one magnetic pole for each phase in the circumferential direction.

In other words, each of the conductors 82 is preferably shaped to have the thickness Tc in the radial direction which is smaller than the width Wc in the circumferential direction. The thickness 2Tc of each of the conductor groups 81 each made of a stack of the two conductors 82 in the radial direction is preferably smaller than the width Wc of each of the conductor groups 81 in the circumferential direction.

The degree of torque produced by the rotating electrical machine 10 is substantially inversely proportional to the thickness of the stator core 52 in the radial direction. The conductor groups 81 arranged radially outside the stator core 52 are, as described above, designed to have the thickness decreased in the radial direction. This design is useful in increasing the degree of torque outputted by the rotating electrical machine 10. This is because a distance between the magnet unit 42 of the rotor 40 and the stator core 52 (i.e., a distance in which there is no iron) may be decreased to decrease the magnetic resistance. This enables interlinkage magnetic flux in the stator core 52 produced by the permanent magnets to be increased to enhance the torque.

The decrease in thickness of the conductor groups 81 facilitates the ease with which a magnetic flux leaking from the conductor groups 81 is collected in the stator core 52, thereby preventing the magnetic flux from leaking outside the stator core 52 without being used for enhancing the torque. This avoids a drop in magnetic force arising from the leakage of the magnetic flux and increases the interlinkage magnetic flux in the stator core 52 produced by the permanent magnets, thereby enhancing the torque.

Each of the conductors 82 is made of a coated conductor formed by covering the surface of the conductor body 82a with the coating 82b. The conductors 82 stacked on one another in the radial direction are, therefore, insulated from each other. Similarly, the conductors 82 are insulated from the stator core 52. The insulating coating 82b may be a coating of each wire 86, as will be described later in detail, in a case where each wire 86 is made of wire with a self-bonded coating or may be made by an additional insulator disposed on a coating of each wire 86. Each phase winding made of the conductors 82 is insulated by the coating 82b except an exposed portion thereof for joining purposes. The exposed portion includes, for example, an input or an output terminal or a neutral point in a case of a star connection. The conductor groups 81 arranged adjacent each other in the radial direction are firmly adhered to each other using resin or self-bonding coated wire, thereby minimizing a risk of insulation breakdown, mechanical vibration, or noise caused by rubbing of the conductors 82.

Figure 13:
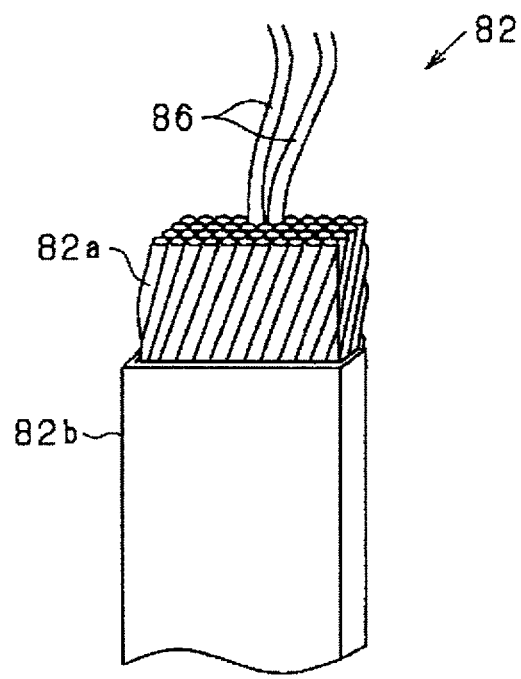
FIG. 13 is a perspective view of a conductor.
Figure 14:
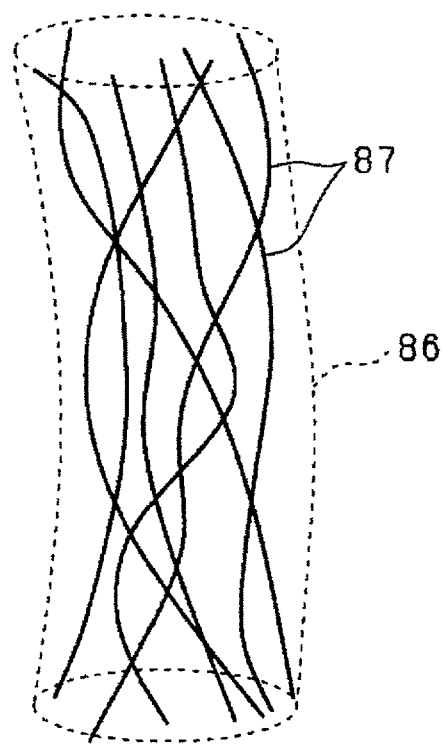
FIG. 14 is a schematic view illustrating a structure of wire.

In this embodiment, the conductor body 82a is made of a collection of a plurality of wires 86. Specifically, the conductor body 82a is, as can be seen in FIG. 13, made of a strand of the twisted wires 86. Each of the wires 86 is, as can be seen in FIG. 14, made of a bundle of a plurality of thin conductive fibers 87. For instance, each of the wires 86 is made of a complex of CNT (carbon nanotube) fibers. The CNT fibers include boron-containing microfibers in which at least a portion of carbon is substituted with boron. Instead of the CNT fibers that are carbon-based microfibers, vapor grown carbon fiber (VGCF) may be used, but however, CNT fiber is preferable. The surface of the wire 86 is covered with a layer of insulating polymer, such as enamel. The surface of the wire 86 is preferably covered with an enamel coating, such as polyimide coating or amide-imide coating.

The conductors 82 constitute n-phase windings of the stator winding 51. The wires 86 of each of the conductors 82 (i.e., the conductor body 82a) are placed in contact with each other. Each of the conductors 82 has one of more portions which are formed by twisting the wires 86 and define one or more portions of a corresponding one of the phase-windings. A resistance value between the twisted wires 86 is larger than that of each of the wires 86. In other words, the respective adjacent two wires 86 have a first electrical resistivity in a direction in which the wires 86 are arranged adjacent each other. Each of the wires 86 has a second electrical resistivity in a lengthwise direction of the wire 86. The first electrical resistivity is larger than the second electrical resistivity. Each of the conductors 82 may be made of an assembly of wires, i.e., the twisted wires 86 covered with insulating members whose first electrical resistivity is very high. The conductor body 82a of each of the conductors 82 is made of a strand of the twisted wires 86.

The conductor body 82a is, as described above, made of the twisted wires 86, thereby reducing an eddy current created in each of the wires 86, which reduces an eddy current in the conductor body 82a. Each of the wires 86 is twisted, thereby causing each of the wires 86 to have portions where directions of applied magnetic field are opposite each other, which cancels a back electromotive force. This results in a reduction in the eddy current. Particularly, each of the wires 86 is made of the conductive fibers 87, thereby enabling the conductive fibers 87 to be thin and also enabling the number of times the conductive fibers 87 are twisted to be increased, which enhances the reduction in eddy current.

How to insulate the wires 86 from each other is not limited to the above-described use of the polymer insulating layer, but the contact resistance may be used to resist a flow of current between the wires 86. In other words, the above beneficial advantage is obtained by a difference in potential arising from a difference between the resistance between the twisted wires 86 and the resistance of each of the wires 86 as long as the resistance between the wires 86 is larger than that of each of the wires 86. For instance, the contact resistance may be increased by using production equipment for the wires 86 and production equipment for the stator 50 (i.e., an armature) of the rotating electrical machine 10 as discrete devices to cause the wires 86 to be oxidized during a transport time or a work interval.

Each of the conductors 82 is, as described above, of a low-profile or flattened rectangular shape in cross section. The multiple conductors 82 are arranged in the radial direction. Each of the conductors 82 is made of a strand of the wires 86 each of which is formed by a self-bonding coating wire equipped with, for example, a fusing or bonding layer or an insulating layer and which are twisted with the bonding layers fused together. Each of the conductors 82 may alternatively be made by forming twisted wires with no bonding layer or twisted self-bonding coating wires into a desired shape using synthetic resin. The insulating coating 82b of each of the conductors 82 may have a thickness of 80 μm to 100 μm which is larger than that of a coating of typical wire (i.e., 5 μm to 40 μm). In this case, a required degree of insulation between the conductors 82 is achieved even if no insulating sheet is interposed between the conductors 82.

It is also advisable that the insulating coating 82b be higher in degree of insulation than the insulating layer of the wire 86 to achieve insulation between the phase windings. For instance, the polymer insulating layer of the wire 86 has a thickness of, for example, 5 μm. In this case, the thickness of the insulating coating 82b of the conductor 82 is preferably selected to be 80 μm to 100 μm to achieve the insulation between the phase windings.

Each of the conductors 82 may alternatively be made of a bundle of the untwisted wires 86. In brief, each of the conductors 82 may be made of a bundle of the wires 86 whose entire lengths are twisted, whose portions are twisted, or whose entire lengths are untwisted. Each of the conductors 82 constituting the conductor portion is, as described above, made of a bundle of the wires 86. The resistance between the wires 86 is larger than that of each of the wires 86.

The conductors 82 are each bent and arranged in a given pattern in the circumferential direction of the stator winding 51, thereby forming the phase-windings of the stator winding 51. The stator winding 51, as illustrated in FIG. 12, includes the coil side portion 53 and the coil ends 54 and 55. The conductors 82 have the straight sections 83 which extend straight in the axial direction of the stator winding 51 and form the coil side portion 53. The conductors 82 have the turns 84 which are arranged outside the coil side portion 53 in the axial direction and form the coil ends 54 and 55. Each of the conductor 82 is made of a wave-shaped string of conductor formed by alternately arranging the straight sections 83 and the turns 84. The straight sections 83 are arranged to face the magnet unit 42 in the radial direction. The straight sections 83 are arranged at a given interval away from each other and joined together using the turns 84 located outside the magnet unit 42 in the axial direction. The straight sections 83 correspond to a magnet facing portion.

In this embodiment, the stator winding 51 is shaped in the form of an annular distributed winding. In the coil side portion 53, the straight sections 83 are arranged at an interval away from each other which corresponds to each pole pair of the magnet unit 42 for each phase. In each of the coil ends 54 and 55, the straight sections 83 for each phase are joined together by the turn 84 which is of a V-shape. The straight sections 83 which are paired for each pole pair are opposite to each other in a direction of flow of electrical current. A respective two of the straight sections 83 which are joined together by each of the turns 84 are different between the coil end 54 and the coil end 55. The joints of the straight sections 83 by the turns 84 are arranged in the circumferential direction on each of the coil ends 54 and 55 to complete the stator winding in a hollow cylindrical shape.

More specifically, the stator winding 51 is made up of two pairs of the conductors 82 for each phase. The stator winding 51 is equipped with a first three-phase winding set including the U-phase winding, the V-phase winding, and the W-phase winding and a second three-phase phase winding set including the X-phase winding, the Y-phase winding, and the Z-phase winding. The first three-phase phase winding set and the second three-phase winding set are arranged adjacent each other in the radial direction in the form of two layers. If the number of phases of the stator winding 51 is defined as S (i.e., 6 in this embodiment), the number of the conductors 82 for each phase is defined as m, 2×S×m=2Sm conductors 82 are used for each pole pair in the stator winding 51. The rotating electrical machine in this embodiment is designed so that the number of phases S is 6, the number m is 4, and 8 pole pairs are used. 6×4×8=192 conductors 82 are arranged in the circumferential direction of the stator core 52.

The stator winding 51 in FIG. 12 is designed to have the coil side portion 53 which has the straight sections 82 arranged in the form of two overlapping layers disposed adjacent each other in the radial direction. Each of the coil ends 54 and 55 has a respective two of the turns 84 which extend from the radially overlapping straight sections 82 in opposite circumferential directions. In other words, the conductors 82 arranged adjacent each other in the radial direction are opposite to each other in direction in which the turns 84 extend except for ends of the stator winding 51.

Figure 15A:
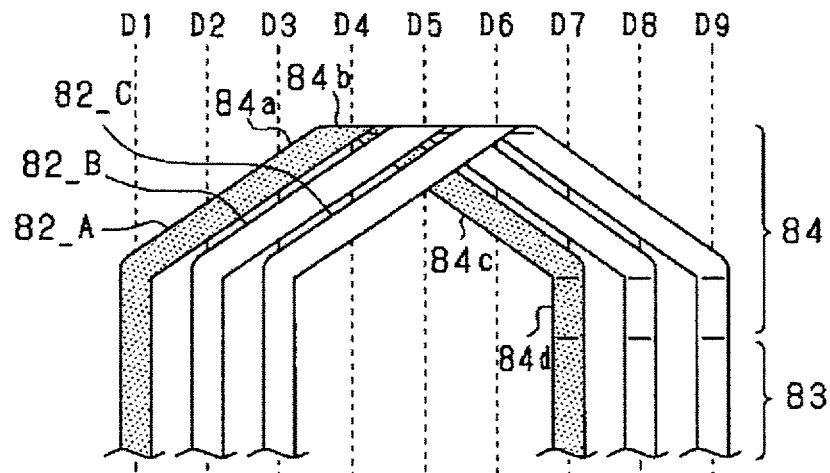
FIGS. 15($a$) and 15($b$) are views showing the layout of conductors at the $n^{th}$ layer position.
Figure 15B:
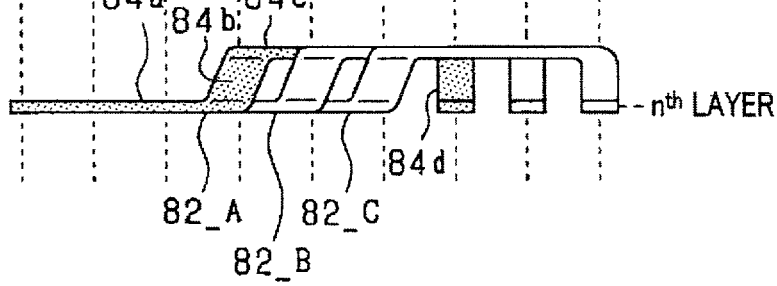

A winding structure of the conductors 82 of the stator winding 51 will be described below in detail. In this embodiment, the conductors 82 formed in the shape of a wave winding are arranged in the form of a plurality of layers (e.g., two layers) disposed adjacent or overlapping each other in the radial direction. FIGS. 15(a) and 15(b) illustrate the layout of the conductors 82 which form the $n^{th}$ layer. FIG. 15(a) shows the configurations of the conductor 82, as the side of the stator winding 51 is viewed. FIG. 15(b) shows the configurations of the conductors 82 as viewed in the axial direction of the stator winding 51. In FIGS. 15(a) and 15(b), locations of the conductor groups 81 are indicated by symbols D1, D2, D3 . . . , and D9. For the sake of simplicity of disclosure, FIGS. 15(a) and 15(b) show only three conductors 82 which will be referred to herein as the first conductor 82_A, the second conductor 82_B, and the third conductor 82_C.

The conductors 82_A to 82_C have the straight sections 83 arranged at a location of the $n^{th}$ layer, in other words, at the same position in the circumferential direction. Every two of the straight sections 82 which are arranged at 6 pitches (corresponding to 3×m pairs) away from each other are joined together by one of the turns 84. In other words, in the conductors 82_A to 82_C, an outermost two of the seven straight sections 83 arranged in the circumferential direction of the stator winding 51 on the same circle defined about the center of the rotor 40 are joined together using one of the turns 84. For instance, in the first conductor 82_A, the straight sections 83 placed at the locations D1 and D7 are joined together by the inverse V-shaped turn 84. The conductors 82_B and 82_C are arranged at an interval equivalent to an interval between a respective adjacent two of the straight sections 83 away from each other in the circumferential direction at the location of the $n^{th}$ layer. In this layout, the conductors 82_A to 82_C are placed at a location of the same layer, thereby resulting in a risk that the turns 84 thereof may physically interfere with each other. In order to alleviate such a risk, each of the turns 84 of the conductors 82_A to 82_C in this embodiment is shaped to have an interference avoiding portion formed by offsetting a portion of the turn 84 in the radial direction.

Specifically, the turn 84 of each of the conductors 82_A to 82_C includes the slant portion 84a, the head portion 84b, the slant portion 84c, and the return portion 84d. The slant portion 84a extends in the circumferential direction of the same circle (which will also be referred to as a first circle). The head portion 84 extends from the slant portion 84a radially inside the first circle (i.e., upward in FIG. 15(b)) to reach another circle (which will also be referred to as a second circle). The slant portion 84c extends in the circumferential direction of the second circle. The return portion 84d returns from the second circle back to the first circle. The head portion 84b, the slant portion 84c, and the return portion 84d define the interference avoiding portion. The slant portion 84c may be arranged radially outside the slant portion 84a.

In other words, each of the conductors 82_A to 82_C has the turn 84 shaped to have the slant portion 84a and the slant portion 84c which are arranged on opposite sides of the head portion 84b at the center in the circumferential direction. The locations of the slant portions 84a and 84b are different from each other in the radial direction (i.e., a direction perpendicular to the drawing of FIG. 15(*a*) or a vertical direction in FIG. 15(*b*)). For instance, the turn 84 of the first conductor 82_A is shaped to extend from the location D1 on the $n^{th}$ layer in the circumferential direction, be bent at the head portion 84b that is the center of the circumferential length of the turn 84 in the radial direction (e.g., radially inwardly), be bent again in the circumferential direction, extend again in the circumferential direction, and then be bent at the return portion 84d in the radial direction (e.g., radially outwardly) to reach the location D7 on the $n^{th}$ layer.

With the above arrangements, the slant portions 84a of the conductors 82_A to 82_C are arranged vertically or downward in the order of the first conductor 82_A, the second conductor 82_B, and the third conductor 82_C. The head portions 84b change the order of the locations of the conductors 82_A to 82_C in the vertical direction, so that the slant portions 84c are arranged vertically or downward in the order of the third conductor 82_3, the second conductor 82_B, and the first conductor 82_A. This layout achieves an arrangement of the conductors 82_A to 82_C in the circumferential direction without any physical interference with each other.

In the structure wherein the conductors 82 are laid to overlap each other in the radial direction to form the conductor group 81, the turns 84 leading to a radially innermost one and a radially outermost one of the straight sections 83 forming the two or more layers are preferably located radially outside the straight sections 83. In a case where the conductors 83 forming the two or more layers are bent in the same radial direction near boundaries between ends of the turns 84 and the straight sections 83, the conductors 83 are preferably shaped not to deteriorate the insulation therebetween due to physical interference of the conductors 83 with each other.

Figure 16:
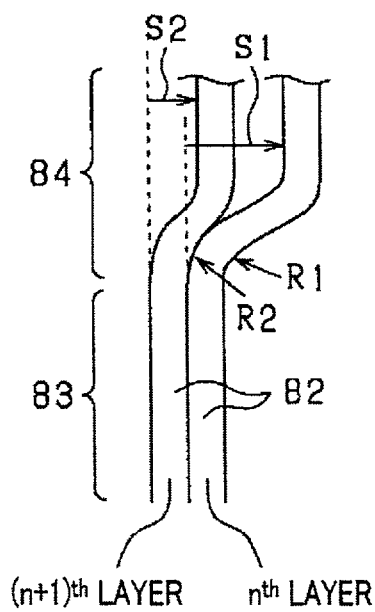
FIG. 16 is a side view showing conductors at the $n^{th}$ layer position and the $(n+1)^{th}$ layer position.

In the example of FIGS. 15(*a*) and 15(*b*), the conductors 82 laid on each other in the radial direction are bent radially at the return portions 84d of the turns 84 at the location D7 to D9. It is advisable that the conductor 82 of the $n^{th}$ layer and the conductor 82 of the $n+1^{th}$ layer be bent, as illustrated in FIG. 16, at radii of curvature different from each other. Specifically, the radius of curvature R1 of the conductor 82 of the $n^{th}$ layer is preferably selected to be smaller than the radius of curvature R2 of the conductor 82 of the $n+1^{th}$ layer.

Additionally, radial displacements of the conductor 82 of the $n^{th}$ layer and the conductor 82 of the $n+1^{th}$ layer are preferably selected to be different from each other. If the amount of radial displacement of the conductor 82 of the $n^{th}$ layer is defined as S1, and the amount of radial displacement of the conductor 82 of the $n+1^{th}$ layer located radially outside the nth layer defined as S2, the amount of radial displacement S1 is preferably selected to be greater than the amount of radial displacement S2.

The above layout of the conductors 82 eliminates the risk of interference with each other, thereby ensuring a required degree of insulation between the conductors 82 even when the conductors 82 laid on each other in the radial direction are bent in the same direction.

The structure of the magnet unit 42 of the rotor 40 will be described below. In this embodiment, the magnet unit 42 is made of permanent magnets in which a remanent flux density Br=1.0 T, and an intrinsic coercive force Hcj=400 kA/m. The permanent magnets used in this embodiment are implemented by sintered magnets formed by sintering grains of magnetic material and compacting them into a given shape and have the following specifications. The intrinsic coercive force Hcj on a J-H curve is 400 kA/m or more. The remanent flux density Br on the J-H curve is 1.0 T or more. Magnets designed so that when 5,000 to 10,000 AT is applied thereto by phase-to-phase excitation, a magnetic distance between paired poles, i.e., between a N-pole and an S-pole, in other words, of a path in which a magnetic flux flows between the N-pole and the S-pole, a portion lying in the magnet has a length of 25 mm may be used to meet a relation of Hcj=10000 A without becoming demagnetized.

In other words, the magnet unit 42 is engineered so that a saturation magnetic flux density Js is 1.2 T or more, a grain size is 10 μm or less, and a relation of Js×a≥1.0 T is met where a is an orientation ratio.

The magnet unit 42 will be additionally described below. The magnet unit 42 (i.e., magnets) has a feature that Js meets a relation of 2.15 T≥Js≥1.2 T. In other words, magnets used in the magnet unit 42 may be FeNi magnets having NdFe11TiN, Nd2Fe14B, Sm2Fe17N3, or L10 crystals. Note that samarium-cobalt magnets, such as SmCo5, FePt, Dy2Fe14B, or CoPt magnets can not be used. When magnets in which high Js characteristics of neodymium are slightly lost, but a high degree of coercive force of Dy is ensured using the heavy rare earth dysprosium, like in isomorphous compounds, such as Dy2Fe14B and Nd2Fe14B, sometimes meets a relation of 2.15 T≥Js≥1.2 T, they may be used in the magnet unit 42. Such a type of magnet will also be referred to herein as [Nd1-xDyx]2Fe14B]. Further, a magnet contacting different types of compositions, in other words, a magnet made from two or more types of materials, such as FeNi and Sm2Fe17N3, may be used to meet a relation of 2.15 T≥Js≥1.2 T. A mixed magnet made by adding a small amount of, for example, Dy2Fe14B in which Js<1 T to an Nd2Fe14B magnet in which Js=1.6 T, meaning that Js is sufficient to enhance the coercive force, may also be used to meet a relation of 2.15 T≥Js≥1.2 T.

In use of the rotating electrical machine at a temperature outside a temperature range of human activities which is higher than, for example, 60° C. exceeding temperatures of deserts, for example, within a passenger compartment of a vehicle where the temperature may rise to 80° C. in summer, the magnet preferably contains FeNi or Sm2Fe17N3 components which are less dependent on temperature. This is because motor characteristics are greatly changed by temperature-dependent factors thereof in motor operations within a range of approximately −40° which is within a range experienced by societies in Northern Europe to 60° C. or more experienced in desert regions or at 180 to 240° C. that is a heat resistance temperature of the enamel coating, which leads to a difficulty in achieving a required control operation using the same motor driver. The use of FeNi containing the above described L10 crystals or Sm2Fe17N3 magnets will result in a decrease in load on the motor driver because characteristics thereof have temperature-dependent factors lower than half that of Nd2Fe14B magnets.

Additionally, the magnet unit 42 is engineered to use the above-described magnet mixing so that a particle size of fine powder before being magnetically oriented is lower than or equal to 10 μm and higher than or equal to a size of single-domain particles. The coercive force of a magnet is usually increased by decreasing the size of powered particles thereof to a few hundred nm. In recent years, smallest possible particles have been used. If the particles of the magnet are too small, the BHmax (i.e., the maximum energy product) of the magnet will be decreased due to oxidization thereof. It is, thus, preferable that the particle size of the magnet is higher than or equal to the size of the single-domain particles. The particle size being only up to the size of the single-domain particles is known to increase the coercive force of the magnet. The particle size, as referred to herein, refers to the diameter or size of fine powdered particles in a magnetic orientation operation in production processes of magnets.

Each of the first magnet 91 and the second magnet 92 of the magnet unit 42 are made of sintered magnets formed by firing or heating magnetic powder at high temperatures and compacting it. The sintering is achieved so as to meet conditions where the saturation magnetization Js of the magnet unit 42 is 1.2 T (Tesla) or more, the particle size of the first magnet 91 and the second magnet 92 is 10 μm or less, and Js×a is higher than or equal to 1.0 T (Tesla) where a is an orientation ratio. Each of the first magnet 91 and the second magnet 92 are also sintered to meet the following conditions. By performing the magnetic orientation in the magnetic orientation operation in the production processes of the first magnet 91 and the second magnet 92, they have an orientation ratio different to the definition of orientation of magnetic force in a magnetization operation for isotropic magnets. The magnet unit 42 in this embodiment is designed to have the saturation magnetization Js more than or equal to 1.2 T and the orientation ratio a of the first magnet 91 and the second magnet 92 which is high to meet a relation of Jr≥Js×a≥1.0 T. The orientation ratio a, as referred to herein, is defined in the following way. If each of the first magnet 91 and the second magnet 92 has six easy axes of magnetization, five of the easy axes of magnetization are oriented in the same direction A10, and a remaining one of the easy axes of magnetization is oriented in the direction B10 angled at 90 degrees to the direction A10, then a relation of a=5/6 is met. Alternatively, if each of the first magnet 91 and the second magnet 92 has six easy axes of magnetization, five of the easy axes of magnetization are oriented in the same direction A10, and a remaining one of the easy axes of magnetization is oriented in the direction B10 angled at 45 degrees to the direction A10, then a relation of a=(5+0.707)/6 is met since a component oriented in the direction A10 is expressed by cos 45°=0.707. The first magnet 91 and the second magnet 92 in this embodiment are, as described above, each made using sintering techniques, but however, they may be produced in another way as long as the above conditions are satisfied. For instance, a method of forming an MQ3 magnet may be used.

In this embodiment, permanent magnets are used which are magnetically oriented to control the easy axis of magnetization thereof, thereby enabling a magnetic circuit length within the magnets to be longer than that within typical linearly oriented magnets which produces a magnetic flux density of 1.0 T or more. In other words, the magnetic circuit length for one pole pair in the magnets in this embodiment may be achieved using magnets with a small volume. Additionally, a range of reversible flux loss in the magnets is not lost when subjected to severe high temperatures, as compared with use of typical linearly oriented magnets. The inventors of this application have found that characteristics similar to those of anisotropic magnets are obtained even using prior art magnets.

The easy axis of magnetization represents a crystal orientation in which a crystal is easy to magnetize in a magnet. The orientation of the easy axis of magnetization in the magnet, as referred to herein, is a direction in which an orientation ratio is 50% or more where the orientation ratio indicates the degree to which easy axes of magnetization of crystals are aligned with each other or a direction of an average of magnetic orientations in the magnet.

The magnet unit 42 is, as clearly illustrated in FIGS. 8 and 9, of an annular shape and arranged inside the magnet holder 41 (specifically, radially inside the cylinder 43). The magnet unit 42 is equipped with the first magnets 91 and the second magnets 92 which are each made of a polar anisotropic magnet. Each of the first magnets 91 and each of the second magnets 92 are different in magnetic polarity from each other. The first magnets 91 and the second magnets 92 are arranged alternately in the circumferential direction of the magnet unit 42. Each of the first magnets 91 is engineered to have a portion creating an N-pole near the stator winding 51. Each of the second magnets 92 is engineered to have a portion creating an S-pole near the stator winding 51. The first magnets 91 and the second magnets 92 are each made of, for example, a permanent rare earth magnet, such as a neodymium magnet.

Each of the magnets 91 and 92 is engineered to have a direction of magnetization (which will also be referred to below as a magnetization direction) which extends in an annular shape in between a d-axis (i.e., a direct-axis) and a q-axis (i.e., a quadrature-axis) in a known d-q coordinate system where the d-axis represents the center of a magnetic pole, and the q-axis represents a magnetic boundary between the N-pole and the S-pole, in other words, where a density of magnetic flux is zero Tesla. In each of the magnets 91 and 92, the magnetization direction is oriented in the radial direction of the annular magnet unit 42 Close to the d-axis and also oriented in the circumferential direction of the annular magnet unit 42 closer to the q-axis. This layout will also be described below in detail. Each of the magnets 91 and 92, as can be seen in FIG. 9, includes a first portion 250 and two second portions 260 arranged on opposite sides of the first portion 250 in the circumferential direction of the magnet unit 42. The first portion 250 is located closer to the d-axis than the second portions 260 are. The second portions 260 are arranged closer to the q-axis than the first portion 250 is. The direction in which the easy axis of magnetization 300 extends in the first portion 250 is oriented more parallel to the d-axis than the direction in which the easy axis of magnetization 310 extends in the second portions 260. To say it in a different way, the easy axis of magnetization has a first portion lying in the first portion 250 of each of the magnets 91 and 92 and second portions lying in the second portions 260 of each of the magnets 91 and 92. The first portion of the easy axis of magnetization extends more parallel to the d-axis than the second portions of the easy axis of magnetization do. In other words, the magnet unit 42 is engineered so that an angle θ11 which the easy axis of magnetization 300 in the first portion 250 makes with the d-axis is selected to be smaller than an angle θ12 which the easy axis of magnetization 310 in the second portion 260 makes with the q-axis.

More specifically, if a direction from the stator 50 (i.e., an armature) toward the magnet unit 42 on the d-axis is defined to be positive, the angle θ11 represents an angle which the easy axis of magnetization 300 makes with the d-axis. Similarly, if a direction from the stator 50 (i.e., an armature) toward the magnet unit 42 on the q-axis is defined to be positive, the angle θ12 represents an angle which the easy axis of magnetization 310 makes with the q-axis. In this embodiment, each of the angle θ11 and the angle θ12 is set to be 90° or less. Each of the easy axes of magnetization 300 and 310, as referred to herein, is defined in the following way. If in each of the magnets 91 and 92, a first one of the easy axes of magnetization is oriented in a direction A11, and a second one of the easy axes of magnetization is oriented in a direction B11, an absolute value of cosine of an angle θ which the direction A11 and the direction B11 make with each other (i.e., |cos θ|) is defined as the easy axis of magnetization 300 or the easy axis of magnetization 310.

The magnets 91 are different in easy axis of magnetization from the magnets 92 in regions close to the d-axis and the q-axis. Specifically, in the region close to the d-axis, the direction of the easy axis of magnetization is oriented approximately parallel to the d-axis, while in the region close to the q-axis, the direction of the easy axis of magnetization is oriented approximately perpendicular to the q-axis. Annular magnetic paths are created according to the directions of easy axes of magnetization. In each of the magnets 91 and 92, the easy axis of magnetization in the region close to the d-axis may be oriented parallel to the d-axis, while the easy axis of magnetization in the region close to the q-axis may be oriented perpendicular to the q-axis.

Each of the magnets 91 and 92 is shaped to have a first peripheral surface facing the stator 50 (i.e., a lower surface viewed in FIG. 9 which will also be referred to as a stator-side outer surface) and a second peripheral surface facing the q-axis in the circumferential direction. The first and second peripheral surfaces function as magnetic flux acting surfaces into and from which magnetic flux flows. The magnetic paths are each created to extend between the magnetic flux acting surfaces (i.e., between the stator-side outer surface and the second peripheral surface facing the q-axis).

Figure 17:
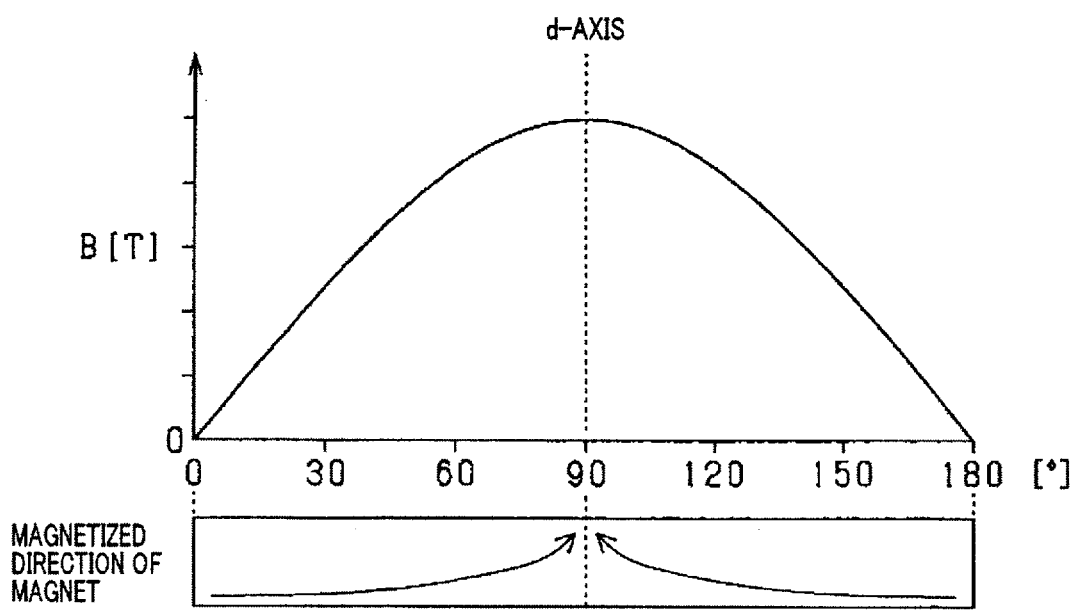
FIG. 17 is a view representing a relation between an electrical angle and a magnetic flux density in magnets of an embodiment.
Figure 18:
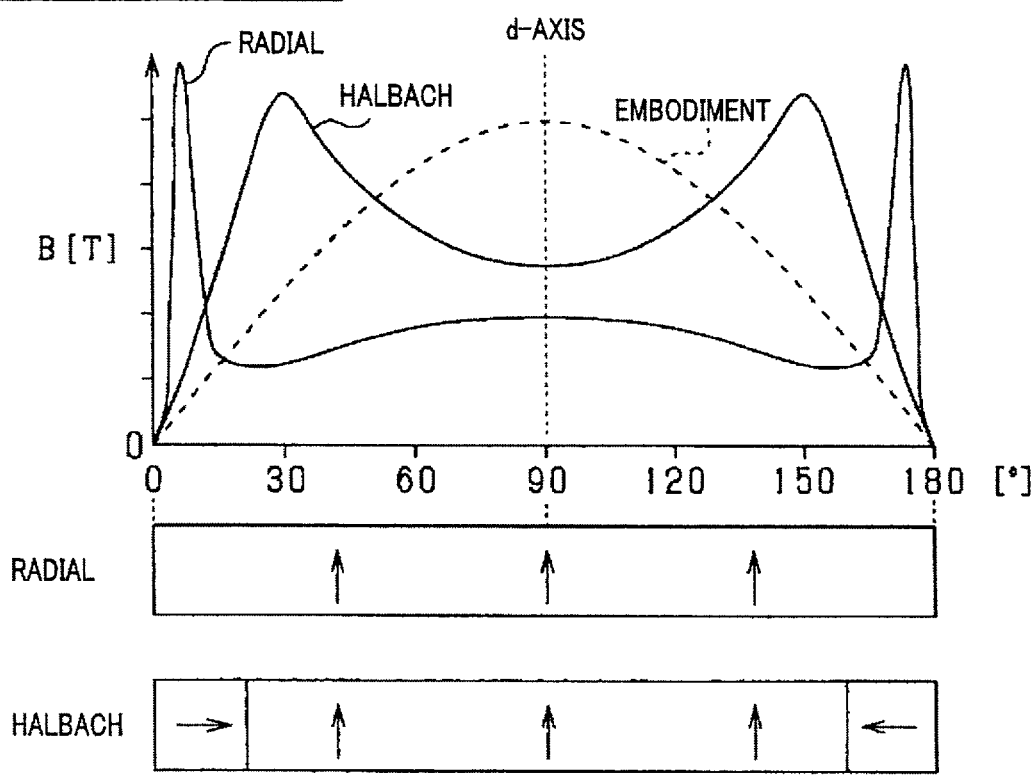
FIG. 18 is a view which represents a relation between an electrical angle and a magnetic flux density in a comparative example of magnet arrangement.

In the magnet unit 42, a magnetic flux flows in an annular shape between a respective adjacent two of the N-poles and the S-poles of the magnets 91 and 92, so that each of the magnetic paths has an increased length, as compared with, for example, radial anisotropic magnets. A distribution of the magnetic flux density will, therefore, exhibit a shape similar to a sine wave illustrated in FIG. 17. This facilitates concentration of magnetic flux around the center of the magnetic pole unlike a distribution of magnetic flux density of a radial anisotropic magnet demonstrated in FIG. 18 as a comparative example, thereby enabling the degree of torque produced by the rotating electrical machine 10 to be increased. It has also been found that the magnet unit 42 in this embodiment has the distribution of the magnetic flux density distinct from that of a typical Halbach array magnet. In FIGS. 17 and 18, a horizontal axis indicates the electrical angle, while a vertical axis indicates the magnetic flux density. 90° on the horizontal axis represents the d-axis (i.e., the center of the magnetic pole). 0° and 180° on the horizontal axis represent the q-axis.

Accordingly, the above-described structure of each of the magnets 91 and 92 functions to enhance the magnet magnetic flux thereof on the d-axis and reduce a change in magnetic flux near the q-axis. This enables the magnets 91 and 92 to be produced which have a smooth change in surface magnetic flux from the q-axis to the d-axis on each magnetic pole.

The sine wave matching percentage in the distribution of the magnetic flux density is preferably set to, for example, 40% or more. This improves the amount of magnetic flux around the center of a waveform of the distribution of the magnetic flux density as compared with a radially oriented magnet or a parallel oriented magnet in which the sine wave matching percentage is approximately 30%. By setting the sine wave matching percentage to be 60% or more, the amount of magnetic flux around the center of the waveform is improved, as compared with a concentrated magnetic flux array, such as the Halbach array.

In the radial anisotropic magnet demonstrated in FIG. 18, the magnetic flux density changes sharply near the q-axis. The more sharp the change in magnetic flux density, the more an eddy current generated in the stator winding 51 will increase. The magnetic flux close to the stator winding 51 also sharply changes. In contrast, the distribution of the magnetic flux density in this embodiment has a waveform approximating a sine wave. A change in magnetic flux density near the q-axis is, therefore, smaller than that in the radial anisotropic magnet near the q-axis. This minimizes the generation of the eddy current.

The magnet unit 42 Creates a magnetic flux oriented perpendicular to the magnetic flux acting surface 280 close to the stator 50 near the d-axis (i.e., the center of the magnetic pole) in each of the magnets 91 and 92. Such a magnetic flux extends in an arc-shape farther away from the d-axis as departing from the magnetic flux acting surface 280 close to the stator 50. The more perpendicular to the magnetic flux acting surface the magnetic flux extends, the stronger the magnetic flux is. The rotating electrical machine 10 in this embodiment is, as described above, designed to shape each of the conductor groups 81 to have a decreased thickness in the radial direction, so that the radial center of each of the conductor groups 81 is located close to the magnetic flux-acting surface of the magnet unit 42, thereby causing the strong magnetic flux to be applied to the stator 50 from the rotor 40.

The stator 50 has the cylindrical stator core 52 arranged radially inside the stator winding 51, that is, on the opposite side of the stator winding 51 to the rotor 40. This causes the magnetic flux extending from the magnetic flux-acting surface of each of the magnets 91 and 92 to be attracted by the stator core 52, so that it circulates through the magnetic path partially including the stator core 52. This enables the orientation of the magnetic flux and the magnetic path to be optimized.

Steps to assemble the bearing unit 20, the housing 30, the rotor 40, the stator 50, and the inverter unit 60 illustrated in FIG. 5 will be described below as a production method of the rotating electrical machine 10. The inverter unit 60 is, as illustrated in FIG. 6, equipped with the unit base 61 and the electrical components 62. Operation processes including installation processes for the unit base 61 and the electrical components 62 will be explained. In the following discussion, an assembly of the stator 50 and the inverter unit 60 will be referred to as a first unit. An assembly of the bearing unit 20, the housing 30, and the rotor 40 will be referred to as a second unit.

The production processes include:
a first step of installing the electrical components 62 radially inside the unit base 61;
a second step of installing the unit base 61 radially inside the stator 50 to make the first unit;
a third step of inserting the attaching portion 44 of the rotor 40 into the bearing unit 20 installed in the housing 30 to make the second unit;
a fourth step of installing the first unit radially inside the second unit; and
a fifth step of fastening the housing 30 and the unit base 61 together. The order in which the above steps are performed is the first step→the second step→the third step→the fourth step→the fifth step.

In the above production method, the bearing unit 20, the housing 30, the rotor 40, the stator 50, and the inverter unit 60 are assembled as a plurality of sub-assemblies, and the sub-assemblies are assembled, thereby facilitating handling thereof and achieving completion of inspection of each sub-assembly. This enables an efficient assembly line to be established and thus facilitates multi-product production planning.

In the first step, a high thermal conductivity material is applied or adhered to at least one of the radial inside of the unit base 61 and the radial outside of the electrical components 62. Subsequently, the electrical components may be mounted on the unit base 61. This achieves efficient transfer of heat, as generated by the semiconductor modules 66, to the unit base 61.

In the third step, an insertion operation for the rotor 40 may be achieved with the housing 30 and the rotor 40 arranged coaxially with each other. Specifically, the housing 30 and the rotor 40 are assembled while sliding one of the housing 30 and the rotor 40 along a jig which positions the outer peripheral surface of the rotor 40 (i.e., the outer peripheral surface of the magnetic holder 41) or the inner peripheral surface of the rotor 40 (i.e., the inner peripheral surface of the magnet unit 42) with respect to, for example, the inner peripheral surface of the housing 30. This achieves the assembly of heavy-weight parts without exertion of unbalanced load to the bearing unit 20. This results in improvement of reliability in operation of the bearing unit 20.

In the fourth step, the first unit and the second unit may be installed while being placed coaxially with each other. Specifically, the first unit and the second unit are installed while sliding one of the first unit and the second unit along a jig which positions the inner peripheral surface of the unit base 61 with respect to, for example, the inner peripheral surfaces of the rotor 40 and the attaching portion 44. This achieves the installation of the first and second units without any physical interference therebetween within a small clearance between the rotor 40 and the stator 50, thereby eliminating risks of defects caused by the installation, such as physical damage to the stator winding 51 or damage to the permanent magnets.

The above steps may alternatively be scheduled as the second step→the third step→the fourth step→the fifth step→the first step. In this order, the delicate electrical components 62 are finally installed, thereby minimizing stress on the electrical components in the installation processes.

Figure 19:
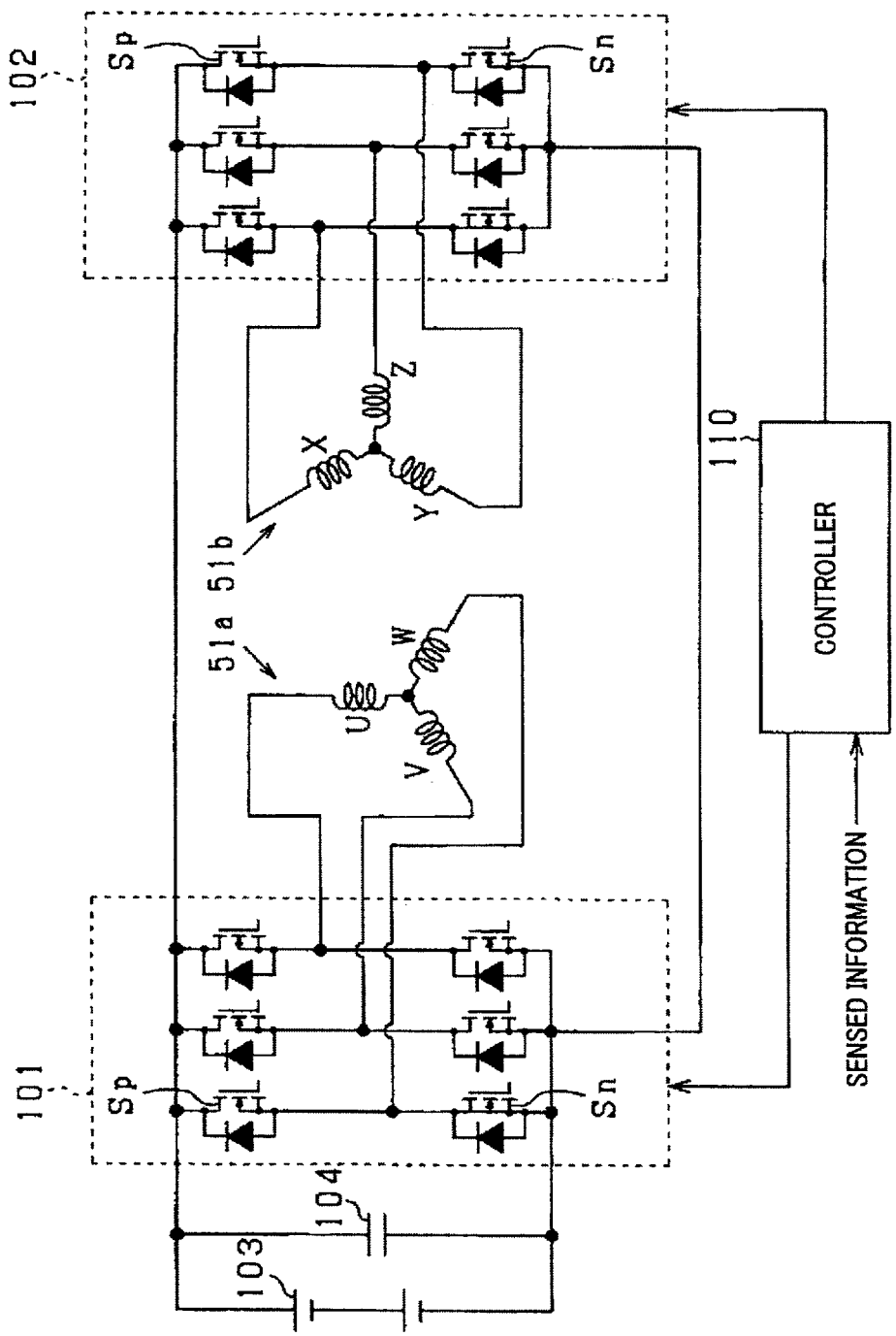
FIG. 19 is an electrical circuit diagram of a control system for a rotating electrical machine.
Figure 20:
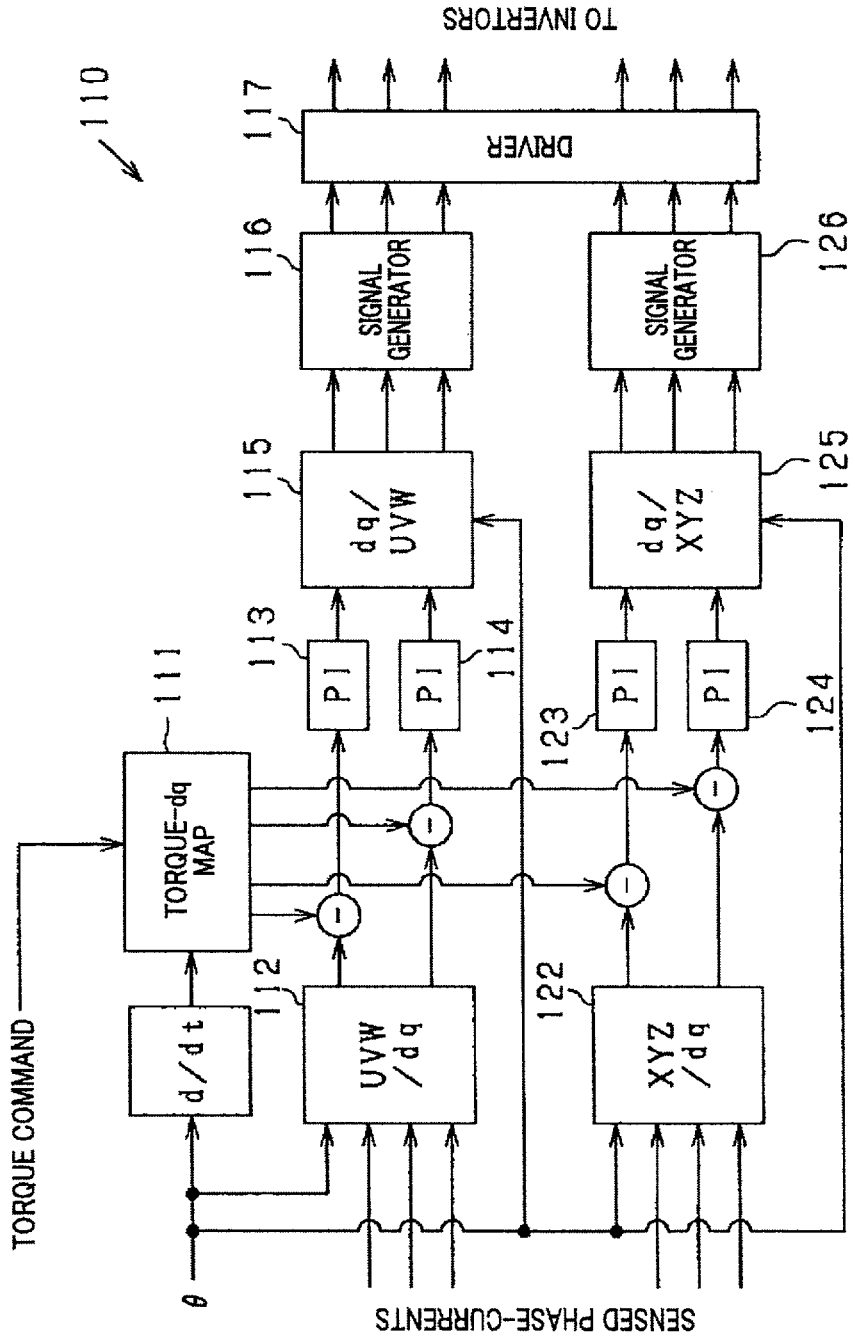
FIG. 20 is a functional block diagram which shows a current feedback control operation of a control device.

The structure of a control system for controlling an operation of the rotating electrical machine 10 will be described below. FIG. 19 is an electrical circuit diagram of the control system for the rotating electrical machine 10. FIG. 20 is a functional block diagram which illustrates control steps performed by the controller 110.

FIG. 19 illustrates two sets of three-phase windings 51a and 51b. The three-phase winding 51a includes a U-phase winding, a V-phase winding, and a W-phase winding. The three-phase winding 51b includes an X-phase winding, a Y-phase winding, and a Z-phase winding. The first inverter 101 and the second inverter 102 are provided as electrical power converters for the three-phase windings 51a and 51b, respectively. The inverters 101 and 102 are made of bridge circuits with as many upper and lower arms as there are the phase-windings. The current delivered to the phase windings of the stator winding 51 is regulated by turning on or off switches (i.e., semiconductor switches) mounted on the upper and lower arms.

The dc power supply 103 and the smoothing capacitor 104 are connected parallel to the inverters 101 and 102. The dc power supply 103 is made of, for example, a plurality of series-connected cells. The switches of the inverters 101 and 102 correspond to the semiconductor modules 66 in FIG. 1. The capacitor 104 corresponds to the capacitor module 68 in FIG. 1.

The controller 110 is equipped with a microcomputer made of a CPU and memories and works to perform control energization by turning on or off the switches of the inverters 101 and 102 using several types of measured information measured in the rotating electrical machine 10 or requests for a motor mode or a generator mode of the rotating electrical machine 10. The controller 110 corresponds to the control device 77 shown in FIG. 6. The measured information about the rotating electrical machine 10 includes, for example, an angular position (i.e., an electrical angle) of the rotor 40 measured by an angular position sensor, such as a resolver, a power supply voltage (i.e., voltage inputted into the inverters) measured by a voltage sensor, and electrical current delivered to each of the phase-windings, as measured by a current sensor. The controller 110 produces and outputs an operation signal to operate each of the switches of the inverters 101 and 102. A request for electrical power generation is a request for driving the rotating electrical machine 10 in a regenerative mode, for example, in a case where the rotating electrical machine 10 is used as a power source for a vehicle.

The first inverter 101 is equipped with a series-connected part made up of an upper arm switch Sp and a lower arm switch Sn for each of the three-phase windings: the U-phase winding, the V-phase winding, and the W-phase winding. The upper arm switches Sp are connected at high-potential terminals thereof to a positive terminal of the dc power supply 103. The lower arm switches Sn are connected at low-potential terminals thereof to a negative terminal (i.e., ground) of the dc power supply 103. Intermediate joints of the upper arm switches Sp and the lower arm switches Sn are connected to ends of the U-phase winding, the V-phase winding, and the W-phase winding. The U-phase winding, the V-phase winding, and the W-phase winding are connected in the form of a star connection (i.e., Y-connection). The other ends of the U-phase winding, the V-phase winding, and the W-phase winding are connected with each other at a neutral point.

The second inverter 102 is, like the first inverter 101, equipped with a series-connected part made up of an upper arm switch Sp and a lower arm switch Sn for each of the three-phase windings: the X-phase winding, the Y-phase winding, and the Z-phase winding. The upper arm switches Sp are connected at high-potential terminals thereof to the positive terminal of the dc power supply 103. The lower arm switches Sn are connected at low-potential terminals thereof to the negative terminal (i.e., ground) of the dc power supply 103. Intermediate joints of the upper arm switches Sp and the lower arm switches Sn are connected to ends of the X-phase winding, the Y-phase winding, and the Z-phase winding. The X-phase winding, the Y-phase winding, and the Z-phase winding are connected in the form of a star connection (i.e., Y-connection). The other ends of the X-phase winding, the Y-phase winding, and the Z-phase winding are connected with each other at a neutral point.

FIG. 20 illustrates a current feedback control operation to control electrical currents delivered to the U-phase winding, the V-phase winding, and the W-phase winding and a current feedback control operation to control electrical currents delivered to the X-phase winding, the Y-phase winding, and the Z-phase winding. The control operation for the U-phase winding, the V-phase winding, and the W-phase winding will first be discussed.

In FIG. 20, the current command determiner 111 uses a torque-dq map to determine current command values for the d-axis and the q-axis using a torque command value in the motor mode of the rotating electrical machine 10 (which will also be referred to as a motor-mode torque command value), a torque command value in the generator mode of the rotating electrical machine 10 (which will be referred to as a generator-mode torque command value), and an electrical angular velocity ω derived by differentiating an electrical angle θ with respect to time. The current command determiner 111 is shared between the U-, V-, and W-phase windings and the X-, Y-, and W-phase windings. The generator-mode torque command value is a regenerative torque command value in a case where the rotating electrical machine 10 is used as a power source of a vehicle.

The d-q converter 112 works to convert currents (i.e., three phase currents), as measured by current sensors mounted for the respective phase windings, into a d-axis current and a q-axis current that are components in a two-dimensional rotating Cartesian coordinate system in which a d-axis is defined as a direction of an axis of a magnetic field or field direction.

The d-axis current feedback control device 113 determines a command voltage for the d-axis as a manipulated variable for bringing the d-axis current into agreement with the current command value for the d-axis in a feedback mode. The q-axis current feedback control device 114 determines a command voltage for the q-axis as a manipulated variable for bringing the q-axis current into agreement with the current command value for the q-axis in a feedback mode. The feedback control devices 113 and 114 calculates the command voltage as a function of a deviation of each of the d-axis current and the q-axis current from a corresponding one of the current command values using PI feedback techniques.

The three-phase converter 115 works to convert the command values for the d-axis and the q-axis into command values for the U-phase, V-phase, and W-phase windings. Each of the devices 111 to 115 is engineered as a feedback controller to perform a feedback control operation for a fundamental current in the d-q transformation theory. The command voltages for the U-phase, V-phase, and W-phase windings are feedback control values.

The operation signal generator 116 uses the known triangle wave carrier comparison to produce operation signals for the first inverter 101 as a function of the three-phase command voltages. Specifically, the operation signal generator 116 works to produce switch operation signals (i.e., duty signals) for the upper and lower arms for the three-phase windings (i.e., the U-, V-, and W-phase windings) under PWM control based on comparison of levels of signals derived by normalizing the three-phase command voltages using the power supply voltage with a level of a carrier signal, such as a triangle wave signal.

The same structure as described above is provided for the X-, Y-, and Z-phase windings. The d-q converter 122 works to convert currents (i.e., three phase currents), as measured by current sensors mounted for the respective phase windings, into a d-axis current and a q-axis current that are components in the two-dimensional rotating Cartesian coordinate system in which the d-axis is defined as the direction of the axis of the magnetic field.

The d-axis current feedback control device 123 determines a command voltage for the d-axis. The q-axis current feedback control device 124 determines a command voltage for the q-axis. The three-phase converter 125 works to convert the command values for the d-axis and the q-axis into command values for the X-phase, Y-phase, and Z-phase windings. The operation signal generator 126 produces operation signals for the second inverter 102 as a function of the three-phase command voltages.

Specifically, the operation signal generator 126 works to switch operation signals (i.e., duty signals) for the upper and lower arms for the three-phase windings (i.e., the X-, Y-, and Z-phase windings) based on comparison of levels of signals derived by normalizing the three-phase command voltages using the power supply voltage with a level of a carrier signal, such as a triangle wave signal.

The driver 117 works to turn on or off the switches Sp and Sn in the inverters 101 and 102 in response to the switch operation signals produced by the operation signal generators 116 and 126.

Subsequently, a torque feedback control operation will be described below. This operation is to increase an output of the rotating electrical machine 10 and reduce torque loss in the rotating electrical machine 10, for example, in a high-speed and high-output range wherein output voltages from the inverters 101 and 102 rise. The controller 110 selects one of the torque feedback control operation and the current feedback control operation and perform the selected one as a function of an operating condition of the rotating electrical machine 10.

Figure 21:
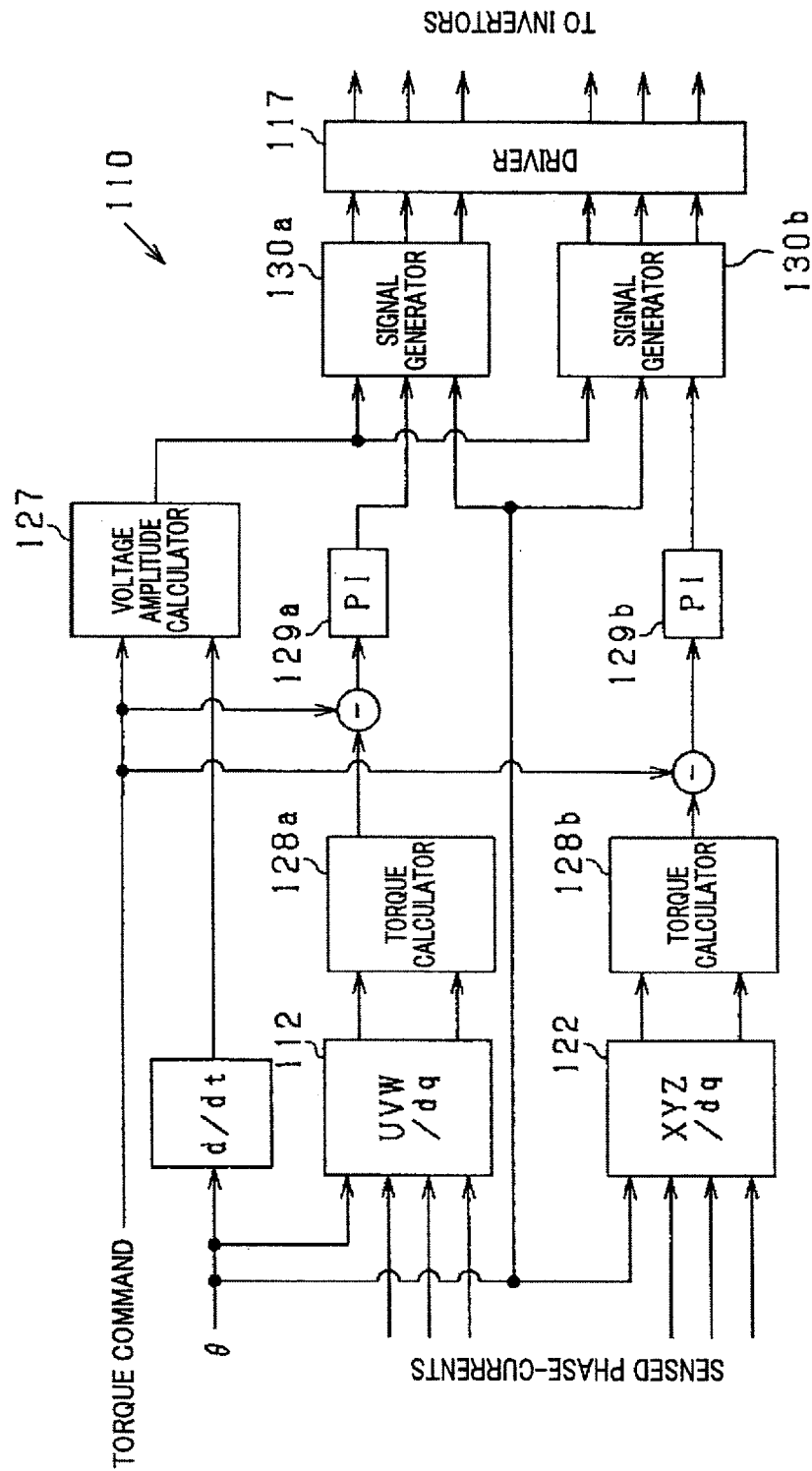
FIG. 21 is a functional block diagram which shows a torque feedback control operation of a control device.

FIG. 21 shows the torque feedback control operation for the U-, V-, and W-phase windings and the torque feedback control operation for the X-, Y-, and Z-phase windings. In FIG. 21, the same reference numbers as employed in FIG. 20 refer to the same parts, and explanation thereof in detail will be omitted here. The control operation for the U-, V-, and W-phase windings will be described first.

The voltage amplitude calculator 127 works to calculate a voltage amplitude command that is a command value of a degree of a voltage vector as a function of the motor-mode torque command value or the generator-mode torque command value for the rotating electrical machine 10 and the electrical angular velocity ω derived by differentiating the electrical angle θ with respect to time.

The torque calculator 128a works to estimate a torque value in the U-phase, V-phase, or the W-phase as a function of the d-axis current and the q-axis current converted by the d-q converter 112. The torque calculator 128a may be designed to calculate the voltage amplitude command using a map listing relations among the d-axis current, the q-axis current, and the voltage amplitude command.

The torque feedback controller 129a calculates a voltage phase command that is a command value for a phase of the voltage vector as a manipulated variable for bringing the estimated torque value into agreement with the motor-mode torque command value or the generator-mode torque command value in the feedback mode. Specifically, the torque feedback controller 129a calculates the voltage phase command as a function of a deviation of the estimated torque value from the motor-mode torque command value or the generator-mode torque command value using PI feedback techniques.

The operation signal generator 130a works to produce the operation signal for the first inverter 101 using the voltage amplitude command, the voltage phase command, and the electrical angle θ. Specifically, the operation signal generator 130a calculates the command values for the three-phase windings based on the voltage amplitude command, the voltage phase command, and the electrical angle θ and then generates switching operation signals for the upper and lower arms for the three-phase windings by means of PWM control based on comparison of levels of signals derived by normalizing the three-phase command voltages using the power supply voltage with a level of a carrier signal, such as a triangle wave signal.

The operation signal generator 130a may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

The same structure as described above is provided for the X-, Y-, and Z-phase windings. The torque calculator 128b works to estimate a torque value in the X-phase, Y-phase, or the Z-phase as a function of the d-axis current and the q-axis current converted by the d-q converter 122.

The torque feedback controller 129b calculates a voltage phase command as a manipulated variable for bringing the estimated torque value into agreement with the motor-mode torque command value or the generator-mode torque command value in the feedback mode. Specifically, the torque feedback controller 129b calculates the voltage phase command as a function of a deviation of the estimated torque value from the motor-mode torque command value or the generator-mode torque command value using PI feedback techniques.

The operation signal generator 130b works to produce the operation signal for the second inverter 102 using the voltage amplitude command, the voltage phase command, and the electrical angle θ. Specifically, the operation signal generator 130b calculates the command values for the three-phase windings based on the voltage amplitude command, the voltage phase command, and the electrical angle θ and then generates the switching operation signals for the upper and lower arms for the three-phase windings by means of PWM control based on comparison of levels of signals derived by normalizing the three-phase command voltages using the power supply voltage with a level of a carrier signal, such as a triangle wave signal. The driver 117 then works to turn on or off the switches Sp and Sn for the three-phase windings in the inverters 101 and 102 in response to the switching operation signals derived by the operation signal generators 130a and 130b.

The operation signal generator 130b may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

The rotating electrical machine 10 has a risk that generation of an axial current may result in electrical erosion in the bearing 21 or 22. For example, when the stator winding 51 is excited or de-excited in response to the switching operation, a small switching time gap (i.e., switching unbalance) may occur, thereby resulting in distortion of magnetic flux, which leads to the electrical erosion in the bearings 21 and 22 retaining the rotating shaft 11. The distortion of magnetic flux depends upon the inductance of the stator 50 and creates an electromotive force oriented in the axial direction, which results in dielectric breakdown in the bearing 21 or 22 to develop the electrical erosion.

In order to avoid the electrical erosion, this embodiment is engineered to take three measures as discussed below. The first erosion avoiding measure is to reduce the inductance by designing the stator 50 to have a core-less structure and also to shape the magnetic flux in the magnet unit 42 to be smooth to minimize the electrical erosion. The second erosion avoiding measure is to retain the rotating shaft in a cantilever form to minimize the electrical erosion. The third erosion avoiding measure is to unify the annular stator winding 51 and the stator core 52 using molding techniques using a molding material to minimize the electrical erosion. The first to third erosion avoiding measures will be described below in detail.

In the first erosion avoiding measure, the stator 50 is designed to have no teeth in gaps between the conductor groups 81 in the circumferential direction. The sealing members 57 made of non-magnetic material are arranged in the gaps between the conductor groups 81 instead of teeth (iron cores) (see FIG. 10). This results in a decrease in inductance of the stator 50, thereby minimizing the distortion of magnetic flux caused by the switching time gap occurring upon excitation of the stator winding 51 to reduce the electrical erosion in the bearings 21 and 22. The inductance on the d-axis is preferably less than that on the q-axis.

Additionally, each of the magnets 91 and 92 is magnetically oriented to have the easy axis of magnetization which is directed near the d-axis to be more parallel to the d-axis than that near the q-axis (see FIG. 9). This strengthens the magnetic flux on the d-axis, thereby resulting in a smooth change in surface magnetic flux (i.e., an increase or decrease in magnetic flux) from the q-axis to the d-axis on each magnetic pole of the magnets 91 and 92. This minimizes a sudden voltage change arising from the switching imbalance to avoid the electrical erosion.

In the second erosion avoiding measure, the rotating electrical machine 10 is designed to have the bearings 21 and 22 located away from the axial center of the rotor 40 toward one of the ends of the rotor 40 opposed to each other in the axial direction thereof (see FIG. 2). This minimizes the risk of the electrical erosion as compared with a case where a plurality of bearings are arranged outside axial ends of a rotor. In other words, in the structure wherein the rotor has ends retained by the bearings, generation of a high-frequency magnetic flux results in creation of a closed circuit extending through the rotor, the stator, and the bearings (which are arranged axially outside the rotor). This leads to a risk that the axial current may result in electrical erosion in the bearings. In contrast, the rotor 40 are retained by the plurality of bearings 21 and 22 in the cantilever form, so that the above closed circuit does not occur, thereby minimizing the electrical erosion in the bearings 21 and 22.

In addition to the above one-side layout of the bearings 21 and 22, the rotating electrical machine 10 also has the following structure. In the magnet holder 41, the intermediate portion 45 extending in the radial direction of the rotor 40 is equipped with the contact avoider which axially extends to avoid physical contact with the stator 50 (see FIG. 2). This enables a closed circuit through which the axial current flows through the magnet holder 41 to be lengthened to increase the resistance thereof. This minimizes the risk of the electrical erosion of the bearings 21 and 22.

The retainer 23 for the bearing unit 20 is secured to the housing 30 and located on one axial end side of the rotor 40, while the housing 30 and the unit base 61 (i.e., a stator holder) are joined together on the other axial end of the rotor 40 (see FIG. 2). These arrangements properly achieve the structure in which the bearings 21 and 22 are located only on the one end of the length of the rotating shaft 11. Additionally, the unit base 61 is connected to the rotating shaft 11 through the housing 30, so that the unit base 61 is located electrically away from the rotating shaft 11. An insulating member such as resin may be disposed between the unit base 61 and the housing 30 to place the unit base 61 and the rotating shaft 11 electrically farther away from each other. This also minimizes the risk of the electrical erosion of the bearings 21 and 22.

The one-side layout of the bearings 21 and 22 in the rotating electrical machine 10 in this embodiment decreases the axial voltage applied to the bearings 21 and 22 and also decreases the potential difference between the rotor 40 and the stator 50. A decrease in the potential difference applied to the bearings 21 and 22 is, thus, achieved without use of conductive grease in the bearings 21 and 22. The conductive grease usually contains fine particles such as carbon particles, thus leading to a risk of generation of acoustic noise. In order to alleviate the above problem, this embodiment uses a non-conductive grease in the bearings 21 and 22 to minimize the acoustic noise in the bearings 21 and 22. For instance, in a case where the rotating electrical machine 10 is used with an electrical vehicle, it is usually required to take a measure to eliminate the acoustic noise. This embodiment is capable of properly taking such a measure.

In the third erosion avoiding measure, the stator winding 51 and the stator core 52 are unified together using a molding material to minimize a positional error of the stator winding 51 in the stator 50 (see FIG. 11). The rotating electrical machine 10 in this embodiment is designed not to have inter-conductor members (e.g., teeth) between the conductor groups 81 arranged in the circumferential direction of the stator winding 51, thus leading to a concern about the positional error or misalignment of the stator winding 51. The misalignment of the conductor of the stator winding 51 may be minimized by unifying the stator winding 51 and the stator core 52 in the mold. This eliminates risks of the distortion of magnetic flux arising from the misalignment of the stator winding 51 and the electrical erosion in the bearings 21 and 22 resulting from the distortion of the magnetic flux.

The unit base 61 serving as a housing to firmly fix the stator core 52 is made of carbon fiber reinforced plastic (CFRP), thereby minimizing electrical discharge to the unit base 61 as compared with when the unit base 61 is made of aluminum, thereby avoiding electrical erosion.

An additional erosion avoiding measure may be taken to make at least one of the outer race 25 and the inner race 26 of each of the bearings 21 and 22 using a ceramic material or alternatively to install an insulating sleeve outside the outer race 25.

Other embodiments will be described below in terms of differences between themselves and the first embodiment.

Second Embodiment

In this embodiment, the polar anisotropic structure of the magnet unit 42 of the rotor 40 is changed and will be described below in detail.

Figure 22:
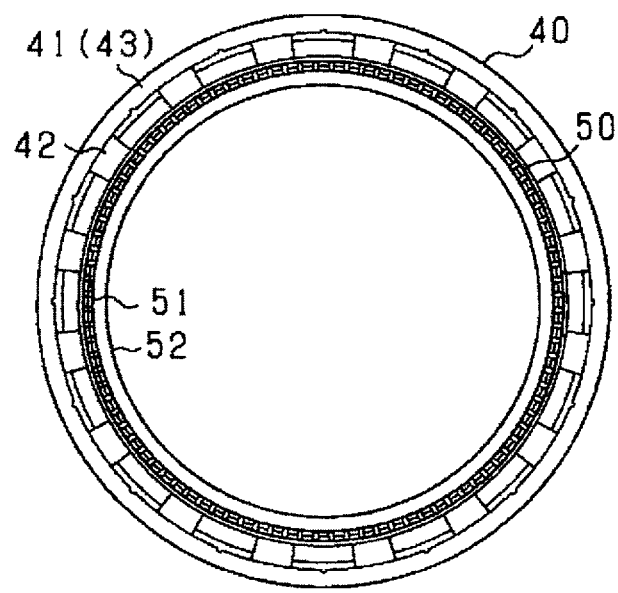
FIG. 22 is a transverse sectional view of a rotor and a stator in the second embodiment.
Figure 23:
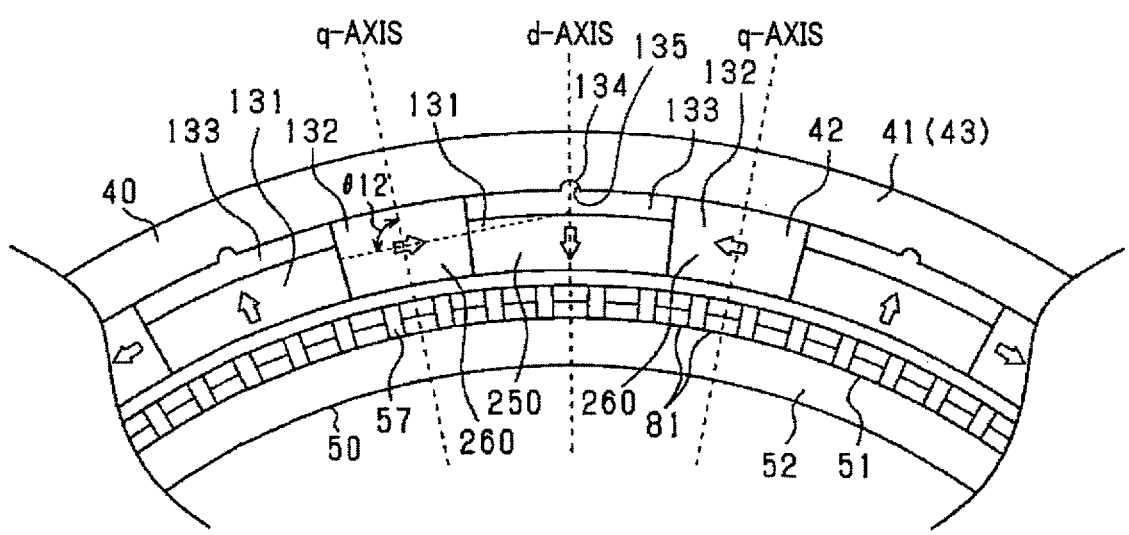
FIG. 23 is a partially enlarged view of FIG. 22.

The magnet unit 42 is, as clearly illustrated in FIGS. 22 and 23, made using a magnet array referred to as a Halbach array. Specifically, the magnet unit 42 is equipped with the first magnets 131 and the second magnets 132. The first magnets 131 have a magnetization direction (i.e., an orientation of a magnetization vector thereof) oriented in the radial direction of the magnet unit 42. The second magnets 132 have a magnetization direction (i.e., an orientation of the magnetization vector thereof) oriented in the circumferential direction of the magnet unit 42. The first magnets 131 are arrayed at a given interval away from each other in the circumferential direction. Each of the second magnets 132 is disposed between the first magnets 131 arranged adjacent each other in the circumferential direction. The first magnets 131 and the second magnets 132 are each implemented by a rare-earth permanent magnet, such as a neodymium magnet.

The first magnets 131 are arranged away from each other in the circumferential direction so as to have N-poles and S-poles which are created in radially inner portions thereof and face the stator 50. The N-poles and the S-poles are arranged alternately in the circumferential direction. The second magnets 132 are arranged to have N-poles and S-poles alternately located adjacent the first magnets 131 in the circumferential direction. The cylinder 43 which surrounds the magnets 131 and 132 may be formed as a soft magnetic core made of a soft magnetic material and which functions as a back core. The magnet unit 42 in this embodiment are designed to have the easy axis of magnetization oriented in the same way as in the first embodiment relative to the d-axis and the q-axis in the d-q axis coordinate system.

The magnetic members 133 each of which is made of a soft magnetic material are disposed radially outside the first magnets 131, in other words, close to the cylinder 43 of the magnet holder 41. Each of the magnetic members 133 may be made of magnetic steel sheet, soft iron, or a dust core material. Each of the magnetic members 133 has a length identical with that of the first magnet 131 (especially, a length of an outer periphery of the first magnet 131) in the circumferential direction. An assembly made up of each of the first magnets 131 and a corresponding one of the magnetic members 133 has a thickness identical with that of the second magnet 132 in the radial direction. In other words, each of the first magnets 131 has the thickness smaller than that of the second magnet 132 by that of the magnetic member 133 in the radial direction. The magnets 131 and 132 and the magnetic members 133 are firmly secured to each other using, for example, adhesive agent. In the magnet unit 42, the radial outside of the first magnets 131 faces away from the stator 50. The magnetic members 133 are located on the opposite side of the first magnets 131 to the stator 50 in the radial direction (i.e., farther away from the stator 50).

Each of the magnetic members 133 has the key 134 in a convex shape which is formed on the outer periphery thereof and protrudes radially outside the magnetic member 133, in other words, protrudes into the cylinder 43 of the magnet holder 41. The cylinder 43 has the key grooves 135 which are formed in an inner peripheral surface thereof in a concave shape and in which the keys 134 of the magnetic members 133 are fit. The protruding shape of the keys 134 is contoured to conform with the recessed shape of the key grooves 135. As many of the key grooves 135 as the keys 134 of the magnetic members 133 are formed. The engagement between the keys 134 and the key grooves 135 serves to eliminate misalignment or a positional deviation of the first magnets 131, the second magnets 132, and the magnet holder 41 in the circumferential direction (i.e. a rotational direction). The keys 134 and the key grooves 135 (i.e., convexities and concavities) may be formed either on the cylinders 43 of the magnet holder 41 or in the magnetic members 133, respectively. Specifically, the magnetic members 133 may have the key grooves 135 in the outer periphery thereof, while the cylinder 43 of the magnet holder 41 may have the keys 134 formed on the inner periphery thereof.

The magnet unit 42 has the first magnets 131 and the second magnets 132 alternately arranged to increase the magnetic flux density in the first magnets 131. This results in concentration of magnetic flux on one surface of the magnet unit 42 to enhance the magnetic flux close to the stator 50.

The layout of the magnetic members 133 radially arranged outside the first magnets 131, in other words, farther away from the stator 50 reduces partial magnetic saturation occurring radially outside the first magnets 131, thereby alleviating a risk of demagnetization in the first magnets 131 arising from the magnetic saturation. This results in an increase in magnetic force produced by the magnet unit 42. In other words, the magnet unit 42 in this embodiment is viewed to have portions which are usually subjected to the demagnetization and replaced with the magnetic members 133.

Figure 24A:
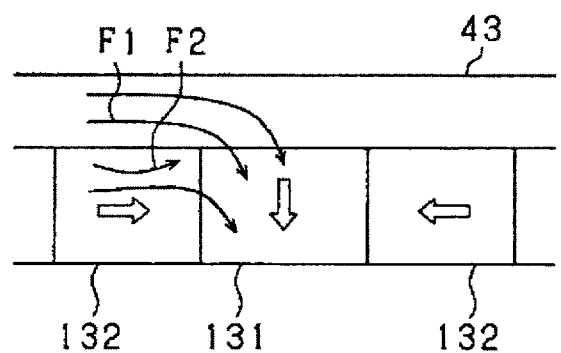
FIGS. 24($a$) and 24($b$) are views demonstrating flows of magnetic flux in a magnet unit.
Figure 24B:
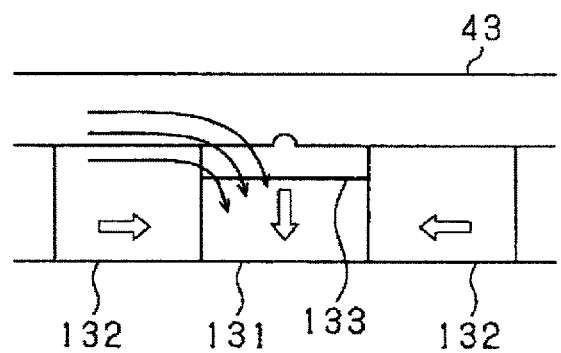

FIGS. 24(a) and 24(b) are illustrations which demonstrate flows of magnetic flux in the magnet unit 42. FIG. 24(a) illustrates a conventional structure in which the magnet unit 42 is not equipped with the magnetic members 133. FIG. 24(b) illustrates the structure in this embodiment in which the magnet unit 42 is equipped with the magnetic members 133. FIGS. 24(a) and 24(b) are linearly developed views of the cylinder 43 of the magnet holder 41 and the magnet unit 42. Lower sides of FIGS. 24(a) and 24(b) are close to the stator 50, while upper sides thereof are farther away from the stator 50.

In the structure shown in FIG. 24(a), a magnetic flux-acting surface of each of the first magnets 131 and a side surface of each of the second magnets 132 are placed in contact with the inner peripheral surface of the cylinder 43. A magnetic flux-acting surface of each of the second magnets 132 is placed in contact with the side surface of one of the first magnets 131. Such layout causes a combined magnetic flux to be created in the cylinder 43. The combined magnetic flux is made up of a magnetic flux F1 which passes outside the second magnet 132 and then enters the surface of the first magnets 131 contacting the cylinder 43 and a magnetic flux which flows substantially parallel to the cylinder 43 and attracts a magnetic flux F2 produced by the second magnet 132. This leads to a risk that the magnetic saturation may occur near the surface of contact between the first magnet 131 and the second magnet 132 in the cylinder 43.

In the structure in FIG. 24(b) wherein each of the magnetic members 133 is disposed between the magnetic flux-acting surface of the first magnet 131 and the inner periphery of the cylinder 43 farther away from the stator 50, the magnetic flux is permitted to pass through the magnetic member 133. This minimizes the magnetic saturation in the cylinder 43 and increases resistance against the demagnetization.

The structure in FIG. 24(b), unlike FIG. 24(a), functions to eliminate the magnetic flux F2 facilitating the magnetic saturation. This effectively enhances the permeance in the whole of the magnetic circuit, thereby ensuring the stability in properties of the magnetic circuit under elevated temperature.

As compared with radial magnets used in conventional SPM rotors, the structure in FIG. 24(b) has an increased length of the magnetic path passing through the magnet. This results in a rise in permeance of the magnet which enhances the magnetic force to increase the torque. Further, the magnetic flux concentrates on the center of the d-axis, thereby increasing the sine wave matching percentage. Particularly, the increase in torque may be achieved effectively by shaping the waveform of the current to a sine or trapezoidal wave under PWM control or using 120° excitation switching ICs.

In a case where the stator core 52 is made of magnetic steel sheets, the thickness of the stator core 52 in the radial direction thereof is preferably half or greater than half the thickness of the magnet unit 42 in the radial direction. For instance, it is preferable that the thickness of the stator core 52 in the radial direction is greater than half the thickness of the first magnets 131 arranged at the pole-to-pole center in the magnet unit 42. It is also preferable that the thickness of the stator core 52 in the radial direction is smaller than that of the magnet unit 42. In this case, a magnet magnetic flux is approximately 1 T, while the saturation magnetic flux density in the stator core 52 is 2 T. The leakage of magnetic flux to inside the inner periphery of the stator core 52 is avoided by selecting the thickness of the stator core 52 in the radial direction to be greater than half that of the magnet unit 42.

Magnets arranged to have the Halbach structure or the polar anisotropic structure usually have an arc-shaped magnetic path, so that the magnetic flux may be increased in proportion to a thickness of ones of the magnets which handle a magnetic flux in the circumferential direction. In such a structure, the magnetic flux flowing through the stator core 52 is thought of as not exceeding the magnetic flux flowing in the circumferential direction. In other words, when the magnetic flux produced by the magnets is 1 T, while ferrous metal whose saturation magnetic flux density is 2 T is used to make the stator core 52, a light weight and compact electrical rotating machine may be produced by selecting the thickness of the stator core 52 to be greater than half that of the magnets. The demagnetizing field is usually exerted by the stator 50 on the magnetic field produced by the magnets, so that the magnetic flux produced by the magnets will be 0.9 T or less. The magnetic permeability of the stator core may, therefore, be properly kept by selecting the thickness of the stator core to be half that of the magnets.

Modifications of the above structure will be described below.

First Modification

Figure 25:
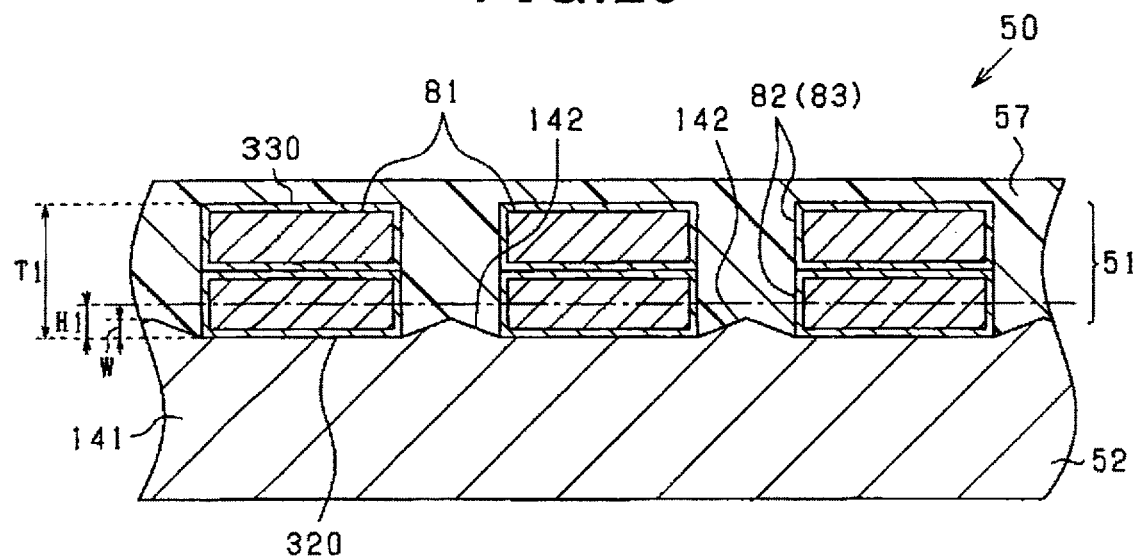
FIG. 25 is a sectional view of a stator in the first modification.

In the above embodiment, the outer peripheral surface of the stator core 52 has a curved surface without any irregularities. The plurality of conductor groups 81 are arranged at a given interval away from each other on the outer peripheral surface of the stator core 52. This layout may be changed. For instance, the stator core 52 illustrated in FIG. 25 is equipped with the circular ring-shaped yoke 141 and the protrusions 142. The yoke 141 is located on the opposite side (i.e., a lower side, as viewed in the drawing) of the stator winding 51 to the rotor 40 in the radial direction. Each of the protrusions 142 protrudes into a gap between a respective two of the straight sections 83 arranged adjacent each other in the circumferential direction. The protrusions 142 are arranged at a given interval away from each other in the circumferential direction radially outside the yoke 141, i.e., close to the rotor 40. Each of the conductor groups 81 of the stator winding 51 engages the protrusions 142 in the circumferential direction, in other words, the protrusions 142 are used as positioners to position and array the conductor groups 81 in the circumferential direction. The protrusions 142 Correspond to inter-conductor members.

A radial thickness of each of the protrusions 142 from the yoke 141, in other words, a distance W, as illustrated in FIG. 25, between the inner surface 320 of the straight sections 82 which is placed in contact with the yoke 141 and the top of the protrusion 412 in the radial direction of the yoke 141 is selected to be smaller than half a radial thickness (as indicated by H1 in the drawing) of the straight sections 83 arranged adjacent the yoke 141 in the radial direction. In other words, non-conductive members (i.e., the sealing members 57) preferably each occupy three-fourths of a dimension (i.e., thickness) T1 (i.e., twice the thickness of the conductors 82, in other words, a minimum distance between the surface 320 of the conductor group 81 placed in contact with the stator core 52 and the surface 330 of the conductor group 81 facing the rotor 40) of the conductor groups (i.e., conductors) 81 in the radial direction of the stator winding 51 (i.e., the stator core 52). Such selection of the thickness of the protrusions 142 Causes each of the protrusions 142 not to function as a tooth between the conductor groups 81 (i.e., the straight sections 83) arranged adjacent each other in the circumferential direction, so that there are no magnetic paths which would usually be formed by the teeth. The protrusions 142 need not necessarily to be arranged between a respective circumferentially adjacent two of all the conductor groups 81, but however, a single protrusion 142 may be disposed at least only between two of the conductor groups 81 which are arranged adjacent each other in the circumferential direction. For instance, the protrusions 142 may be disposed away from each other in the circumferential direction at equal intervals each of which corresponds to a given number of the conductor groups 81. Each of the protrusions 142 may be designed to have any shape, such as a rectangular or arc-shape.

The straight sections 83 may alternatively be arranged in a single layer on the outer peripheral surface of the stator core 52. In a broad sense, the thickness of the protrusions 142 from the yoke 141 in the radial direction may be smaller than half that of the straight sections 83 in the radial direction.

If an imaginary circle whose center is located at the axial center of the rotating shaft 11 and which passes through the radial centers of the straight sections 83 placed adjacent the yoke 141 in the radial direction is defined, each of the protrusions 142 may be shaped to protrude only within the imaginary circle, in other words, not to protrude radially outside the imaginary circle toward the rotor 40.

The above structure in which the protrusions 142 have the limited thickness in the radial direction and do not function as teeth in the gaps between the straight sections 83 arranged adjacent each other in the circumferential direction enables the adjacent straight sections 83 to be disposed closer to each other as compared with a case where teeth are provided in the gaps between the straight sections 83. This enables a sectional area of the conductor body 82a to be increased, thereby reducing heat generated upon excitation of the stator winding 51. The absence of the teeth enables magnetic saturation to be eliminated to increase the amount of electrical current delivered to the stator winding 51. It is, however, possible to alleviate the adverse effects arising from an increase in amount of heat generated by the increase in electrical current delivered to the stator winding 51. The stator winding 51, as described above, has the turns 84 which are shifted in the radial direction and equipped with the interference avoiding portions with the adjacent turns 84, thereby enabling the turns 84 to be disposed away from each other in the radial direction. This enhances the heat dissipation from the turns 84. The above structure is enabled to optimize the heat dissipating ability of the stator 50.

The radial thickness of the protrusions 142 may not be restricted by the dimension H1 in FIG. 25 as long as the yoke 141 of the stator core 52 and the magnet unit 42 (i.e., each of the magnets 91 and 92) of the rotor 40 are arranged at a given distance away from each other. Specifically, the radial thickness of the protrusions 142 may be larger than or equal to the dimension H1 in FIG. 25 as long as the yoke 141 and the magnet unit 42 arranged 2 mm or more away from each other. For instance, in a case where the radial thickness of the straight section 83 is larger than 2 mm, and each of the conductor groups 81 is made up of the two conductors 82 stacked in the radial direction, each of the protrusions 142 may be shaped to occupy a region ranging to half the thickness of the straight section 83 not contacting the yoke 141, i.e., the thickness of the conductor 82 located farther away from the yoke 141. In this case, the above beneficial advantages will be obtained by increasing the conductive sectional area of the conductor groups 81 as long as the radial thickness of the protrusions 142 is at least $H1 \times 3/2$.

Figure 26:
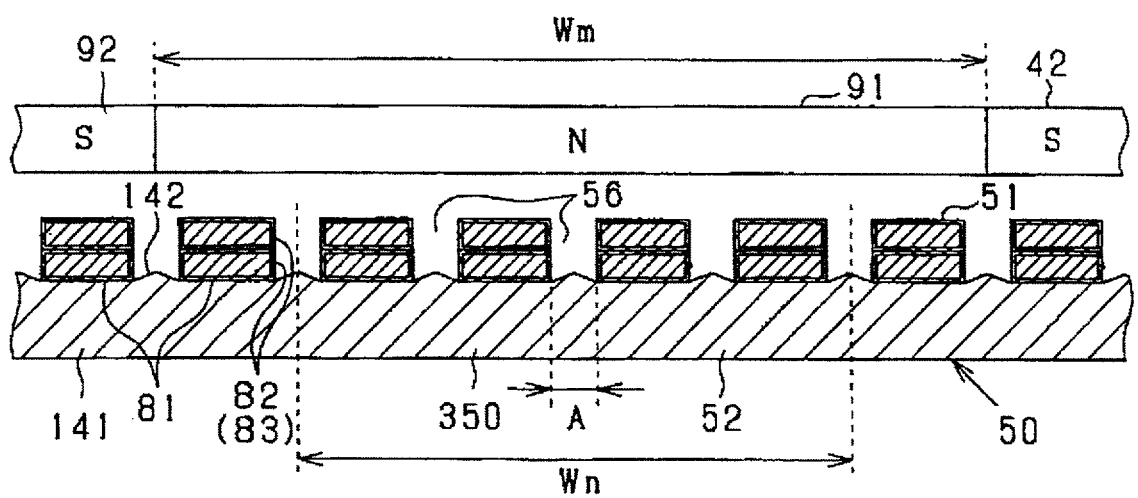
FIG. 26 is a sectional view of a stator in the first modification.

The stator core 52 may be designed to have the structure illustrated in FIG. 26. FIG. 26 omits the sealing members 57, but the sealing members 57 may be used. FIG. 26 illustrates the magnet unit 42 and the stator core 52 as being arranged linearly for the sake of simplicity.

In the structure of FIG. 26, the stator 50 has the protrusions 142 as inter-conductor members each of which is arranged between a respective two of the conductors 82 (i.e., the straight sections 83) located adjacent each other in the circumferential direction. The stator 50 is equipped with the portions 350 each of which magnetically operates along with one of the magnetic poles (i.e., an N-pole or an S-pole) of the magnet unit 42 when the stator winding 51 is excited. The portions 350 extend in the circumferential direction of the stator 50. If each of the portions 350 has a length Wn in the circumferential direction of the stator 50, the sum of widths of the protrusions 142 lying in a range of this length Wn (i.e., the total dimension of the protrusions 412 in the circumferential direction of the stator 50 in the range of length Wn) is defined as Wt, the saturation magnetic flux density of the protrusions 412 is defined as Bs, a width of the magnet unit 42 equivalent to one of the magnetic poles of the magnet unit 42 in the circumferential direction of the magnet unit 42 is defined as Wm, and the remanent flux density in the magnet unit 42 is defined as Br, the protrusions 142 are made of a magnetic material meeting a relation of $$Wt \times Bs \leq Wm \times Br \quad (1)$$

The range Wn is defined to contain ones of the conductor groups 81 which are arranged adjacent each other in the circumferential direction and which overlap in time of excitation thereof with each other. It is advisable that a reference (i.e., a border) used in defining the range Wn be set to the center of the gap 56 between the conductor groups 81. For instance, in the structure illustrated in FIG. 26, the plurality of conductor groups 81 lying in the range Wn include the first, the second, the third, and the fourth conductor groups 81, as numbered from the magnetic center of the N-pole, where the first and the second conductor groups 81 are closest to the magnetic center of the N-pole. The range Wn is defined to include the total of those four conductor groups 81. Ends (i.e., outer limits) of the range Wn are defined to lie at the centers of the gaps 56.

In FIG. 26, the range Wn contains half of the protrusion 142 inside each of the ends thereof. The total of the four protrusions 142 lie in the range Wn. If the width of each of the protrusions 142 (i.e., a dimension of the protrusion 142 in the circumferential direction of the stator 50, in other words, an interval between the adjacent conductor groups 81) is defined as A, the sum of widths Wt of the protrusions 142 lying in the range Wn meets a relation of $Wt = \frac{1}{2}A + A + A + A + \frac{1}{2}A = 4A$.

Specifically, the three-phase windings of the stator winding 51 in this embodiment are made in the form of distributed windings. In the stator winding 51, the number of the protrusions 142 for each pole of the magnet unit 42, that is, the number of the gaps 56 each between the adjacent conductor groups 81 is selected to be "the number of phases×Q" where Q is the number of the conductors 82 for each phase which are placed in contact with the stator core 52. In other words, in the case where the conductors 82 are stacked in the radial direction of the rotor 40 to constitute each of the conductor groups 81, Q is the number of inner ones of the conductors 82 of the conductor groups 81 for each phase. In this case, when the three-phase windings of the stator winding 51 are excited in a given sequence, the protrusions 142 for two of the three-phases within each pole are magnetically excited. The total circumferential width Wt of the protrusions 142 excited upon excitation of the stator winding 51 within a range of each pole of the magnet unit 42, therefore, meets a relation of "the number of the phases excited×Q×A=2×2×A where A is the width of each of the protrusions 142 (i.e., the gap 56) in the circumferential direction.

The total width Wt is determined in the above way. Additionally, the protrusions 142 of the stator core 52 are made of magnetic material meeting the above equation (1). The total width Wt is also viewed as being equivalent to a circumferential dimension of where the relative magnetic permeability is expected to become greater than one within each pole. The total width Wt may alternatively be determined as a circumferential width of the protrusions 142 in each pole with some margin. Specifically, since the number of the protrusions 142 for each pole of the magnet unit 42 is given by the number of phases×Q, the width of the protrusions 412 in each pole (i.e., the total width Wt) may be given by the number of phases×Q×A=3×2×A=6 A.

The distributed winding, as referred to herein, means that there is a pair of poles (i.e., the N-pole and the S-pole) of the stator winding 51 for each pair of magnetic poles. The pair of poles of the stator winding 51, as referred to herein, is made of the two straight sections 83 in which electrical current flows in opposite directions and the turn 84 electrically connecting them together. Note that a short pitch winding or a full pitch winding may be viewed as an equivalent of the distributed winding as long as it meets the above conditions.

Next, the case of a concentrated winding will be described below. The concentrated winding, as referred to herein, means that the width of each pair of magnetic poles is different from that of each pair of poles of the stator winding 51. An example of the concentrated winding includes a structure in which there are three conductor groups 81 for each pair of magnetic poles, in which there are three conductor groups 81 for two pairs of magnetic poles, in which there are nine conductor groups 81 for four pairs of magnetic poles, or in which there are nine conductor groups 81 for five pairs of magnetic poles.

In the case where the stator winding 51 is made in the form of the concentrated winding, when the three-phase windings of the stator winding 51 are excited in a given sequence, a portion of the stator winding 51 for two phases is excited. This causes the protrusions 142 for two phases to be magnetically excited. The circumferential width Wt of the protrusions 142 which is magnetically excited upon excitation of the stator winding in a range of each pole of the magnet unit 42 is given by Wt=A×2. The width Wt is determined in this way. The protrusions 142 are made of magnetic material meeting the above equation (1). In the above described case of the concentrated winding, the sum of widths of the protrusions 142 arranged in the circumferential direction of the stator 50 within a region surrounded by the conductor groups 81 for the same phase is defined as A. The dimension Wm in the concentrated winding is given by [an entire circumference of a surface of the magnet unit 42 facing the air gap]×[the number of phases]÷ [the number of the distributed conductor groups 81].

Usually, a neodymium magnet, a samarium-cobalt magnet, or a ferrite magnet whose value of BH is higher than or equal to 20[MGOe (kJ/m^3)] has Bd=1.0 T or more. Iron has Br=2.0 T or more. The protrusions 142 of the stator core 52 may, therefore, be made of magnetic material meeting a relation of Wt<½×Wm for realizing a high-power motor.

In a case where each of the conductors 82 is, as described later, equipped with the outer coated layer 182, the conductors 82 may be arranged in the circumferential direction of the stator core with the outer coated layers 182 placed in contact with each other. In this case, the width Wt may be viewed to be zero or equivalent to thicknesses of the outer coated layers 182 of the conductors 82 contacting with each other.

The structure illustrated in FIG. 25 or 26 is designed to have inter-conductor members (i.e., the protrusions 142) which are too small in size for the magnet-produced magnetic flux in the rotor 40. The rotor 40 is implemented by a surface permanent magnet rotor which has a flat surface and a low inductance, and does not have a salient pole in terms of a magnetic resistance. Such a structure enables the inductance of the stator 50 to be decreased, thereby reducing a risk of distortion of the magnetic flux caused by the switching time gap in the stator winding 51, which minimizes the electrical erosion of the bearings 21 and 22.

Second Modification

Figure 27:
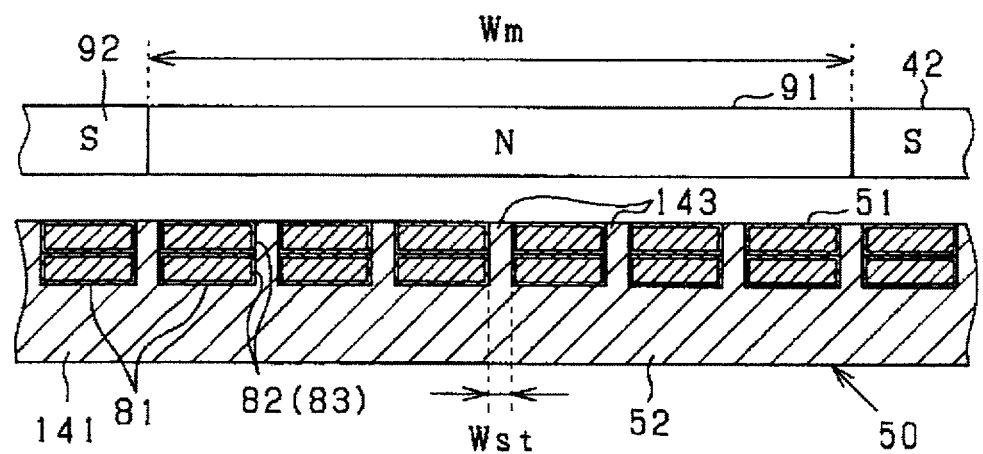
FIG. 27 is a sectional view of a stator in the second modification.

The stator 50 equipped with the inter-conductor members made to meet the above equation may be designed to have the following structure. In FIG. 27, the stator core 52 is equipped with the teeth 143 as inter-conductor members which are formed in an outer peripheral portion (an upper portion, as viewed in the drawing) of the stator core 52. The teeth 143 protrude from the yoke 141 and are arranged at a given interval away from each other in the circumferential direction of the stator core 52. Each of the teeth 143 has a thickness identical with that of the conductor group 81 in the radial direction. The teeth 143 have side surfaces placed in contact with the conductors 82 of the conductor groups 81. The teeth 143 may alternatively be located away from the conductors 82 through gaps.

The teeth 143 are shaped to have a restricted width in the circumferential direction. Specifically, each of the teeth 143 has a stator tooth which is very thin for the volume of magnets. Such a structure of the teeth 143 serves to achieve saturation by the magnet-produced magnetic flux at 1.8 T or more to reduce the permeance, thereby decreasing the inductance.

If a surface area of a magnetic flux-acting surface of the magnet unit 42 facing the stator 50 for each pole is defined as Sm, and the remanent flux density of the magnet unit 42 is defined as Br, the magnetic flux in the magnet unit 42 will be Sm×Br. A surface area of each of the teeth 143 facing the rotor 40 is defined as St. The number of the conductors 83 for each phase is defined as m. When the teeth 143 for two phases within a range of one pole are magnetically excited upon excitation of the stator winding 51, the magnetic flux in the stator 50 is expressed by St×m×2×Bs. The decrease in inductance may be achieved by selecting the dimensions of the teeth 143 to meet a relation of $$St \times m \times 2 \times Bs < Sm \times Br \quad (2).$$

In a case where the dimension of the magnet unit 42 is identical with that of the teeth 143 in the axial direction, the above equation (2) may be rewritten as an equation (3) of Wst×m×2×Bs<Wm×Br where Wm is the circumferential width of the magnet unit 42 for each pole, and Wst is the circumferential width of the teeth 143. For example, when Bs=2 T, Br=1 T, and m=2, the equation (3) will be Wst<Wm/8. In this case, the decrease in inductance may be achieved by selecting the width Wst of the teeth 143 to be smaller than one-eighth (⅛) of the width Wm of the magnet unit 42 for one pole. When m is one, the width Wst of the teeth 143 is preferably selected to be smaller than one-fourth (¼) of the width Wm of the magnet unit 42 for one pole.

"Wst×m×2" in the equation (3) corresponds to a circumferential width of the teeth 143 magnetically excited upon excitation of the stator winding 51 in a range of one pole of the magnet unit 42.

The structure in FIG. 27 is, like in FIGS. 25 and 26, equipped with the inter-conductor members (i.e., the teeth 143) which are very small in size for the magnet-produced magnetic flux in the rotor 40. Such a structure is capable of reducing the inductance of the stator 50 to alleviate a risk of distortion of the magnetic flux arising from the switching time gap in the stator winding 51, which minimizes the probability of the electrical erosion of the bearings 21 and 22. Note that the definitions of parameters, such as Wt, Wn, A, and Bs, associated with the stator 50 or parameters, such as Wm and Br, associated with the magnet unit 42 may refer to those in the above described first modification.

Third Modification

Figure 28:
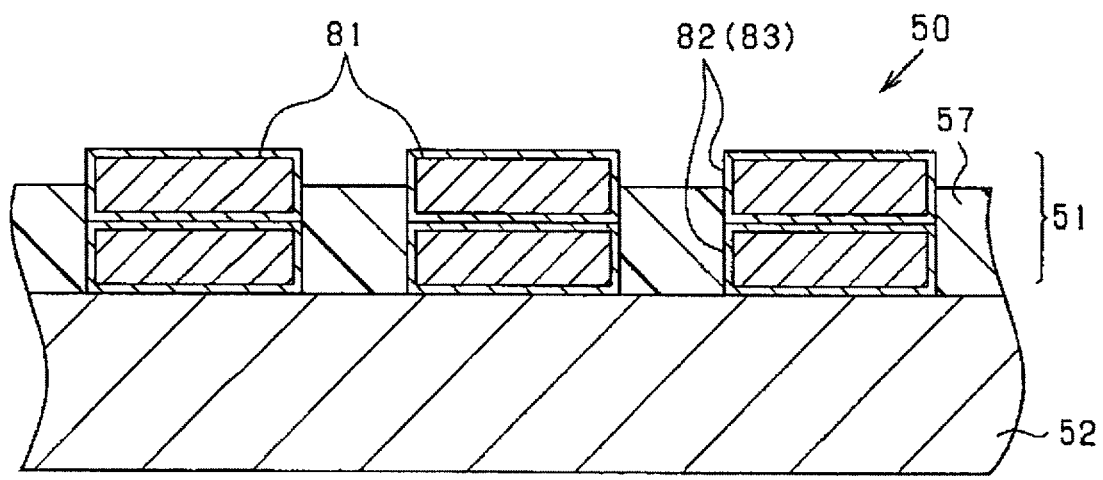
FIG. 28 is a sectional view of a stator in the third modification.

The above embodiment has the sealing members 57 which cover the stator winding 51 and occupy a region including all of the conductor groups 81 radially outside the stator core 52, in other words, lie in a region where the thickness of the sealing members 57 is larger than that of the conductor groups 81 in the radial direction. This layout of the sealing members 57 may be changed. For instance, the sealing members 57 may be, as illustrated in FIG. 28, designed so that the conductors 82 protrude partially outside the sealing members 57. Specifically, the sealing members 57 are arranged so that portions of the conductors 82 that are radially outermost portions of the conductor groups 81 are exposed outside the sealing members 57 toward the stator 50. In this case, the thickness of the sealing members 57 in the radial direction may be identical with or smaller than that of the conductor groups 81.

Fourth Modification

Figure 29:
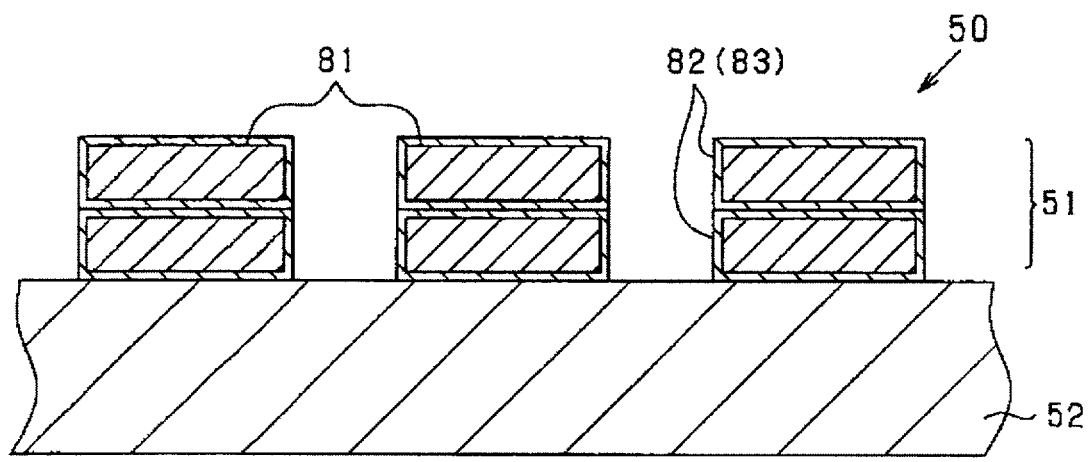
FIG. 29 is a sectional view of a stator in the fourth modification.

The stator 50 may be, as illustrated in FIG. 29, designed not to have the sealing members 57 covering the conductor groups 81, i.e., the stator winding 51. In this case, a gap is created between the adjacent conductor groups 81 arranged in the circumferential direction without an inter-conductor member therebetween. In other words, no inter-conductor member is disposed between the conductor groups 81 arranged in the circumferential direction. Air may be arranged in the gaps between the conductor groups 81. The air may be viewed as a non-magnetic member or an equivalent thereof whose Bs is zero (0).

Fifth Modification

The inter-conductor members of the stator 50 may be made of a non-magnetic material other than resin. For instance, a non-metallic material, such as SUS304 that is austenitic stainless steel.

Sixth Modification

The stator 50 may be designed not to have the stator core 52. Specifically, the stator 50 is made of the stator winding 51 shown in FIG. 12. The stator winding 51 of the stator 50 may be covered with a sealing member. The stator 50 may alternatively be designed to have an annular winding retainer made from non-magnetic material such as synthetic resin instead of the stator core 52 made from soft magnetic material.

Seventh Modification

Figure 30:
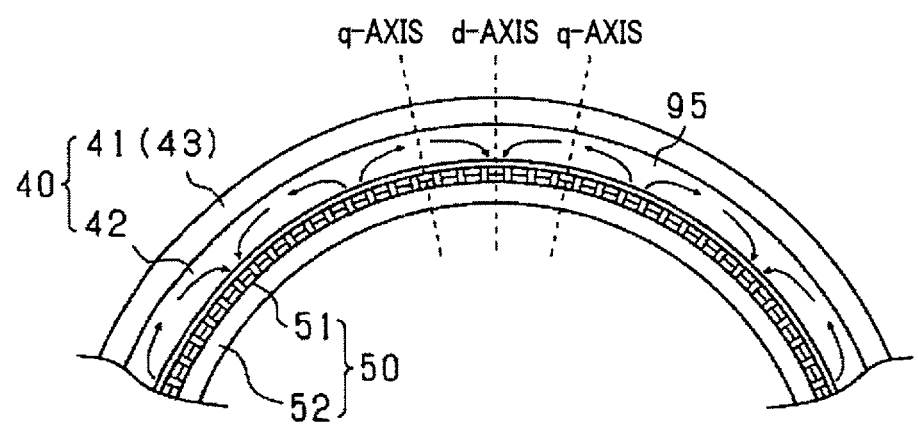
FIG. 30 is a sectional view of a stator in the seventh modification.

The structure in the first embodiment uses the magnets 91 and 92 arranged in the circumferential direction to constitute the magnet unit 42 of the rotor 40. The magnet unit 42 may be made using an annular permanent magnet. For instance, the annular magnet 95 is, as illustrated in FIG. 30, secured to a radially inner periphery of the cylinder 43 of the magnet holder 41. The annular magnet 95 is equipped with a plurality of different magnetic poles whose magnetic polarities are arranged alternately in the circumferential direction of the annular magnet 95. The magnet 95 lies integrally both on the d-axis and the q-axis. The annular magnet 95 has a magnetic orientation directed in the radial direction on the d-axis of each magnetic pole and a magnetic orientation directed in the circumferential direction on the q-axis between the magnetic poles, thereby creating arc-shaped magnetic paths.

The annular magnet 95 may be designed to have an easy axis of magnetization directed parallel or near parallel to the d-axis near the d-axis and also to have an easy axis of magnetization directed perpendicular or near perpendicular to the q-axis near the q-axis, thereby creating the arc-shaped magnetic paths.

Eighth Modification

This modification is different in operation of the controller 110 from the above embodiment or modifications. Only differences from those in the first embodiment will be described below.

Figure 31:
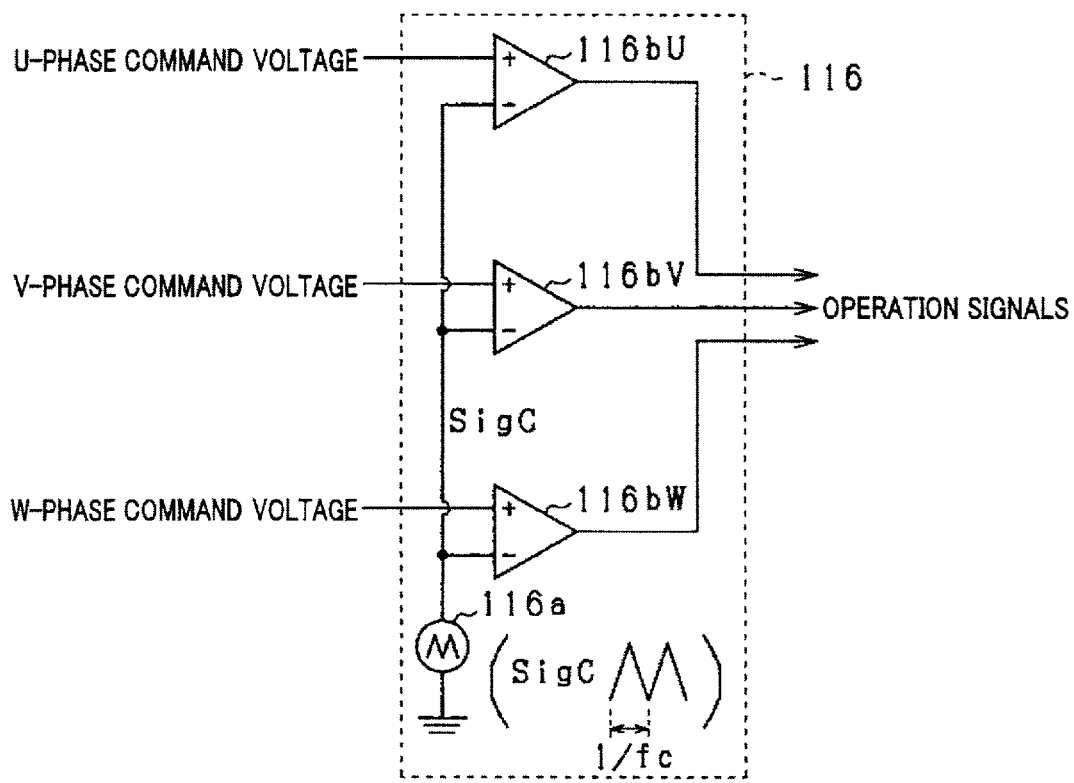
FIG. 31 is a functional block diagram which illustrates a portion of operations of an operation signal generator in the eighth modification 8.

The operations of the operation signal generators 116 and 126 illustrated in FIG. 20 and the operation signal generators 130a and 130b illustrated in FIG. 21 will first be discussed below using FIG. 31. The operations executed by the operation signal generators 116, 126, 130a, and 130b are basically identical with each other. Only the operation of the operation signal generator 116 will, therefore, be described below for the sake of simplicity.

The operation signal generator 116 includes the carrier generator 116a, the U-phase comparator 116bU, the V-phase comparator 116bV, and the W-phase comparator 116bW. The carrier generator 116a produces and outputs the carrier signal SigC in the form of a triangle wave signal.

The U-, V-, and W-phase comparators 116bU, 116bV, and 116bW receive the carrier signal SigC outputted by the carrier generator 116a and the U-, V-, and W-phase command voltages produced by the three-phase converter 115. The U-, V-, and W-phase command voltages are produced, for example, in the form of a sine wave and outputted 120° out of electrical phase with each other.

The U-, V-, and W-phase comparators 116bU, 116bV, and 116bW compare the U-, V-, and W-phase command voltages with the carrier signal SigC to produce operation signals for the switches Sp and Sn of the upper and lower arms in the first inverter 101 for the U-, V-, and W-phase windings under PWM (Pulse Width Modulation) control. Specifically, the operation signal generator 116 works to produce operation signals for the switches Sp and Sn of the upper and lower arms for the U-, V-, and W-phase windings under the PWM control based on comparison of levels of signals derived by normalizing the U-, V-, and W-phase command voltages using the power supply voltage with a level of the carrier signal SigC. The driver 117 is responsive to the operation signals outputted by the operation signal generator 116 to turn on or off the switches Sp and Sn in the first inverter 101 for the U-, V-, and W-phase windings.

The controller 110 alters the carrier frequency fc of the carrier signal SigC, i.e., a switching frequency for each of the switches Sp and Sn. The carrier frequency fc is altered to be higher in a low torque range or a high-speed range in the rotating electrical machine 10 and alternatively lower in a high torque range in the rotating electrical machine 10. This altering is achieved in order to minimize a deterioration in ease of control of electrical current flowing through each of the U-, V-, and W-phase windings.

In brief, the core-less structure of the stator 50 serves to reduce the inductance in the stator 50. The reduction in inductance usually results in a decrease in electrical time constant in the rotating electrical machine 10. This leads to a risk that a ripple of current flowing through each of the phase windings may be increased, thereby resulting in the deterioration in ease of control of the current flowing through the phase winding, which causes control divergence. The adverse effects of the above deterioration on the ease of control usually become higher when the current (e.g., an effective value of the current) flowing through the winding lies in a low current region than when the current lies in a high current range. In order to alleviate such a problem, the controller 110 in this embodiment is designed to alter the carrier frequency fc.

How to alter the carrier frequency fc will be described below with reference to FIG. 32. This operation of the operation signal generator 116 is executed by the controller 110 cyclically at a given interval.

First, in step S10, it is determined whether electrical current flowing through each of the three-phase windings 51a lies in the low current range. This determination is made to determine whether torque now produced by the rotating electrical machine 10 lies in the low torque range. Such a determination may be achieved according to the first method or the second method, as discussed below.

First Method

The estimated torque value of the rotating electrical machine 10 is calculated using the d-axis current and the q-axis current converted by the d-q converter 112. If the estimated torque value is determined to be lower than a torque threshold value, it is concluded that the current flowing through the winding 51a lies in the low current range. Alternatively, if the estimated torque value is determined to be higher than or equal to the torque threshold value, it is concluded that the current lies in the high current range. The torque threshold value is selected to be half, for example, the degree of starting torque (also called locked rotor torque) in the rotating electrical machine 10.

Second Method

If an angle of rotation of the rotor 40 measured by an angle sensor is determined to be higher than or equal to a speed threshold value, it is determined that the current flowing through the winding 51a lies in the low current range, that is, in the high speed range. The speed threshold value may be selected to be a rotational speed of the rotating electrical machine 10 when a maximum torque produced by the rotating electrical machine 10 is equal to the torque threshold value.

If a NO answer is obtained in step S10, meaning that the current lies in the high current range, then the routine proceeds to step S11 wherein the carrier frequency fc is set to the first frequency fL.

Alternatively, if a YES answer is obtained in step S10, then the routine proceeds to step S12 wherein the carrier frequency fc is set to the second frequency fH that is higher than the first frequency fL.

As apparent from the above discussion, the carrier frequency fc when the current flowing through each of the three-phase windings lies in the low current range is selected to be higher than that when the current lies in the high current range. The switching frequency for the switches Sp and Sn is, therefore, increased in the low current range, thereby minimizing a rise in current ripple to ensure the stability in controlling the current.

When the current flowing through each of the three-phase windings lies in the high current range, the carrier frequency fc is selected to be lower than that when the current lies in the low current range. The current flowing through the winding in the high current range usually has an amplitude larger than that when the current lies in the low current range, so that the rise in current ripple arising from the reduction in inductance has a low impact on the ease of control of the current. It is, therefore, possible to set the carrier frequency fc in the high current range to be lower than that in the low current range, thereby reducing a switching loss in the inverters 101 and 102.

This modification is capable of realizing the following modes.

Figure 32:
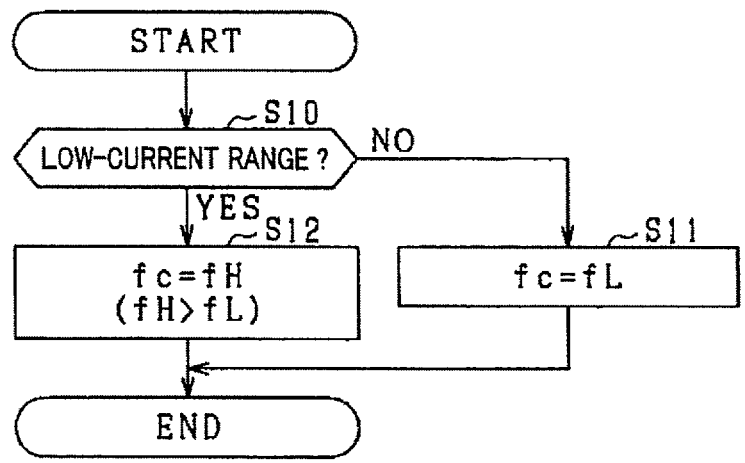
FIG. 32 is a flowchart representing a sequence of steps to execute a carrier frequency altering operation.

If a YES answer is obtained in step S10 in FIG. 32 when the carrier frequency fc is set to the first frequency fL, the carrier frequency fc may be changed gradually from the first frequency fL to the second frequency fH.

Alternatively, if a NO answer is obtained in step S10 when the carrier frequency fc is set to the second frequency fH, the carrier frequency fc may be changed gradually from the second frequency fH to the first frequency fL.

The operation signals for the switches may alternatively be produced using SVM (Space Vector Modulation) instead of the PWM. The above alteration of the switching frequency may also be made.

Ninth Modification

In each of the embodiments, two pairs of conductors making up the conductor groups 81 for each phase are, as illustrated in FIG. 33(a), arranged parallel to each other. FIG. 33(a) is a view which illustrates an electrical connection of the first and second conductors 88a and 88b that are the two pairs of conductors. The first and second conductors 88a and 88b may alternatively be, as illustrated in FIG. 33(b), connected in series with each other instead of the connection in FIG. 33(a).

Three or more pairs of conductors may be stacked in the form of multiple layers. FIG. 34 illustrates four pairs of conductors: the first to fourth conductors 88a to 88d which are stacked. The first conductor 88a, the second conductor 88b, the third conductor 88c, and the fourth conductor 88d are arranged in this order from the stator core 52 in the radial direction.

The third and fourth conductors 88c and 88d are, as illustrated in FIG. 33(c), connected in parallel to each other. The first conductor 88a is connected to one of joints of the third and fourth conductors 88c and 88d. The second conductor 88b is connected to the other joint of the third and fourth conductors 88c and 88d. The parallel connection of conductors usually results in a decrease in current density of those conductors, thereby minimizing thermal energy produced upon energization of the conductors. Accordingly, in the structure in which a cylindrical stator winding is installed in a housing (i.e., the unit base 61) with the coolant path 74 formed therein, the first and second conductors 88a and 88b which are connected in non-parallel to each other are arranged close to the stator core 52 placed in contact with the unit base 61, while the third and fourth conductors 88c and 88d which are connected in parallel to each other are disposed farther away from the stator core 52. This layout equalizes the cooling ability of the conductors 88a to 88d stacked in the form of multiple layers.

The conductor group 81 including the first to fourth conductors 88a to 88d may have a thickness in the radial direction which is smaller than a circumferential width of the conductor groups 81 for one phase within a region of one pole.

Tenth Modification

Figure 35:
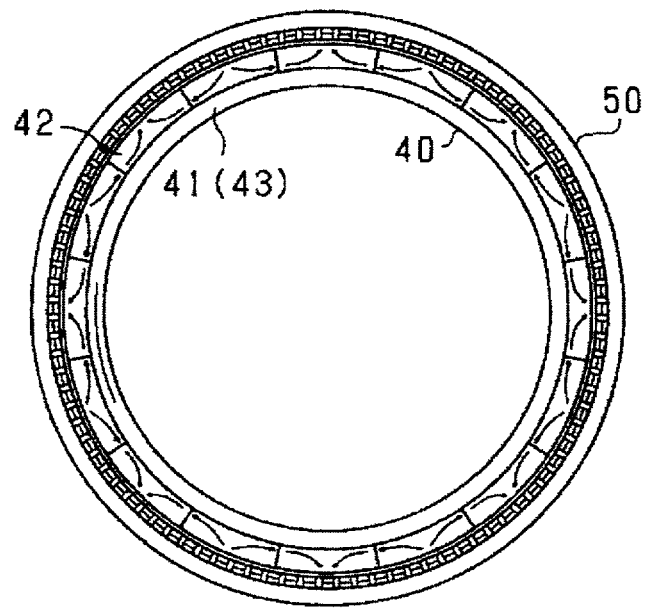
FIG. 35 is a transverse sectional view of an inner rotor type rotor and a stator in the tenth modification.
Figure 36:
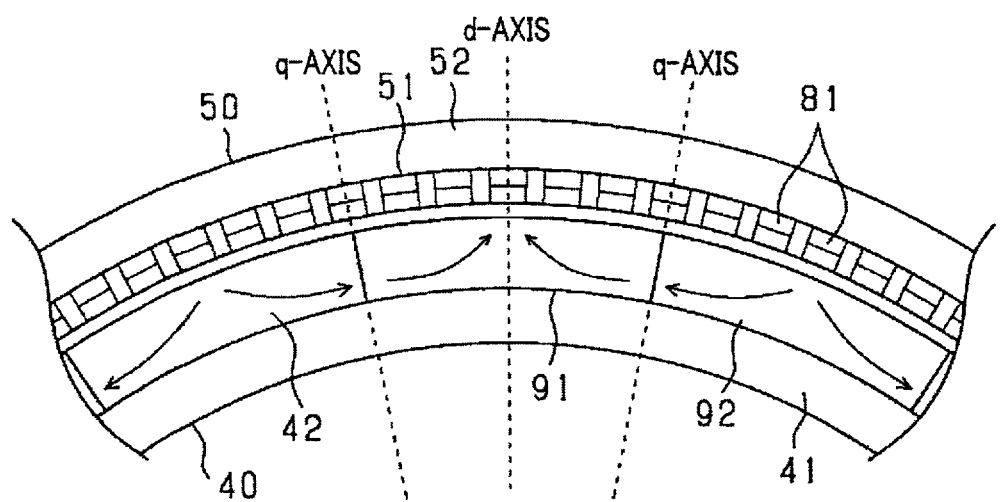
FIG. 36 is a partially enlarged view of FIG. 35.

The rotating electrical machine 10 may alternatively be designed to have an inner rotor structure (i.e., an inward rotating structure). In this case, the stator 50 may be mounted, for example, on a radial outside within the housing 30, while the rotor 40 may be disposed on a radial inside within the housing 30. The inverter unit 60 may be mounted one or both axial sides of the stator 50 or the rotor 40. FIG. 35 is a transverse sectional view of the rotor 40 and the stator 50. FIG. 36 is an enlarged view which partially illustrates the rotor 40 and the stator 50 in FIG. 35.

The inner rotor structure in FIGS. 35 and 36 is substantially identical with the outer rotor structure in FIGS. 8 and 9 except for the layout of the rotor 40 and the stator 50 in the radial direction. In brief, the stator 50 is equipped with the stator winding 51 having the flattened conductor structure and the stator core 52 with no teeth. The stator winding 51 is installed radially inside the stator core 52. The stator core 52, like the outer rotor structure, has any of the following structures.

(A) The stator 50 has the inter-conductor members each of which is disposed between the conductor portions in the circumferential direction. As the inter-conductor members, magnetic material is used which meets a relation of Wt×Bs≤Wm×Br where Wt is a width of the inter-conductor members in the circumferential direction within one magnetic pole, Bs is the saturation magnetic flux density of the inter-conductor members, Wm is a width of the magnet unit equivalent to one magnetic pole in the circumferential direction, and Br is the remanent flux density in the magnet unit.

(B) The stator 50 has the inter-conductor members each of which is disposed between the conductor portions in the circumferential direction. The inter-conductor members are each made of a non-magnetic material.

(C) The stator 50 has no inter-conductor member disposed between the conductor portions in the circumferential direction.

The same is true of the magnets 91 and 92 of the magnet unit 42. Specifically, the magnet unit 42 is made up of the magnets 91 and 92 each of which is magnetically oriented to have the easy axis of magnetization which is directed near the d-axis to be more parallel to the d-axis than that near the q-axis which is defined on the boundary of the magnetic poles. The details of the magnetization direction in each of the magnets 91 and 92 are the same as described above. The magnet unit 42 may be the annular magnet 95 (see FIG. 30).

Figure 37:
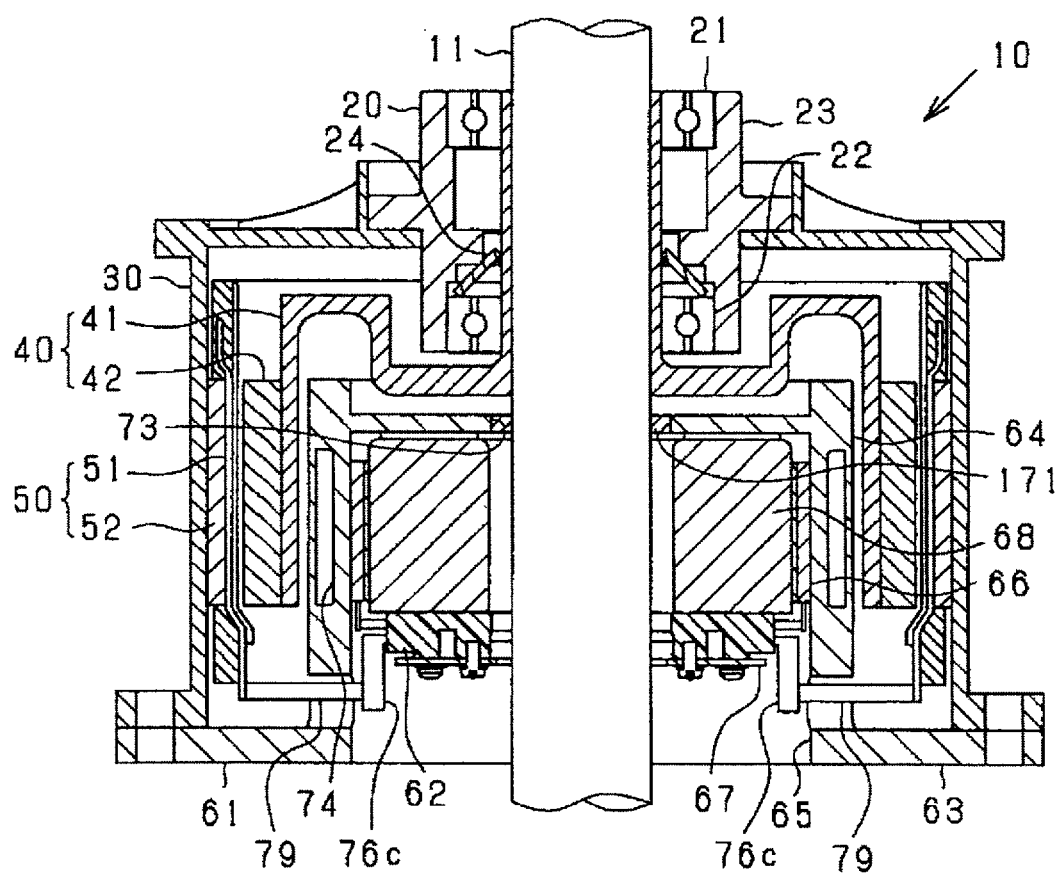
FIG. 37 is a longitudinal sectional view of an inner rotor type rotating electrical machine.

FIG. 37 is a longitudinal sectional view of the rotating electrical machine 10 designed to have the inner rotor structure. FIG. 37 corresponds to FIG. 2. Differences from the structure in FIG. 2 will be described below in brief. In FIG. 37, the annular stator 50 is retained inside the housing 30. The rotor 40 is disposed inside the stator 50 with an air gap therebetween to be rotatable. The bearings 21 and 22 are, like in FIG. 2, offset from the axial center of the rotor 40 in the axial direction of the rotor 40, so that the rotor 40 is retained in the cantilever form. The inverter 60 is mounted inside the magnet holder 41 of the rotor 40.

Figure 38:
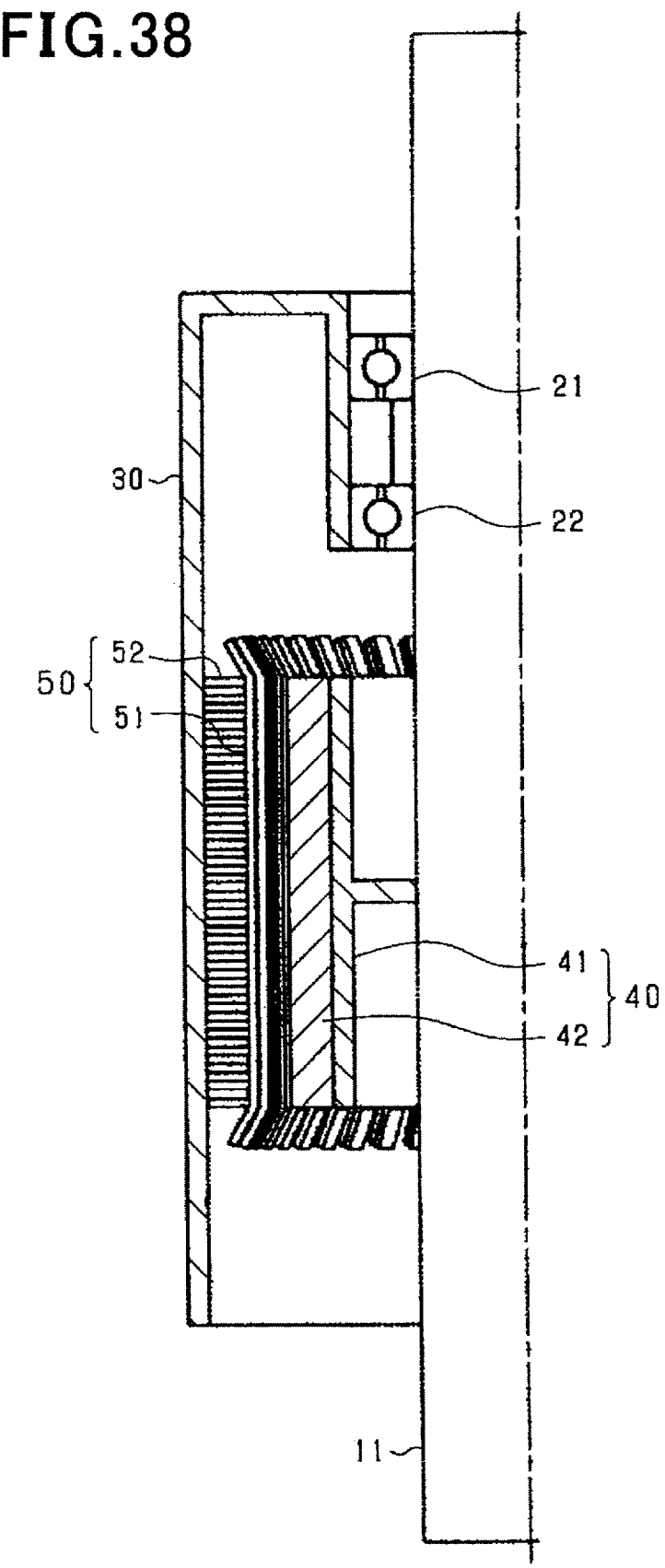
FIG. 38 is a longitudinal sectional view which schematically illustrates a structure of an inner rotor type rotating electrical machine.

FIG. 38 illustrates the inner rotor structure of the rotating electrical machine 10 which is different from that described above. The housing 30 has the rotating shaft 11 retained by the bearings 21 and 22 to be rotatable. The rotor 40 is secured to the rotating shaft 11. Like the structure in FIG. 2, each of the bearings 21 and 22 is offset from the axial center of the rotor 40 in the axial direction of the rotor 40. The rotor 40 is equipped with the magnet holder 41 and the magnet unit 42.

The rotating electrical machine 10 in FIG. 38 is different from that in FIG. 37 in that the inverter unit 60 is not located radially inside the rotor 40. The magnet holder 41 is joined to the rotating shaft 11 radially inside the magnet unit 42. The stator 50 is equipped with the stator winding 51 and the stator core 52 and secured to the housing 30.

Eleventh Modification

Figure 39:
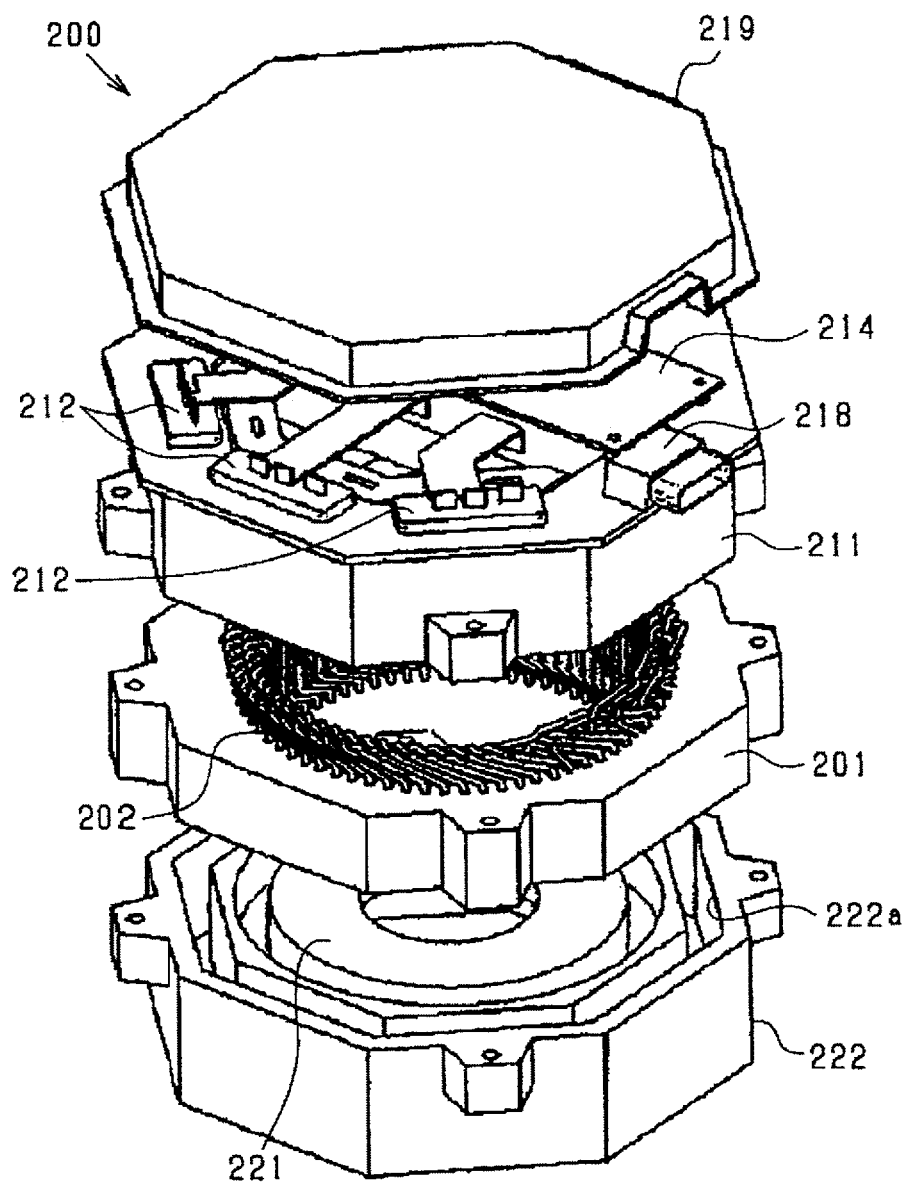
FIG. 39 is a view which illustrates a structure of an inner rotor type rotating electrical machine in the eleventh modification.
Figure 40:
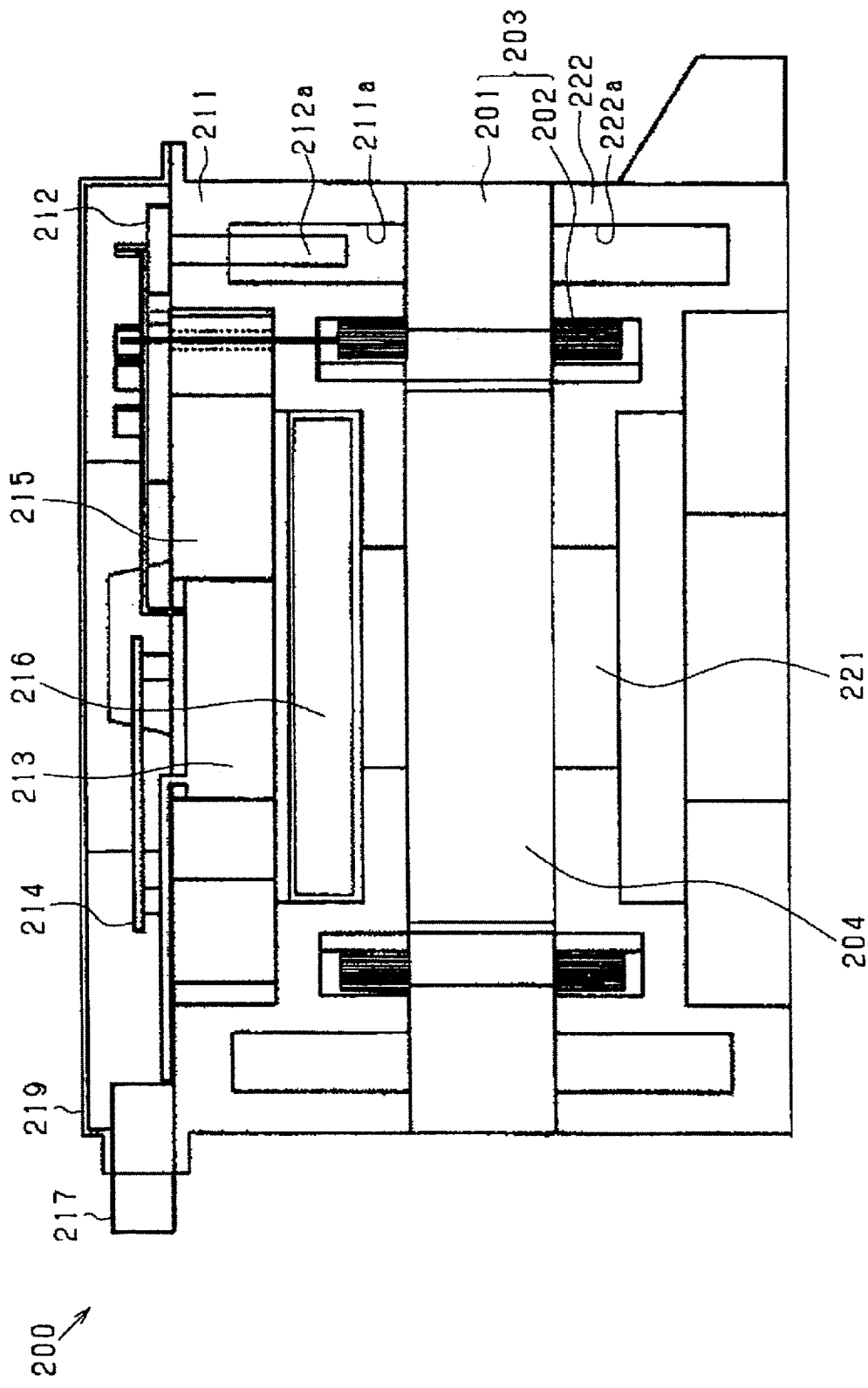
FIG. 40 is a view which illustrates a structure of an inner rotor type rotating electrical machine in the eleventh modification.

The inner rotor structure of a rotating electrical machine which is different from that described above will be discussed below. FIG. 39 is an exploded view of the rotating electrical machine 200. FIG. 40 is a sectional side view of the rotating electrical machine 200. In the following discussion, a vertical direction is based on the orientation of the rotating electrical machine 200.

The rotating electrical machine 200, as illustrated in FIGS. 39 and 40, includes the stator 203 and the rotor 204. The stator 203 is equipped with the annular stator core 201 and the multi-phase stator winding 202. The rotor 204 is disposed inside the stator core 201 to be rotatable. The stator 203 works as an armature. The rotor 204 works as a field magnet. The stator core 201 is made of a stack of silicone steel plates. The stator winding 202 is installed in the stator core 201. Although not illustrated, the rotor 204 is equipped with a rotor core and a plurality of permanent magnet arranged in the form of a magnet unit. The rotor core has formed therein a plurality of holes which are arranged at equal intervals away from each other in the circumferential direction of the rotor core. The permanent magnets which are magnetized to have magnetization directions changed alternately in adjacent magnetic poles are disposed in the holes of the rotor core. The permanent magnets of the magnet unit may be designed, like in FIG. 23, to have a Halbach array structure or a similar structure. The permanent magnets of the magnet unit may alternatively be made of anisotropic magnets, as described with reference to FIG. 9 or 30, in which the magnetic orientation (i.e., the magnetization direction) extends in an arc-shape between the d-axis which is defined on the magnetic center and the q-axis which is defined on the boundary of the magnetic poles.

The stator 203 may be made to have one of the following structures.
  (A) The stator 203 has the inter-conductor members each of which is disposed between the conductor portions in the circumferential direction. As the inter-conductor members, magnetic material is used which meets a relation of Wt×Bs≤Wm×Br where Wt is a width of the inter-conductor members in the circumferential direction within one magnetic pole, Bs is the saturation magnetic flux density of the inter-conductor members, Wm is a width of the magnet unit equivalent to one magnetic pole in the circumferential direction, and Br is the remanent flux density in the magnet unit.
  (B) The stator 203 has the inter-conductor members each of which is disposed between the conductor portions in the circumferential direction. The inter-conductor members are each made of a non-magnetic material.
  (C) The stator 203 has no inter-conductor member disposed between the conductor portions in the circumferential direction.

The rotor 204 has the magnet unit which is made up of a plurality of magnets each of which is magnetically oriented to have the easy axis of magnetization which is directed near the d-axis to be more parallel to the d-axis than that near the q-axis which is defined on the boundary of the magnetic poles.

The annular inverter case 211 is disposed on one end side of an axis of the rotating electrical machine 200. The inverter case 211 has a lower surface placed in contact with an upper surface of the stator core 201. The inverter case 211 has disposed therein a plurality of power modules 212 constituting an inverter circuit, the smoothing capacitors 213 working to reduce a variation in voltage or current (i.e., a ripple) resulting from switching operations of semiconductor switches, the control board 214 equipped with a controller, the current sensor 215 working to measure a phase current, and the resolver stator 216 serving as a rotational speed sensor for the rotor 204. The power modules 212 are equipped with IGBTs serving as semiconductor switches and diodes.

The inverter case 211 has the power connector 217 which is disposed on a circumferential edge thereof for connection with a dc circuit for a battery mounted in a vehicle. The inverter case 211 also has the signal connector 218 which is disposed on the circumferential edge thereof for achieving transmission of signals between the rotating electrical machine 200 and a controller installed in the vehicle. The inverter case 211 is covered with the top cover 219. The dc power produced by the battery installed in the vehicle is inputted into the power connector 217, converted by the switches of the power modules 212 to an alternating current, and then delivered to phase windings of the stator winding 202.

The bearing unit 221 and the annular rear case 222 are disposed on the opposite end side of the axis of the stator core to the inverter case 211. The bearing unit 221 retains a rotation axis of the rotor 204 to be rotatable. The rear case 222 has the bearing unit 221 disposed therein. The bearing unit 221 is equipped with, for example, two bearings and offset from the center of the length of the rotor 204 toward one of the ends of the length of the rotor 204. The bearing unit 221 may alternatively be engineered to have a plurality of bearings disposed on both end sides of the stator core 201 opposed to each other in the axial direction, so that the bearings retain both the ends of the rotation shaft. The rear case 222 is fastened to a gear case or a transmission of the vehicle using bolts, thereby securing the rotating electrical machine 200 to the vehicle.

The inverter case 211 has formed therein the cooling flow path 211a through which cooling medium flows. The cooling flow path 211a is defined by closing an annular recess formed in a lower surface of the inverter case 211 by an upper surface of the stator core 201. The cooling flow path 211a surrounds a coil end of the stator winding 202. The cooling flow path 211a has the module cases 212a of the power modules 212 disposed therein. Similarly, the rear case 222 has formed therein the cooling flow path 222a which surrounds a coil end of the stator winding 202. The cooling flow path 222a is defined by closing an annular recess formed in an upper surface of the rear case 222 by a lower surface of the stator core 201. Note that the definitions of parameters, such as Wt, Wn, Wm, and Bs, associated with the stator 50 or parameters, such as θ11, θ12, X1, X2, Wm, and Br, associated with the magnet unit 42 may refer to those in the above described first embodiment or the first modification.

Twelfth Modification

Figure 41:
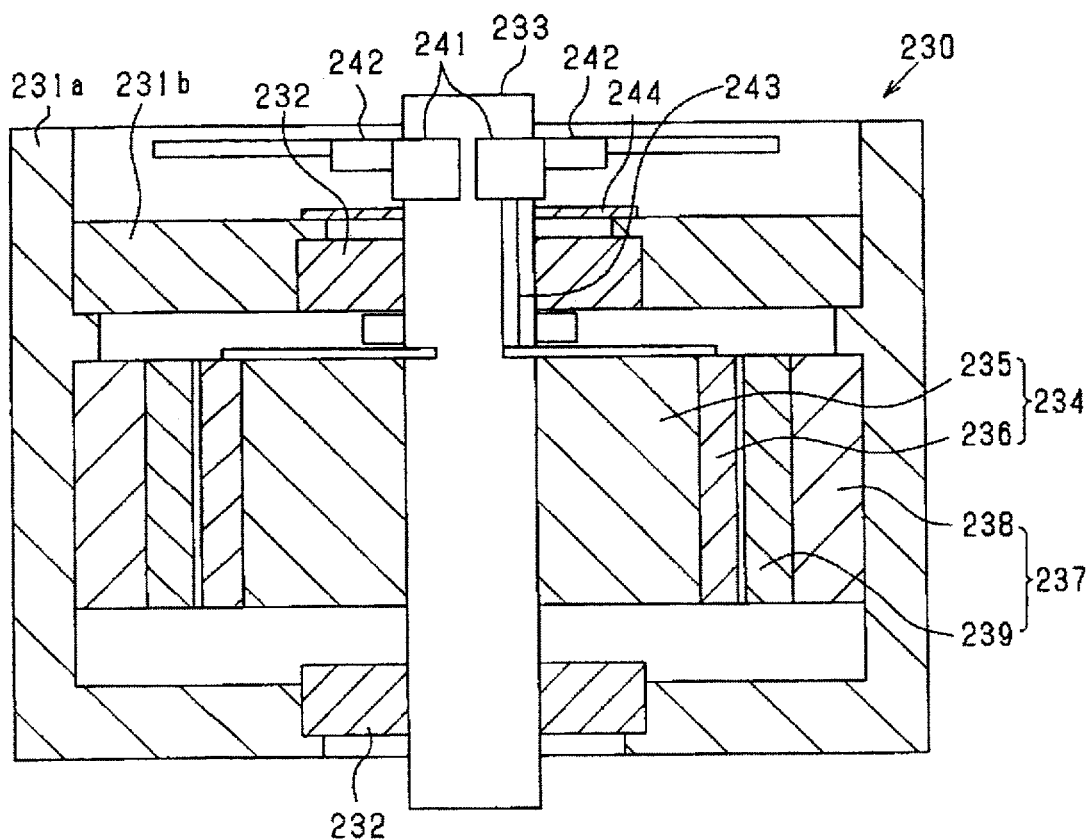
FIG. 41 is a view which illustrates a structure of a revolving armature type of rotating electrical machine in the twelfth modification.

The above discussion has referred to the revolving-field type of rotating electrical machines, but a revolving armature type of rotating electrical machine may be embodied. FIG. 41 illustrates the revolving armature type of rotating electrical machine 230.

The rotating electrical machine 230 in FIG. 41 has the bearing 232 retained by the housings 231a and 231b. The bearing 232 retains the rotating shaft 233 to be rotatable. The bearing 232 is made of, for example, an oil-impregnated bearing in which a porous metal is impregnated with oil. The rotating shaft 233 has secured thereto the rotor 234 which works as an armature. The rotor 234 includes the rotor core 235 and the multi-phase rotor winding 236 secured to an outer periphery of the rotor core 235. The rotor core 235 of the rotor 234 is designed to have the slot-less structure. The multi-phase rotor winding 236 has the flattened conductor structure as described above. In other words, the multi-phase rotor winding 236 is shaped to have an area for each phase which has a dimension in the circumferential direction which is larger than that in the radial direction.

The stator 237 is disposed radially outside the rotor 234. The stator 237 works as a field magnet. The stator 237 includes the stator core 238 and the magnet unit 239. The stator core 238 is secured to the housing 231a. The magnet unit 239 is attached to an inner periphery of the stator core 238. The magnet unit 239 is made up of a plurality of magnets arranged to have magnetic poles alternately arrayed in the circumferential direction. Like the magnet unit 42 described above, the magnet unit 239 is magnetically oriented to have the easy axis of magnetization which is directed near the d-axis to be more parallel to the d-axis than that near the q-axis that is defined on a boundary between the magnetic poles. The magnet unit 239 is equipped with magnetically oriented sintered neodymium magnets whose intrinsic coercive force is 400 [kA/m] or more and whose remanent flux density is 1.0 [T] or more.

The rotating electrical machine 230 in this embodiment is engineered as a two-pole three-coil brush coreless motor. The multi-phase rotor winding 236 is made of three coils. The magnet unit 239 is designed to have two poles. A ratio of the number of poles and the number of coils in typical brush motors is 2:3, 4:10, or 4:21 depending upon intended use.

The rotating shaft 233 has the commutator 241 secured thereto. A plurality of brushes 242 are arranged radially outside the commutator 241. The commutator 241 is electrically connected to the multi-phase rotor winding 236 through the conductors 234 embedded in the rotating shaft 233. The commutator 241, the brushes 242, and the conductors 243 are used to deliver dc current to the multi-phase rotor winding 236. The commutator 241 is made up of a plurality of sections arrayed in a circumferential direction thereof depending upon the number of phases of the multi-phase rotor winding 236. The brushes 242 may be connected to a dc power supply, such as a storage battery, using electrical wires or using a terminal block.

The rotating shaft 233 has the resinous washer 244 disposed between the bearing 232 and the commutator 241. The resinous washer 244 serves as a sealing member to minimize leakage of oil seeping out of the bearing 232, implemented by an oil-impregnated bearing, to the commutator 241.

Thirteenth Modification

Each of the conductors 82 of the stator winding 51 of the rotating electrical machine 10 may be designed to have a stack of a plurality of insulating coatings or layers laid on each other. For instance, each of the conductors 82 may be made by covering a bundle of a plurality of insulating layer-coated conductors (i.e., wires) with an insulating layer, so that the insulating layer (i.e., an inner insulating layer) of each of the conductors 82 is covered with the insulating layer (i.e., an outer insulating layer) of the bundle. The outer insulating layer is preferably designed to have an insulating ability greater than that of the inner insulating layer. Specifically, the thickness of the outer insulating layer is selected to be larger than that of the inner insulating layer. For instance, the outer insulating layer has a thickness of 100 μm, while the inner insulating layer has a thickness of 40 μm. Alternatively, the outer insulating layer may have a permittivity lower than that of the inner insulating layer. Each of the conductors 82 may have any of the above structure. Each wire is preferably made of a collection of conductive members or fibers.

As apparent from the above discussion, the rotating electrical machine 10 becomes useful in a high-voltage system of a vehicle by increasing the insulation ability of the outermost layer of the conductor 82. The above structure enables the rotating electrical machine 10 to be driven in low pressure conditions such as high-altitude areas.

Fourteenth Modification

Each of the conductors 82 equipped with a stack of a plurality of insulating layers may be designed to have at least one of a linear expansion coefficient and the degree of adhesion strength different between an outer one and an inner one of the insulating layers. The conductors 82 in this modification are illustrated in FIG. 42.

Figure 42:
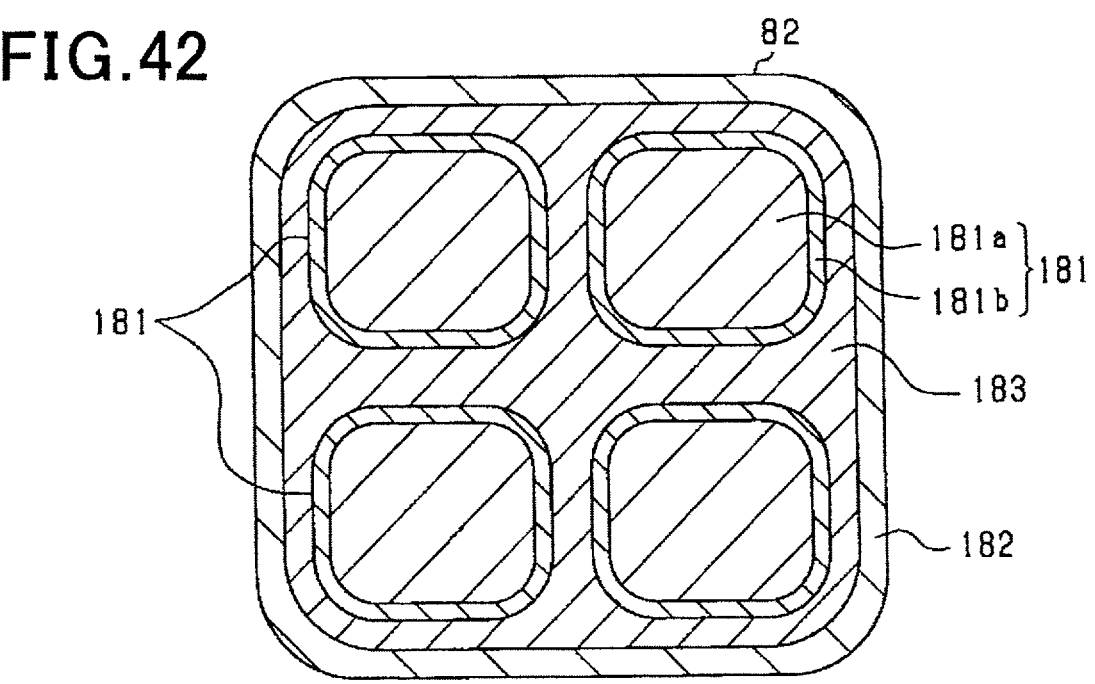
FIG. 42 is a sectional view which illustrates a structure of a conductor in the fourteenth modification.

In FIG. 42, the conductor 82 includes a plurality of (four in the drawing) wires 181, the outer coated layer 182 (i.e., an outer insulating layer) with which the wires 181 are covered and which is made of, for example, resin, and the intermediate layer 183 (i.e., an intermediate insulating layer) which is disposed around each of the wires 181 within the outer coated layer 182. Each of the wires 181 includes the conductive portion 181a made of copper material and the conductor-coating layer (i.e., an inner insulating layer) made of electrical insulating material. The outer coated layer 182 serves to electrically insulate between phase-windings of the stator winding. Each of the wires 181 is preferably made of a collection of conductive members or fibers.

The intermediate layer 183 has a linear expansion coefficient higher than that of the coated layer 181b, but lower than that of the outer coated layer 182. In other words, the linear expansion coefficient of the conductor 82 is increased from an inner side to an outer side thereof. Typically, the outer coated layer 182 is designed to have a linear expansion coefficient higher than that of the coated layer 181b. The intermediate layer 183, as described above, has a linear expansion coefficient intermediate between those of the coated layer 181b and the outer coated layer 182 and thus serves as a cushion to eliminate a risk that the inner and outer layers may be simultaneously broken.

Each of the wires 181 of the conductor 82 has the conductive portion 181a and the coated layer 181b adhered to the conductive portion 181a. The coated layer 181b and the intermediate layer 183 are also adhered together. The intermediate layer 183 and the outer coated layer 182 are adhered together. Such joints have a strength of adhesion decreasing toward an outer side of the conductor 82. In other words, the strength of adhesion between the conductive portion 181a and the coated layer 181b is lower than that between the coated layer 181b and the intermediate layer 183 and between the intermediate layer 183 and the outer coated layers 182. The strength of adhesion between the coated layer 181b and the intermediate layer 183 may be higher than or identical with that between the intermediate layer 183 and the outer coated layers 182. Usually, the strength of adhesion between, for example, two coated layers may be measured as a function of a tensile strength required to peel the coated layers away from each other. The strength of adhesion of the conductor 82 is selected in the above way to minimize the risk that the inner and outer layers may be broken together arising from a temperature difference between inside and outside the conductor 82 when heated or cooled.

Usually, the heat generation or temperature change in the rotating electrical machine results in copper losses arising from heat from the conductive portion 181a of the wire 181 and from an iron core. These two types of loss result from the heat transmitted from the conductive portion 181a in the conductor 82 or from outside the conductor 82. The intermediate layer 183 does not have a heat source. The intermediate layer 183 has the strength of adhesion serving as a cushion for the coated layer 181b and the outer coated layer 182, thereby eliminating the risk that the coated layer 181b and the outer coated layer 182 may be simultaneously broken. This enables the rotating electrical machine to be used in conditions, such as in vehicles, wherein a resistance to high pressure is required, or the temperature greatly changes.

In addition, the wire 181 may be made of enamel wire with a layer (i.e., the coated layer 181b) coated with resin, such as PA, PI or PAI. Similarly, the outer coated layer 182 outside the wire 181 is preferably made of PA, PI, and PAI and has a large thickness. This minimizes a risk of breakage of the outer coated layer 182 caused by a difference in linear expansion coefficient. Instead of use of PA, PI, PAI to make the outer coated layer 182 having a large thickness, material, such as PPS, PEEK, fluororesin, polycarbonate, silicone, epoxy, polyethylene naphthalate, or LCP which has a dielectric permittivity lower than that of PI or PAI is preferably used to increase the conductor density of the rotating electrical machine. The use of such resin enhances the insulating ability of the outer coated layer 182 even when it has a thickness smaller than or equal to that of the coated layer 181b and increases the occupancy of the conductive portion. Usually, the above resin has the degree of electric permittivity higher than that of an insulating layer of enamel wire. Of course, there is an example where the state of formation or additive results in a decrease in electric permittivity thereof. Usually, PPS and PEEK is higher in linear expansion coefficient than an enamel-coated layer, but lower than another type of resin and thus is useful only for the outer of the two layers.

The strength of adhesion of the two types of coated layers arranged outside the wire 181 (i.e., the intermediate insulating layer and the outer insulating layer) to the enamel coated layer of the wire 181 is preferably lower than that between the copper wire and the enamel coated layer of the wire 181, thereby minimizing a risk that the enamel coated layer and the above two types of coated layers are simultaneously broken.

In a case where the stator is equipped with a water cooling mechanism, a liquid cooling mechanism, or an air cooling mechanism, thermal stress or impact stress is thought of as being exerted first on the outer coated layers 182. The thermal stress or the impact stress is decreased by partially bonding the insulating layer of the wire 181 and the above two types of coated layers together even if the insulation layer is made of resin different from those of the above two types of coated layers. In other words, the above-described insulating structure may be created by placing a wire (i.e., an enamel wire) and an air gap and also arranging a fluororesin, polycarbonate, silicone, epoxy, polyethylene naphthalate, or LCP. In this case, adhesive which is made from epoxy, low in electric permittivity, and also low in linear expansion coefficient is preferably used to bond the outer coated layer and the inner coated layer together. This eliminates breakage of the coated layers caused by friction arising from vibration of the conductive portion or breakage of the outer coated layer due to the difference in linear expansion coefficient as well as the mechanical strength.

The outermost layer which serves to ensure the mechanical strength or securement of the conductor 82 having the above structure is preferably made from resin material, such as epoxy, PPS, PEEK, or LCP which is easy to shape and similar in dielectric constant or linear expansion coefficient to the enamel coated layer, typically in a final process for a stator winding.

Typically, the resin potting is made using urethane or silicone. Such resin, however, has a linear expansion coefficient approximately twice that of other types of resin, thus leading to a risk that thermal stress is generated when the resin is subjected to the resin potting, so that it is sheared. The above resin is, therefore, unsuitable for use where requirements for insulation are severe and 60V or more. The final insulation process to make the outermost layer using injection molding techniques with epoxy, PPS, PEEK, or LCP satisfies the above requirements.

Other modifications will be listed below.

The distance DM between a surface of the magnet unit 42 which faces the armature and the axial center of the rotor in the radial direction may be selected to be 50 mm or more. For instance, the distance DM, as illustrated in FIG. 4, between the radial inner surface of the magnet unit 42 (i.e., the first and second magnets 91 and 92) and the center of the axis of the rotor 40 may be selected to be 50 mm or more.

The small-sized slot-less structure of the rotating electrical machine whose output is several tens or hundreds watt is known which is used for models. The inventors of this application have not seen examples where the slot-less structure is used with large-sized industrial rotating electrical machines whose output is more than 10 kW. The inventors have studied the reason for this.

Modern major rotating electrical machines are categorized into four main types: a brush motor, a squirrel-cage induction motor, a permanent magnet synchronous motor, and a reluctance motor.

Brush motors are supplied with exciting current using brushes. Large-sized brush motors, therefore, have an increased size of brushes, thereby resulting in complex maintenance thereof. With the remarkable development of semiconductor technology, brushless motors, such as induction motors, have been used instead. In the field of small-sized motors, a large number of coreless motors have also come on the market in terms of low inertia or economic efficiency.

Squirrel-cage induction motors operate on the principle that a magnetic field produced by a primary stator winding is received by a secondary stator core to deliver induced current to bracket-type conductors, thereby creating magnetic reaction field to generate torque. In terms of small-size and high-efficiency of the motors, it is inadvisable that the stator and the rotor be designed not to have iron cores.

Reluctance motors are motors designed to use a change in reluctance in an iron core. It is, thus, inadvisable in principle that the iron core be omitted.

In recent years, permanent magnet synchronous motors have used an IPM (Interior Permanent Magnet) rotor. Especially, most large-sized motors use an IPM rotor unless there are special circumstances.

IPM motors has properties of producing both magnet torque and reluctance torque. The ratio between the magnet torque and the reluctance torque is timely controlled using an inverter. For these reasons, the IMP motors are thought of as being compact and excellent in ability to be controlled.

Figure 43:
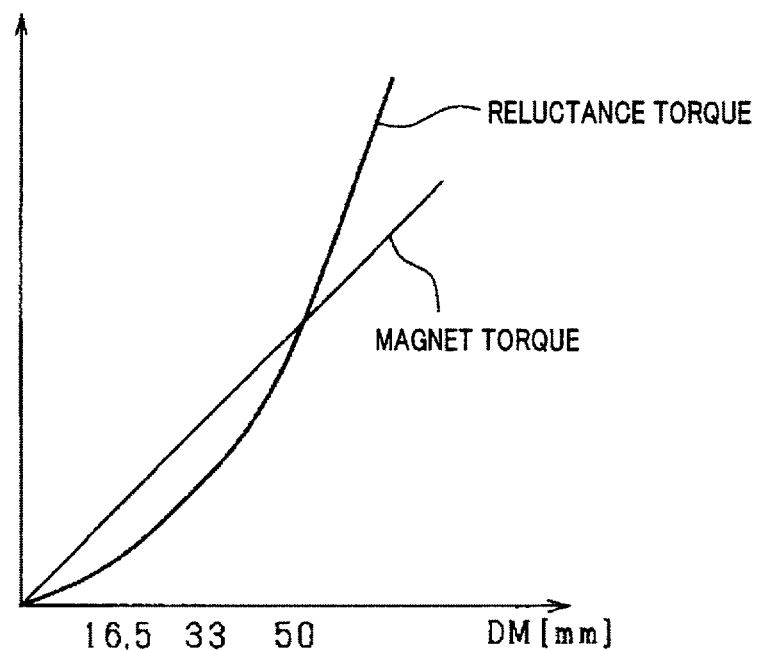
FIG. 43 is a view which illustrates a relation among reluctance torque, magnet torque, and distance DM.

According to analysis by the inventors, torque on the surface of a rotor producing the magnet torque and the reluctance torque is expressed in FIG. 43 as a function of the distance DM between the surface of the magnet unit which faces the armature and the center of the axis of the rotor, that is, the radius of a stator core of a typical inner rotor indicated on the horizontal axis.

The potential of the magnet torque, as can be seen in the following equation (eq1), depends upon the strength of magnetic field created by a permanent magnet, while the potential of the reluctance torque, as can be seen in the following equation (eq2), depends upon the degree of inductance, especially, on the q-axis.

$$\text{The magnet torque} = k \cdot \psi \cdot Iq \quad (eq1)$$

$$\text{The reluctance torque} = k \cdot (Lq - Ld) \cdot Iq \cdot Id \quad (eq2)$$

Comparison between the strength of magnetic field produced by the permanent magnet and the degree of inductance of a winding using the distance DM shows that the strength of magnetic field created by the permanent magnet, that is, the amount of magnetic flux $\psi$ is proportional to a total area of a surface of the permanent magnet which faces the stator. In case of a cylindrical stator, such a total area is a cylindrical surface area of the permanent magnet. Technically speaking, the permanent magnet has an N-pole and an S-pole, and the amount of magnetic flux ψ is proportional to half the cylindrical surface area. The cylindrical surface area is proportional to the radius of the cylindrical surface and the length of the cylindrical surface. When the length of the cylindrical surface is constant, the cylindrical surface area is proportional to the radius of the cylindrical surface.

Figure 44:
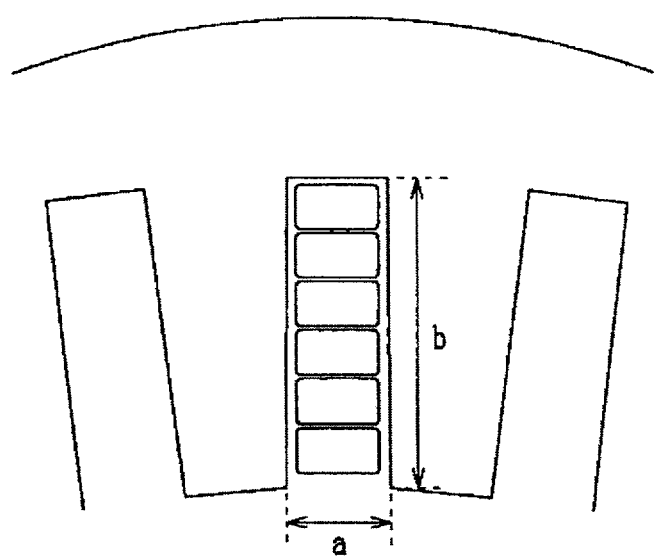
FIG. 44 is a view which illustrates teeth.

The inductance Lq of the winding depends upon the shape of the iron core, but its sensitivity is low and rather proportional to the square of the number of turns of the stator winding, so that it is strongly dependent upon the number of the turns. The inductance L is expressed by a relation of $L=\mu \cdot N^2 \times S/\delta$ where μ is permeability of a magnetic circuit, N is the number of turns, S is a sectional area of the magnetic circuit, and δ is an effective length of the magnetic circuit. The number of turns of the winding depends upon the size of space occupied by the winding. In the case of a cylindrical motor, the number of turns, therefore, depends upon the size of space occupied by the winding of the stator, in other words, areas of slots in the stator. The slot is, as demonstrated in FIG. 44, rectangular, so that the area of the slot is proportional to the product of a and b where a is the width of the slot in the circumferential direction, and b is the length of the slot in the radial direction.

The width of the slot in the circumferential direction becomes large with an increase in diameter of the cylinder, so that the width is proportional to the diameter of the cylinder. The length of the slot in the radial direction is proportional to the diameter of the cylinder. The area of the slot is, therefore, proportional to the square of the diameter of the cylinder. It is apparent from the above equation (eq2) that the reluctance torque is proportional to the square of current in the stator. The performance of the rotating electrical machine, therefore, depends upon how much current is enabled to flow in the rotating electrical machine, that is, depends upon the areas of the slots in the stator. The reluctance is, therefore, proportional to the square of the diameter of the cylinder for a cylinder of constant length. Based on this fact, a relation of the magnetic torque and the reluctance torque with the distance DM is shown by plots in FIG. 43.

The magnet torque is, as shown in FIG. 43, increased linearly as a function of the distance DM, while the reluctance torque is increased in the form of a quadratic function as a function of the distance DM. FIG. 43 shows that when the distance DM is small, the magnetic torque is dominant, while the reluctance torque becomes dominant with an increase in diameter of the stator core. The inventors of this application have arrived at the conclusion that an intersection of lines expressing the magnetic torque and the reluctance torque in FIG. 43 lies near 50 mm that is the radius of the stator core. It seems that it is difficult for a motor whose output is 10 kW and whose stator core has a radius much larger than 50 mm to omit the stator core because the use of the reluctance torque is now mainstream. This is one of reasons why the slot-less structure is not used in large-sized motors.

The rotating electrical machine using an iron core in the stator always faces a problem associated with magnetic saturation of the iron core. Particularly, radial gap type rotating electrical machines have a longitudinal section of the rotating shaft which is of a fan shape for each magnetic pole, so that the further inside the rotating electrical machine, the smaller the width of a magnetic circuit, so that inner dimensions of teeth forming slots in the core become a factor of the limit of performance of the rotating electrical machine. Even if a high performance permanent magnet is used, generation of magnetic saturation in the permanent magnet will lead to a difficulty in producing a required degree of performance of the permanent magnet. It is necessary to design the permanent magnet to have an increased inner diameter in order to eliminate a risk of occurrence of the magnetic saturation, which results in an increase size of the rotating electrical machine.

For instance, a typical rotating electrical machine with a distributed three-phase winding is designed so that three to six teeth serve to produce a flow of magnetic flux for each magnetic pole, but encounters a risk that the magnetic flux may concentrate on a leading one of the teeth in the circumferential direction, thereby causing the magnetic flux not to flow uniformly in the three to six teeth. For instance, the flow of magnetic flux concentrates on one or two of the teeth, so that the one or two of the teeth in which the magnetic saturation is occurring will move in the circumferential direction with rotation of the rotor, which may lead to a factor causing slot ripple.

For the above reasons, it is required to omit the teeth in the slot-less structure of the rotating electrical machine whose distance DM is 50 mm or more to eliminate the risk of generation of the magnetic saturation. The omission of the teeth, however, results in an increase in magnetic resistance in magnetic circuits of the rotor and the stator, thereby decreasing torque produced by the rotating electrical machine. The reason for such an increase in magnetic resistance is that there is, for example, a large air gap between the rotor and the stator. The slot-less structure of the rotating electrical machine whose distance DM is 50 mm or more, therefore, has room for improvement for increasing the output torque. There are numerous beneficial advantages to use the above torque-increasing structure in the slot-less structure of rotating electrical machines whose distance DM is 50 mm or more.

Not only the outer-rotor type rotating electrical machines, but also the inner rotor type rotating electrical machines are preferably designed to have the distance DM of 50 mm or more between the surface of the magnet unit which faces the armature and the center of the axis of the rotor in the radial direction.

The stator winding 51 of the rotating electrical machine 10 may be designed to have only the single straight section 83 of the conductor 82 arranged in the radial direction. Alternatively, a plurality of straight sections 83, for example, three, four, five, or six straight sections 83 may be stacked on each other in the radial direction.

For example, the structure illustrated in FIG. 2 has the rotating shaft 11 extending outside the ends of length of the rotating electrical machine 10, but however, may alternatively be designed to have the rotating shaft 11 protruding outside only one of the ends of the rotating electrical machine 10. In this case, it is advisable that a portion of the rotating shaft 11 which is retained by the bearing unit 20 in the cantilever form be located on one of the ends of the rotating electrical machine, and that the rotating shaft 11 protrude outside such an end of the rotating electrical machine. This structure has the rotating shaft 11 not protruding inside the inverter unit 60, thus enabling a wide inner space of the inverter unit 60, i.e., the cylinder 71 to be used.

The above structure of the rotating electrical machine 10 uses non-conductive grease in the bearings 21 and 22, but however, may alternatively be designed to have conductive grease in the bearings 21 and 22. For instance, conductive grease containing metallic particles or carbon particles may be used.

A bearing or bearings may be mounted on only one or both axial ends of the rotor 40 for retaining the rotating shaft 11 to be rotatable. For example, the structure of FIG. 1 may have a bearing or bearings mounted on only one side or opposite sides of the inverter unit 60 in the axial direction.

The magnet holder 41 of the rotor 40 of the rotating electrical machine 10 has the intermediate portion 45 equipped with the inner shoulder 49a and the annular outer shoulder 49b, however, the magnet holder 41 may alternatively be designed to have the flat intermediate portion 45 without the shoulders 49a and 49b.

The conductor body 82a of each of the conductors 82 of the stator winding 51 of the rotating electrical machine 10 is made of a collection of the wires 86, however, may alternatively be formed using a square conductor having a rectangular cross section. The conductor 82 may alternatively be made using a circular conductor having a circular cross section or an oval cross section.

The rotating electrical machine 10 has the inverter unit 60 arranged radially inside the stator 50, but however, may alternatively be designed not to have the inverter 60 disposed inside the stator 50. This enables the stator 50 to have a radial inner void space in which parts other than the inverter unit 60 may be mounted.

The rotating electrical machine 10 may be designed not to have the housing 30. In this case, the rotor 40 or the stator 50 may be retained by a wheel or another part of a vehicle.

In-Wheel Motor for Vehicle

Figure 45:
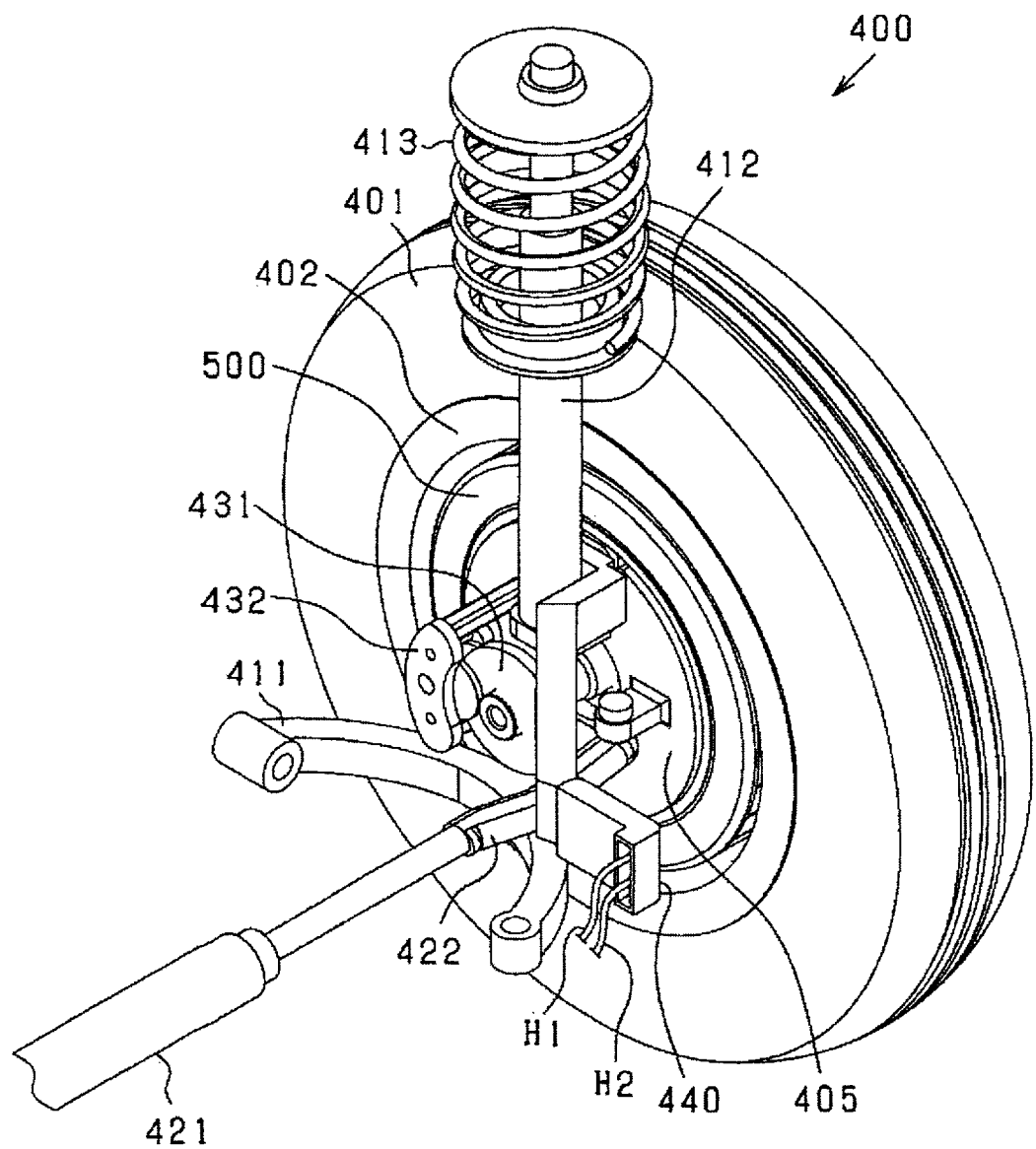
FIG. 45 is a perspective view which illustrates a structure of a wheel assembly with an in-wheel motor and a peripheral structure.
Figure 46:
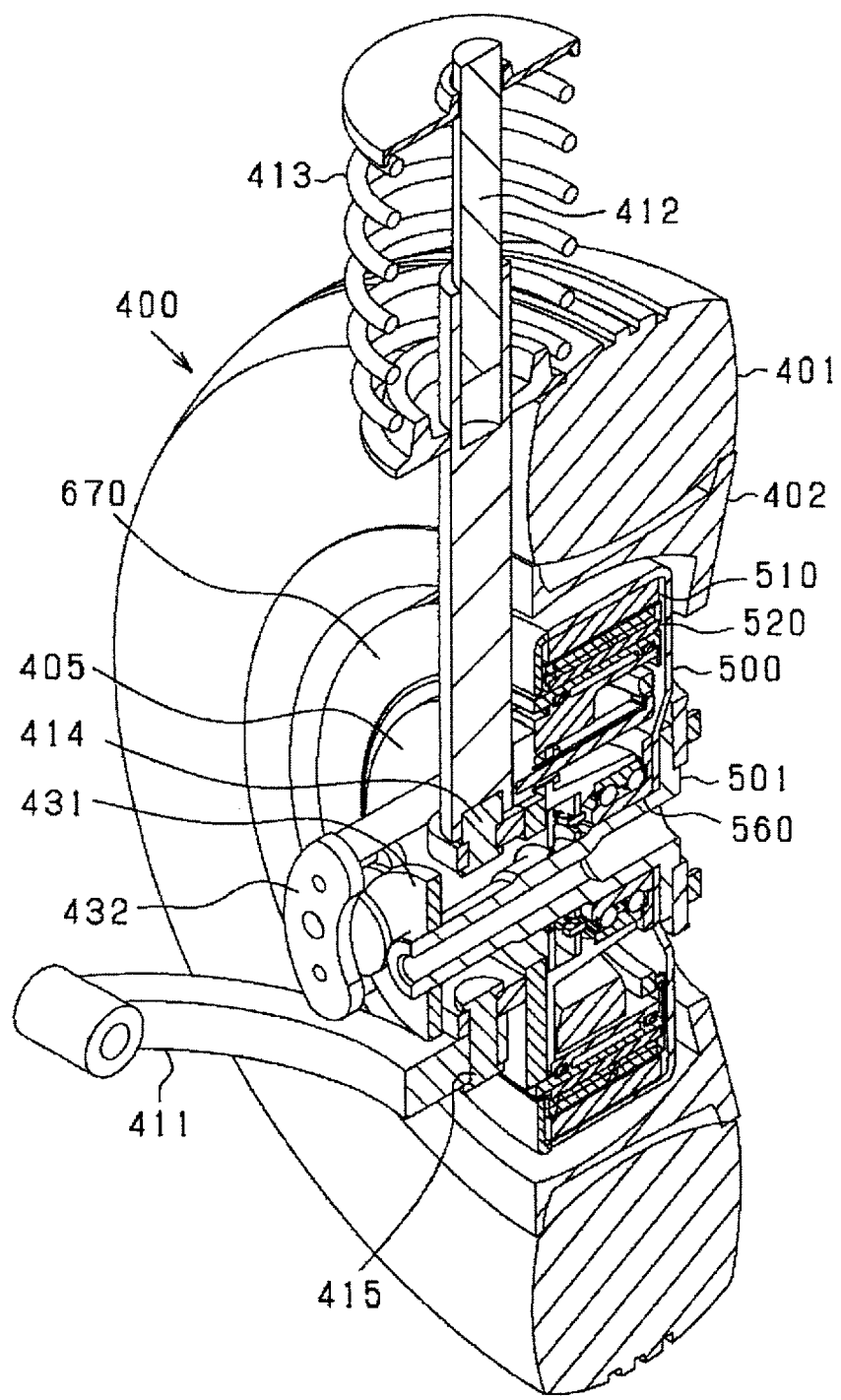
FIG. 46 is a longitudinal sectional view which illustrates a wheel assembly and a peripheral structure.
Figure 47:
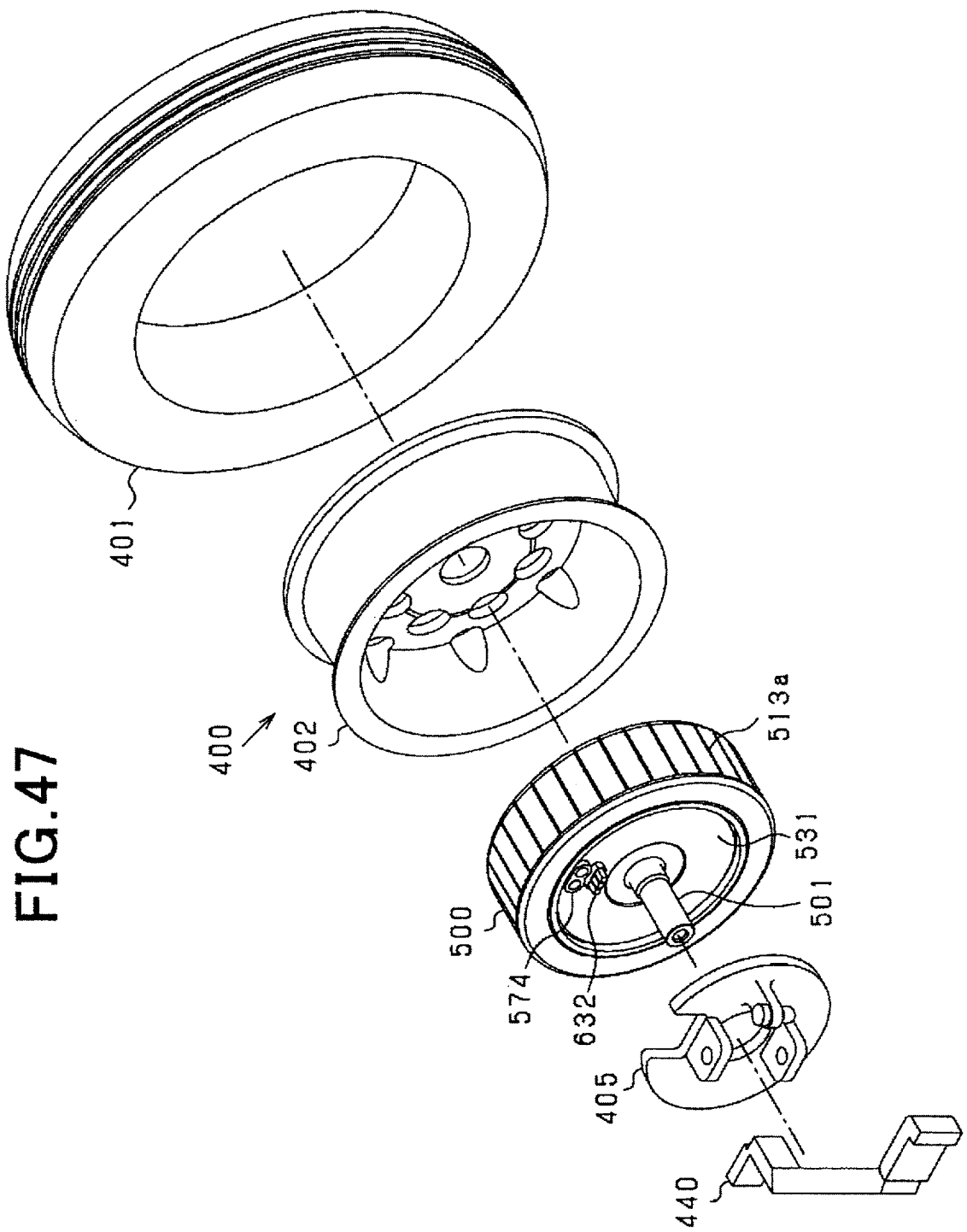
FIG. 47 is an exploded view of a wheel assembly.

Embodiments in which a rotating electrical machine is incorporated into a hub of a wheel of a vehicle, such as, an automotive vehicle in the form of an in-wheel motor will be described below. FIG. 45 is a perspective view which illustrates the tire wheel assembly 400 engineered to have an in-wheel motor structure and a surrounding structure. FIG. 46 is a longitudinal sectional view which illustrates the tire wheel assembly 400 and the surrounding structure. FIG. 47 is a perspective exploded view of the tire wheel assembly 400. These views are perspective illustrations of the tire wheel assembly 400, as viewed from inside the vehicle. The vehicle may use the in-wheel motor structure in different modes. For instance, in a case where the vehicle is equipped with four wheels: two front wheel and two rear wheels, either or both of the front wheels and the rear wheel may be engineered to have the in-wheel motor structure in this embodiment. Alternatively, the in-wheel motor structure may also be used with a vehicle equipped with a front or a rear single wheel. The wheel motor, as referred to herein, is designed as a vehicle power unit.

The tire wheel assembly 400, as illustrated in FIGS. 45 to 47, includes the tire 401 that is a known air inflated tire, the wheel 402 fit in the tire 401, and the rotating electrical machine 500 secured inside the wheel 402. The rotating electrical machine 500 is equipped with a stationary portion including a stator and a rotating portion including a rotor. The rotating electrical machine 500 is firmly attached at the stationary portion to the vehicle body and also attached at the rotating portion to the wheel 402. The tire 401 and the wheel 402 are rotated with rotation of the rotating portion of the rotating electrical machine 500. The structure of the rotating electrical machine 500 including the stationary portion and the rotating portion will be described later in detail.

The tire wheel assembly 400 also has peripheral devices: a suspension, a steering device, and a brake device mounted thereon. The suspension retains the tire wheel assembly 400 secured to a vehicle body, not shown. The steering device works to turn the tire wheel assembly 400. The brake device works to apply a brake to the tire wheel assembly 400.

The suspension is implemented by an independent suspension, such as trailing arm suspension, a strut-type suspension, a wishbone suspension, or a multi-link suspension. In this embodiment, the suspension includes the lower arm 411, the suspension arm 412, and the spring 413. The lower arm 411 extends toward the center of the vehicle body. The suspension arm 412 and the spring 413 extend vertically. The suspension arm 412 may be engineered as a shock absorber whose detailed structure will be omitted in the drawings. The lower arm 411 and the suspension arm 412 are joined to the vehicle body and also joined to the disc-shaped base plate 405 secured to the stationary portion of the rotating electrical machine 500. The lower arm 411 and the suspension arm 412 are, as clearly illustrated in FIG. 46, retained coaxially with each other by the rotating electrical machine 500 (i.e., the base plate 405) using the support shafts 414 and 415.

The steering device may be implemented by a rack-and-pinion, a ball-and-nut steering system, a hydraulic power steering system, or an electronic power steering system. In this embodiment, the steering device is made up of the rack unit 421 and the tie rod 422. The rack unit 421 is connected to the base plate 405 of the rotating electrical machine 500 through the tie rod 422. Rotation of a steering shaft, not shown, will cause the rack unit 421 to be driven, thereby moving the tie rod 422 in a lateral direction of the vehicle. This causes the tire wheel assembly 400 to be turned around the lower arm 411 and the support shafts 414 and 415 of the suspension arm 412, thereby changing the orientation of the tire wheel assembly 400.

The brake device may preferably be made of a disc brake or a drum brake. In this embodiment, the brake device includes the disc rotor 431 and the brake caliper 432. The disc rotor 431 is secured to the rotating shaft 501 of the rotating electrical machine 500. The brake caliper 432 is secured to the base plate 405 of the rotating electrical machine 500. The brake caliper 432 has a brake pad which is hydraulically actuated and pressed against the disc rotor 431 to create a brake in the form of mechanical friction, thereby stopping rotation of the tire wheel assembly 400.

The tire wheel assembly 400 also has mounted thereon the storage duct 440 in which the electrical cable H1 and the cooling pipe H2 extending from the rotating electrical machine 500 are disposed. The storage duct 440 extends from an end of the stationary portion of the rotating electrical machine 500 parallel to an end surface of the rotating electrical machine 500 without physical interference with the suspension arm 412 and is firmly joined to the suspension arm 412, thereby fixing a location of the joint of the storage duct 440 to the suspension arm 412 relative to the base plate 405. This minimizes mechanical stress which arises from vibration of the vehicle and acts on the electrical cable H1 and the cooling pipe H2. The electrical cable H1 is electrically connected to a power supply, not shown, and an ECU, not shown, which are mounted in the vehicle. The cooling pipe H2 is connected to a radiator, not shown.

The structure of the rotating electrical machine 500 will be described below in detail. This embodiment will refer to an example where the rotating electrical machine 500 is designed as the in-wheel motor. The rotating electrical machine 500 is excellent in operation efficiency and output performance as compared with a conventional electrical motor of a power unit equipped with a speed reducer for use in vehicles. The rotating electrical machine 500 may alternatively be employed as an electrical motor in another application other than the power unit for vehicles if it may be produced at low cost. In such a case, the rotating electrical machine 500 ensures high performance. The operation efficiency, as referred to herein, represents an indication used in fuel economy tests in which automobiles are operated in given driving modes.

Figure 48:
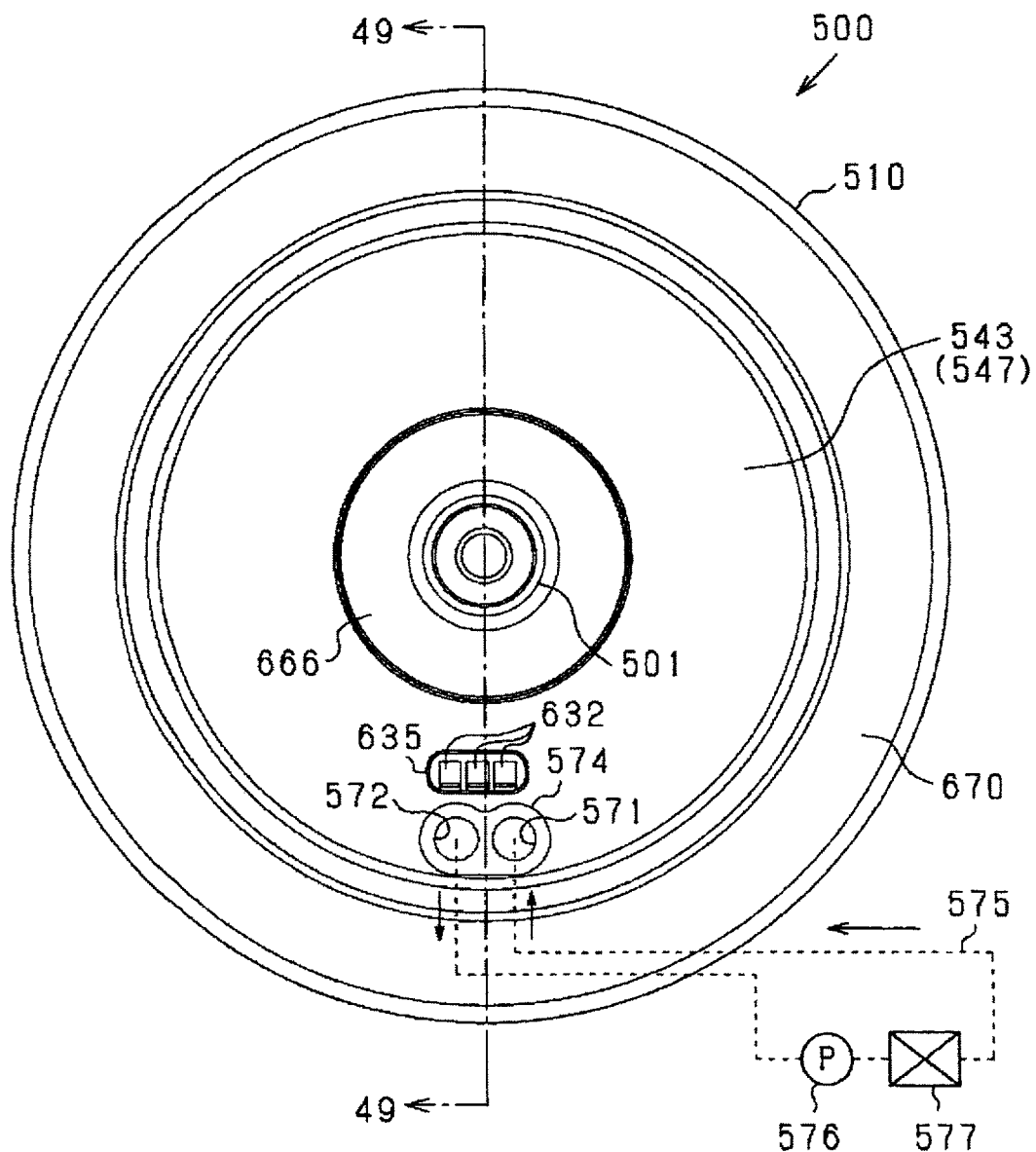
FIG. 48 is a side view which illustrates a rotating electrical machine, as viewed from a protruding portion of a rotating shaft.
Figure 49:
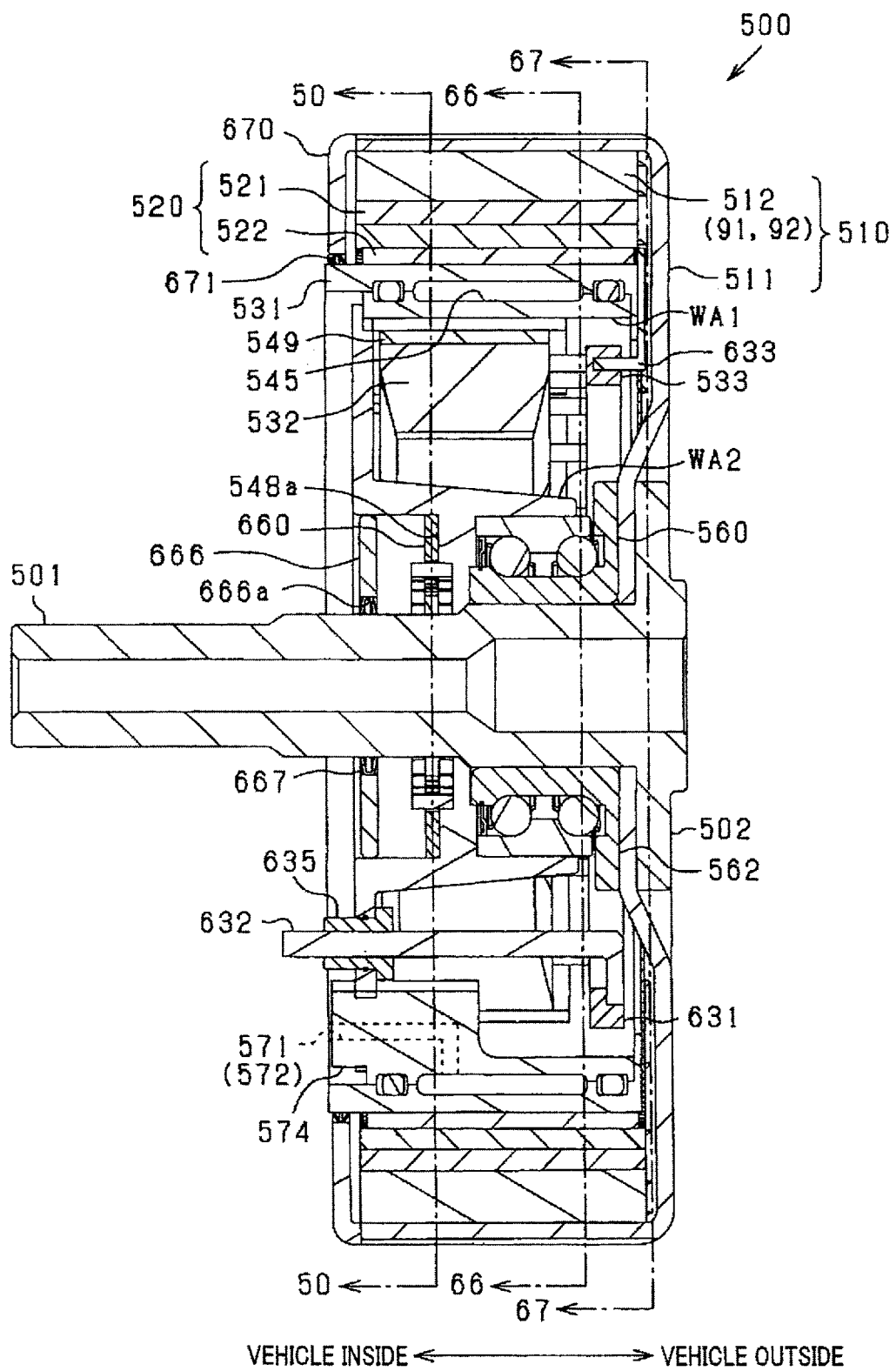
FIG. 49 is a sectional view taken along the line 49-49 in FIG. 48.
Figure 50:
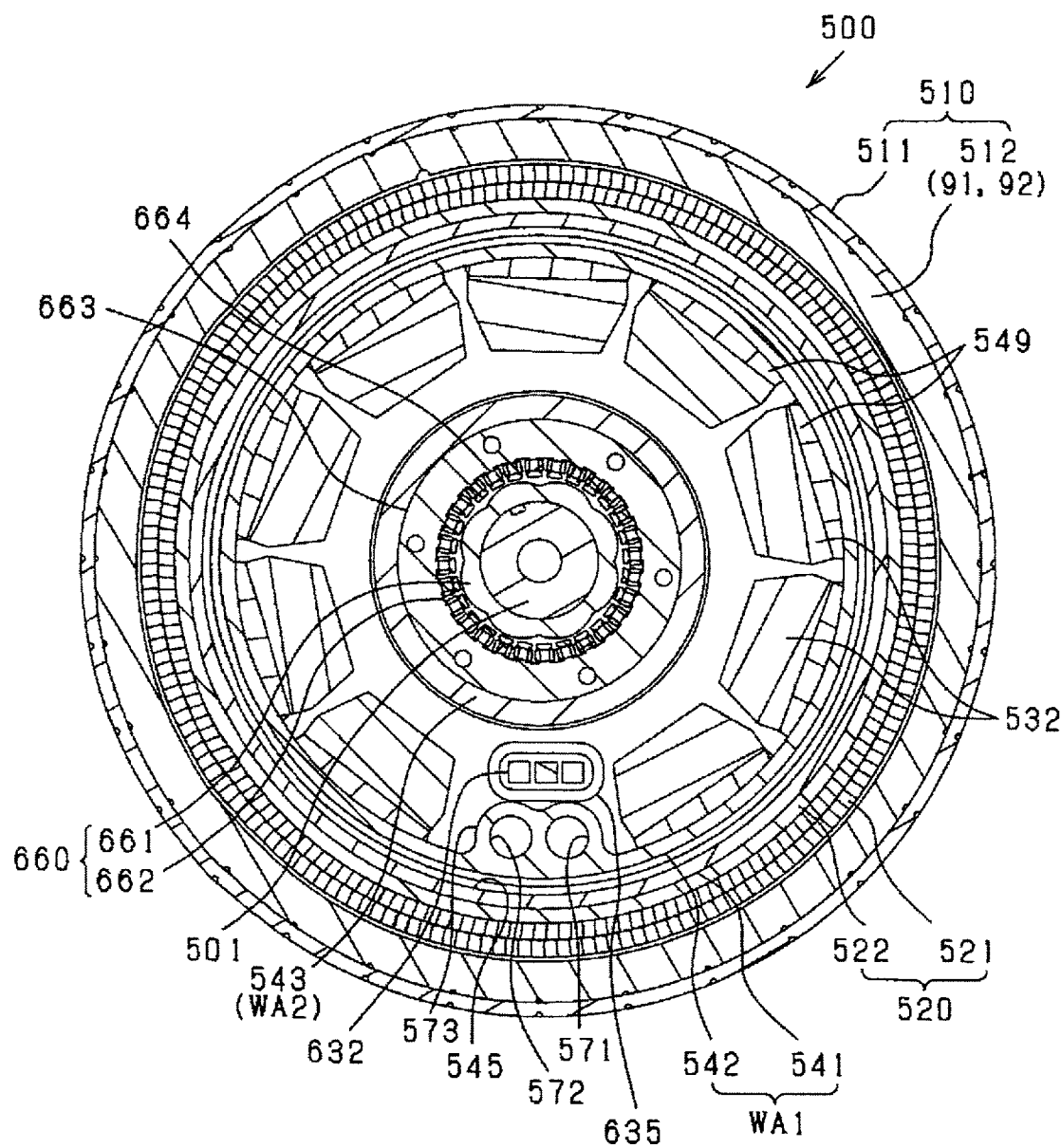
FIG. 50 is a sectional view taken along the line 50-50 in FIG. 49.
Figure 51:
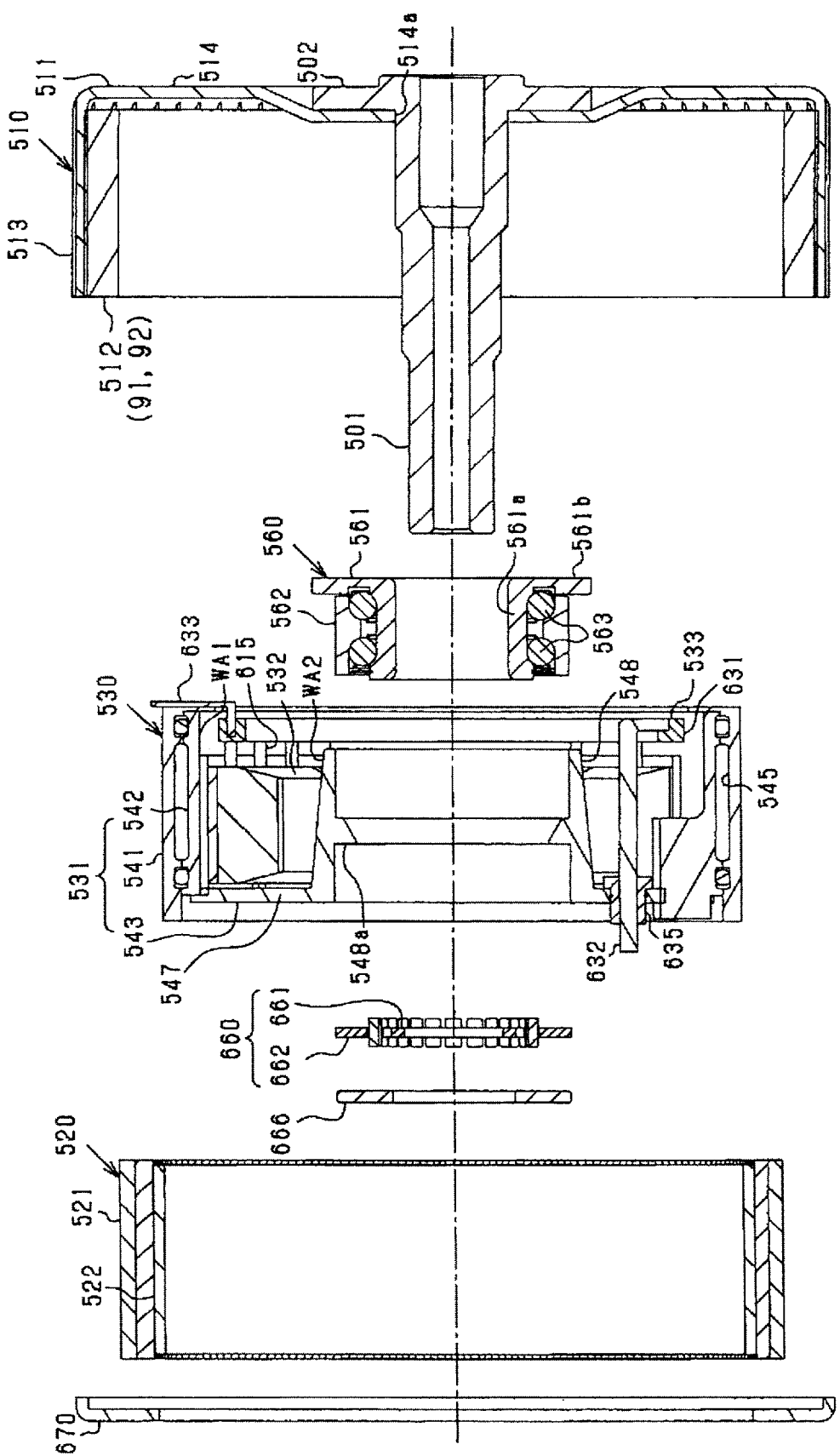
FIG. 51 is an exploded sectional view of a rotating electrical machine.

The outline of the rotating electrical machine 500 is shown in FIGS. 48 to 51. FIG. 48 is a side elevation of the rotating electrical machine 500, as viewed in an axial direction of the rotating shaft 501 (i.e., from inside the vehicle). FIG. 49 is a longitudinal sectional view of the rotating electrical machine 500, as taken along the line 49-49 in FIG. 48. FIG. 50 is a transverse sectional view of the rotating electrical machine 500, as taken along the line 50-50 in FIG. 49. FIG. 51 is an exploded sectional view of the rotating electrical machine 500. In the following discussion, a direction in which the rotating shaft 501 extends outside the vehicle body will be referred to as an axial direction, and a direction perpendicular to the length of the rotating shaft 501 will be referred to as a radial direction in FIG. 51. In FIG. 48, opposite directions extending in a circular form from a point on a center line which passes through the center of the rotating shaft 501, in other words, the center of rotation of the rotating portion of the rotating electrical machine 500 and defines the cross section 49 of the rotating electrical machine 500 will be referred to as a circumferential direction. In other words, the circumferential direction is either a clockwise direction or a counterclockwise direction from a point on the cross section 49. In FIG. 49, the right side is an outer side of the vehicle, while the left side is an inner side of the vehicle. In other words, when the rotating electrical machine 500 is mounted in the vehicle, the rotor 510 which will be described later in detail is disposed closer to the outer side of the vehicle body than the rotor cover 670 is.

The rotating electrical machine 500 in this embodiment is designed as an outer-rotor surface-magnet rotating electrical machine. The rotating electrical machine 500 includes the rotor 510, the stator 520, the inverter unit 530, the bearing 560, and the rotor cover 670. These parts are each arranged coaxially with the rotating shaft 501 provided integrally with the rotor 510 and assembled in a given order in the axial direction to complete the rotating electrical machine 500.

In the rotating electrical machine 500, the rotor 510 and the stator 520 are hollow cylindrical and face each other through an air gap. Rotation of the rotating shaft 501 causes the rotor 510 to rotate radially outside the stator 520. The rotor 510 works as a field generator. The stator 520 works as an armature.

The rotor 510 includes the hollow cylindrical rotor carrier 511 and the annular magnet unit 512 secured to the rotor carrier 511. The rotating shaft 501 is firmly joined to the rotor carrier 511.

The rotor carrier 511 includes the cylindrical portion 513. The magnet unit 512 is firmly attached to an inner circumferential surface of the cylindrical portion 513. In other words, the magnet unit 512 is surrounded by the cylindrical portion 513 of the rotor carrier 511 from radially outside it. The cylindrical portion 513 has a first end and a second end which are opposed to each other in the axial direction. The first end faces the outside of the vehicle body. The second end faces the base plate 405. In the rotor carrier 511, the end plate 514 continues to the first end of the cylindrical portion 513. In other words, the cylindrical portion 513 and the end plate 514 are formed or joined integrally with each other. The cylindrical portion 513 has an opening in the second end. The rotor carrier 511 may be made by a cold rolled steel plate having a high mechanical strength. For example, the rotor carrier 511 is made of SPCC (steel plate cold commercial) or SPHC (steel plate hot commercial) which has a thickness larger than SPCC. The rotor carrier 511 may alternatively be made of forging steel or carbon fiber reinforced plastic (CFRP).

The length of the rotating shaft 501 is larger than a dimension of the rotor carrier 511 in the axial direction. In other words, the rotating shaft 501 protrudes from the open end of the rotor carrier 511 inwardly in the vehicle to have an end on which the brake device is mounted.

The end plate 514 of the rotor carrier 511 has the center hole 514a passing through a thickness thereof. The rotating shaft 501 passes through the hole 514a of the end plate 514 and is retained by the rotor carrier 511. The rotating shaft 501 has the flange 502 extending from a joint of the rotor carrier 511 to the rotating shaft 501 in a direction traversing or perpendicular to the length of the rotating shaft 501. The flange 502 has a surface joined to an outer surface of the end plate 514 which faces outside the vehicle, so that the rotating shaft 501 is secured to the rotor carrier 511. In the tire wheel assembly 400, the wheel 402 is joined to the rotating shaft 501 using fasteners, such as bolts, extending from the flange 502 outwardly in the vehicle.

The magnet unit 512 is made up of a plurality of permanent magnets which arranged adjacent each other and whose magnetic polarities are disposed alternately in a circumferential direction of the rotor 510. The magnet unit 512, thus, has a plurality of magnetic poles arranged in the circumferential direction. The permanent magnets are secured to the rotor carrier 511 using, for example, adhesive. The magnet unit 512 has the same structure as that of the magnet unit 42 discussed with reference to FIGS. 8 and 9 and is made of sintered neodymium magnets whose intrinsic coercive force is 400 [kA/m] or more and whose remanent flux density is 1.0 [T] or more.

The magnet unit 512 is, like the magnet unit 42 in FIG. 9, made of polar anisotropic magnets and includes the first magnets 91 and the second magnets 92 which are different in magnetic polarity from each other. As already described with reference to FIGS. 8 and 9, each of the magnets 91 and 92, as can be seen in FIG. 9, includes the first portion 250 and the two second portions 260 arranged on opposite sides of the first portion 250 in the circumferential direction of the magnet unit 512. In other words, the first portion 250 is located closer to the d-axis than the second portions 260 are. The second portions 260 are arranged closer to the q-axis than the first portion 250 is. The direction in which the easy axis of magnetization 300 extends in the first portion 250 is oriented more parallel to the d-axis than the direction in which the easy axis of magnetization 310 extends in the second portions 260. In other words, the magnet unit 512 is engineered so that an angle θ11 which the easy axis of magnetization 300 in the first portion 250 makes with the d-axis is selected to be smaller than an angle θ12 which the easy axis of magnetization 310 in the second portion 260 makes with the q-axis. Annular magnetic paths are, therefore, created according to the directions of easy axes of magnetization. In each of the magnets 91 and 92, the easy axis of magnetization in a region close to the d-axis may be oriented parallel to the d-axis, while the easy axis of magnetization in a region close to the q-axis may be oriented perpendicular to the q-axis. In brief, the magnet unit 512 is magnetically oriented to have the easy axis of magnetization in the region close to the d-axis (i.e., the center of the magnetic pole) which is oriented more parallel to the d-axis than in the region close to the q-axis (i.e., the boundary between the magnetic poles).

Accordingly, the above-described structure of each of the magnets 91 and 92 functions to enhance the magnet magnetic flux thereof on the d-axis and reduce a change in magnetic flux near the q-axis. This enables the magnets 91 and 92 to be produced which have a smooth change in surface magnetic flux from the q-axis to the d-axis on each magnetic pole. The magnet unit 512 may be designed to have the same structure as that of the magnet unit 42 illustrated in FIGS. 22 and 23 or illustrated in FIG. 30.

The magnet unit 512 may be equipped with a rotor core (i.e., a back yoke) which is made of a plurality of magnetic steel plates stacked in the axial direction and arranged close to the cylindrical portion 513 of the rotor carrier 511, i.e., near the outer circumference thereof. In other words, the rotor core may be disposed radially inside the cylindrical portion 513 of the rotor carrier 511, and the permanent magnets (i.e., the magnets 91 and 92) may be arranged radially inside the rotor core.

Figure 52:
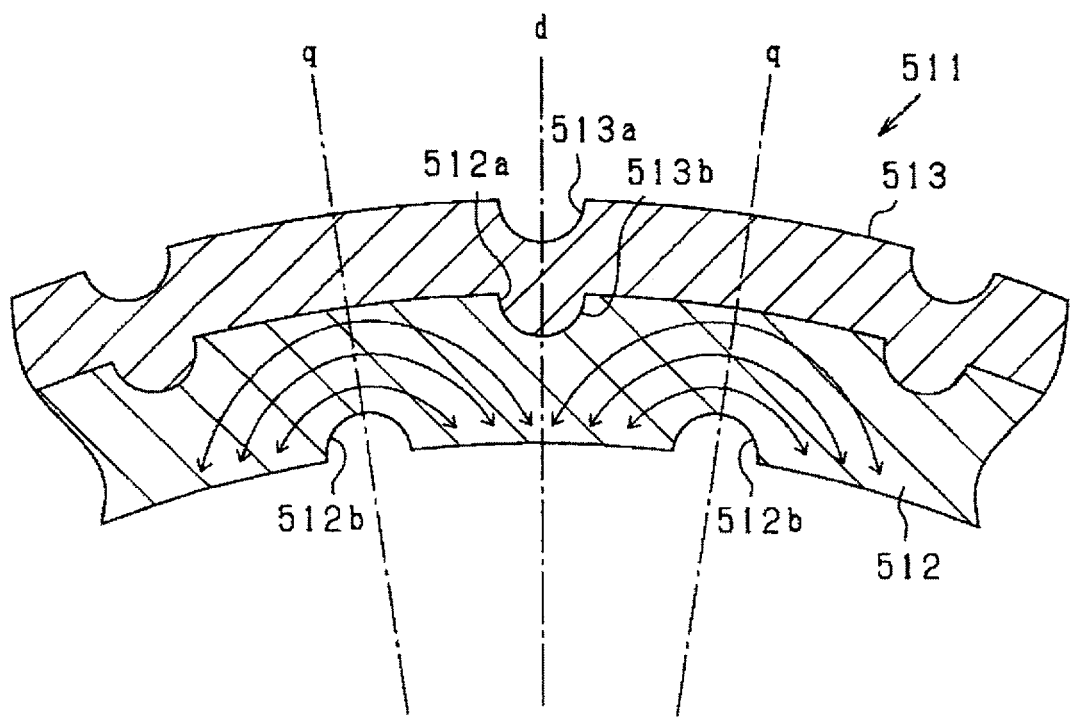
FIG. 52 is a partially sectional view of a rotor.

Referring back to FIG. 47, the cylindrical portion 513 of the rotor carrier 511 has formed therein the recesses 513a which are arranged at a given interval away from each other in the circumferential direction of the cylindrical portion 513 and extend in the axial direction of the cylindrical portion 513. The recesses 513a are made, for example, using a stamp or a press. The cylindrical portion 513, as can be seen in FIG. 52, has convexities or protrusions 513b each of which is formed on an inner circumference thereof in alignment with a respective one of the recesses 513 in the radial direction of the cylindrical portion 513. The magnet unit 512 has formed in the outer circumference thereof the recesses 512a each of which is fit on a respective one of the protrusions 513b of the cylindrical portion 513. In other words, the protrusions 513b of the cylindrical portion 513 are disposed in the recesses 512a, thereby holding the magnet unit 512 from moving in the circumferential direction of the rotor carrier 511. The protrusions 513b of the rotor carrier 511, thus, serve as stoppers to stop the magnet unit 512 from being rotated. The protrusions 513b may alternatively be formed in a known way other than the pressing techniques.

FIG. 52 demonstrates magnetic paths which are produced by the magnets of the magnet unit 512 and indicated by arrows. Each of the magnetic paths extends in an arc-shape and crosses the q-axis that is located at the boundary between the magnetic poles. Each of the magnetic paths is oriented parallel or near parallel to the d-axis in the region close to the d-axis. The magnet unit 512 has the recesses 512b which are formed in an inner circumferential surface thereof and located on the q-axis. The magnetic paths in the magnet unit 512 have lengths different between a region near the stator 520 (i.e., a lower side in the drawing) and a region far from the stator 520 (i.e., an upper side in the drawing). Specifically, the length of the magnetic path close to the stator 520 is shorter than that of the magnetic path far from the stator 520. Each of the recesses 512b is located on the shortest length of the magnetic path. In other words, in view of an insufficient amount of magnetic flux around the shorter magnetic path, the magnet unit 512 is shaped to have removed portions in which the magnetic flux is weak.

Generally, the effective magnetic flux density Bd of a magnet becomes high with an increase in length of a magnetic circuit passing through the magnet. The permeance coefficient Pc and the effective magnetic flux density Bd of the magnet have a relationship in which when one of them becomes high, the other also becomes high. The structure illustrated in FIG. 52 enables the volume of the magnets to be reduced with a minimized risk of decrease in permeance coefficient Pc that is an indication of the degree of the effective magnetic flux density of the magnets. On the B-H coordinate system, an intersection of a permeance straight line and a demagnetization curve is an operating point according to the configuration of a magnet. The magnetic flux density on the operating point represents the effective magnetic flux density Bd. The rotating electrical machine 500 in this embodiment is engineered to have the stator 520 in which the amount of iron is decreased and highly effective in having the magnetic circuit crossing the q-axis.

The recesses 512b of the magnet unit 512 may be used as air paths extending in the axial direction, thereby enhancing the cooling ability of the rotating electrical machine 500.

Figure 53:
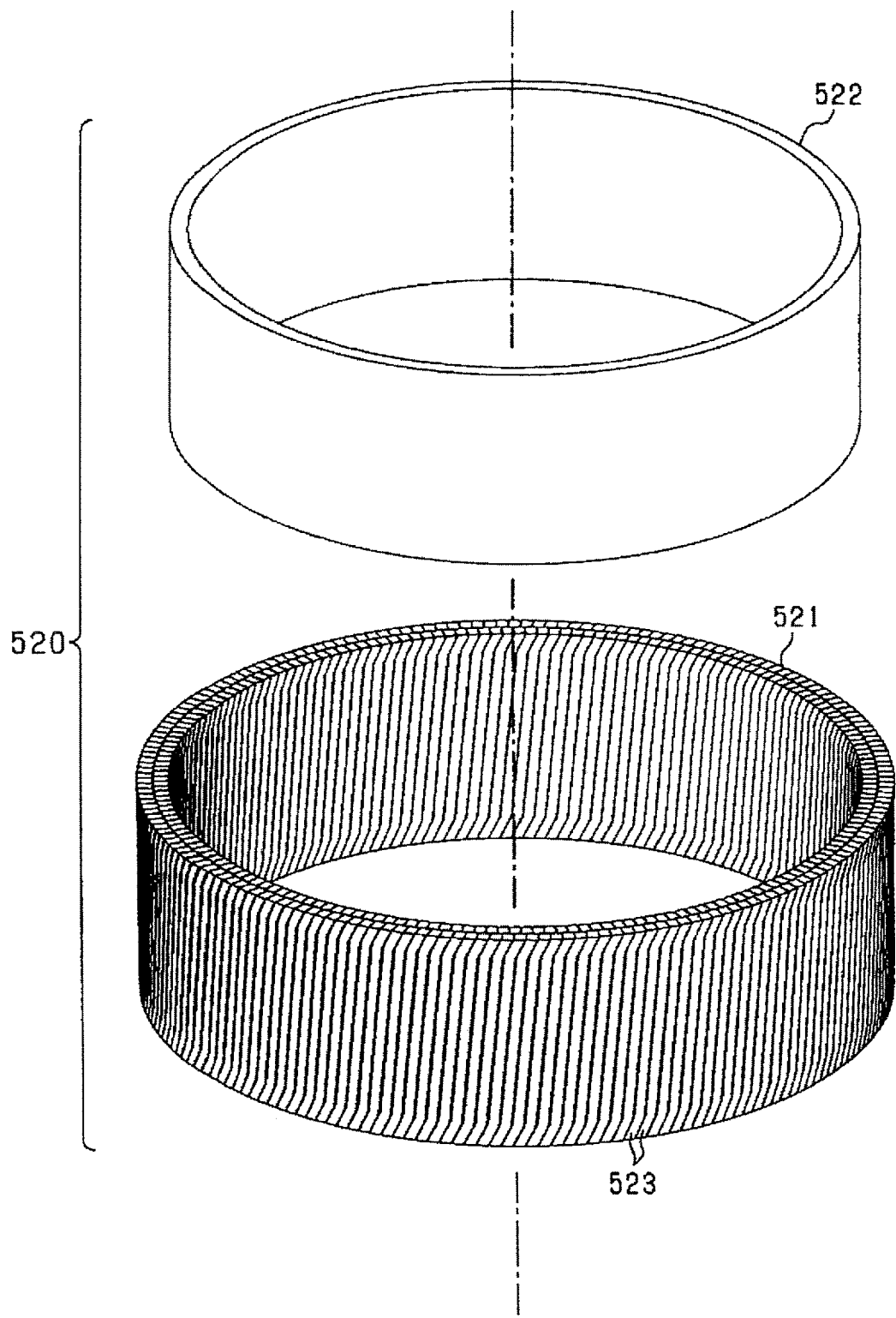
FIG. 53 is a perspective view of a stator winding and a stator core.

Next, the structure of the stator 520 will be described below. The stator 520 includes the stator winding 521 and the stator core 522. FIG. 53 is an exploded view of the stator winding 521 and the stator core 522.

The stator winding 521 is made up of a plurality of phase-windings which are of a hollow cylindrical shape. The stator core 522 serving as a base member is arranged radially inside the stator winding 521. In this embodiment, the stator winding 521 includes three-phase windings: a U-phase winding, a V-phase winding, and a W-phase winding. Each of the U-phase winding, the V-phase winding, and the W-phase winding is made of two layers of the conductor 523: an outer layer and an inner layer located radially inside the outer layer. The stator 520 is, like the above-described stator 50, designed to have a slot-less structure and the flattened stator winding 521. The stator 520, therefore, has substantially the same structure of the stator 50 illustrated in FIGS. 8 to 16.

The structure of the stator core 522 will be described below. The stator core 522 is, like the above described stator core 52, made of a plurality of magnetic steel plates stacked in the axial direction in the shape of a hollow cylinder having a given thickness in the radial direction. The stator winding 521 is mounted on a radially outer circumference of the stator core 522 which faces the rotor 510. The stator core 522 does not have any irregularities on the outer circumferential surface thereof. In the assembly of the stator core 522 and the stator winding 521, the conductors 523 of the stator winding 521 are arranged adjacent each other in the circumferential direction on the outer circumferential surface of the stator core 522. The stator core 522 functions as a back core.

The stator 520 may be made to have one of the following structures.

(A) The stator 520 has an inter-conductor members each of which is disposed between the conductors 523 in the circumferential direction. As the inter-conductor members, magnetic material is used which meets a relation of $Wt \times Bs \leq Wm \times Br$ where Wt is a width of the inter-conductor members in the circumferential direction within one magnetic pole, Bs is the saturation magnetic flux density of the inter-conductor members, Wm is a width of the magnet unit 512 equivalent to one magnetic pole in the circumferential direction, and Br is the remanent flux density in the magnet unit 512.

(B) The stator 520 has the inter-conductor members each of which is disposed between the conductors 523 in the circumferential direction. The inter-conductor members are each made of a non-magnetic material.

(C) The stator 520 has no inter-conductor member disposed between the conductors 523 in the circumferential direction.

The above structure of the stator 520 results in a decrease in inductance as compared with typical rotating electrical machines equipped with teeth (i.e., iron core) which create a magnetic path between conductors of a stator winding. Specifically, the structure of the stator 520 enables the inductance to be one-tenth or less of that in the prior art structure. Usually, the reduction in inductance will result in a reduction in impedance. The rotating electrical machine 500 is, therefore, designed to increase output power relative to input power to increase the degree of output torque. The rotating electrical machine 500 is also enabled to produce a higher degree of output than rotating electrical machines which use a magnet-embedded rotor and output torque using impedance voltage (i.e., reluctance torque).

In this embodiment, the stator winding 521 is formed along with the stator core 522 in the form of a single unit using a resinous molding material (i.e., insulating material). The molding material occupies an interval between a respective adjacent two of the conductors 523 arranged in the circumferential direction. This structure of the stator 520 is equivalent to that described in the above item (B). The conductors 523 arranged adjacent each other in the circumferential direction may have surfaces which face each other in the circumferential direction and are placed in direct contact with each other or opposed to each other through a small air gap therebetween. This structure is equivalent to the above item (C). When the structure in the above item (A) is used, the outer circumferential surface of the stator core 522 is preferably shaped to have protrusions in accordance with orientation of the conductors 523 in the axial direction, that is, a skew angle in a case where the stator winding 521 is of a skew structure.

The structure of the stator winding 521 will be described below with reference to FIGS. 54(*a*) and 54(*b*). FIG. 54(*a*) is a partially developed view which illustrates an assembly of the conductors 523 arranged in the form of an outer one of two layers overlapping each other in the radial direction of the stator winding 521. FIG. 54(*b*) is a partially developed which illustrates an assembly of the conductors 523 arranged in the form of an inner one of the two layers.

The stator winding 521 is designed as an annular distributed winding. The stator winding 521 is made up of the conductors 523 arranged in the form of two layers: an outer layer and an inner layer overlapping each other in the radial direction of the stator winding 521. The conductors 523 of the outer layer are, as can be seen in FIGS. 54(*a*) and 54(*b*), skewed at an orientation different from that of the conductors 523 of the inner layer. The conductors 523 are electrically insulated from each other. Each of the conductors 523 is, as illustrated in FIG. 13, preferably made of an aggregation of wires 86. For instance, two each of the conductors 523 through which current flows in the same direction for the same phase are arranged adjacent each other in the circumferential direction of the stator winding 521. Accordingly, in the stator winding 521, a respective circumferentially arranged two of the conductors 523 in each of the outer and inner layers, that is, a total four of the conductors 523 constitutes one conductor portion of the stator winding 521 for each phase. The conductor portions are provided one in each magnetic pole.

The conductor portion is preferably shaped to have a thickness (i.e., a dimension in the radial direction) which is less than a width thereof (i.e., a dimension in the circumferential direction) for each phase in each pole. In other words, the stator winding 521 is preferably designed to have a flattened conductor structure. For instance, a total eight of the conductors 523: four arrayed adjacent each other in the circumferential direction in each of the outer and inner layers preferably define each conductor portion for each phase in the stator winding 521. Alternatively, each of the conductors 523 may be shaped to have a transverse section, as illustrated in FIG. 50, whose width (i.e., a dimension in the circumferential direction) is larger than a thickness thereof (i.e., a dimension in the radial direction). The stator winding 521 may alternatively be designed to have the same structure as that of the stator winding 51 shown in FIG. 12. This structure, however, requires the rotor carrier 511 to have an inner chamber in which coil ends of the stator winding 521 are disposed.

The stator winding 521, as can be seen in FIG. 54(*a*), has the coil side 525 which overlaps the stator core 522 in the radial direction thereof. The coil side 525 is made up of portions of the conductors 523 which obliquely extend or slant at a given angle to the axis of the stator winding 521 and are arranged adjacent each other in the circumferential direction. The stator winding 521 also has the coil ends 526 located outside the coil side 525 in the axial direction thereof. Each of the coil ends 526 is made up of portions of the conductors 523 which are turned inwardly in the axial direction to make joints of the conductors 523 of the coil side 525. FIG. 54(*a*) illustrates the coil side 525 and the coil ends 526 in the outer layer of the conductors 523 of the stator winding 521. The conductors 523 of the inner layer and the conductors 523 of the outer layer are electrically connected together by the coil ends 526. In other words, each of the conductors 523 of the outer layer is turned in the axial direction and leads to a respective one of the conductors 523 of the inner layer through the coil end 526. In brief, a direction in which current flows in the stator winding 521 is reversed between the outer and inner layers of the conductors 523 connected to extend in the circumferential direction.

Figure 55:
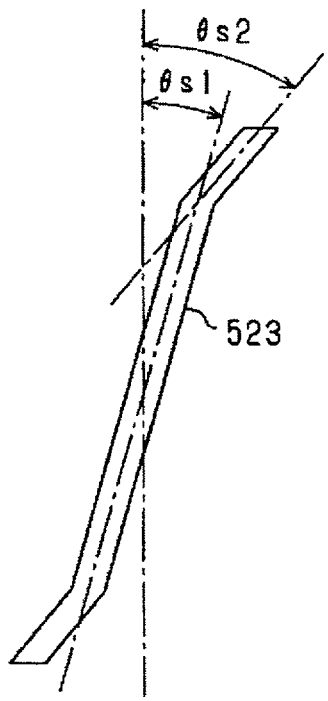
FIG. 55 is a view which demonstrates skew of a conductor.

The stator winding 521 has end regions defining ends thereof opposed to each other in the axial direction and an intermediate region between the end regions. Each of the conductors 523 has skew angles different between each of the end regions and the intermediate region. Specifically, the skew angle is an angle which each of the conductors 523 makes with a line extending parallel to the axis of the stator winding 521. The conductors 523, as illustrated in FIG. 55, have the skew angle $\theta_{s1}$ in the intermediate region and the skew angle $\theta_{s2}$ in the end regions which is different from the skew angle $\theta_{s1}$. The skew angle $\theta_{s1}$ is smaller than the skew angle $\theta_{s2}$. The end regions of the stator winding 521 are defined to partially occupy the coil side 525. The skew angle $\theta_{s1}$ and the skew angle $\theta_{s2}$ are angles at which the conductors 523 are inclined in the axial direction of the stator winding 521. The skew angle $\theta_{s1}$ in the intermediate region is preferably selected to be an angle suitable for removing harmonic components of magnetic flux resulting from excitation of the stator winding 521.

The skew angle of each of the conductors 523 of the stator winding 521 is, as described above, selected to be different between the intermediate region and the end regions. The skew angle $\theta_{s1}$ in the intermediate region is set smaller than the skew angle $\theta_{s2}$ in the end regions, thereby decreasing the size of the coil ends 526, but enabling a winding factor of the stator winding 521 to be increased. In other words, it is possible for the stator winding 521 to decrease the length of the coil ends 526, i.e., portions of the conductors 523 extending outside the stator core 522 in the axial direction without sacrificing a desired winding factor, which enables the rotating electrical machine 500 to be reduced in size and the degree of torque to be increased.

An adequate range of the skew angle $\theta_{s1}$ in the intermediate region will be discussed below. In the case where the X conductors 523 where X is the number of the conductors 523 are arranged in one magnetic pole of the stator winding 521, excitation of the stator winding 521 is thought of as producing an $X^{th}$ harmonic. If the number of phases is defined as S, and the number of the conductors 523 for each phase is defined as m, then X=2×S×m. The inventor of this application has focused the fact that an $X^{th}$ harmonic is equivalent to a combination of an $(X^{-1})^{th}$ harmonic and $(X^{+1})^{th}$ harmonic, and the $X^{th}$ harmonic may be reduced by reducing at least either of the $(X^{-1})^{th}$ harmonic or the $(X^{+1})^{th}$ harmonic and found that the $X^{th}$ harmonic will be reduced by selecting the skew angle $\theta_{s1}$ to fall in a range of 360°/(X+1) to 360°/(X−1) in terms of electrical angle.

For instance, if S=3, and m=2, the skew angle $\theta_{s1}$ is determined to fall in a range of 360°/13 to 360°/11 in order to decrease the $12^{th}$ harmonic (i.e., X=12). Specifically, the skew angle $\theta_{s1}$ is selected from a range of 27.7° to 32.7°.

The skew angle $\theta_{s1}$ of each of the conductors 523 in the intermediate region determined in the above way will facilitate or enhance interlinkage of magnetic fluxes, as produced by N-poles and S-poles of the magnets arranged alternately, in the intermediate regions of the conductors 523, thereby increasing the winding factor of the stator winding 521.

The skew angle $\theta_{s2}$ in the end regions is determined to be larger than the skew angle $\theta_{s1}$ in the intermediate region of the conductors 523. The skew angle $\theta_{s2}$ is selected to meet a relation of $\theta_{s1} < \theta_{s2} < 90°$.

In the stator winding 521, the end of each of the conductors 523 of the inner layer is joined to the end of a respective one of the conductors 523 of the outer layer by welding or bonding techniques. Alternatively, each of the conductors 523 of the inner layer and a respective one of the conductors 523 of the outer layer may be made by a single conductor with a curved or bent portion defining an end joint thereof. In the stator winding 521, one of the ends of each phase winding, i.e., one of the axially opposed coil ends 526 of each phase winding is electrically connected to a power converter (i.e., an inverter) using, for example, a bus. The structure of the stator winding 521 in which the conductors 523 are joined together in ways different between the coil end 526 closer to the bus bar and the coil end 526 farther away from the bus bar will be described below.

First Structure

The conductors 523 are welded together at the coil ends 526 closer to the bus bars, while they are connected in a way other than welding at the coil ends 526 farther away from the bus bars. For instance, a single conductor may be shaped to have a curved or bent portion which defines the coil end 523 farther away from the bus bar and to make a respective two of the conductors 523. The end of each phase winding is, as described above, welded to the bus bar at the coil end 526 closer to the bus bar. The coil ends 526 closer to the bus bars may, therefore, be welded together to connect the conductors 523 in a single step. This improves the efficiency in producing the stator winding 521.

Second Structure

The conductors 523 are connected in a way other than welding at the coil ends 526 closer to the bus bars and welded together at the coil ends 526 farther away from the bus bars. In a case where the conductors 523 are welded together at the coil ends 526 closer to the bus bars, it is necessary to increase an interval between the bus bars and the coil ends 526 in order to avoid a mechanical interference between the welds and the bus bars. The second structure, however, eliminates such a need and enables an interval between the bus bars and the coil ends 526 to be decreased, thereby loosing requirements for an axial dimension of the stator winding 521 or for the bus bars.

Third Structure

The conductors 523 are jointed together at all the coil ends 526 using welding techniques. This structure enables each of the conductors 523 to be made of a shorter length of conductor than the above structures and also eliminates the need for bending or curving conductors to improve the efficiency in completing the stator winding 521.

Fourth Structure

The stator winding 521 is completed without welding the coil ends 526 of all the conductors 523. This minimizes or eliminates welded portions of the stator winding 521, thereby minimizing a risk that electrical insulation of the conductors 532 may be damaged at welds.

The stator winding 521 may be produced by preparing a weaved assembly of conductor strips placed horizontally and then bending them into a cylinder. In this case, the coil ends 526 of the conductor strips may be welded together before the conductor strips are bent. The bending of the conductor strips into a cylinder may be achieved by wrapping the assembly of the conductor strips about a circular cylinder which is identical in diameter with the stator core 522 or alternatively by wrapping the assembly of the conductor trips directly around the stator core 522.

The stator winding 521 may alternatively be designed to have one of the following structures.

Figure 54A:
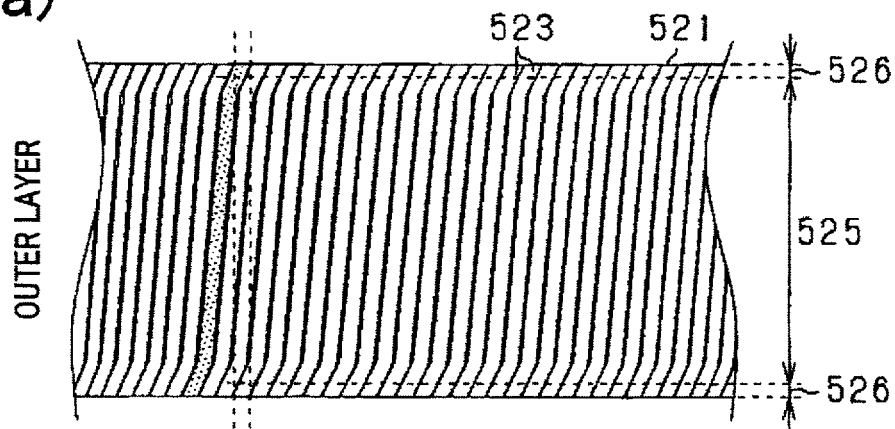
FIGS. 54(a) and 54(b) are front views which illustrate a development of a stator winding.
Figure 54B:
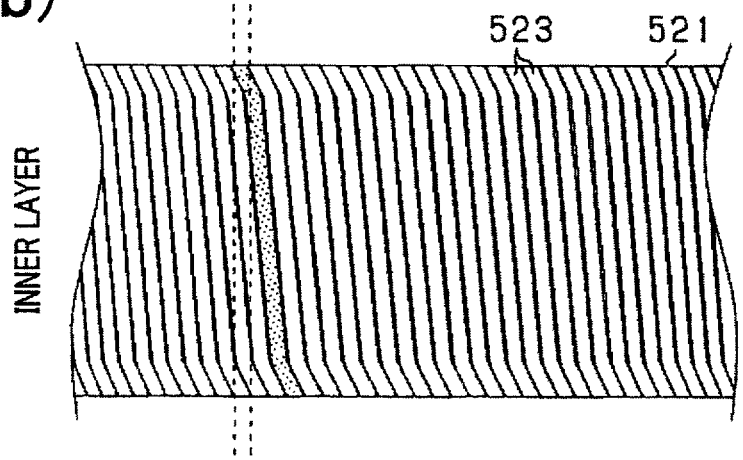

The stator winding 521 illustrated in FIGS. 54(a) and 54(b) may alternatively have the intermediate region and the end regions which are identical in skew angle with each other.

The stator winding 521 illustrated in FIGS. 54(a) and 54(b) may alternatively have the conductors 523 which are arranged adjacent each other in the circumferential direction in the same phase and have ends joined together using connecting conductors extending perpendicular to the axial direction of the stator winding 521.

The stator winding 521 may be made in the form of 2×n annular layers. For example, the stator winding 521 may be shaped to have 4 or 6 overlapping annular layers.

The structure of the inverter unit 530 working as a power converter unit will be described below with reference to FIGS. 56 and 57 which are exploded sectional views. FIG. 57 illustrates two sub-assemblies of parts of the inverter unit 530 shown in FIG. 56.

The inverter unit 530 includes the inverter housing 531, a plurality of electrical modules 532 disposed in the inverter housing 531 and the bus bar module 533 which electrically connects the electrical modules 532 together.

The inverter housing 531 includes the hollow cylindrical outer wall 541, the hollow cylindrical inner wall 542, and the bossed member 543. The inner wall 542 is smaller in outer diameter than the outer wall 541 and arranged radially inside the outer wall 541. The bossed member 543 is secured to one of axially opposed ends of the inner wall 542. These members 541, 542, and 543 are each preferably made of an electrically conductive material, such as carbon fiber reinforced plastic (CFRP). The inverter housing 531 has the outer wall 541 and the inner wall 542 overlapping each other in the radial direction thereof. The bossed member 543 is, as illustrated in FIG. 57, attached to the axial end of the inner wall 542.

The stator core 522 is secured to an outer periphery of the outer wall 541 of the inverter housing 531, thereby assembling the stator 520 and the inverter unit 530 as a single unit.

Figure 56:
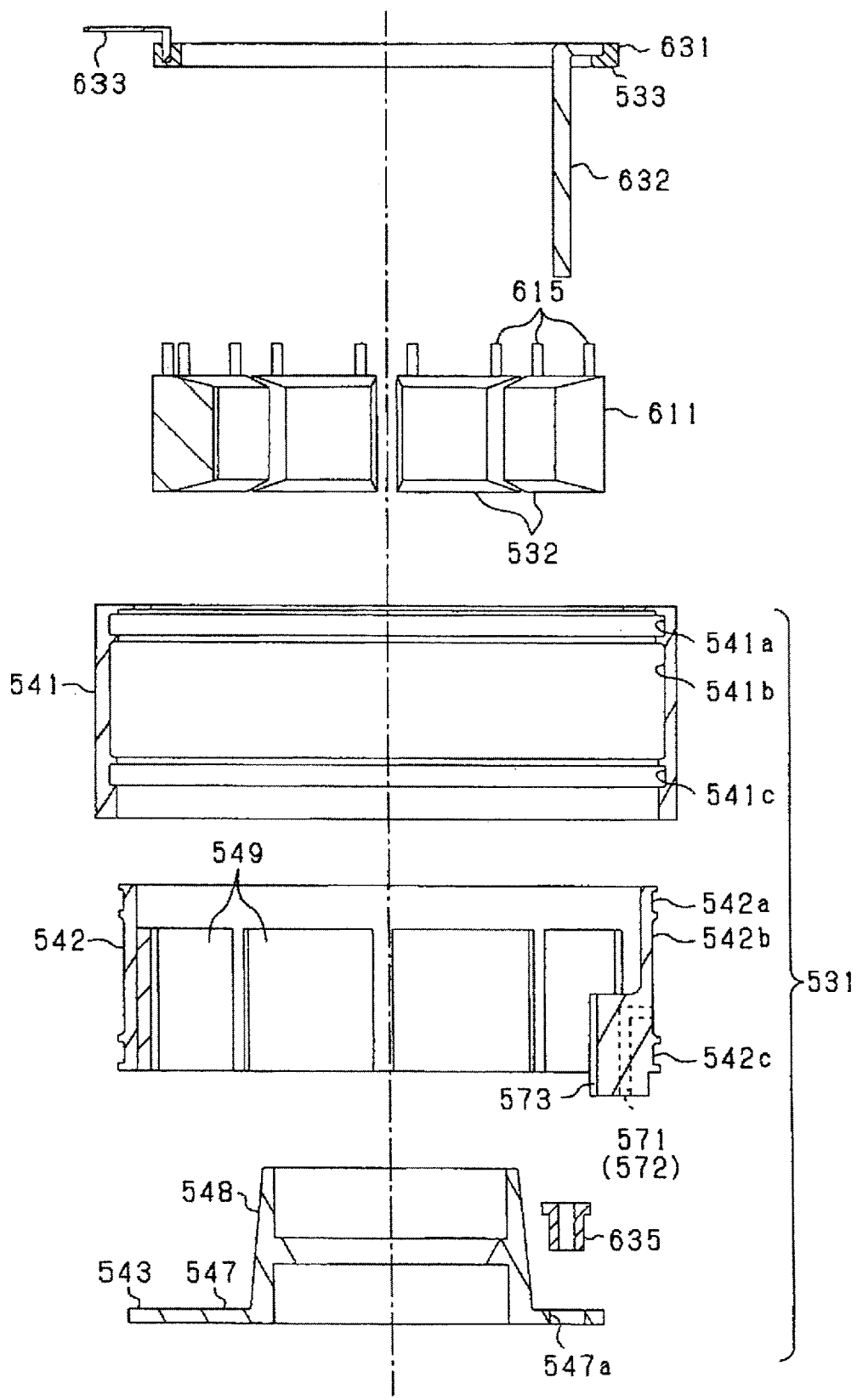
FIG. 56 is an exploded sectional view of an inverter unit.
Figure 57:
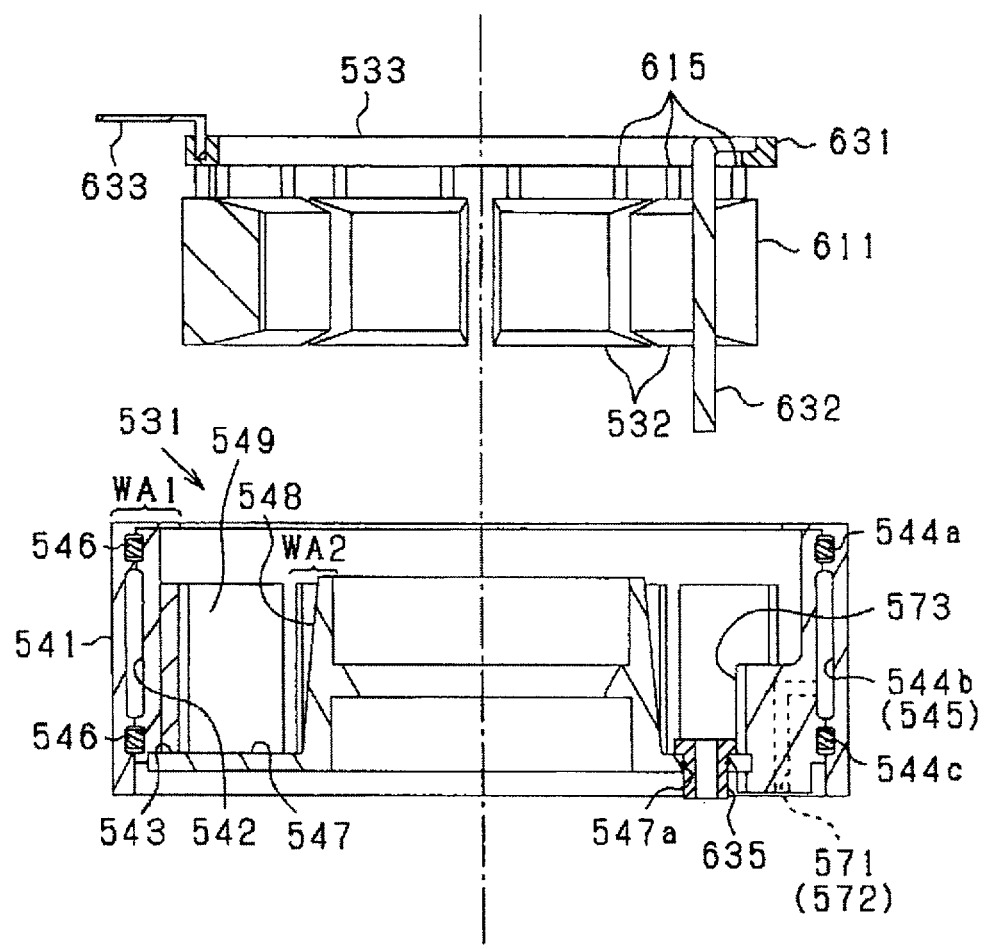
FIG. 57 is an exploded sectional view of an inverter unit.

The outer wall 541, as illustrated in FIG. 56, has a plurality of grooves or recesses 541a, 541b, and 541C formed in an inner peripheral surface thereof. The inner wall 542 has a plurality of grooves or recesses 542a, 542b, and 542C formed in an outer peripheral surface thereof. When the outer wall 541 and the inner wall 542 are assembled together, three inner chambers: the annular chambers 544a, 544b, and 544c are, as can be seen in FIG. 57, defined by the recesses 541a, 541b, and 541C and the recesses 542a, 542b, and 542C. The annular chamber 544b located intermediate between the annular chambers 544a and 544c is used as the coolant path 545 through which cooling water or coolant flows. The annular chambers 544a and 544c located axially outside the annular chamber 544b (i.e., the coolant path 545) have the sealing members 546 disposed therein. The sealing members 546 hermetically seal the annular chamber 544b (i.e., the coolant path 545). The coolant path 545 will also be discussed later in detail.

The bossed member 543 includes the annular disc-shaped end plate 547 and the boss 548 protruding from the end plate 547 into the housing 531. The boss 548 is of a hollow cylindrical shape. Specifically, the inner wall 542 has a first end and a second end which is opposed to the first end in the axial direction and closer to a protruding end of the rotating shaft 501 (i.e., the inside of the vehicle). The bossed member 543 is, as can be seen in FIG. 51, secured to the second end of the inner wall 542. In the tire wheel assembly 400 illustrated in FIGS. 45 to 47, the base plate 405 is secured to the inverter housing 531 (more specifically, the end plate 547 of the bossed member 543).

The inverter housing 531 is of a double-walled structure made up of outer and inner peripheral walls overlapping each other in the radial direction of the inverter housing 531. The outer peripheral wall of the inverter housing 531 is defined by a combination of the outer wall 541 and the inner wall 542. The inner peripheral wall of the inverter housing 531 is defined by the boss 548. In the following discussion, the outer peripheral wall defined by the outer wall 541 and the inner wall 542 will also be referred to as an outer peripheral wall WA1. The inner peripheral wall defined by the boss 548 will also be referred to as an inner peripheral wall WA2.

The inverter housing 531 has an annular inner chamber which is defined between the outer peripheral wall WA1 and the inner peripheral wall WA2 and in which the electrical modules 532 are arranged adjacent each other in the circumferential direction thereof. The electrical modules 532 are firmly attached to an inner periphery of the inner wall 542 using adhesive or vises (i.e., screws). The inverter housing 531 will also be referred to as a housing member. The electrical modules 532 will also be referred to as electrical parts or electrical devices.

The bearing 560 is disposed inside the inner peripheral wall WA2 (i.e., the boss 548). The bearing 560 retains the rotating shaft 501 to be rotatable. The bearing 560 is designed as a hub bearing which is disposed in the center of the wheel 402 to support the tire wheel assembly 400 to be rotatable. The bearing 560 is located to overlap the rotor 510, the stator 520, and the inverter unit 530 in the radial direction thereof. In the rotating electrical machine 500 of this embodiment, the above-described magnetic orientation of the rotor 510 enables the magnet unit 512 to have a decreased thickness. The stator 520, as described above, has a slot-less structure and uses flattened conductors. This enables the magnetic circuit to have a thickness decreased in the radial direction, thereby increasing the volume of space radially inside the magnetic circuit. These arrangements enable the magnetic circuit, the inverter unit 530, and the bearing 560 to be stacked in the radial direction. The boss 548 also serves as a bearing retainer in which the bearing 560 is disposed.

The bearing 560 is implemented by, for example, a radial ball bearing, as can be seen in FIG. 51, including the cylindrical inner race 561, the cylindrical outer race 561 which is larger in diameter than the inner race 561 and arranged radially outside the inner race 561, and the balls 563 disposed between the inner race 561 and the outer race 562. The outer race 562 is fit in the bossed member 543, thereby securing the bearing 560 to the inverter housing 531. The inner race 561 is fit on the rotating shaft 501. The inner race 561, the outer race 562, and the balls 563 are made of metallic material, such as carbon steel.

The inner race 561 of the bearing 560 includes the cylinder 561a in which the rotating shaft 501 is disposed and the flange 561b which extends from an end of the cylinder 561a in a direction perpendicular to the axis of the bearing 560. The flange 561b is placed in contact with an inner surface of the end plate 514 of the rotor carrier 511. After the bearing 560 is mounted on the rotating shaft 501, the rotor carrier 511 is retained or held between the flange 502 of the rotating shaft 501 and the flange 561b of the inner race 561. The angle (i.e., 90° in this embodiment) which the flange 503 of the rotating shaft 501 makes with the axis of the rotating shaft 501 is identical with that which the flange 561b of the inner race 561 makes with the axis of the rotating shaft 501. The rotor carrier 511 is firmly held between the flanges 502 and 561b.

The rotor carrier 511 is supported by the inner race 561 of the bearing 560 from inside, thereby ensuring the stability in holding the rotor carrier 511 relative to the rotating shaft 501 at a required angle, which achieves a desired degree of parallelism of the magnet unit 512 to the rotating shaft 501. This enhances the resistance of the rotor carrier 511 to mechanical vibration even though the rotor carrier 511 is designed to have a size increased in the radial direction.

Next, the electrical modules 532 installed in the inverter housing 531 will be discussed below.

The electrical modules 532 is made up of a plurality of modules each of which includes electrical devices, such as semiconductor switches, and smoothing capacitors which constitute a power converter. Specifically, the electrical modules 532 include the switch modules 532A equipped with semiconductor switches (i.e., power devices) and the capacitor modules 532B equipped with smoothing capacitors.

A plurality of spaces 549 are, as illustrated in FIGS. 49 and 50, secured to the inner peripheral surface of the inner wall 542. The spaces 549 each have a flat surface to which one of the electrical modules 532 is attached. The inner peripheral surface of the inner wall 542 is curved, while each of the electrical modules 532 has a flat surface to be attached to the inner wall 542. Each of the spaces 549 is, therefore, shaped to have the flat surface which faces away from the inner wall 542. The electrical modules 532 are secured to the flat surfaces of the spacers 549.

The spacers 549 need not necessarily to be interposed between the inner wall 542 and the electrical modules 532. For example, the inner wall 542 may be shaped to have flat sections. Alternatively, each of the electrical modules 532 may be shaped to have a curved surface attached directly to the inner wall 542. The electrical modules 532 may alternatively be secured to the inverter housing 531 in non-contact with the inner peripheral surface of the inner wall 542. For instance, the electrical modules 532 may be fixed on the end plate 547 of the bossed member 543. The switch modules 532A may be secured to the inner peripheral surface of the inner wall 542 in non-contact therewith. Similarly, the capacitor modules 532B may be secured to the inner peripheral surface of the inner wall 542 in non-contact therewith.

In a case where the spacers 549 are disposed on the inner peripheral surface of the inner wall 542, a combination of the outer peripheral wall WA1 and the spacers 549 will be referred to as a cylindrical portion. Alternatively, in a case where the spacers 549 are not used, the outer peripheral wall WA1 itself will be referred to as a cylindrical portion.

The outer peripheral wall WA1 of the inverter housing 531, as described already, has formed therein the coolant path 545 in which cooling water flows to cool the electrical modules 532. Instead of the cooling water, cooling oil may be used. The coolant path 545 is of an annular shape contoured to conform with the configuration of the outer peripheral wall WA1. The cooling water passes the electrical modules 532 from an upstream to a downstream side in the coolant path 545. In this embodiment, the coolant path 545 extends in an annular shape and surrounds or overlaps the electrical modules 532 in the radial direction.

The inner wall 542 has formed therein the inlet path 571 through which the cooling water is inputted into the coolant path 545 and the outlet path 572 through which the cooling water is discharged from the coolant path 545. The inner wall 542, as described already, has the electrical modules 532 disposed on the inner peripheral surface thereof. Only one of intervals each between a respective circumferentially adjacent two of the electrical modules 532 is shaped to be larger than the others. In such a large interval, a portion of the inner wall 542 protrudes radially inwardly to form the bulging portion 573. The bulging portion 573 has formed therein the inlet path 571 and the outlet path 572 which are arranged adjacent each other in the circumferential direction of the inner wall 542.

Figure 58:
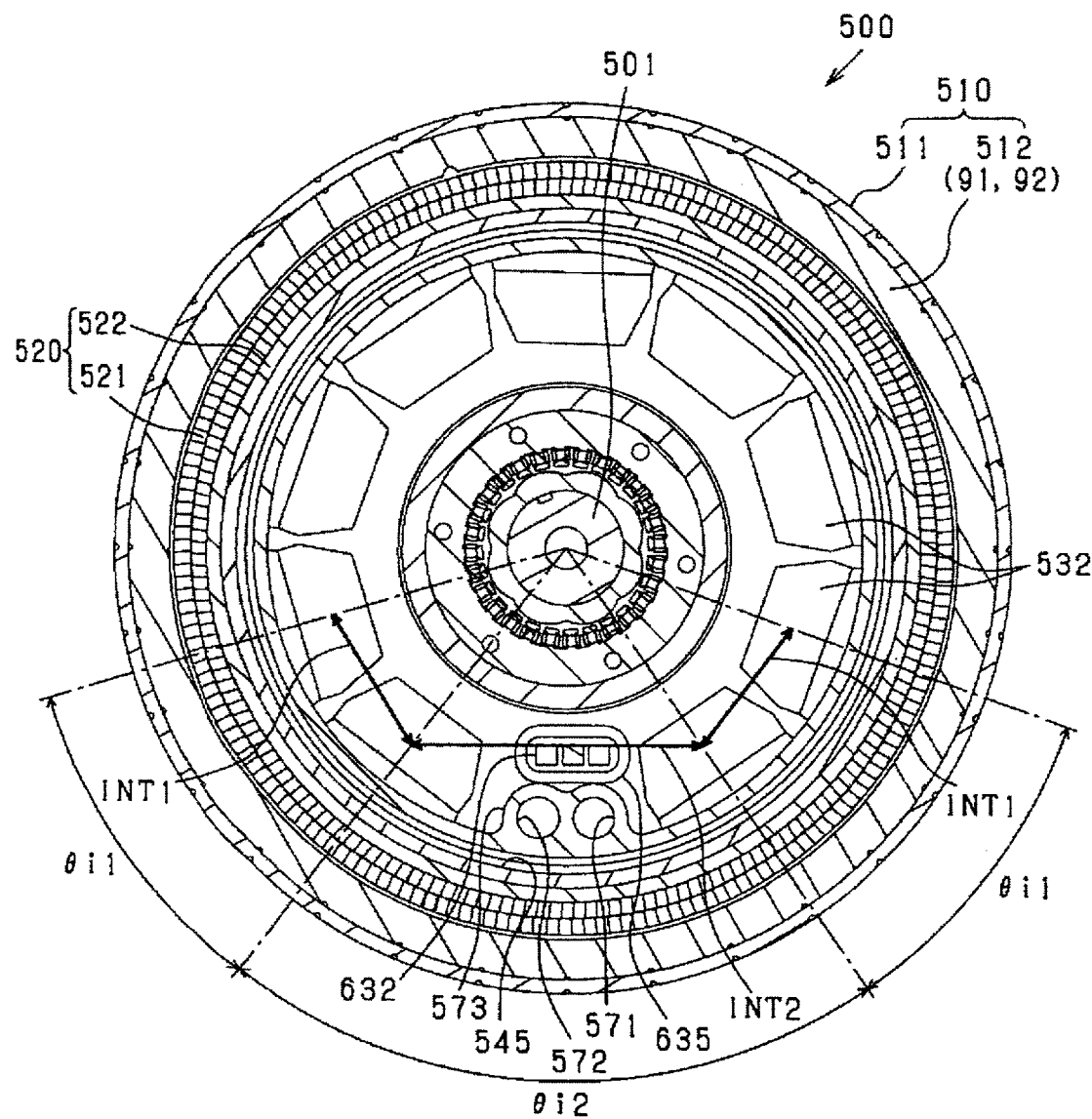
FIG. 58 is a view which demonstrates layout of electrical modules in an inverter housing.

FIG. 58 illustrates the layout of the electrical modules 532 in the inverter housing 531. FIG. 58 represents the same longitudinal section of the rotating electrical machine 500 as in FIG. 50.

The electrical modules 532 are, as can be seen in FIG. 58, arranged at the first interval INT1 or the second interval INT2 away from each other in the circumferential direction of the rotating electrical machine 500. Only selected two of the electrical modules 532 are, as clearly illustrated in FIG. 58, located at the second interval INT2 away from each other. The second interval INT2 is selected to be larger than the first interval INT1. Each of the intervals INT1 and INT2 is, for example, a distance between the centers of an adjacent two of the electrical modules 532 arranged in the circumferential direction. The bulging portion 573 is located in the interval INT2 between the electrical modules 532. In other words, the intervals between the electrical modules 532 include a longer interval (i.e., the second interval INT2) in which the bulging portion 573 lies.

Each of the intervals INT1 and INT2 may be given by an arc-shaped distance between the two adjacent electrical modules 532 along a circle around the center defined on the rotating shaft 501. Each of the intervals INT1 and INT2 may alternatively be expressed, as illustrated in FIG. 58, by an angular interval $\theta i1$ or $\theta i2$ around the center defined on the rotating shaft 501 where $\theta i1 < \theta i2$).

In the structure illustrated in FIG. 58, the electrical modules 532 are placed in non-contact with each other in the circumferential direction of the rotating electrical machine 500, but however, they may be arranged in contact with each other in the circumferential direction except for the second interval INT2.

Referring back to FIG. 48, the end plate 547 of the bossed member 543 has formed therein the inlet/outlet port 574 in which ends of the inlet path 571 and the outlet path 572 are formed. The inlet path 571 and the outlet path 572 connect with the circulation path 575 through which the cooling water is circulated. The circulation path 575 is defined by a coolant pipe. The circulation path 575 has the pump 576 and the heat dissipating device 577 installed therein. The pump 576 is actuated to circulate the cooling water in the coolant path 545 and the circulation path 575. The pump 576 is implemented by an electrically powered pump. The heat dissipating device 577 is made of a radiator working to release thermal energy of the cooling water to air.

The stator 520 is, as illustrated in FIG. 50, arranged outside the outer peripheral wall WA1. The electrical modules 532 are arranged inside the outer peripheral wall WA1. Accordingly, thermal energy generated by the stator 520 is transferred to the outer peripheral wall WA1 from outside, while thermal energy generated by the electrical modules 532 is transferred to the outer peripheral wall WA1 from inside. The cooling water flowing through the coolant path 545, therefore, simultaneously absorbs the thermal energy generated by both the stator 520 and the electrical modules 532, thereby facilitating dissipation of heat from the rotating electrical machine 500.

The electrical structure of the power converter will be described below with reference to FIG. 59.

Figure 59:
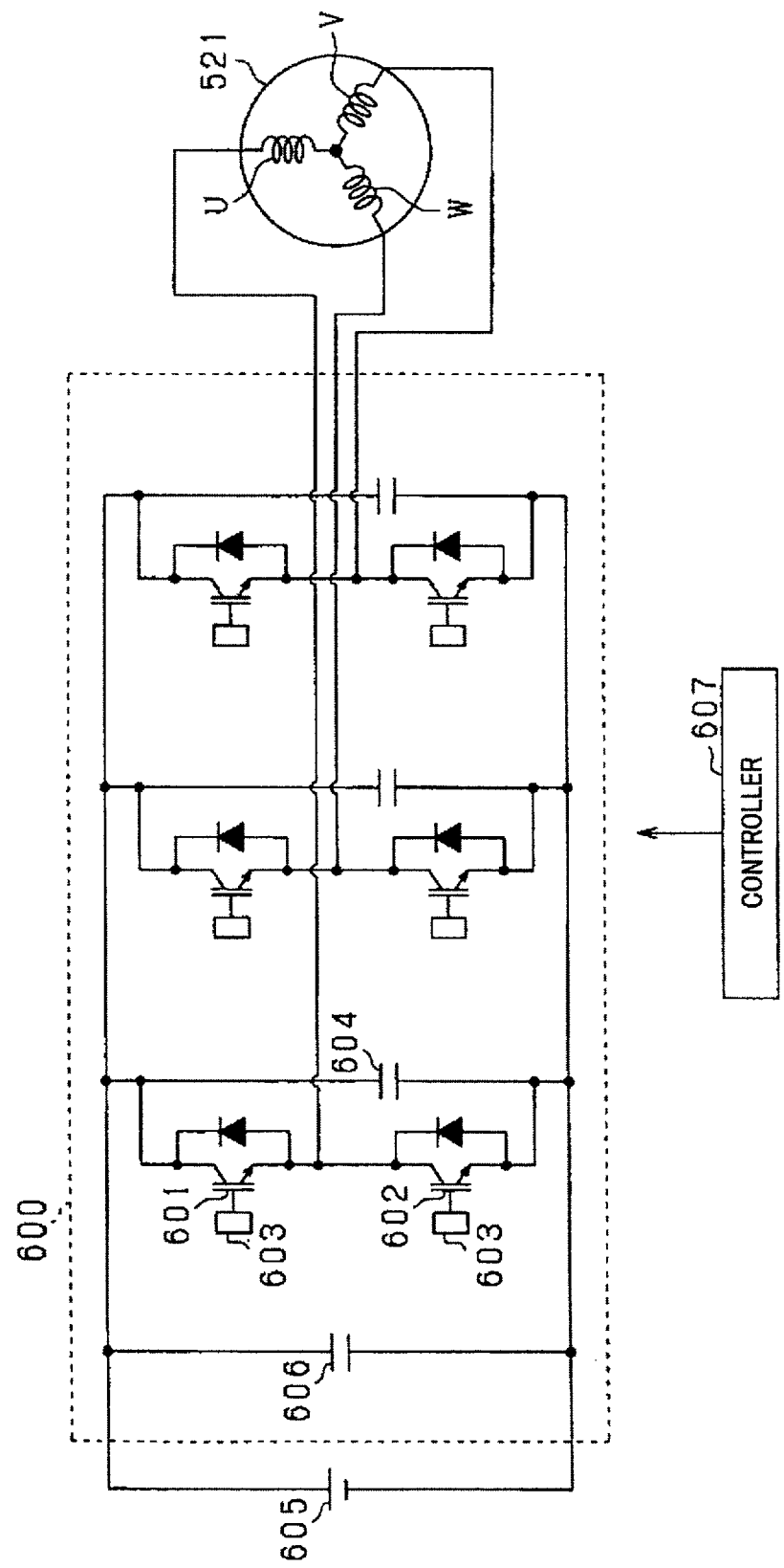
FIG. 59 is a circuit diagram which illustrates an electrical structure of a power converter.

The stator winding 521 is, as illustrated in FIG. 59, made up of a U-phase winding, a V-phase winding, and a W-phase winding. The stator winding 521 connects with the inverter 600. The inverter 600 is made of a bridge circuit having as many upper and lower arms as the phases of the stator winding 521. The inverter 600 is equipped with a series-connected part made up of the upper arm switch 601 and the lower arm switch 602 for each phase. Each of the switches 601 and 602 is turned on or off by a corresponding one of the driver circuits 603 to energize or deenergize a corresponding one of the phase windings. Each of the switches 601 and 602 is made of, for example, a semiconductor switch, such as a MOSFET or IGBT. The capacitor 604 is also connected to each of the series-connected parts made up of the switches 601 and 602 to output electrical charge required to achieve switching operations of the switches 601 and 602.

The control device 607 serves as a controller and is made up of a microcomputer equipped with a CPU and memories. The control device 607 analyzes information about parameters sensed in the rotating electrical machine 500 or a request for a motor mode or a generator mode in which the rotating electrical machine 500 operates to control switching operations of the switches 601 and 602 to excite or deexcite the stator winding 521. For instance, the control device 607 performs a PWM operation at a given switching frequency (i.e., carrier frequency) or an operation using a rectangular wave to turn on or off the switches 601 and 602. The control device 607 may be designed as a built-in controller installed inside the rotating electrical machine 500 or an external controller located outside the rotating electrical machine 500.

The rotating electrical machine 500 in this embodiment has a decreased electrical time constant because the stator 520 is engineered to have a decreased inductance. It is, therefore, preferable to increase the switching frequency (i.e., carrier frequency) and enhance the switching speed in the rotating electrical machine 500. In terms of such requirements, the capacitor 604 serving as a charge supply capacitor is connected parallel to the series-connected part made up of the switches 601 and 602 for each phase of the stator winding 521, thereby reducing the wiring inductance, which deals with electrical surges even through the switching speed is enhanced.

The inverter 600 is connected at a high potential terminal thereof to a positive terminal of the dc power supply 605 and at a low potential terminal thereof to a negative terminal (i.e., ground) of the dc power supply 605. The smoothing capacitor 606 is connected to the high and low potential terminals of the inverter 600 in parallel to the dc power supply 605.

Each of the switch modules 532A includes the switches 601 and 602 (i.e., semiconductor switching devices generating heat), the driver circuits 603 (i.e., electric devices constituting the driver circuits 603), and the charge supply capacitor 604. Each of the capacitor modules 532B includes the smoothing capacitor 606 generating heat. The structure of the switch modules 532A is shown in FIG. 60.

Figure 60:
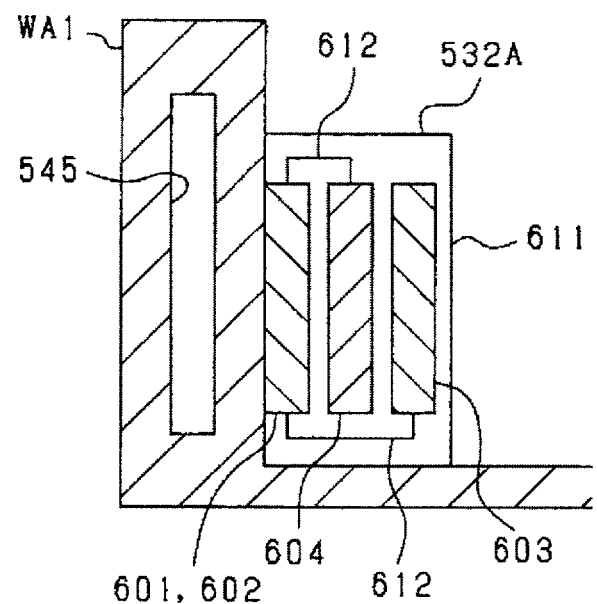
FIG. 60 is a sectional view which illustrates a cooling structure of a switch module.

Each of the switch modules 532A, as illustrated in FIG. 60, includes the module case 611, the switches 601 and 602 for one of the phases of the stator winding 521, the driver circuits 603, and the charge supply capacitor the charge supply capacitor 604. Each of the driver circuits 603 is made of a dedicated IC or a circuit board and installed in the switch module 532A.

The module case 611 is made from insulating material, such as resin. The module case 611 is secured to the outer peripheral wall WA1 with a side surface thereof contacting the inner peripheral surface of the inner wall 542 of the inverter unit 530. The module case 611 has, for example, resin molded therein. In the module case 611, the switches 601 and 602, the driver circuits 603, and the capacitor 604 are electrically connected together using wires 612. The switch modules 532A are, as described above, attached to the outer peripheral wall WA1 through the spacers 549, but however, FIG. 60 emits the spacers 549 for the brevity of illustration.

In a condition where the switch modules 532A are firmly attached to the outer peripheral wall WA1, a portion of each of the switch modules 532A which is closer to the outer peripheral wall WA1, i.e., the coolant path 545 is more cooled. In terms of such ease of cooling, the order in which the switches 601 and 602, the driver circuits 603, and the capacitor 604 are arranged is determined. Specifically, the switches 601 and 602 have the largest amount of heat generation. The capacitor 604 has an intermediate amount of heat generation. The driver circuits 603 have the smallest amount of heat generation. Accordingly, the switches 601 and 602 are located closest to the outer peripheral wall WA1. The driver circuits 603 are located farther away from the outer peripheral wall WA1. The capacitor 604 is interposed between the switches 601 and 602 and the driver circuit 603. In other words, the switches 601 and 602, the capacitor 604, the driver circuit 603 are arranged in this order close to the outer peripheral wall WA1. An area of each of the switch modules 532A which is attached to the inner wall 542 is preferably smaller in size than an area of the inner peripheral surface of the inner wall 542 which is contactable with the switch modules 532A.

Although not illustrated in detail, the capacitor modules 532B have the capacitor 606 disposed in a module case similar in configuration and size to the switch modules 532A. Each of the capacitor modules 532B is, like the switch modules 532A, secured to the outer peripheral wall WA1 with the side surface of the module case 611 placed in contact with the inner peripheral surface of the inner wall 542 of the inverter housing 531.

The switch modules 532A and the capacitor modules 532B need not necessarily be arranged coaxially with each other inside the outer peripheral wall WA1 of the inverter housing 531. For instance, the switch modules 532A may alternatively be disposed radially inside or outside the capacitor modules 532B.

When the rotating electrical machine 500 is operating, the switch modules 532A and the capacitor modules 532B transfer heat generated therefrom to the coolant path 545 through the inner wall 542 of the outer peripheral wall WA1, thereby cooling the switch modules 532A and the capacitor modules 532B.

Figure 61A:
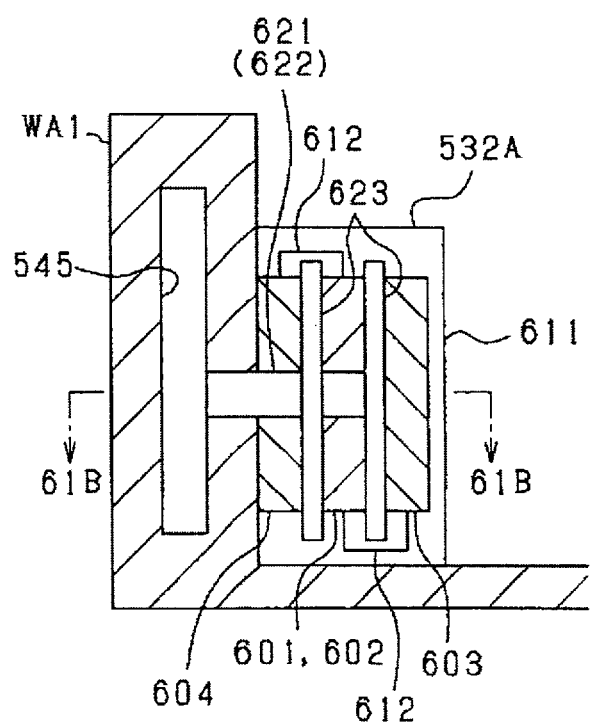
FIGS. 61(a) and 61(b) are sectional views which illustrate a cooling structure of a switch module.
Figure 61B:
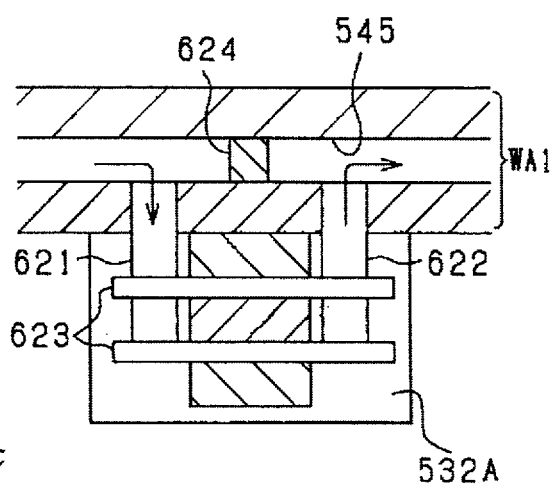

Each of the electrical modules 532 may be designed to have formed therein a flow path into which coolant is delivered to cool the electrical module 532. The cooling structure of the switch modules 532A will be described below with reference to FIGS. 61(a) and 61(b). FIG. 61(a) is a longitudinal sectional view of each of the switch modules 532A along a line passing through the outer peripheral wall WA1. FIG. 61(b) is a sectional view taken along the line 61B-61B in FIG. 61(a).

Like in FIG. 60, the switch module 532A, as illustrated in FIGS. 61(a) and 61(b), includes the module case 611, the switches 601 and 602 for a corresponding one of the phases of the stator winding 521, the driver circuits 603, the capacitor 604, and a cooling device made of a pair of pipes 621 and 622 and the coolers 623. The pipe 621 of the cooling device is designed as an inlet pipe through which cooling water is delivered from the coolant path 545 in the outer peripheral wall WA1 to the coolers 623. The pipe 622 of the cooling device is designed as an outlet pipe through which the cooling water is discharged from the coolers 623 to the coolant path 545. The cooler 623 is prepared for an object to be cooled. The cooling device may, therefore, be designed to have a single cooler 623 or a plurality of coolers 623. In the structure shown in FIGS. 61(a) and 61(b), the two coolers 623 are arranged at a given interval away from each other in a direction perpendicular to the length of the coolant path 545, in other words, the radial direction of the inverter unit 530. The pipes 621 and 622 connect with the coolers 623. Each of the coolers 623 has an inner void. Each of the coolers 623 may be equipped with inner fins for enhancing the cooling ability.

In the structure equipped with the two coolers 623 which will also be referred to as a first cooler 623 and a second cooler 623 where the first cooler 623 is located closer to the outer peripheral wall WA1 than the second cooler 623 is, a first space between the first cooler 623 and the outer peripheral wall WA1, a second space between the first and second coolers 623, and a third space located inside the second cooler 623 away from the outer peripheral wall WA1 are locations where electrical devices are disposed. The second space, the first space, and the third space have a higher degree of cooling capability in this order. In other words, the second space is a location which has the highest degree of cooling ability. The first space close to the outer peripheral wall WA1 (i.e., the coolant path 545) is higher in cooling capability than the third space farther away from the outer peripheral wall WA1. In view of this relation in cooling capability, the switches 601 and 602 are arranged in the second space between the first and second coolers 623. The capacitor 604 is arranged in the first space between the first cooler 623 and the outer peripheral wall WA1. The driver circuits 603 are arranged in the third space located farther away from the outer peripheral wall WA1. Although not illustrated, the driver circuits 603 may alternatively be disposed in the first space, while the capacitor 604 may be disposed in the third space.

In either case, in the module case 611, the switches 601 and 602 are electrically connected to the driver circuits 603 using the wires 612, while the switches 601 and 602 are connected to the capacitor 604 using the wires 612. The switches 601 and 602 are located between the driver circuits 603 and the capacitor 604, so that the wires 612 extending from the switches 601 and 602 to the driver circuit 603 are oriented in a direction opposite a direction in which the wires 612 extending from the switches 601 and 602 to the capacitor 604.

The pipes 621 and 622 are, as can be seen in FIG. 61(b), arranged adjacent each other in the circumferential direction, that is, from an upstream side to a downstream side of the coolant path 545. The cooling water, therefore, enters the coolers 623 from the pipe 621 located on the upstream side and is then discharged from the pipe 622 located on the downstream side. The stopper 624 is preferably disposed between the inlet pipe 621 and the outlet pipe 621 in the coolant path 545 to stop flow of the cooling water in order to facilitate entry of cooling water into the cooling device. The stopper 624 may be designed as a shutter or block to close the coolant path 545 or an orifice to decrease a transverse sectional area of the coolant path 545.

Figure 62A:
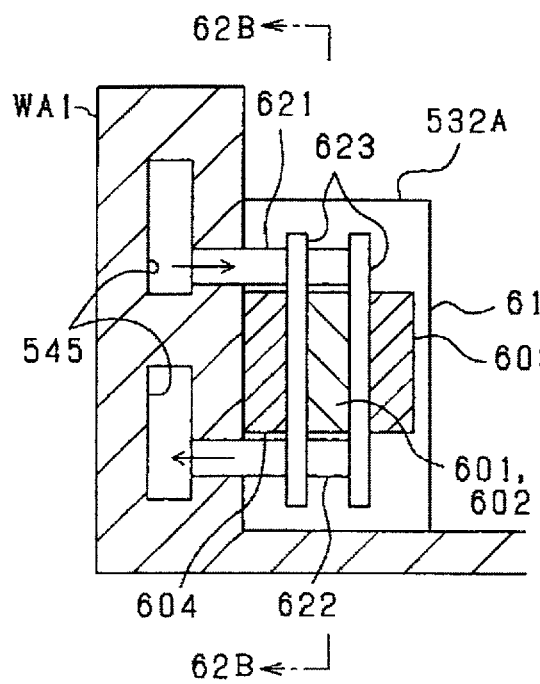
FIGS. 62(a), 62(b), and 62(c) are partial views which illustrate a cooling structure of a switch module.
Figure 62B:
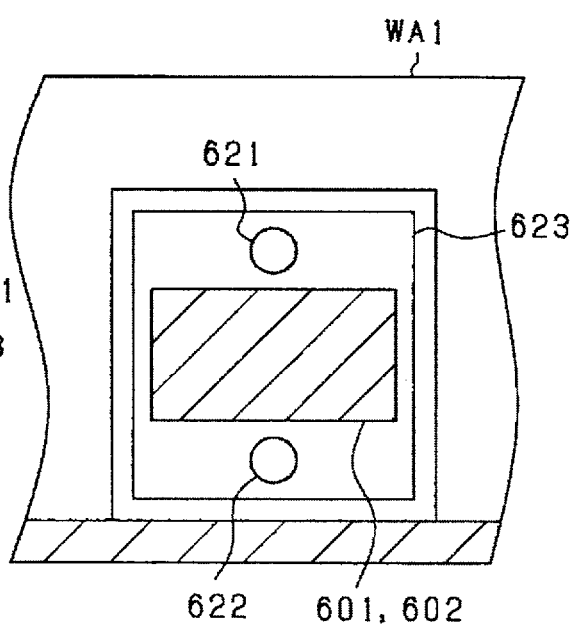
Figure 62C:
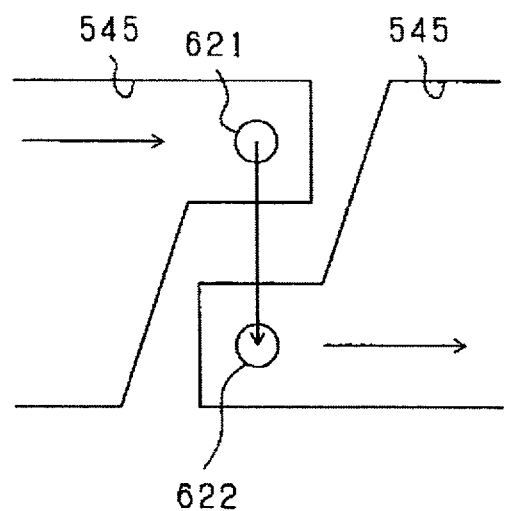

FIGS. 62(a) to 62(c) illustrate a modified form of the cooling structure of the switch modules 532A. FIG. 62(a) is a longitudinal section of the switch module 532A along a line traversing the outer peripheral wall WA1. FIG. 62(b) is a sectional view taken along the line 62B-62B in FIG. 62(a).

The structure in FIGS. 62(a) and 62(b) has the inlet pipe 621 and the outlet pipe 622 which are different in layout from those illustrated in FIGS. 62(a) and 62(b). Specifically, the inlet and outlet pipes 621 and 622 are arranged adjacent each other in the axial direction. The coolant path 545, as clearly illustrated in FIG. 62(c), includes an inlet section leading to the inlet pipe 621 and an outlet section leading to the outlet pipe 622. The inlet section and the outlet section are physically separate from each other in the axial direction and hydraulically connected through the pipes 621 and 622 and the coolers 623.

Each of the switch modules 532A may alternatively be designed to have one of the following structures.

Figure 63A:
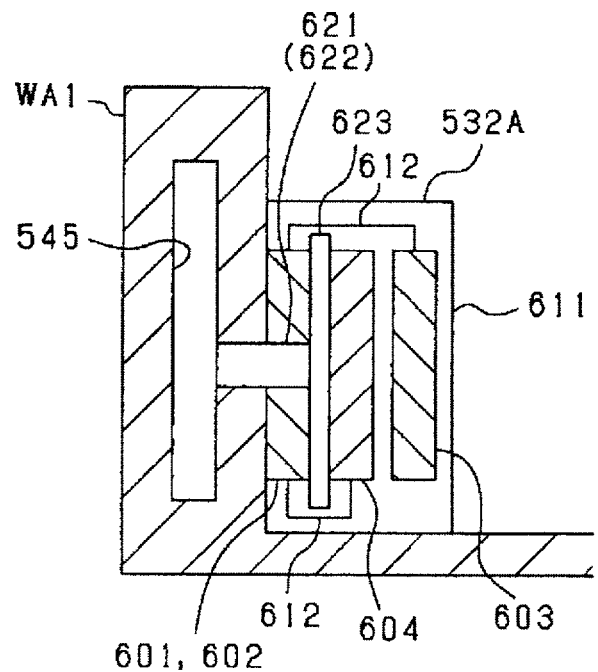
FIGS. 63(a) and 63(b) are partially sectional views each of which illustrates a cooling structure of a switch module.

The structure in FIG. 63(a) is, unlike in FIG. 61(a), equipped with the single cooler 263. In the module case 611, a space (which will be referred to as a first space) between the cooler 623 and the outer peripheral wall WA1 in the radial direction of the module case 611 has a higher degree of cooling capability. A space (which will be referred to as a second space) located inside the cooler 623 farther away from the outer peripheral wall WA1 has a lower degree of cooling capability. In view of this relation in cooling capability, the structure in FIG. 63(a) has the switches 601 and 602 arranged in the first space close to the outer peripheral wall WA1 outside the cooler 623. The capacitor 604 is arranged in the second space located inside the cooler 623. The driver circuits 603 are disposed farther away from the cooler 623.

Each of the switch modules 532A is, as described above, designed to have the switches 601 and 602, the driver circuits 603, and the capacitor 604 disposed within the module case 611 for one of the phases of the stator winding 521, but may be modified to have the switches 601 and 602 and the driver circuits 603 or the capacitor 604 disposed in the module case 611 for one of the phases of the stator winding 521.

Figure 63B:
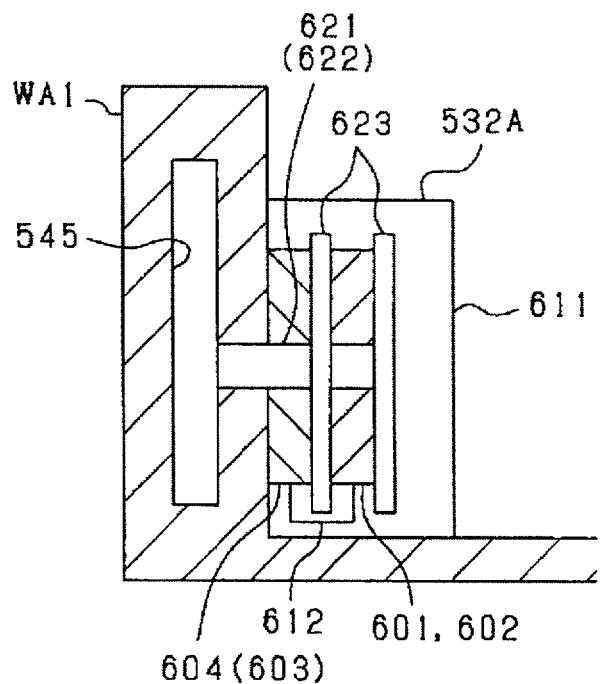

In FIG. 63(b), the module case 611 has the inlet pipe 621, the outlet pipe 622, and the two coolers 623 mounted therein. One of the coolers 623 located closer to the outer peripheral wall WA1 will be referred to as a first cooler. One of the coolers 623 located farther away from the outer peripheral wall WA1 will be referred to as a second cooler. The switches 601 and 602 are arranged between the first and second coolers 623. The capacitor 604 or the driver circuits 603 are arranged close to the outer peripheral wall WA1 outside the first cooler 623. The switches 601 and 602 and the driver circuit 603 are assembled as a single semiconductor module which is disposed in the module case 611 along with the capacitor 604.

In the structure of the switch module 532A illustrated in FIG. 63(b), the capacitor 604 is located outside or inside one of the first and second coolers 623 on the opposite side of the one of the first and second coolers 623 to the switches 601 and 602. In the illustrated example, the capacitor 604 is located between the first cooler 623 and the outer peripheral wall WA1. The switch module 532A may alternatively be designed to have two capacitors 604 disposed on the both sides of the first cooler 623 in the radial direction of the stator winding 521.

The structure in this embodiment delivers cooling water into only the switch modules 532A other than the capacitor module 532B through the coolant path 545, but may alternatively be designed to supply the cooling water to both the modules 532A and 532B through the coolant path 545.

Figure 64:
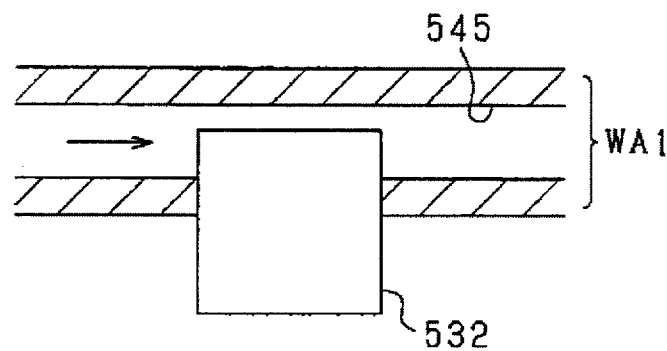
FIG. 64 is a partial view which illustrates a cooling structure of a switch module.

It is also possible to bring cooling water into direct contact with the electrical modules 532 to cool them. For instance, the electrical modules 532 may be, as illustrated in FIG. 64, embedded in the outer peripheral wall WA1 to achieve a direct contact of the outer surface of the electrical modules 532 with the cooling water. In this case, each of the electrical modules 532 may be partially exposed to the cooling water flowing in the coolant path 545. Alternatively, the coolant path 545 may be shaped to have a size increased to be larger than that in FIG. 58 in the radial direction to arrange the electrical modules 532 fully within the coolant path 545. In the case where the electrical modules 532 are embedded in the coolant path 545, the module case 611 of each of the electrical modules 532 may be equipped with fins disposed in the coolant path 545, that is, exposed to the cooling water to enhance the ability to cool the electrical modules 532.

The electrical modules 532, as described above, include the switch modules 532A and the capacitor modules 532B which are different in amount of heat generation from the switch modules 532A. In terms of such a difference, it is possible to modify the layout of the electrical modules 532 in the inverter housing 531 in the following way.

Figure 65:
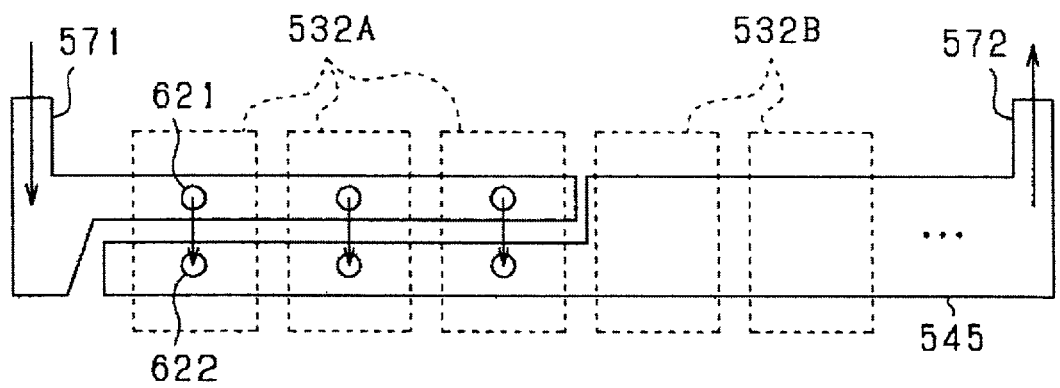
FIG. 65 is a view which illustrates layout of electrical modules and a coolant path.

For instance, the switch modules 532A are, as illustrated in FIG. 65, arranged away from each other in the circumferential direction of the stator 520 and located as a whole closer to the upstream side of the coolant path 545 (i.e., the inlet path 571) than to the downstream side (i.e., the outlet path 572) of the coolant path 545. The cooling water entering the inlet path 571 is first used to cool the switch modules 532A and then used to cool the capacitor modules 532B. In the structure illustrated in FIG. 65, the inlet and outlet pipes 621 and 622 are, like in FIGS. 62(a) and 62(b), arranged adjacent each other in the axial direction, but however, may be, like in FIGS. 61(a) and 61(b), oriented adjacent each other in the circumferential direction.

Figure 66:
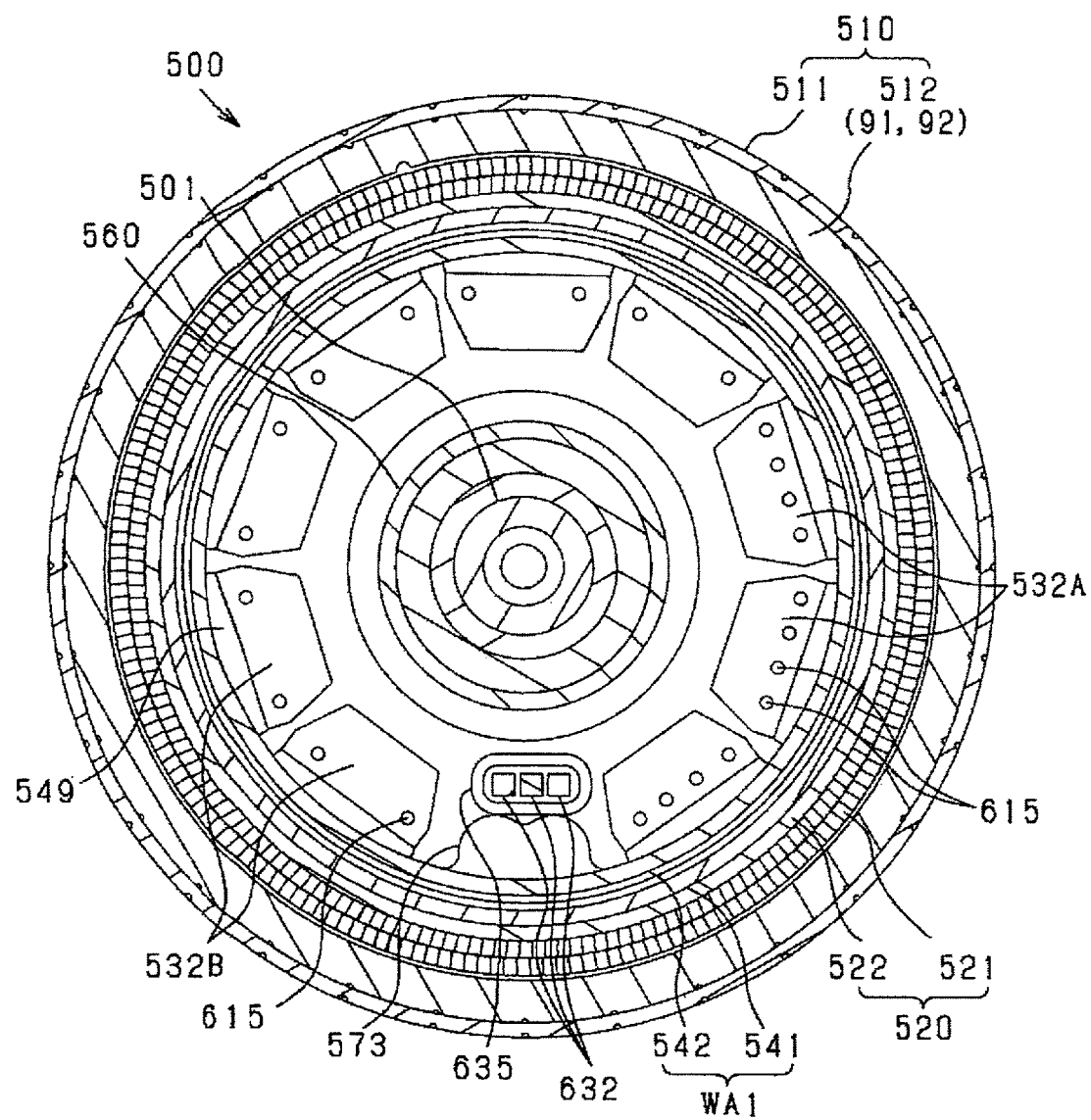
FIG. 66 is a sectional view taken along the line 66-66 in FIG. 49.
Figure 67:
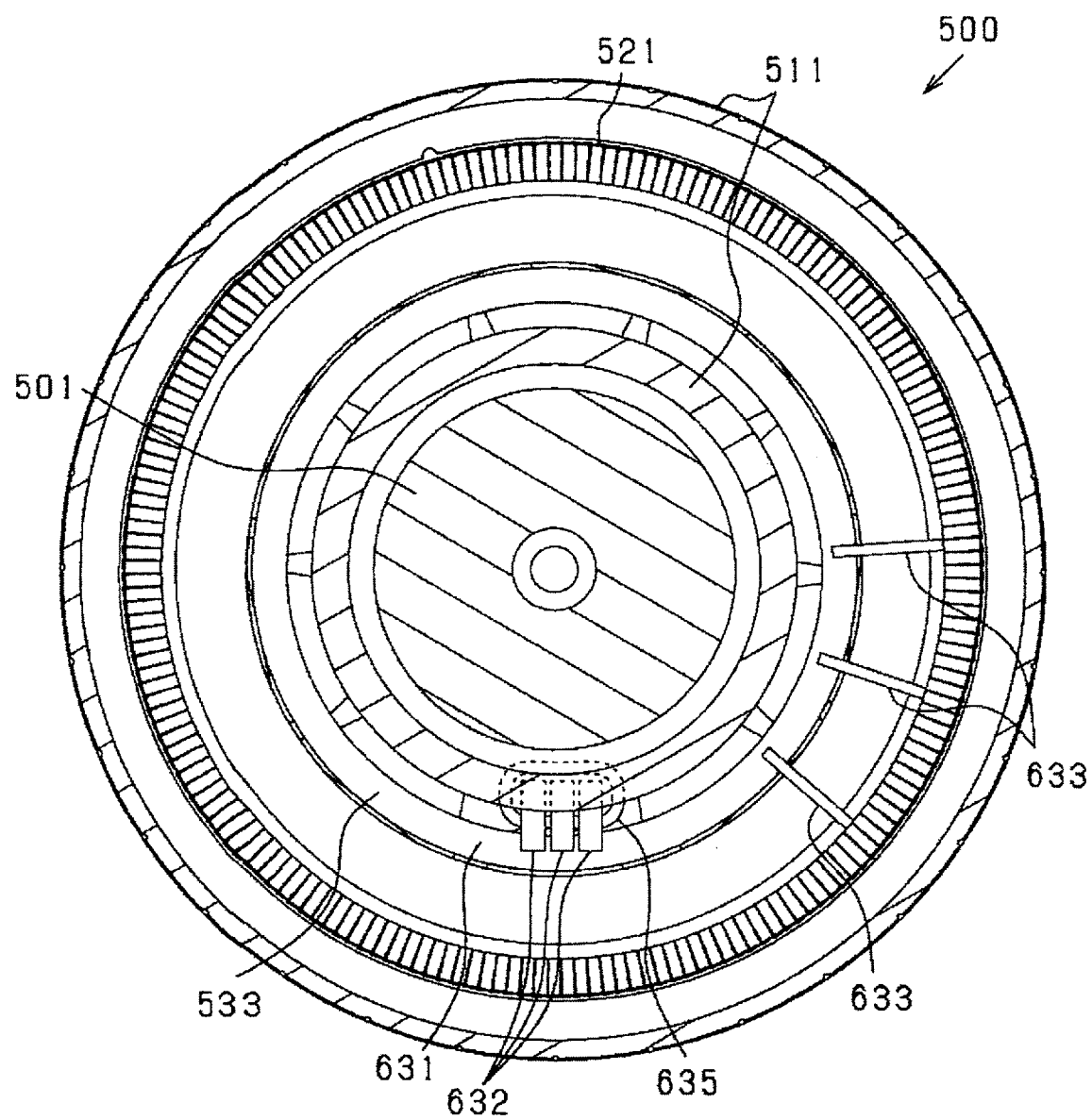
FIG. 67 is a sectional view taken along the line 67-67 in FIG. 49.
Figure 68:
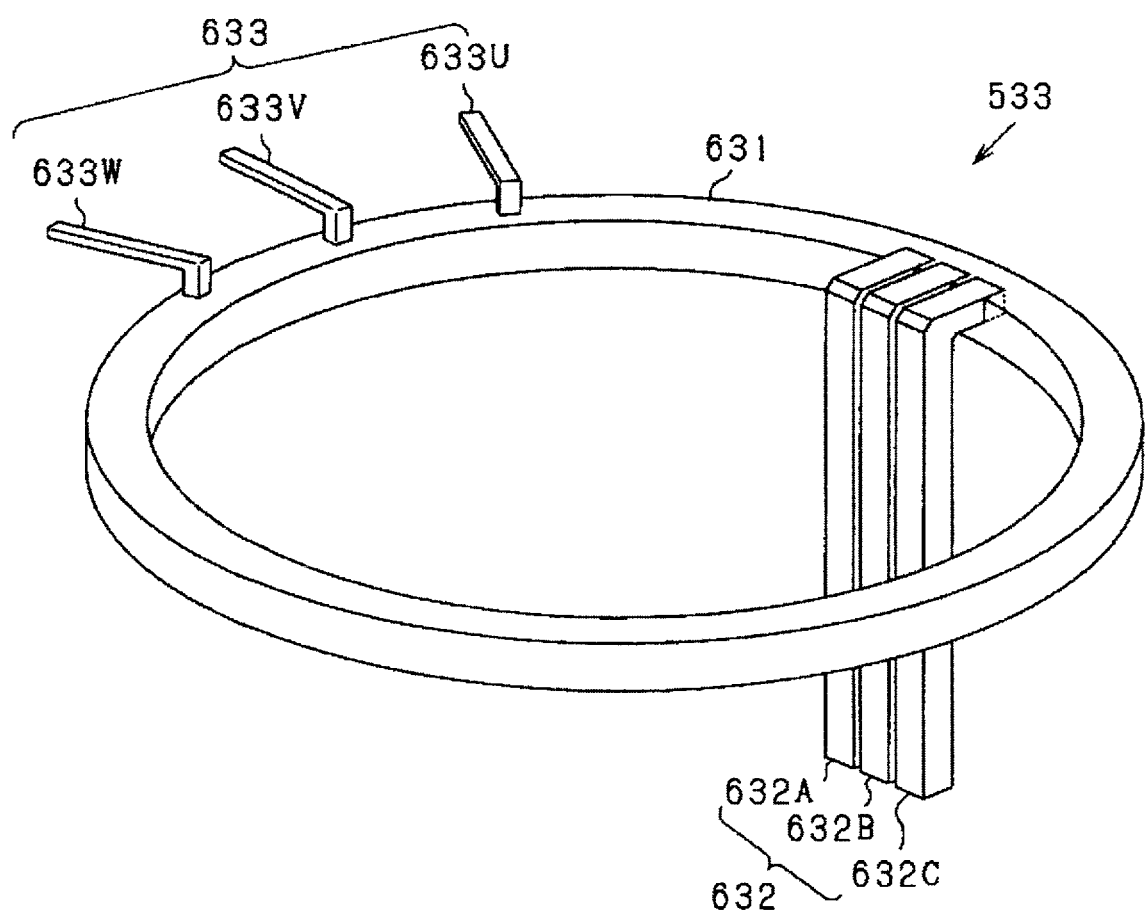
FIG. 68 is a perspective view which illustrates a bus bar module.

The electrical structure of the electrical modules 532 and the bus bar module 533 will be described below. FIG. 66 is a transverse section taken along the line 66-66 in FIG. 49. FIG. 67 is a transverse section taken along the line 67-67 in FIG. 49. FIG. 68 is a perspective view which illustrates the bus bar module 533. Electrical connections of the electrical modules 532 and the bus bar module 533 will be discussed with reference to FIGS. 66 to 68.

The inverter housing 531 has the three switch modules 532A (which will also be referred to below as a first module group) which are, as illustrated in FIG. 66, arranged adjacent each other circumferentially next to the bulging portion 573 on the inner wall 542 in which the inlet path 571 and the outlet path 572 are formed in communication with the coolant path 545. The six capacitor modules 532B are also arranged circumferentially adjacent each other next to the first module group. In summary, the inverter housing 531 has ten regions (i.e., the number of the modules 532A and 532B plus one) defined on the inner peripheral surface of the outer peripheral wall WA1. The ten regions are arranged adjacent each other in the circumferential direction of the inverter housing 531. The electrical modules 532 are disposed, one in each of ninth of the regions, while the bulging portion 573 occupies the remaining one of the regions. The three switch modules 532A will also be referred to as a U-phase module, a V-phase module, and a W-phase module.

Each of the electrical modules 532 (i.e., the switch modules 532A and the capacitor modules 532B) is, as illustrated in FIGS. 66, 56, and 57, equipped with a plurality of module terminals 615 extending from the module case 611. The module terminals 615 serve as input/output terminals through which electrical signals are inputted into or outputted from the electrical modules 532. The module terminals 615 each have a length extending in the axial direction of the inverter housing 531. More specifically, the module terminals 615, as can be seen in FIG. 51, extend from the module case 611 toward the bottom of the rotor carrier 511 (i.e., the outside of the vehicle).

The module terminals 615 of the electrical modules 532 are connected to the bus bar module 533. The switch modules 532A and the capacitor modules 532B are different in number of the module terminals 615 from each other. Specifically, each of the switch modules 532A is equipped with the four module terminals 615, while each of the capacitor modules 532B is equipped with the two module terminals 615.

The bus bar module 533, as clearly illustrated in FIG. 68, includes the annular ring 631, the three external terminals 632, and the winding connecting terminals 633. The external terminals 632 extend from the annular ring 631 and achieve connections with external devices, such as a power supply and an ECU (Electronic Control Unit). The winding connecting terminals 633 are connected to ends of the phase windings of the stator winding 521. The bus bar module 533 will also be referred to as a terminal module.

The annular ring 631 is located radially inside the outer peripheral wall WA1 of the inverter housing 531 and adjacent one of axially opposed ends of each of the electrical modules 532. The annular ring 631 includes an annular body made from an insulating material, such as resin, and a plurality of bus bars embedded in the annular body. The bus bars connect with the module terminals 615 of the electrical modules 532, the external terminals 632, and the phase windings of the stator winding 521, which will be also described later in detail.

The external terminals 632 include the high-potential power terminal 632A connecting with a power unit, the low-potential power terminal 632B connecting with the power unit, and the single signal terminal 632C connecting with the external ECU. The external terminals 632 (i.e., 632A to 632C) are arranged adjacent each other in the circumferential direction of the annular ring 631 and extend in the axial direction of the annular ring 631 radially inside the annular ring 631. The bus bar module 533 is, as illustrated in FIG. 51, mounted in the inverter housing 531 together with the electrical modules 532. Each of the external terminals 632 has an end protruding outside the end plate 547. Specifically, the end plate 547 of the bossed member 543, as illustrated in FIGS. 56 and 57, has the hole 547a formed therein. The cylindrical grommet 635 is fit in the hole 547a. The external terminals 632 pass through the grommet 635. The grommet 635 also functions as a hermetically sealing connector.

Figure 70:
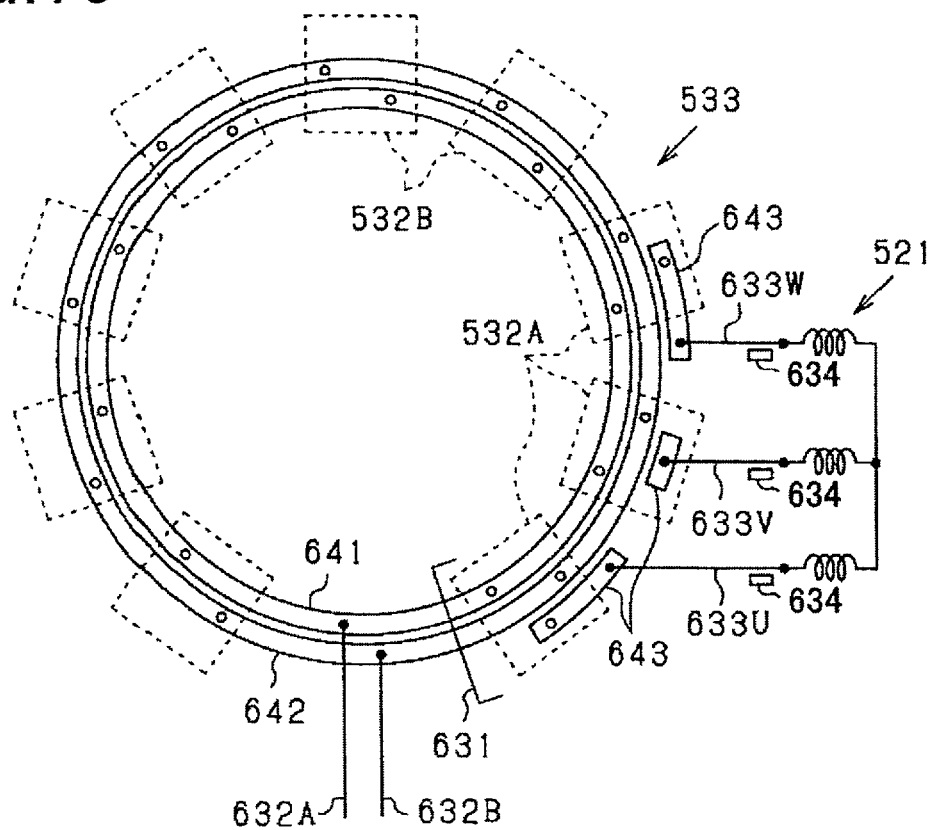
FIG. 70 is a view which illustrates electrical connections between electrical modules and a bus bar module.

The winding connecting terminals 633 connect with ends of the phase windings of the stator winding 521 and extend radially outward from the annular ring 631. Specifically, the winding connecting terminals 633 include the winding connecting terminal 633U connecting with the end of the U-phase winding of the stator winding 521, the winding connecting terminal 633V connecting with the end of the V-phase winding of the stator winding 521, and the winding connecting terminal 633W connecting with the end of the W-phase winding of the stator winding 521. Each of the winding connecting terminals 633 is, as illustrated in FIG. 70, the current sensor 634 which measure an electrical current flowing through a corresponding one of the U-phase winding, the V-phase winding, and the W-phase winding.

The current sensor 634 may be arranged outside the electrical module 532 around the winding connecting terminal 633 or installed inside the electrical module 532.

Figure 69:
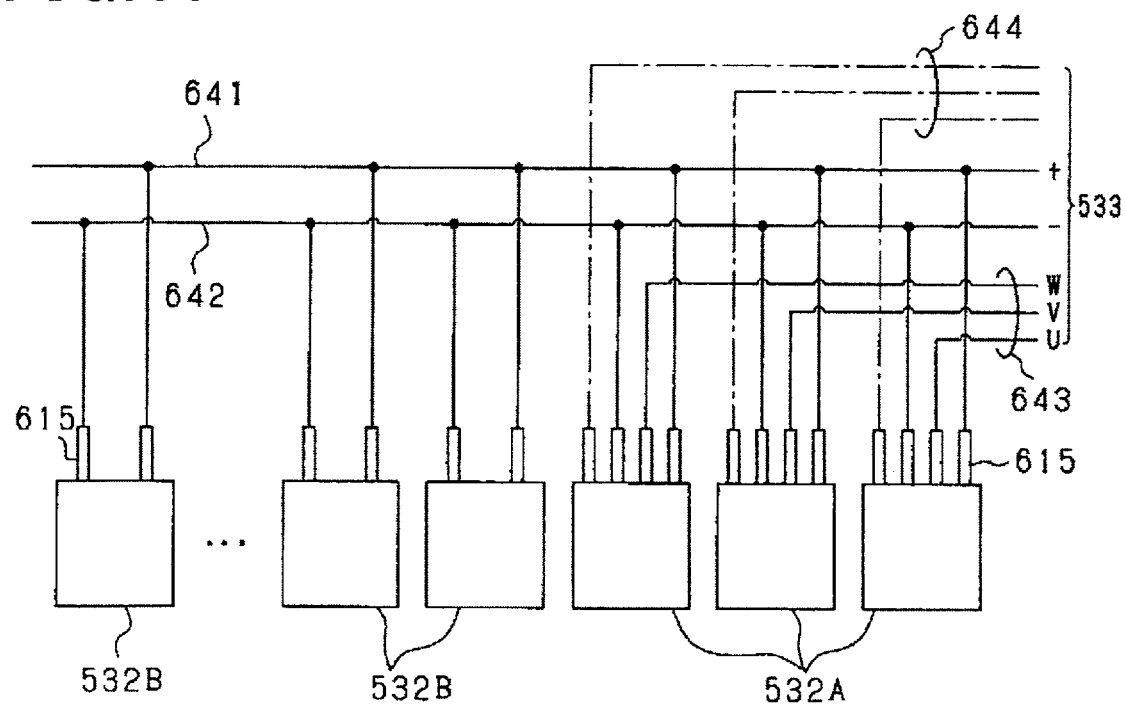
FIG. 69 is a circuit diagram which illustrates a relation in electrical connection between electrical modules and a bus bar module.

Connections between the electrical modules 532 and the bus bar module 533 will be described below in detail with reference to FIGS. 69 and 70. FIG. 69 is a development view of the electrical modules 532 which schematically illustrates electrical connections of the electrical modules 532 with the bus bar module 533. FIG. 70 is a view which schematically illustrate electrical connections of the electrical modules 532 arranged in an annular shape with the bus bar module 533. In FIG. 69, power supply lines are expressed by solid lines, while signal transmission lines are expressed by chain lines. FIG. 70 shows only the power supply lines.

The bus bar module 533 includes the first bus bar 641, the second bus bar 642, and the third bus bars 643 as power supply bus bars. The first bus bar 641 is connected to the high-potential power terminal 632A. The second bus bar 642 is connected to the low-potential power terminal 632B. The three third bus bars 643 are connected to the U-phase winding connecting terminals 633U, the V-phase winding connecting terminals 633V, and the W-phase winding connecting terminals 633W.

The winding connecting terminals 633 and the third bus bars 643 usually generate heat due to the operation of the rotating electrical machine 10. A terminal block, not shown, may, therefore, be disposed between the winding connecting terminals 633 and the third bus bars 643 in contact with the inverter housing 531 equipped with the coolant path 545. Alternatively, the winding connecting terminals 633 and/or the third bus bars 643 may be bent in a crank form to achieve physical contact with the inverter housing 531 equipped with the coolant path 545.

The above structure serves to release heat generated by the winding connecting terminals 633 or the third bus bars 643 to cooling water flowing in the coolant path 545.

FIG. 70 depicts the first bus bar 641 and the second bus bar 642 as completely circular bus bars, but however, may alternatively be of a C-shape. Each of the winding connecting terminals 633U, 633V, and 633W may alternatively be connected directly to a corresponding one of the switch modules 532A (i.e., the module terminals 615) without use of the bus bar module 533.

Each of the switch modules 532A is equipped with the four module terminals 615 including a positive terminal, a negative terminal, a winding terminal, and a signal terminal. The positive terminal is connected to the first bus bar 641. The negative terminal is connected to the second bus bar 642. The winding terminal is connected to one of the third bus bars 643.

The bus bar module 533 is also equipped with the fourth bus bars 644 as signal transmission bus bars. The signal terminal of each of the switch modules 532A is connected to one of the fourth bus bars 644. The fourth bus bar 644 are connected to the signal terminal 632C.

In this embodiment, each of the switch modules 532A receives a control signal transmitted from an external ECU through the signal terminal 632C. Specifically, the switches 601 and 602 in each of the switch modules 532A are turned on or off in response to the control signal inputted through the signal terminal 632C. Each of the switch modules 532A is, therefore, connected to the signal terminal 632C without passing through a control device installed in the rotating electrical machine 500. The control signals may alternatively be, as illustrated in FIG. 71, produced by the control device of the rotating electrical machine 500 and then inputted to the switch modules 532A.

Figure 71:
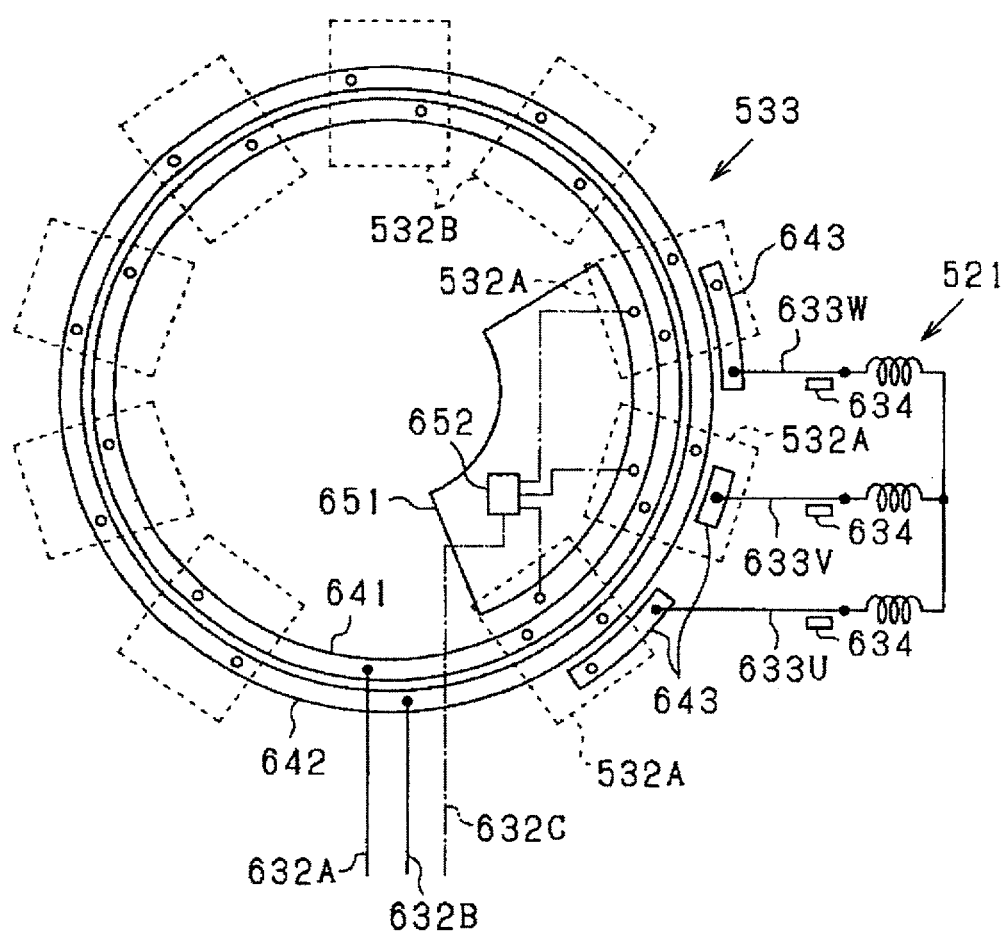
FIG. 71 is a view which illustrates electrical connections between electrical modules and a bus bar module.

The structure of FIG. 71 has the control board 651 on which the control device 652 is mounted. The control device 652 is connected to the switch modules 532A. The signal terminal 632C is connected to the control device 652. For instance, an external ECU serving as a host control device outputs a command signal associated with the motor mode or the generation mode to the control device 652. The control device 652 then controls on-off operations of the switches 601 and 602 of each of the switch modules 532A.

In the inverter unit 530, the control board 651 may be arranged closer to the outside of the vehicle (i.e., the bottom of the rotor carrier 511) than the bus bar module 533 is. The control board 651 may alternatively be disposed between the electrical modules 532 and the end plate 547 of the bossed member 543. The control board 651 may be located to overlap at least a portion of each of the electrical modules 532 in the axial direction.

Each of the capacitor modules 532B is equipped with two module terminals 615 serving as a positive terminal and a negative terminal. The positive terminal is connected to the first bus bar 641. The negative terminal is connected to the second bus bar 642.

Referring back to FIGS. 49 and 50, the inverter housing 531 has disposed therein the bulging portion 573 which is equipped with the inlet path 571 and the outlet path 572 for cooling water. The inlet path 571 and the outlet path 572 are aligned with the electrical modules 532 arranged adjacent each other in the circumferential direction of the inverter housing 531. The external terminals 632 are arranged adjacent the bulging portion 573 in the radial direction of the inverter housing 531. In other words, the bulging portion 573 and the external terminals 632 are located at the same angular position in the circumferential direction of the inverter housing 531. In this embodiment, the external terminals 632 are disposed radially inside the bulging portion 573. As the inverter housing 531 is viewed from inside the vehicle, the inlet/outlet port 574 and the external terminals 632 are, as clearly illustrated in FIG. 48, aligned with each other in the radial direction of the end plate 547 of the bossed member 543.

The bulging portion 573 and the external terminals 632 are arranged adjacent the electrical modules 532 in the circumferential direction, thereby enabling the inverter unit 530 to be reduced in size, which also enables the rotating electrical machine 500 to be reduced in size.

Referring back to the structure of the tire wheel assembly 400 in FIGS. 45 and 47, the cooling pipe H2 is joined to the inlet/outlet port 574. The electrical cable H1 is joined to the external terminals 632. The electrical cable H1 and the cooling pipe H2 are arranged inside the storage duct 440.

In the inverter housing 531, the three switch modules 532A are arranged adjacent each other next to the external terminals 632 in the circumferential direction. The six capacitor modules 532B are arranged next to the array of the switch modules 532A in the circumferential direction. Such layout may be modified in the following way. For instance, the array of the three switch modules 532A may be arranged at a location farthest away from the external terminals 632, that is, diametrically opposed to the external terminals 632 across the rotating shaft 501. Alternatively, the switch modules 532A may be arranged at an increased interval away from each other in the circumferential direction, so that the capacitor modules 532B may be disposed between the switch modules 532A.

The layout of the switch modules 532A located farthest away from the external terminals 632, that is, diametrically opposed to the external terminals 632 across the rotating shaft 501 minimizes a risk of failure in operation of the switch modules 532A caused by mutual inductance between the external terminals 632 and the switch modules 532A.

Next, the structure of the resolver 660 working as an angular position sensor will be described below.

The inverter housing 531, as illustrated in FIGS. 49 to 51, has disposed therein the resolver 660 which measures the electrical angle θ of the rotating electrical machine 500. The resolver 660 functions as an electromagnetic induction sensor and includes the resolver rotor 661 secured to the rotating shaft 501 and the resolver stator 662 which radially faces an outer circumference of the resolver rotor 661. The resolver rotor 661 is made of a ring-shaped disc fit on the rotating shaft 501 coaxially with the rotating shaft 501. The resolver stator 662 includes the circular stator core 663 and the stator coil 664 wound around teeth of the stator core 663. The stator coil 664 includes a single-phase exciting coil and two-phase output coils.

The exciting coil of the stator coil 664 is energized by a sine wave excitation signal to generate magnetic flux which interlinks with the output coils. This causes a positional relation of the exciting coil with the two output coils to be changed cyclically as a function of an angular position of the resolver rotor 661 (i.e., a rotation angle of the rotating shaft 501), so that the number of magnetic fluxes interlining with the output coils is changed cyclically. In this embodiment, the exciting coil and the output coils are arranged so that voltages, as developed at the output coils, are out of phase by π/2. Output voltage generated by the output coils will, therefore, be waves derived by modulating the excitation signal with modulating waves sin θ and cos θ. Specifically, if the excitation signal is expressed by sin Ωt, the modulated waves will be sin θ×sin Ωt and cos θ×sin Ωt.

The resolver 660 is equipped with a resolver digital converter. The resolver digital converter works to perform wave detection using the modulated wave and the excitation signal to calculate the electrical angle θ. For instance, the resolver 660 is connected to the signal terminal 632C. An output of the resolver digital converter is inputted to an external device through the signal terminal 632C. In a case where a control device is installed in the rotating electrical machine 500, the output of the resolver digital converter is inputted to the control device.

The structure of the resolver 660 installed in the inverter housing 531 will be described below.

The bossed member 543 of the inverter housing 531, as illustrated in FIGS. 49 and 51, has formed thereon the hollow cylindrical boss 548. The boss 548 has the protrusion 548a formed on an inner periphery thereof in the shape of an inner shoulder. The protrusion 548a projects in a direction perpendicular to the axial direction of the inverter housing 531. The resolver stator 662 is secured using screws in contact with the protrusion 548a. In the boss 548, the bearing 650 is arranged on an opposite side of the protrusion 548a to the resolver 660.

Within the boss 548, the housing cover 666 is arranged on an opposite side of the resolver 660 to the protrusion 548a in the axial direction. The housing cover 666 is made of an annular ring-shaped disc and closes an inner chamber of the boss 548 in which the resolver 660 is disposed. The housing cover 666 is made from an electrically conductive material, such as a carbon fiber reinforced plastic (CFRP). The housing cover 666 has formed in the center thereof the center hole 666a through which the rotating shaft 501 passes. The center hole 666a, as clearly illustrated in FIG. 49, has disposed therein the sealing member 667 which hermetically seal an air gap between the center hole 666a and the outer periphery of the rotating shaft 501. The sealing member 667 hermetically seals the inner chamber of the boss 548 in which the resolver 660 is disposed. The sealing member 667 may be designed as a slidable seal made from resin.

The inner chamber in which the resolver 660 is disposed is surrounded or defined by the annular boss 548 of the bossed member 543 and which has axially-opposed ends closed by the bearing 560 and the housing cover 666. The outer circumference of the resolver 660 is, therefore, surrounded by the conductive material, thereby minimizing adverse effects of electromagnetic noise on the resolver 660.

The inverter housing 531 is, as described above in FIG. 57, designed to have a double-walled structure equipped with the outer peripheral wall WA1 and the inner peripheral wall WA2. The stator 520 is arranged radially outside the outer peripheral wall WA1. The electrical modules 532 are arranged between the outer peripheral wall WA1 and the inner peripheral wall WA2. The resolver 660 is disposed radially inside the inner peripheral wall WA2. The inverter housing 531 is made from conductive material. The stator 520 and the resolver 660 are, therefore, isolated from each other through a conductive wall (i.e., a conductive double wall), that is, the outer peripheral wall WA1 and the inner peripheral wall WA2, thereby minimizing a risk of magnetic interference between the stator 520 (i.e., the magnetic circuit) and the resolver 660.

The rotor cover 670 which is arranged in the open end of the rotor carrier 511 will be described below in detail.

The rotor carrier 511, as illustrated in FIGS. 49 and 50, has the end open in the axial direction. The rotor cover 670 which is made of a substantially ring-shaped disc is disposed on the open end, i.e., partially covers the open end. The rotor cover 670 is secured to the rotor carrier 511 using, for example, welding techniques or vises (i.e., screws). The rotor cover 670 is preferably shaped to have a portion smaller in size (i.e. diameter) than the inner periphery of the rotor carrier 511 to hold the magnet unit 512 from moving in the axial direction. The rotor cover 670 has an outer diameter identical with that of the rotor carrier 511, but has an inner diameter slightly greater than an outer diameter of the inverter housing 531. The outer diameter of the inverter housing 531 is equal to the inner diameter of the stator 520.

The stator 520 is, as described above, attached to the outer circumference of the inverter housing 531. Specifically, the stator 520 and the inverter housing 531 joined together. The inverter housing 531 has a portion protruding in the axial direction from the joint of the stator 520 and the inverter housing 531. Such a protrusion of the inverter housing 531 is, as clearly illustrated in FIG. 49, surrounded by the rotor cover 670. The sealing member 671 is disposed between the inner circumference of the rotor cover 670 and the outer periphery of the inverter housing 531 to hermetically seal an air gap therebetween. The sealing member 671, therefore, hermetically closes an inner chamber of the rotor cover 670 in which the magnet unit 512 and the stator 520 are disposed. The sealing member 671 may be made of a slidable seal made from resin.

The above embodiment offers the following beneficial advantages.

The rotating electrical machine 500 has the outer peripheral wall WA1 of the inverter housing 531 arranged radially inside the magnetic circuit made up of the magnet unit 512 and the stator winding 521 and also has the coolant path 545 formed in the outer peripheral wall WA1. The rotating electrical machine 500 also has the plurality of electrical modules 532 arranged along the inner circumference of the outer peripheral wall WA1. This enables the magnetic circuit, the coolant path 545, and the power converter to be arranged in a stacked shape in the radial direction of the rotating electrical machine 500, thereby permitting an axial dimension of the rotating electrical machine 500 to be reduced and also achieving effective layout of parts in the rotating electrical machine 500. The rotating electrical machine 500 also ensures the stability in cooling the electrical modules 532 composing the power converter, thereby enabling the rotating electrical machine 500 to operate with high efficiency and to be reduced in size thereof.

The electrical modules 532 (i.e., the switch modules 532A and the capacitor modules 532B) equipped with heat generating devices, such as semiconductor switches or capacitors are placed in direct contact with the inner peripheral surface of the outer peripheral wall WA1, thereby causing heat, as generated by the electrical modules 532, to be transferred to the outer peripheral wall WA1, so that the electrical modules 532 are well cooled.

In each of the switch modules 532A, the coolers 623 are disposed outside the switches 601 and 602. In other words, the switches 601 and 602 are arranged between the coolers 623. The capacitor 604 is placed on an opposite side of at least one of the coolers 623 to the switches 601 and 602, thereby enhancing the cooling of the capacitor 604 as well as the switches 601 and 602.

In each of the switch modules 532A, the coolers 623 are, as described above, placed on both sides of the switches 601 and 602. The driver circuit 603 is arranged on an opposite side of at least one of the coolers 623 to the switches 601 and 602, while the capacitor 604 is arranged on the other opposite side of the cooler 623, thereby enhancing the cooling of the driver circuit 603 and the capacitor 604 as well as the switches 601 and 602.

For instance, each of the switch modules 532A is designed to have the coolant path 545 which delivers cooling water into the modules to cool the semiconductor switches. Specifically, each module 532A is cooled by the outer peripheral wall WA1 through which the cooling water passes and also by the cooling water flowing in the module 532A. This enhances the cooling of the switch modules 532A.

The rotating electrical machine 500 is equipped with a cooling system in which cooling water is delivered into the coolant path 545 from the external circulation path 575. The switch modules 532A are placed on an upstream side of the coolant path 545 close to the inlet path 571, while the capacitor modules 532B are arranged downstream of the switch modules 532A. Generally, the cooling water flowing through the coolant path 545 has a lower temperature on the upstream side than the downstream side. The switch modules 532A are, therefore, cooled better than the capacitor modules 532B.

The electrical modules 532 are, as described above, arranged at shorter intervals (i.e., the first intervals INT1) or a longer interval (i.e., the second interval INT2) away from each other in the circumferential direction of the rotating electrical machine 500. In other words, the intervals between the electrical modules 532 include a single longer interval (i.e., the second interval INT2). The bulging portion 573 which is equipped with the inlet path 571 and the outlet path 572 lies in the longer interval. These arrangements enable the inlet path 571 and the outlet path 572 of the coolant path 545 to be arranged radially inside the outer peripheral wall WA1. Usually, it is required to increase the volume or flow rate of cooling water in order to enhance the cooling efficiency. Such a requirement may be met by increasing an area of an opening of each of the inlet path 571 and the outlet path 572. This is achieved in this embodiment by placing the bulging portion 573 in the longer interval (i.e., the second interval INT2) between the electrical modules 532, which enables the inlet path 571 and the outlet path 572 to be shaped to have required sizes.

The external terminals 632 of the bus bar module 533 are arranged adjacent the bulging portion 573 in the radial direction of the rotor 510 radially inside the outer peripheral wall WA1. In other words, the external terminals 632 is placed together with the bulging portion 573 within the larger interval (i.e., the second interval INT2) between the electrical modules 532 arranged adjacent each other in the circumferential direction of the rotor 510. This achieves a suitable layout of the external terminals 632 without physical interference with the electrical modules 532.

The outer-rotor type rotating electrical machine 500 is, as described above, engineered to have the stator 520 attached to the radially outer circumference of the outer peripheral wall WA1 and also have the plurality of electrical modules 532 arranged radially inside the outer peripheral wall WA1. This layout causes heat generated by the stator 520 to be transferred to the outer peripheral wall WA1 from radially outside and also causes heat generated by the electrical modules 532 to be transferred to the outer peripheral wall WA1 from radially inside. The stator 520 and the electrical modules 532 are simultaneously cooled by cooling water flowing through the coolant path 545, thereby facilitating dissipation of thermal energy generated by heat-producing parts installed in the rotating electrical machine 500.

The electrical modules 532 arranged radially inside the outer peripheral wall WA1 and the stator winding 521 arranged radially outside the outer peripheral wall WA1 are electrically connected together using the winding connecting terminals 633 of the bus bar module 533. The winding connecting terminals 633 are disposed away from the coolant path 545 in the axial direction of the rotating electrical machine 500. This facilitates electrical connections of the electrical modules 532 to the stator winding 521 even in a structure in which the coolant path 545 extends in an annular form in the outer peripheral wall WA1, in other words, the outside and the inside of the outer peripheral wall WA1 are isolated from each other by the coolant path 545.

The rotating electrical machine 500 in this embodiment is designed to have a decreased size of teeth or no teeth (i.e., iron cores) between the conductors 523 of the stator 520 arranged adjacent each other in the circumferential direction to reduce a limitation on a torque output which results from magnetic saturation occurring between the conductors 532. The rotating electrical machine 500 also has the conductors 523 of a thin flat shape to enhance a degree of torque output. This structure enables a region radially inside the magnetic circuit to be increased in size by reducing the thickness of the stator 520 without altering the outer diameter of the rotating electrical machine 500. The region is used to have the outer peripheral wall WA1 equipped with the coolant path 545 disposed therein and enables the electrical modules 532 to be placed radially inside the outer peripheral wall WA1.

The rotating electrical machine 500 is equipped with the magnet unit 512 in which magnet-produced magnetic fluxes are concentrated on the d-axis to enhance a degree of output torque. Such a structure of the magnet unit 512 enables a radial thickness thereof to be reduced and the region radially inside the magnetic circuit to be, as described above, increased in volume thereof. The region is used to have the outer peripheral wall WA1 with the coolant path 545 disposed therein and also have the plurality of electrical modules 532 to be placed radially inside the outer peripheral wall WA1.

The above region also be used to have the bearing 560 and the resolver 660 arranged therein in addition to the magnetic circuit, the outer peripheral wall WA1, and the electrical modules 532.

The tire wheel assembly 400 using the rotating electrical machine 500 as an in-wheel motor is attached to the vehicle body using the base plate 405 secured to the inverter housing 531 and a mount mechanism, such as suspensions. The rotating electrical machine 500 is designed to have a reduced size, thus occupying a decreased size of space in the vehicle body. This enables the volume of space required for installation of a power unit, such as a storage battery in the vehicle or the volume of a passenger compartment of the vehicle to be increased.

Modified forms of the in-wheel motor will be described below.

First Modification of In-Wheel Motor

The rotating electrical machine 500 has the electrical modules 532 and the bus bar module 533 arranged radially inside the outer peripheral wall WA1 of the inverter unit 530 and also has the stator 520 arranged radially outside the outer peripheral wall WA1. Locations of the bus bar modules 533 relative to the electrical modules 532 are optional. The phase windings of the stator winding 521 may be connected to the bus bar module 533 radially across the outer peripheral wall WA1 using winding connecting wires (e.g., the winding connecting terminals 633) whose locations are optional.

For example, the bus bar module 533 or the winding connecting wires may be arranged in the following layouts.
  (a1) The bus bar module 533 may be located closer to the outer side of the vehicle, that is, the bottom of the rotor carrier 511 than the electrical modules 532 are in the axial direction of the rotating electrical machine 500.

(a2) The bus bar module 533 may be located closer to the inner side of the vehicle, that is, farther away from the rotor carrier 511 than the electrical modules 532 is in the axial direction.

The winding connecting wires may be placed on the following location.

(β1) The winding connecting wires may be arranged close to the outer side of the vehicle, that is, the bottom of the rotor carrier 511 in the axial direction of the rotating electrical machine 500.

(β2) The winding connecting wires may be located closer to the inner side of the vehicle, that is, far away from the rotor carrier 511.

Four types of locations of the electrical modules 532, the bus bar module 533, and the winding connecting wires will be described below with reference to FIGS. 72(a) to 72(d). FIGS. 72(a) to 72(d) are longitudinal sectional views which partially illustrate modified forms of the rotating electrical machine 500. The same reference numbers as employed in the above embodiments refer to the same parts, and explanation thereof in detail will be omitted here. The winding connecting wires 637 are electrical conductors connecting of the phase windings of the stator winding 521 with the bus bar module 533 and correspond to the above described winding connecting terminals 633.

Figure 72A:
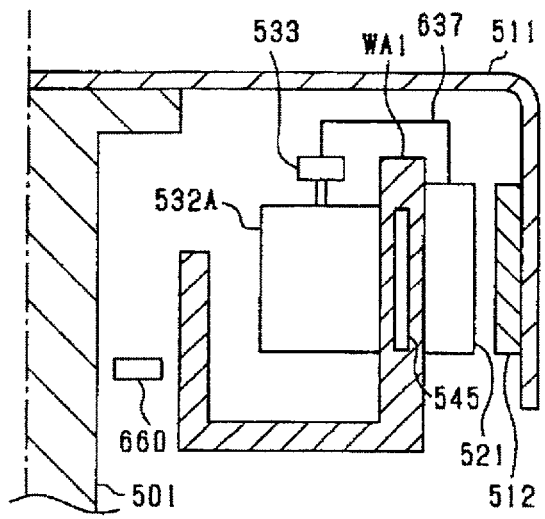
FIGS. 72(a), 72(b), 72(c), and 72(d) are structural views of the first modified form of an in-wheel motor.

In the structure illustrated in FIG. 72(a), a locational relation of the bus bar module 533 to the electrical modules 532 corresponds to the above described layout (a1). The winding connecting wires 637 are arranged in the above layout (β1). Specifically, connections of the electrical modules 532 to the bus bar module 533 and connections of the stator winding 521 to the bus bar module 533 are made on the outer side of the vehicle (i.e., close to the bottom of the rotor carrier 511). This layout is identical with that in FIG. 49.

The structure in 72(a) enables the coolant path 545 to be formed in the outer peripheral wall WA1 without any physical interference with the winding connecting wires 637 and also facilitates the layout of the winding connecting wires 637 connecting the stator winding 521 and the bus bar module 533 together.

Figure 72B:
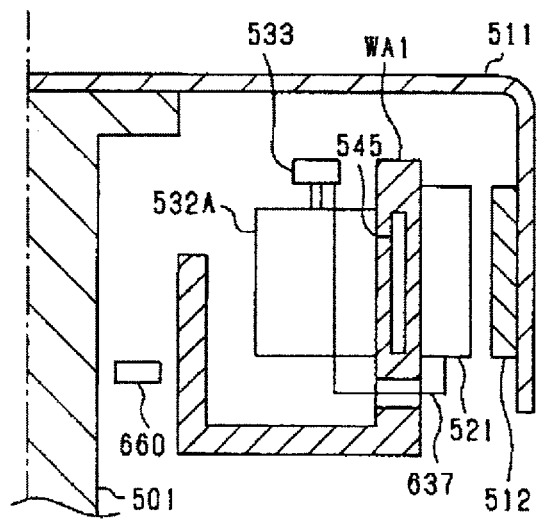

In the structure illustrated in FIG. 72(b), a locational relation of the bus bar module 533 to the electrical modules 532 corresponds to the above described layout (a1). The winding connecting wires 637 are arranged in the above layout (β2). Specifically, connections of the electrical modules 532 to the bus bar module 533 are made on the outer side of the vehicle (i.e., close to the bottom of the rotor carrier 511, while the stator winding 521 and the bus bar module 533 are connected close to the inner side of the vehicle (i.e., far away from the rotor carrier 511).

The structure in FIG. 72(b) enables the coolant path 545 to be formed in the outer peripheral wall WA1 without any physical interference with the winding connecting wires 637.

Figure 72C:
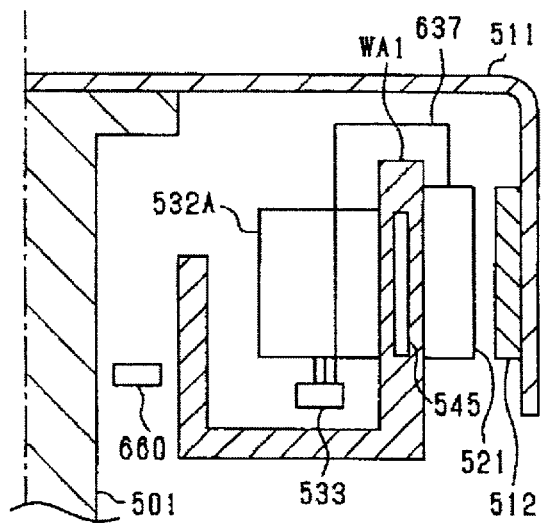

In the structure illustrated in FIG. 72(c), a locational relation of the bus bar module 533 to the electrical modules 532 corresponds to the above described layout (a2). The winding connecting wires 637 are arranged in the above layout (β1). Specifically, connections of the electrical modules 532 to the bus bar module 533 are made on the inner side of the vehicle (i.e., far away from the bottom of the rotor carrier 511, while the stator winding 521 and the bus bar module 533 are connected close to the outer side of the vehicle (i.e., close to the rotor carrier 511).

Figure 72D:
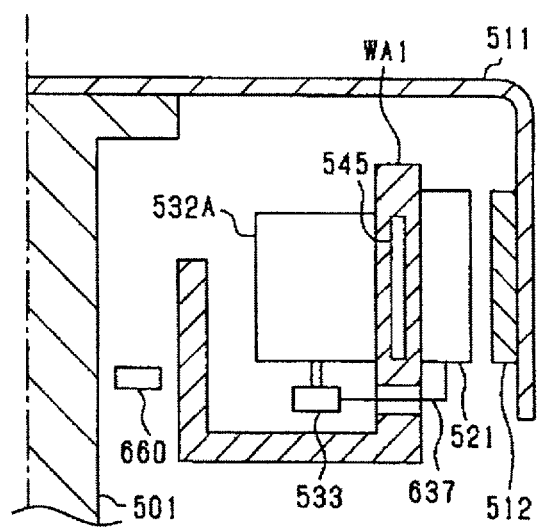

In the structure illustrated in FIG. 72(d), a locational relation of the bus bar module 533 to the electrical modules 532 corresponds to the above described layout (a2). The winding connecting wires 637 are arranged in the above layout (β2). Specifically, connections of the electrical modules 532 to the bus bar module 533 and connections of the stator winding 521 to the bus bar module 533 are made on the inner side of the vehicle (i.e., far away from the bottom of the rotor carrier 511).

The structure in FIG. 72(c) or 72(d) in which the bus bar module 533 is arranged farther away from the rotor carrier 511 than the electrical modules 532, thereby facilitating layout of electrical wires leading to, for example, an electrical device, such as a fan motor, if installed in the rotor carrier 511. The structure also enables the bus bar module 533 to be placed close to the resolver 660 mounted closer to the inner side of the vehicle than the bearings 563 are, thereby facilitating layout of electrical wires leading to the resolver 660.

Second Modification of In-Wheel Motor

Modified forms of a mount structure of the resolver rotor 661 will be described below. Specifically, the rotating shaft 501, the rotor carrier 511, and the inner race 561 of the bearing 560 are rotated together in the form of a rotating unit. The structure in which the resolver rotor 611 is mounted to the rotating unit will be described below.

Figure 73A:
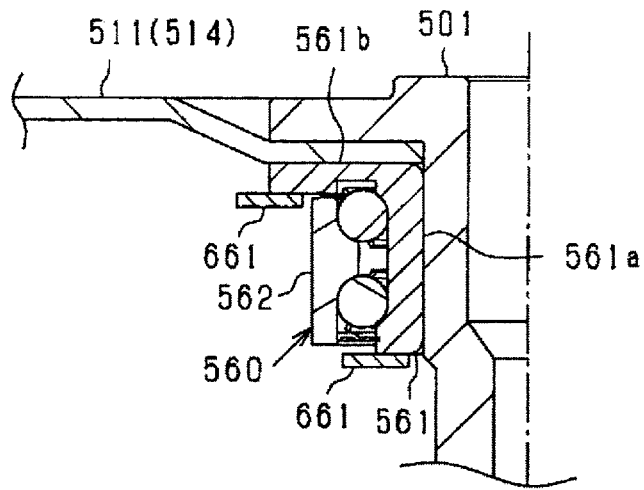
FIGS. 73(a), 73(b), and 73(c) are structural views of the second modified form of an in-wheel motor.
Figure 73B:
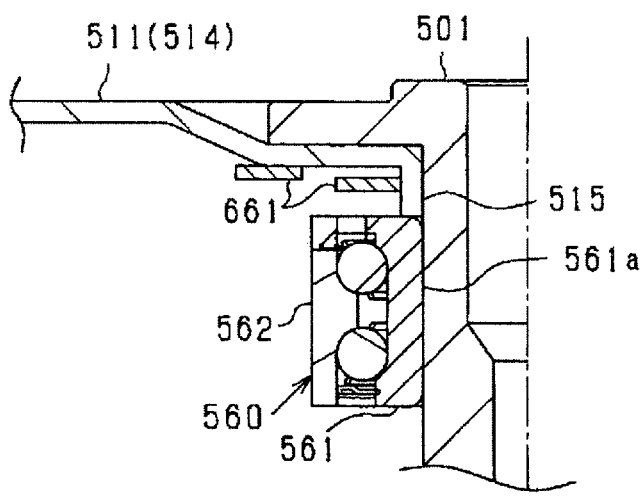
Figure 73C:
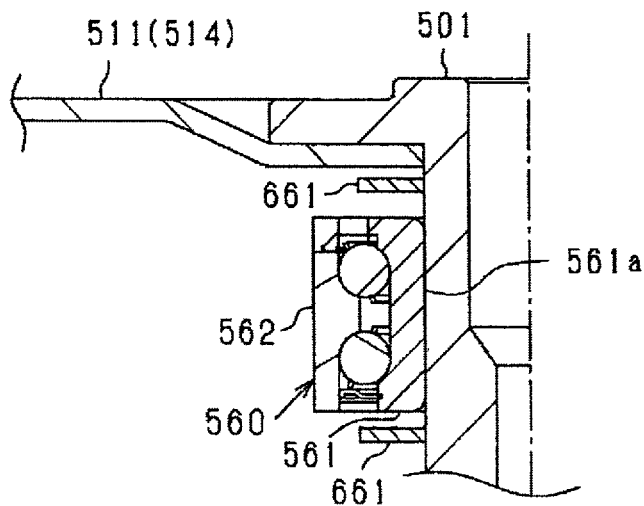

FIGS. 73(a) to 73(c) are structural views which illustrate modifications of the mount structure for attaching the resolver rotor 661 to the rotating unit. In any of the modifications, the resolver 660 is arranged within a hermetically sealed space which is surrounded by the rotor carrier 511 and the inverter housing 531 and protected from splashing of water or mud. FIG. 73(a) shows the same structure of the bearing 560 as that in FIG. 49. The structures in FIGS. 73(b) and 73(c) have the bearing 560 which is different in structure from that illustrated in FIG. 49 and arranged away from the end plate 514 of the rotor carrier 511. FIGS. 73(a) to 73(c) each demonstrate two available locations where the resolver rotor 661 is mounted. Although not clearly illustrated, the boss 548 of the bossed member 543 may be extended to or near the outer circumference of the resolver rotor 661 to have the resolver stator 662 secured to the boss 548.

In the structure illustrated in FIG. 73(a) the resolver rotor 661 is attached to the inner race 561 of the bearing 560. Specifically, the resolver rotor 661 is secured to a surface of the flange 561b of the inner race 561 which faces in the axial direction or an end surface of the cylinder 561a of the inner race 561 which faces in the axial direction.

In the structure illustrated in FIG. 73(b), the resolver rotor 661 is attached to the rotor carrier 511. Specifically, the resolver rotor 661 is secured to an inner peripheral surface of the end plate 514 of the rotor carrier 511. The rotor carrier 511 has the hollow cylinder 515 extending from an inner circumferential edge of the end plate 514 along the rotating shaft 501. The resolver rotor 661 may alternatively be secured to an outer periphery of the cylinder 515 of the rotor carrier 511. In the latter case, the resolver rotor 661 is disposed between the end plate 514 of the rotor carrier 511 and the bearing 560.

In the structure illustrated in FIG. 73(c), the resolver rotor 661 is attached to the rotating shaft 501. Specifically, the resolver rotor 661 is mounted on the rotating shaft 501 between the end plate 514 of the rotor carrier 511 and the bearing 560 or on the opposite side of the bearing 560 to the rotor carrier 511.

Third Modification of In-Wheel Motor

Modifications of the structures of the inverter housing 531 and the rotor cover 670 will be described below with reference to 74(a) and 74(b) which are longitudinal sectional view schematically illustrating the structure of the rotating electrical machine 500. The same reference number as employed in the above embodiments refer to the same parts. The structure in FIG. 74(a) substantially corresponds to that illustrated in FIG. 49. The structure in FIG. 74(b) substantially corresponds to a partially modified form of that in 74(a).

Figure 74A:
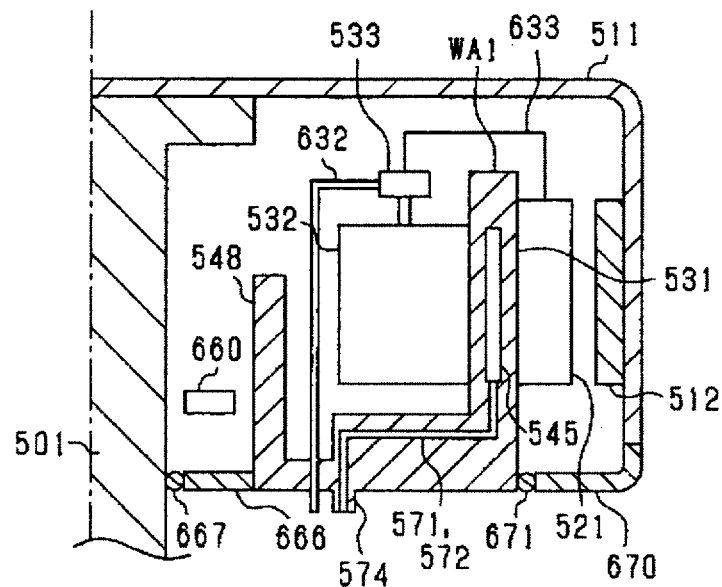
FIGS. 74(a) and 74(b) are structural views of the third modified form of an in-wheel motor.

In the structure illustrated in FIG. 74(a), the rotor cover 670 secured to an open end of the rotor carrier 511. The rotor cover 670 surrounds the outer peripheral wall WA1 of the inverter housing 531. In other words, the rotor cover 670 has an inner circumferential end surface facing the outer peripheral surface of the outer peripheral wall WA1. The sealing member 671 is disposed between the inner circumferential end surface of the rotor cover 670 and the outer peripheral surface of the outer peripheral wall WA1. The housing cover 666 is disposed inside the boss 548 of the inverter housing 531. The sealing member 667 is disposed between the housing cover 666 and the rotating shaft 501. The external terminals 632 of the bus bar module 533 extend through the wall of the inverter housing 531 downward, as viewed in FIG. 74(a).

The inverter housing 531 has formed therein the inlet path 571 and the outlet path 572 which communicate with the coolant path 545. The inverter housing 531 has also formed thereon the inlet/outlet port 574 in which open ends of the inlet path 571 and the outlet path 572 lie.

Figure 74B:
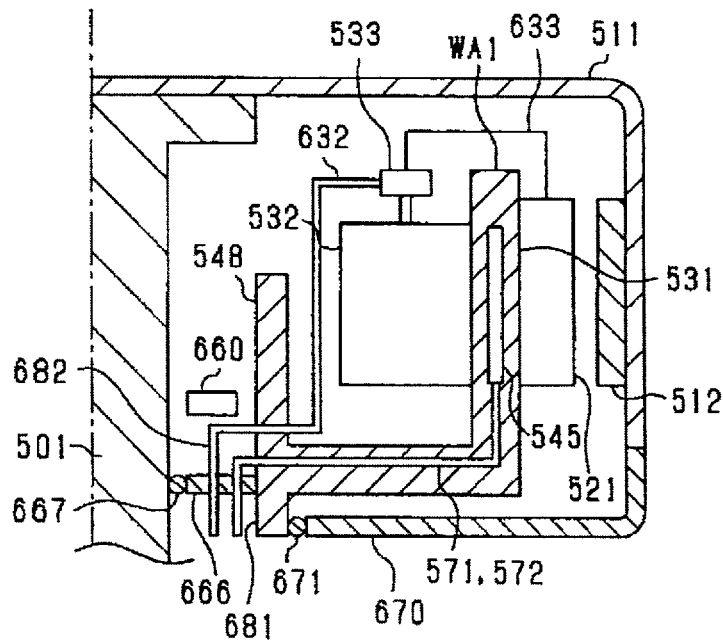

In the structure illustrated in FIG. 74(b), the inverter housing 531 (i.e., the bossed member 543) has the annular protrusion 681 formed thereon in the shape of a flange. The annular protrusion 681 extends substantially parallel to the rotating shaft 501 inwardly in the inverter housing 531 (i.e., in the vehicle). The rotor cover 670 surrounds the protrusion 681 of the inverter housing 531. In other words, the rotor cover 670 has an inner end surface facing the outer periphery of the protrusion 681. The sealing member 671 is interposed between the inner end surface of the rotor cover 670 and the outer periphery of the protrusion 681. The external terminals 632 of the bus bar module 533 extend through the wall of the boss 548 of the inverter housing 531 into the inner space of the boss 548 and also pass through the wall of the housing cover 666 toward the inside of the vehicle (downward, as viewed in FIG. 74(b)).

The inverter housing 531 has formed therein the inlet path 571 and the outlet path 572 which communicate with the coolant path 545. The inlet path 571 and the outlet path 572 extend to the inner periphery of the boss 548 and then connect with the connecting pipes 682 which extend inwardly through the wall of the housing cover 666 (i.e. downward as viewed in FIG. 74(b)). Portion of the pipes 682 extending inside the housing cover 666 (i.e., toward the inside of the vehicle) serve as the inlet/outlet port 574.

The structure in FIG. 74(a) or 74(b) hermetically seals the inner space of the rotor carrier 511 and the rotor cover 670 and achieves smooth rotation of the rotor carrier 511 and the rotor cover 670 relative to the inverter housing 531.

Particularly, the structure in FIG. 74(b) is designed to have the rotor cover 670 which is smaller in inner diameter than that in FIG. 74(a). The inverter housing 531 and the rotor cover 670 are, therefore, laid to overlap each other in the axial direction of the rotating shaft 501 inside the electrical modules 532 in the vehicle, thereby minimizing a risk of adverse effects of electromagnetic noise in the electrical modules 532. The decreased inner diameter of the rotor cover 670 results in a decrease in diameter of a sliding portion of the sealing member 671, thereby reducing mechanical loss of rotation of the sliding portion.

Fourth Modification of In-Wheel Motor

A modification of the structure of the stator winding 521 will be described below with reference to FIG. 75.

Figure 75:
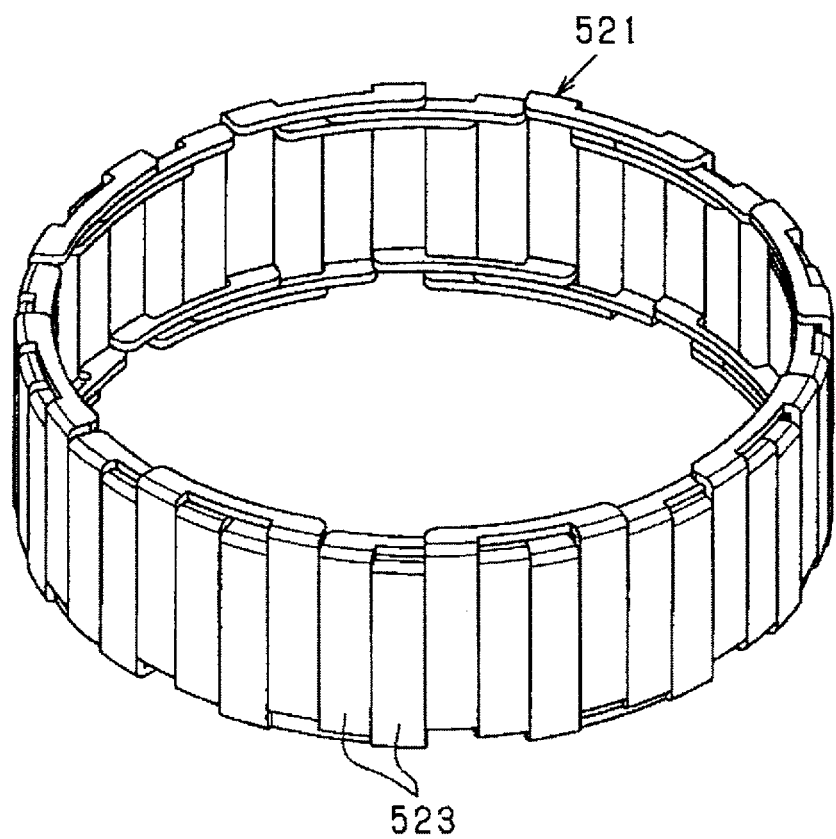
FIG. 75 is a structural view of the fourth modified form of an in-wheel motor.

The stator winding 521 is, as clearly illustrated in FIG. 75, made of conductors which are shaped to have a rectangular transverse section and wave-wound with a long side thereof extending in the circumferential direction of the stator winding 521. Each of the three-phase conductors 532 of the stator winding 521 has coil ends and coil sides. The coil sides are arranged at a given interval away from each other and connected together by the coil ends. The coil sides of the conductors 523 which are arranged adjacent each other in the circumferential direction of the stator winding 521 have side surfaces which face in the circumferential direction and placed in contact with each other or at a small interval away from each other.

The coil ends of each of the phase windings of the stator winding 521 are bent in the radial direction. Specifically, the stator winding 521 (i.e., the conductors 523) is bent inwardly in the radial direction at locations which are different among the U-, V-, and W-phase windings and away from each other in the axial direction, thereby avoiding physical interference with each other. In the illustrated structure, the coil ends of the conductors 523 of the U-, V-, and W-phase windings are, as described above, bent at right angles inwardly in the radial direction of the stator winding 521 at locations axially offset from each other by a distance equivalent to the thickness of the conductors 523. The coil sides of the conductors 523 which are arranged adjacent each other in the circumferential direction have lengths which extend in the axial direction and are preferably identical with each other.

The production of the stator 520 in which the stator core 522 is installed in the stator winding 521 may be achieved by preparing the hollow cylindrical stator winding 521 which has a slit to make end surfaces facing in the circumferential direction, in other words, to make the stator winding 521 in a substantially C-shape, fitting the stator core 522 inside an inner periphery of the stator winding 521, and then joining the facing end surfaces to complete the stator winding 521 of a complete hollow cylindrical shape.

Alternatively, the stator 520 may be produced by preparing the stator core 522 made of three discrete core sections arranged adjacent each other in the circumferential direction and then placing the core sections inside the inner periphery of the hollow cylindrical stator winding 521.

Other Modifications

The rotating electrical machine 500 is, as illustrated in FIG. 50, designed to have the inlet path 571 and the outlet path 572 of the coolant path 545 which are collected in one place. This layout may be modified in the following way. For instance, the inlet path 571 and the outlet path 572 may be placed at locations separate from each other in the circumferential direction of the rotating electrical machine 500. Specifically, the inlet path 571 and the outlet path 572 may be arranged at an angular interval of 180° away from each other in the circumferential direction, in other words, diametrically opposed to each other. At least one of the inlet path 571 and the outlet path 572 may be made up of a plurality of discrete paths.

The tire wheel assembly 400 in the corresponding embodiment is designed to have the rotating shaft 501 protruding in one of axially opposite directions of the rotating electrical machine 500, but however, the rotating shaft 501 may alternatively have end portions protruding in axial opposite directions. This is suitable for vehicles equipped with a single front or a single rear wheel.

The rotating electrical machine 500 may alternatively be designed to have an inner rotor-structure for use in the tire wheel assembly 400.

Fifteenth Modification

Figure 76:
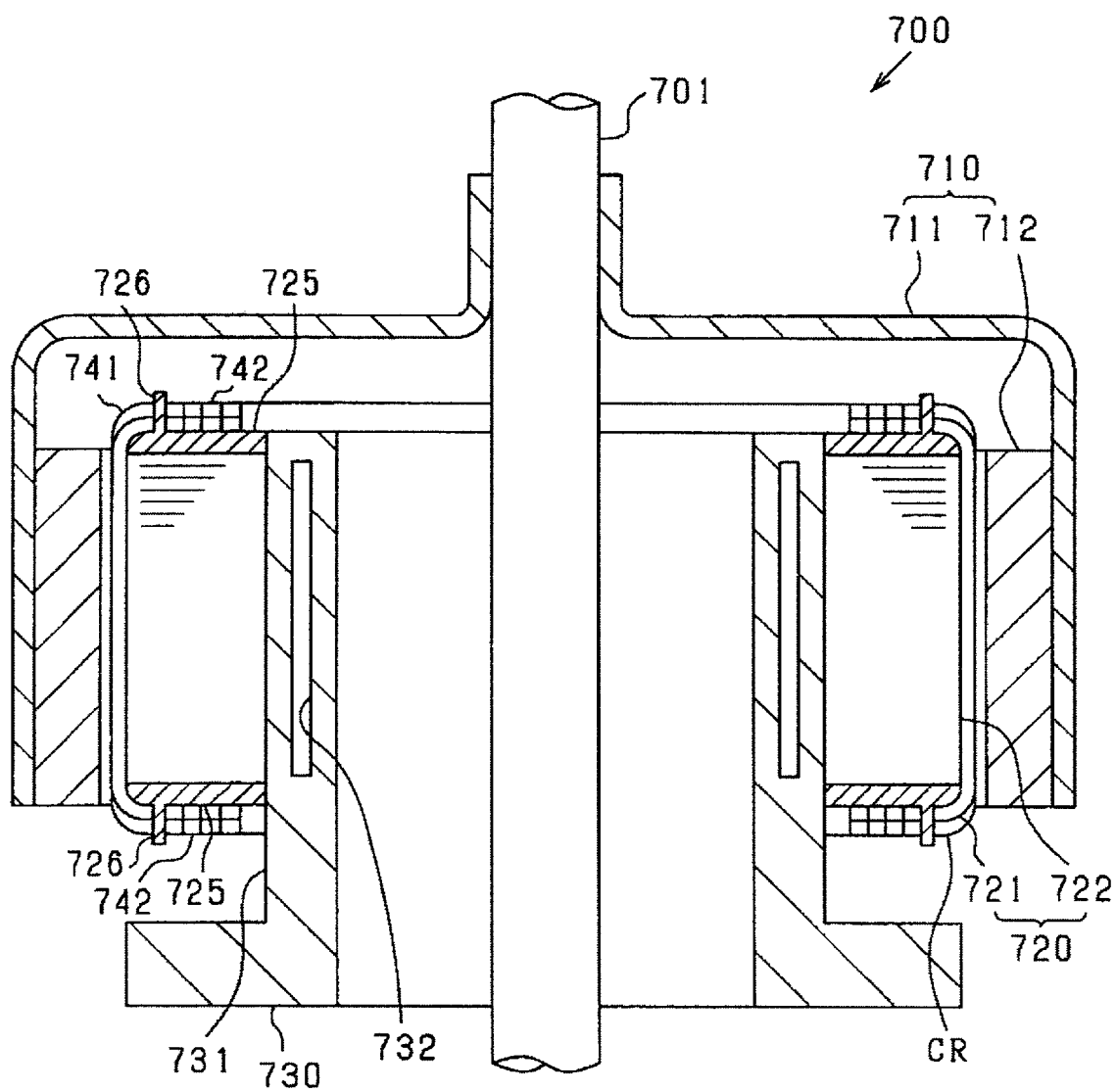
FIG. 76 is a longitudinal sectional view of a rotating electrical machine of the fifteenth modification.

The following describes an outer-rotor type rotating electrical machine 700 according to the fifteenth modification. The rotating electrical machine 700 can be used as, for example, a drive unit for vehicles. FIG. 76 is a longitudinal cross-sectional view of the outer-rotor type rotating electrical machine 700.

The rotating electrical machine 700, as illustrated in FIG. 76, includes a hollow cylindrical rotor 710 and a stator 720. The rotor 710 is fixed to a rotating shaft 701 to be integrally rotatable. The stator 720 is disposed radially inside the rotor 710. Like the rotating shafts set forth above, the rotating shaft 701 is retained to be rotatable by unillustrated bearings. The rotor 710 serves as a field generator, and the stator 720 serves as an armature.

The rotor 710 includes a hollow cylindrical rotor carrier 711, and an annular magnet unit 712 secured to a radial inner surface of the rotor carrier 711.

The rotor carrier 711 is secured to the rotating shaft 701, and serves as a magnet holder.

The magnet unit 712 is comprised of a plurality of permanent magnets arranged such that their magnetic polarities alternate in the circumferential direction of the rotor 710. The magnet unit 712 serves as a magnet member. The arrangement of the magnets enables the magnet unit 712 to have plural magnetic poles in the circumferential direction of the rotor 710. The magnet unit 712 has a substantially identical structure as that of the magnet unit 42 according to the first embodiment illustrated in FIGS. 8 and 9. Specifically, as the permanent magnets of the magnet unit 712, sintered neodymium magnets are used; each of the sintered neodymium magnets has the intrinsic coercive force of 400 [kA/m] or more, and the remanent flux density Br of 1.0 [T] or more.

The magnet unit 712, like the magnet unit 42 illustrated in, for example, FIG. 9, is comprised of first and second magnets 91 and 92 as the permanent magnets; the first and second magnets 91 and 92 have a polar anisotropic structure, and also respectively have different magnetic polarities.

As described above with reference to FIGS. 8 and 9, each of the first and second magnets 91 and 92 has a d-axis side region and q-axis side regions. The d-axis side region of each of the first and second magnets 91 and 92 is located closer to a corresponding d-axis than the q-axis side regions are, and each q-axis side region of each of the first and second magnets 91 and 92 is located closer to a corresponding adjacent q-axis than the d-axis side region is.

Specifically, the direction of the easy axis of magnetization located in the d-axis side region of the first magnet 91 is different from the direction of the easy axis of magnetization located in each q-axis side region of the first magnet 91. Similarly, the direction of the easy axis of magnetization located in the d-axis side region of the second magnet 92 is different from the direction of the easy axis of magnetization located in each q-axis side region of the second magnet 92.

In particular, the direction of the easy axis of magnetization located in the d-axis side region of the first magnet 91 is oriented to be parallel or approximately parallel to the d-axis, and the direction of the easy axis of magnetization located in each q-axis side region of the first magnet 91 is oriented to be perpendicular or approximately perpendicular to the q-axis. The directions of the easy axes of magnetization in the second magnet 92 are identical to those in the first magnet 91.

This results in a circular-arc magnetic path being created in accordance with the easy axes of magnetization oriented in each of the first and second magnets 91 and 92.

In other words, each first magnet 91, which is applied as well for each second magnet 92, is magnetically oriented to have (1) A first set of easy axes of magnetization formed in the d-axis side region closer to the corresponding d-axis that is a center of the corresponding magnetic pole (2) A second set of easy axes of magnetization formed in each q-axis side region closer to the q-axis that is a boundary between a corresponding adjacent pair of the magnetic poles (3) The easy axes of magnetization formed in the d-axis side region are more parallel to the corresponding d-axis than the easy axes of magnetization formed in each q-axis side region are The fifteenth modification can use the magnet unit 42 illustrated in FIGS. 22 and 23 in place of the magnet unit 712, or use the magnet unit 42 illustrated in FIG. 30 in place of the magnet unit 712.

The stator 720 includes a stator winding assembly 721 as an armature winding assembly, and a tubular cylindrical stator core 722 as an armature core. The stator winding assembly 721 is comprised of multiphase windings assembled to a radially outer surface outside of the stator core 722. The stator winding assembly 721 of the fifteenth modification is for example comprised of three-phase windings as the multiphase windings, i.e., a U-phase winding, a V-phase winding, and a W-phase winding. The U-, V-, and W-phase windings are connected to each other in a star configuration (i.e., Y-connection configuration), or can be connected to each other in a delta configuration (i.e., Δ-connection configuration).

The rotating electrical machine 700 includes a stator holder 730 assembled to a radially inner surface of the stator core 722. The stator holder 730 is configured to hold the stator 720.

The stator holder 730 includes a cylindrical member 731 arranged radially inside the stator core 722. The cylindrical member 731 has a coolant channel 732 annularly formed therethrough. The coolant channel 732 enables a coolant, such as cooling water, to annularly flow therethrough. Electrical components including, for example, semiconductor switches can be arranged radially inside the cylindrical member 731. This enables the coolant flowing through the coolant channel 732 to cool the electrical modules.

Next, the following describes in detail the structure of the stator 720.

Figure 77A:
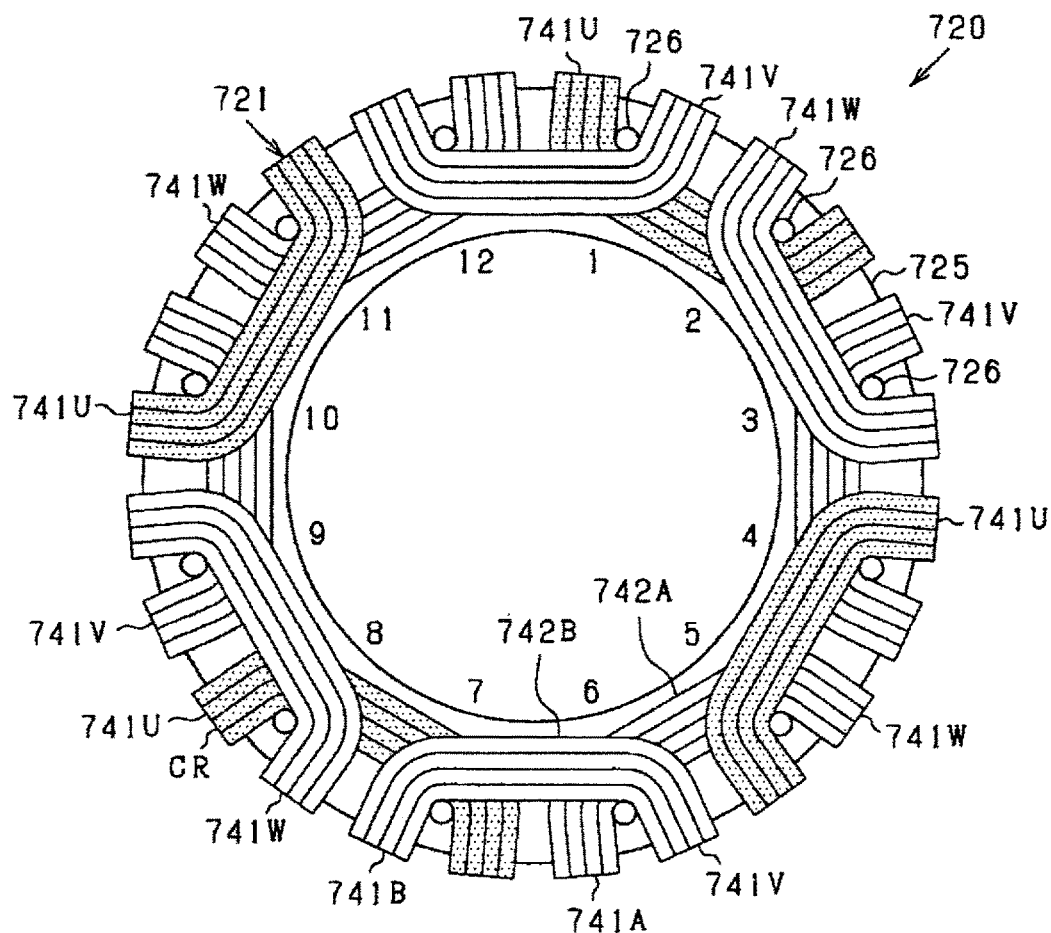
FIG. 77(a) is a plan view of a stator.
Figure 77B:
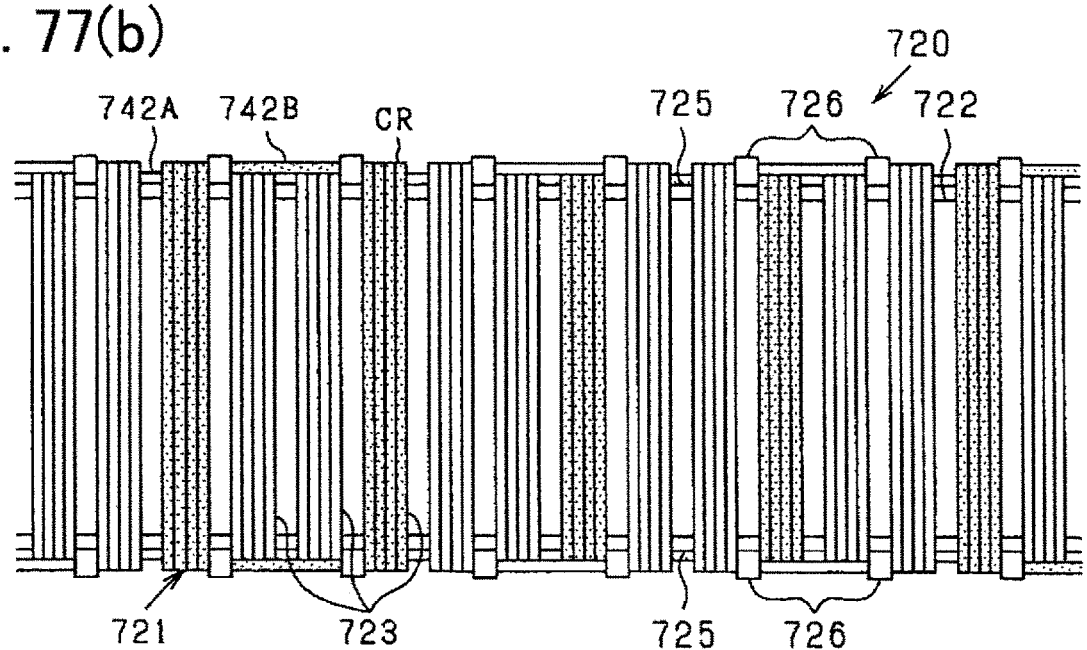
FIG. 77(b) is a developed side view of the stator.
Figure 78:
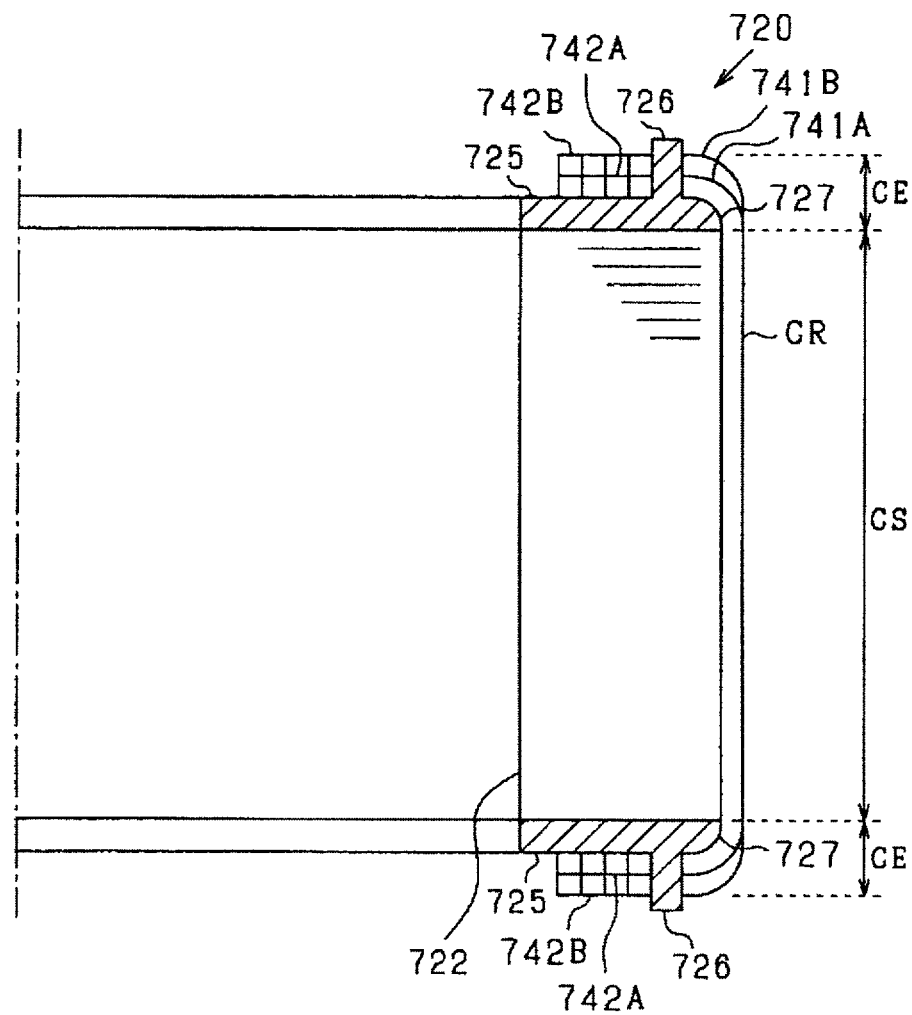
FIG. 78 is a longitudinal sectional view illustrating the structure of the stator.
Figure 79:
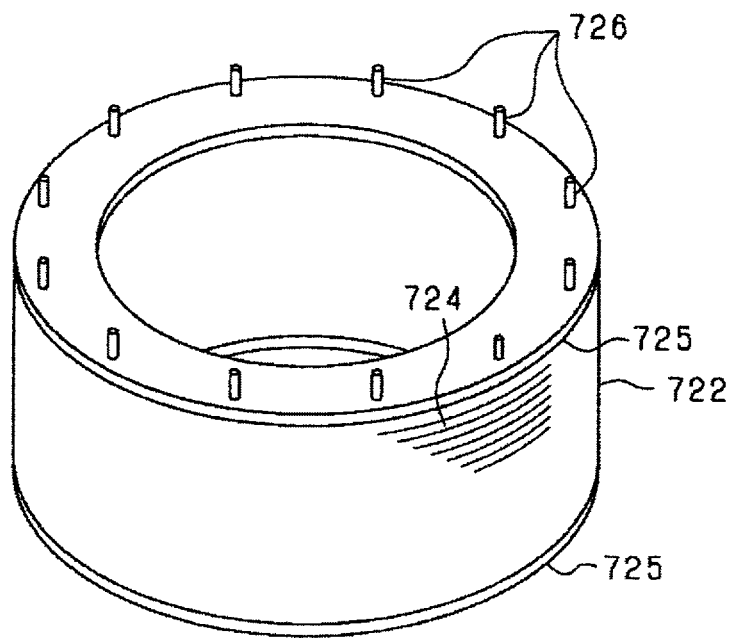
FIG. 79 is a perspective view illustrating the structure of each of a stator core and an end plate.

FIG. 77(*a*) is a plan view of the stator 720, and FIG. 77(*b*) is a side view of the stator 720. FIG. 78 is a longitudinal sectional view illustrating the structure of the stator 720, and FIG. 79 is a perspective view illustrating the stator 720 before assembling of the stator winding assembly 721 to the stator core 722. In particular, FIG. 77(*b*) illustrates the stator winding assembly 721 while the stator winding assembly 721 is developed in a planer form for the sake of explanation. In each of FIGS. 77(*a*) and 77(*b*), the same phase winding segments, i.e., the U-phase winding segments in the stator winding assembly 721 described later are dotted.

The stator core 722 is comprised of a plurality of core sheets 724, each of which is comprised of a magnetic steel plate, stacked in the axial direction in the shape of a hollow cylinder having a given thickness in the radial direction. The stator core 722 has an annular outer peripheral surface that does not have any irregularities thereon. Each phase winding of the stator winding assembly 721 is comprised of winding segments 741 described later, and each of the winding segments 741 includes a pair of conductor portions 723 described later.

The stator winding assembly 721 is assembled to the stator core 722 while the conductor portions 723 are arranged along the outer peripheral surface of the stator core 722 in the circumferential direction of the stator core 722 (see FIG. 77(*b*)). Each of the conductor portions 723 for a selected phase is comprised of a plurality of wires connected in series in each of which a current flows in the same direction. The stator core 722 serves as a back yoke.

The stator core 722 is preferably comprised of the plurality of core sheets 724 stacked in the axial direction; each core sheet 724 has been punched out to have an annular plate-like shape. For the stator core 722 having a helical configuration, the stator core 722 may be comprised of an elongated sheet helically wound and stacked in the axial direction to wholly shape as a hollow cylindrical shape.

The stator 720 is designed to preferably have any of the following structures:

(A) The stator 720 has inter-conductor members, each of which is disposed between a corresponding adjacent pair of the conductor portions 723 in the circumferential direction. As the inter-conductor members, magnetic material is used which meets a relation of Wt×Bs≤Wm×Br where Wt is a width of the inter-conductor members in the circumferential direction within one magnetic pole, Bs is the saturation magnetic flux density of the inter-conductor members, Wm is a width of the magnet unit 712 equivalent to one magnetic pole in the circumferential direction, and Br is the remanent flux density in the magnet unit 712.

(B) The stator 720 has the inter-conductor members each of which is disposed between a corresponding adjacent pair of the conductor portions 723 in the circumferential direction. The inter-conductor members are each made of a non-magnetic material.

(C) The stator 720 has no inter-conductor member disposed between each adjacent pair of the conductor portions 723 in the circumferential direction.

The above structure of the stator 720 results in a decrease in inductance as compared with typical rotating electrical machines equipped with teeth (i.e., iron core) which create a magnetic path between the conductors of the stator winding. Specifically, the structure of the stator 720 enables the inductance to be one-tenth or less of that in the prior art structure. Usually, the reduction in inductance will result in a reduction in impedance. The rotating electrical machine 700 is, therefore, designed to increase output power relative to input power to increase the degree of output torque. The rotating electrical machine 700 is also enabled to produce a higher degree of output than rotating electrical machines which use a magnet-embedded rotor and output torque using impedance voltage (i.e., reluctance torque).

The rotating electrical machine 700 is configured to have no teeth or no components equivalent to teeth. This configuration enables the waveform of magnetic flux actually linking to the stator winding assembly 721, to approach the waveform of magnetic flux created by the magnet unit 712 for obtaining a higher degree of output torque of the rotating electrical machine 700. This results in the rotating electrical machine 700 having an increased effect of higher degree of output torque thereof.

The stator winding assembly 721 and the stator core 722 are molded to each other as a single assembly by a mold material, such as an insulation material, made of resin, so that a part of the mold member is interposed between each adjacent pair of the conductor portions 723 arranged in the circumferential direction. This configuration of the assembly of the stator winding assembly 721 and the stator core 722 corresponds to the structure (B) selected from the structures (A) to (C).

Each adjacent pair of the conductor portions 723 are arranged to abut each other or to face each other with a sufficiently short interval therebetween. This arrangement enables the assembly of the stator winding assembly 721 and the stator core 722 to have the structure (C). If the assembly of the stator winding assembly 721 and the stator core 722 is designed to have the structure (A), the outer peripheral surface of the stator core 722 preferably has protrusions mounted thereon. The protrusions are preferably arranged in the circumferential direction of the stator core 722 at predetermined intervals, and each of the protrusions preferably has a size, i.e., a width and/or a height; the size of each protrusion satisfies the requirements based on the structure (A).

The stator 720 includes first and second end plates 725 secured to respective ends of the stator core 722 in the axial direction. Each of the first and second end plates 725 has an annular plate shape, and has an inner diameter and an outer diameter; the inner and outer diameters of each of the first and second end plates 725 are identical to respective inner and outer diameters of the stator core 722.

Each of the first and second end plates 725 has an outer major surface, and includes protrusions 726 extending from the outer major surface thereof. The protrusions 726 of each of the first and second end plates 725 according to the fifteenth modification are configured to extend in parallel to the axial direction of the stator core 722. The protrusions 726 of each of the first and second end plates 725 may be molded together with the corresponding end plate 725, or secured to the corresponding end plate 725 with fasteners, such as bolts. The outer diameter of each of the first and second end plates 725, around which the stator winding assembly 721 is wound, may be set to be identical to the outer diameter of the stator core 722, and the inner diameter thereof may be set to be larger or smaller than the inner diameter of the stator core 722. The assembly of the stator core 722 and the first and second end plates 725 serves as a base member.

Each phase winding of the stator winding assembly 721 is comprised of the winding segments 741, and each of the winding segments 741 is comprised of a conductor CR. The conductor CR of each of the winding segments 741 constitutes a pair of conductor portions 723.

The protrusions 726 are arranged on the outer major surface of each of the first and second end plates 725 in the circumferential direction of the stator core 722 at regular intervals. Each protrusion 726 of the first end plate 725 serves as a retainer with which the conductor CR of a corresponding one of the winding segments 741 is partially engaged. Similarly, each protrusion 726 of the second end plate 725 serves as a retainer with which the conductor CR of a corresponding one of the winding segments 741 is partially engaged. Each protrusion 726 has, for example, a cylindrical column shape with a true circular shape in its transverse cross section. Each protrusion 726 may have an elliptical shape in its transverse cross section. Each protrusion 726 may also have a flattened circular shape in its transverse cross section; the flattened circular shape has a circumferential length and a radial length, the radial length being larger than the circumferential length.

In a case where the protrusions 726 located on the outer major surface of the first end plate 725 are separately described from the protrusions 726 located on the outer major surface of the second end plate 725, the following is defined:

1. The protrusions 726 located on the outer major surface of the first end plate 725 will be referred to as first protrusions 726.
2. The protrusions 726 located on the outer major surface of the second end plate 725 will also be referred to as second protrusions 726.

The number of protrusions 726 arranged on each of the first and second end plates 725 is set to 12.

Each first protrusion 726 is located to face the corresponding one of the second protrusions 726 in the axial direction of the stator core 722, so that a circumferential position of each first protrusion 726 is the same as that of the corresponding one of the second protrusions 726 in the axial direction of the stator core 722. In other words, the first protrusions 726 are aligned with the respective second protrusions 726 in the axial direction of the stator core 722.

Each adjacent pair of protrusions 726 have an interval that enables two conductor portions 723 of different phases to be interposed therebetween.

The first and second end plates 725 and the protrusions 726 are each made from non-magnetic material, such as paramagnetic material or diamagnetic material. For example, the first and second end plates 725 and the protrusions 726 are each made from aluminum, copper, or synthetic resin. Each of the first and second end plates 725 may be made from ferromagnetic material, and each protrusion 726 may be made from a non-magnetic material, such as a paramagnetic material or a diamagnetic material. Each of the first and second end plates 725 is fastened to the corresponding one of the axial ends of the stator core 722 by welding or adhesion. Each of the first and second end plates 725 may be mechanically fastened to the corresponding one of the axial ends of the stator core 722 using pin insertion, press-fitting with keys and keyways, or bolts.

The stator winding assembly 721 includes, as illustrated in FIG. 78, a coil side CS, and opposing first and second coil ends CE in the axial direction of the stator core 722. The coil side CS is arranged to radially surround the stator core 722, and the first and second coil ends CE are arranged at axially outside the coil side CS.

The stator winding assembly 721 has opposing first and second ends in the axial direction of the stator core 722, the first coil end CE constitutes the first end of the stator winding assembly 721 in the axial direction of the stator core 722, and the second coil end CE constitutes the second end of the stator winding assembly 721 in the axial direction of the stator core 722.

The coil side CS of the stator winding assembly 721 is arranged to radially face the magnet unit 712 of the rotor 710. Each of the first and second coil ends CE is comprised of portions of the phase windings located outside the coil side CS; the portions of the phase windings extend in the circumferential direction of the stator core 722.

As described above, each of the phase windings includes the winding segments 741, and each of the winding segments 741 is comprised of the conductor CR. The conductor CR of each of the winding segments 741 constitutes the pair of conductor portions 723 and a pair of first and second bridges 742.

Specifically, the conductor CR of each winding segment 741 is multiply wound around a corresponding adjacent pair of first protrusions 726 and around a corresponding adjacent pair of second protrusions 726 while (i) being engaged with the corresponding adjacent pair of first protrusions 726, (ii) being engaged with the corresponding adjacent pair of second protrusions 726, and (iii) axially extending along the outer peripheral surface of the stator core 722.

That is, each winding segment 741 described above is comprised of

1. The pair of conductor portions 723 arranged to face the outer peripheral surface of the stator core 722 with, for example, the predetermined interval in the circumferential direction of the stator core 722
2. The first bridge 742 located at the first coil end CE to axially face the pair of conductor portions 723 and extending in the circumferential direction of the stator core 722
3. The second bridge 742 located at the second coil end CE to axially face the pair of conductor portions 723 and extending in the circumferential direction of the stator core 722

The pair of conductor portions 723 of each winding segment 741 serves as a pair of coil-side conductor portions, and a pair of the first and second bridges 742 of each winding segment 741 serves as a pair of coil-end conductor portions.

The pair of conductor portions 723 of each winding segment 741 enables a same-phase current to flow through one of the pair of conductor portions 723 in a predetermined first direction and the same-phase current to flow through the other of the pair of conductor portions 723 in a second direction opposite to the first direction.

The winding segments 741 of the respective phases are arranged in the circumferential direction of the stator core 722 in a predetermined order. Hereinafter, the winding segments 741 of the U-phase winding will also be referred to as U-phase winding segments 741, the winding segments 741 of the V-phase winding will also be referred to as V-phase winding segments 741, and the winding segments 741 of the W-phase winding will also be referred to as W-phase winding segments 741.

As described later, the winding segments 741 have a two-layered structure. For example, as illustrated in FIG. 77(a), the U-phase winding segments 741U, the V-phase winding segments 741V, and W-phase winding segments 741W in each layer are arranged in this order in a clockwise direction.

The stator winding assembly 721 according to the fifteenth modification is wound around the stator core 722 in full pitch winding in which the pole pitch of the stator winding assembly 721 is equal to the coil pitch. The rotor 710 according to the fifteenth modification has eight poles, but the number of poles of the rotor 710 may be freely determined.

The stator winding assembly 721 is preferably configured such that a thickness of each conductor portion 723 in the radial direction is smaller than a circumferential width of the corresponding conductor portion 723 for one phase within a region of one pole.

Each of the three-phase windings of the stator winding assembly 721 is configured such that four conductors CR of four winding segments 741 of the corresponding one of the three-phase windings are multiply wound around the corresponding pair of first protrusions 726 and around the corresponding pair of second protrusions 726.

Specifically, as illustrated in FIG. 77(a), the winding segments 741 of each phase winding have the two-layered structure comprised of lower winding segments 741A and upper winding segments 741B.

The first and second bridges 742, which will be referred to as lower bridges 742A, of each lower winding segment 741A are located adjacent to the respective first and second end plates 725 in the axial direction. The first and second bridges 742, which will be referred to as upper bridges 742B, of each upper winding segment 741B are located to separate from the respective first and second end plates 725 in the axial direction.

Specifically, the upper bridge 742B of each upper winding segment 741B is arranged to overlap an adjacent pair of the lower bridges 742A in the axial direction of the stator core 722. The lower bridges 742A serve as first conductor portions, and the upper bridges 742B serve as second conductor portions.

As illustrated in FIG. 77(a), the stator winding segment 721 is comprised of six lower winding segments 741A and six upper winding segments 741B, and these six lower winding segments 741A and six upper winding segments 741B provide four U-phase winding segments 741U, four V-phase winding segments 741V, and four W-phase winding segments 741W.

The U-phase winding segments 741U are connected in series or connected in parallel to one another through unillustrated connection members, such as busbars. Similarly, the V-phase winding segments 741V are connected in series or connected in parallel to one another through unillustrated connection members, such as busbars, and the W-phase winding segments 741W are connected in series or connected in parallel to one another through unillustrated connection members, such as busbars.

Figure 80:
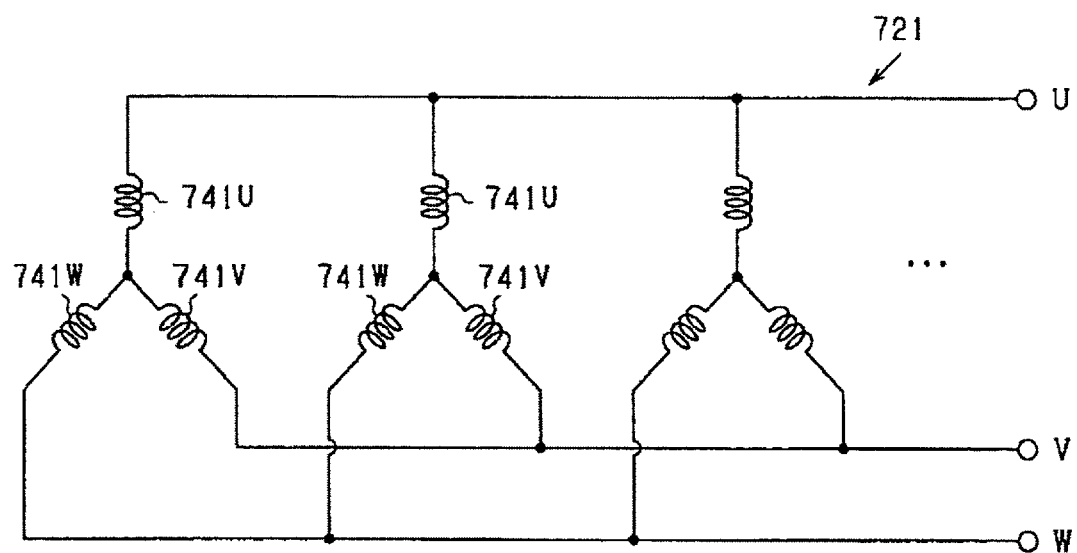
FIG. 80 is a circuit diagram illustrating an electrical connection of winding segments of respective phases of a stator winding.
Figure 81A:
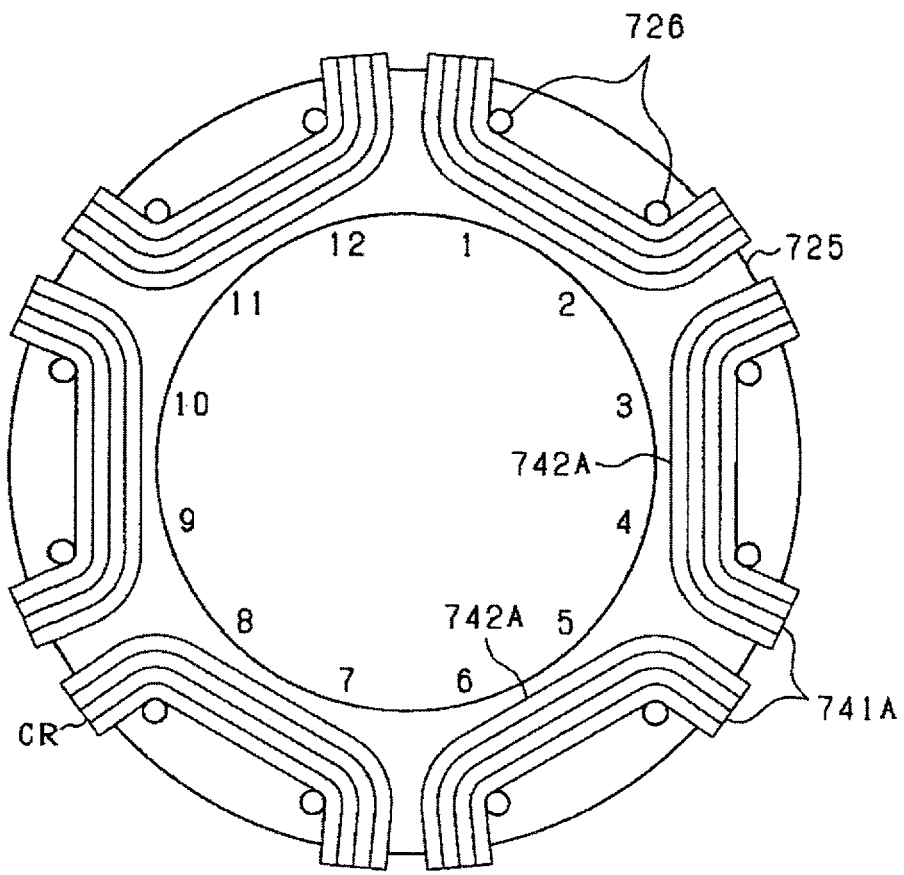
FIG. 81(a) is a plan view of the stator.
Figure 81B:
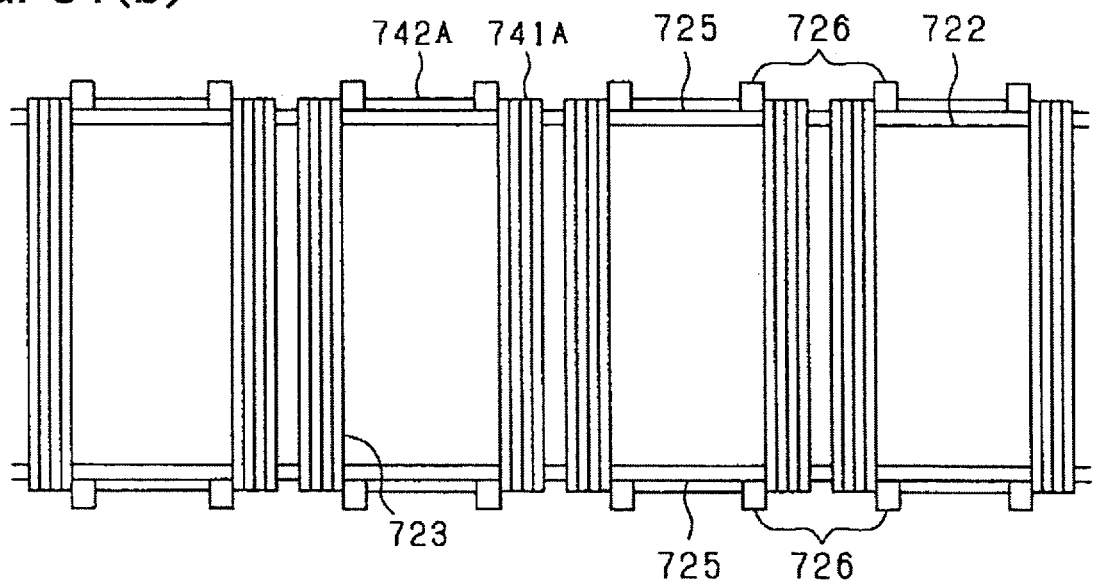
FIG. 81(b) is a side view of the stator.

For example, as illustrated in FIG. 80, each of the U-phase winding segments 741U is connected to a corresponding one of the V-phase winding segments 741V and a corresponding one of the W-phase winding segments 741A in a star configuration (i.e., Y-connection configuration), and the star-connected U-, V-, and W-phase winding segments are connected in parallel to each other.

As illustrated in FIG. 77(a), each of the four conductors CR for a corresponding one of the four U-phase winding segments 741U is multiply wound around the stator core 722 four times. Similarly, each of the four conductors CR for a corresponding one of the four V-phase winding segments 741U is multiply wound around the stator core 722 four times, and each of the four conductors CR for a corresponding one of the four W-phase winding segments 741U is multiply wound around the stator core 722 four times.

The present disclosure is not limited to the number of turns. Specifically, the number of turns of each of the four conductors CR for a corresponding one of one phase winding segments 741U or 741V or 741W may be set to, for example, 10.

Next, the following describes how the stator winding segment 721 is manufactured.

Specifically, first, the winding segments 741 are assembled to the stator core 722 such that the lower winding segments 741A are arranged in the circumferential direction of the stator core 722.

Next, the upper winding segments 741B are wound around the stator core 722 such that each of the upper winding segments 741B overlaps a corresponding adjacent pair of the lower winding segments 741A.

The following specifically describes the above method of manufacturing the stator winding segment 721 using FIGS. 77(a), 77(b), 81(a), and 81(b). In each of FIGS. 77(a) and 81(a), twelve first protrusions 726 on the outer major surface of the first end plate 725 are individually numbered 1, 2, . . . , 12 in a clockwise direction.

In a first step of the manufacturing method, each of six conductors CR is wound around a corresponding pair of an odd-numbered first protrusion 726 and a following even-numbered first protrusion 726 while being engaged with the corresponding pair of an odd-numbered first protrusion 726 and a following even-numbered first protrusion 726.

Specifically, a selected first conductor segment CR is wound around the pair of the first protrusions 726 with the numbers 1 and 2, a selected second conductor segment CR is wound around the pair of the first protrusions 726 with the numbers 3 and 4, . . . , and a selected sixth conductor CR is wound around the pair of the first protrusions 726 with the numbers 11 and 12. The six conductors CR are wound around the second protrusion 726 in the same manner as being wound around the first protrusions 726.

This results in the six lower winding segments 741A being assembled to the stator core 722 while being circumferentially arranged.

Next, in a second step of the manufacturing method, each of the remaining six conductors CR is wound around a corresponding pair of an even-numbered first protrusion 726 and a following odd-numbered first protrusion 726 while being engaged with the corresponding pair of an even-numbered first protrusion 726 and a following odd-numbered first protrusion 726.

Specifically, a selected first conductor CR is wound around the pair of the first protrusions 726 with the numbers 2 and 3, a selected second conductor CR is wound around the pair of the first protrusions 726 with the numbers 4 and 5, . . . , and a selected sixth conductor CR is wound around the pair of the first protrusions 726 with the numbers 12 and 1.

This results in the six upper winding segments 741B being assembled to the stator core 722 while being circumferentially arranged. The six conductors CR are wound around the second protrusion 726 in the same manner as being wound around the first protrusions 726.

In particular, for assembling each winding segment 741 to the stator core 722, the corresponding conductor CR is wound, with a predetermined degree of tension, around a corresponding pair of the first protrusions 726 while being engaged with the corresponding pair of the first protrusions 726. This winding of each conductor CR around a corresponding pair of the first protrusions 726 with the predetermined level of tension enables the space factor of each conductor CR to be improved, making it possible for the stator winding assembly 721 to have a smaller size. This winding of each conductor CR around a corresponding pair of the first protrusions 726 with the predetermined level of tension also enables a level of binding force of each winding segment 741 to the stator core 722 to be improved, making it possible to improve the rigidity of the stator 720.

Additionally, the winding of each conductor CR around a corresponding pair of the first protrusions 726 with the predetermined level of tension enables axial pressing force to be applied to each of the first and second end plates 725 of the stator core 722, which is comprised of the stack structure of the core sheets 724, making it possible to eliminate or reduce one or more gaps between the core sheets 724. This prevents deterioration of the dimension tolerance of the stacked stator core 722, making it possible for the stator 720 to have a smaller size.

The lower and upper winding segments 741A and 741B are wound, as illustrated in FIG. 77(a), around the stator core 722 while (1) Adjacent ends of respective two first bridges 742 of different phases are interposed between each adjacent pair of first protrusions 726 on the first end plate 725
(2) Adjacent ends of respective two second bridges 742 of different phases are interposed between each adjacent pair of second protrusions 726 on the second end plate 725

In particular, adjacent ends of respective two upper bridges 742B of different phases of the lower winding segments 741A and adjacent ends of respective two upper bridges 742B of different phases of the upper winding segments 741B are alternately interposed between the adjacent pairs of first protrusions 726 on the first end plate 725. Similarly, adjacent ends of respective two upper bridges 742B of different phases of the lower winding segments 741A and adjacent ends of respective two upper bridges 742B of different phases of the upper winding segments 741B are alternately interposed between the adjacent pairs of second protrusions 726 on the second end plate 726.

The conductor segments 723 of the respective winding segments 741, which constitutes the coil side CS, are sequentially arranged in the circumferential direction of the stator core 722.

The number of the first protrusions 726 and the number of the second protrusions 726 are each set to another value, such as a multiple of 12, i.e., 24 or 36.

Each of the first and second end plates 725 has an outer corner located radially outside the corresponding one of the set of the first protrusions 726 and the set of the second protrusions 726. The outer corner of each of the first and second end plates 725 is configured as a rounded corner 727. The conductor CR of each winding segment 741 is wound around the stator core 722 along the rounded corners 727 of the respective first and second end plates 725.

That is, the conductor CR for each phase winding segment 741 is bent from a first direction parallel to the axial direction of the stator core 722 to a second direction perpendicular to the first direction at each rounder corner 727. Because each of the first and second end plates 725 has the rounder corner 727, the bent portion of the conductor CR is subject to a smaller level of bending stress.

Specifically, if the bent portion of the conductor CR had a bending radius that is smaller than a predetermined threshold, the bent portion were subject to an excessive level of bending stress.

In contrast, each of the first and second end plates 725 according to the fifteenth modification has the rounded corner 727, so that the bent portion of the conductor CR along the rounded corner 727 has the bending radius that is equal to or larger than the predetermined threshold, resulting in the conductor CR along the rounded corner 727 being bent along the rounded corner 727 gentler.

This therefore makes it possible to reduce the level of bending stress applied to the bent portion of the conductor CR for each phase winding segment 741. The bending radius of the conductor CR, which is defined as a radius from the bent portion to a center line of the conductor CR, is preferably set to be larger than or equal to, for example, 5 mm.

The number of the U-phase winding segments 741U, the number of the V-phase winding segments 741V, and the number of the W-phase winding segments 741W are each set to four, and the number of the lower winding segments 741A and the number of the upper winding segments 741B for each phase are each set to two. Even if the length of each upper winding segment 741B is longer than the length of each lower winding segment 741A, the total length of each phase winding is identical to that of another phase winding. This therefore makes it possible to equalize resistance values of the respective phase windings to each other.

As described above, the conductors CR constitutes each phase winding of the stator winding assembly 721. The transverse cross sectional view of the conductor CR is illustrated in FIG. 82.

Figure 82:
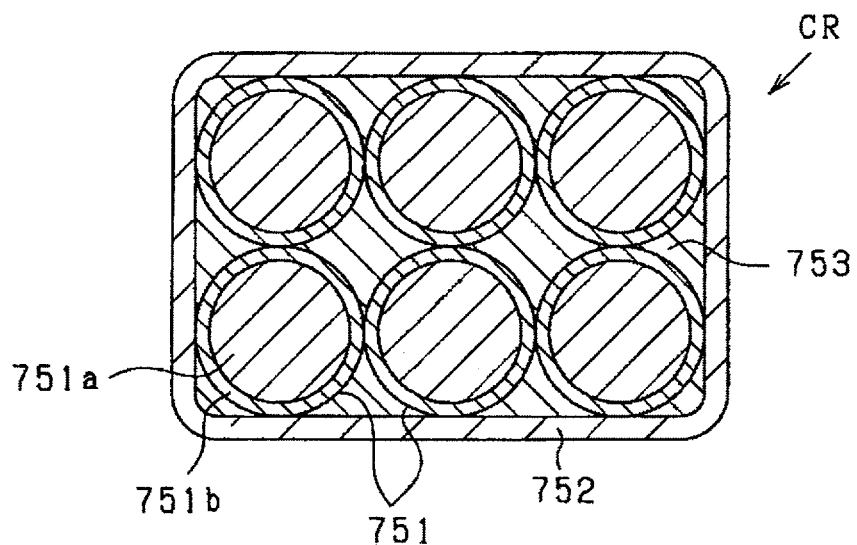
FIG. 82 is a transverse sectional view of a conductor.
Figure 83:
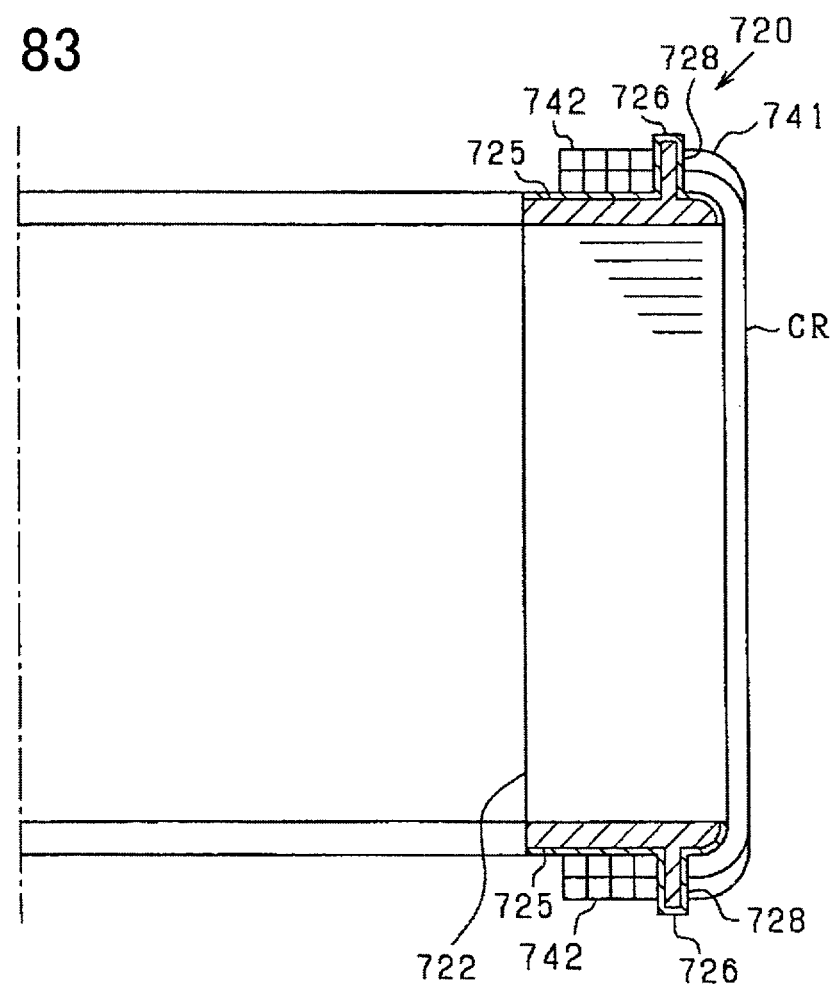
FIG. 83 is a longitudinal sectional view illustrating the structure of a stator according to the first modified example of the fifteenth modification.

As illustrated in FIG. 82, the conductor CR is configured as a rectangular conductive wire having a substantially rectangular shape in its transversal cross section.

Specifically, the conductor CR includes
(i) A plurality of (six in the drawing) wires 751
(ii) An outer coated layer 752 (i.e., an outer insulating layer) with which the wires 751 are covered and which is made of, for example, resin, and
(ii) An intermediate layer 753 disposed around each of the wires 751 within the outer coated layer 752

Each of the wires 751 includes a conductive section 751a made of copper material, and a conductor-coating layer (i.e., a wire insulating layer) 751b made of electrical insulating material.

That is, the conductor CR includes, as multiple insulating layers, the outer coated layer 752 as an outer insulating layer, the intermediate layer 753 as an intermediate insulating layer, and the conductor-coating layer 751b as an inner insulating layer.

The conductor CR is comprised of a bundle of the wires 751. The resistance between the wires 751 is larger than that of each of the wires 751. Each of the wires 751 may be comprised of a collection of conductive members.

The outer coated layer 752 has a thickness that is larger than a thickness of the conductor-coating layer 751b. Because the thickness of the outer coated layer 752 serving as an inter-phase insulating layer is larger than that of the conductor-coating layer 751b of each wire 751, the conductor CR is capable of withstanding high voltages. That is, the insulating ability of the outer insulating layer of the conductor CR is higher than that of the inner insulating layer thereof. This enables the conductor CR to be used in a high voltage field where a sufficient withstand voltage is required; the sufficient withstand voltage is higher than a usual withstand voltage of a usual thickness of a coated layer of a wire ranging from 5 to 40 µm inclusive.

The stator 720 according to the fifteenth modification includes the first protrusions 726 extending from the first end plate 725 outwardly in the axial direction of the stator core 722, and the second protrusions 726 extending from the second end plate 725 outwardly in the axial direction of the stator core 722. The conductor CR for each phase winding segment 741 is wound around a corresponding pair of the first protrusions 726 while being engaged with the corresponding pair of the first protrusions 726, and wound around a corresponding pair of the second protrusions 726 while being engaged with the corresponding pair of the second protrusions 726.

This enables the conductor CR for each phase winding segment 741 to be in more intimate contact with the outer peripheral surface of the stator core 722 as compared with a comparative stator core with radially extending protrusions. This results in less gaps between each winding segment 741 and the outer peripheral surface of the stator core 722, thus preventing the stator 720 from having a radially larger size due to the gaps and the heat dissipation of the stator 720 from decreasing.

This therefore makes it possible to efficiently wind each phase winding of the stator winding assembly 721 around the stator core 722.

At least each of the first and second protrusions 726 is made from a non-magnetic material, making it possible to reduce a risk of the occurrence of cogging torque due to the first and second protrusions 726.

Modified Examples of Fifteenth Modification

A stator 720 according to the first modified example of the fifteenth modification is comprised of a first insulating layer 728 mounted on the outer surface of at least each first protrusion 726 extending from the first end plate 725 made of a conductive material; the outer surface of each first protrusion 726 is in contact with the corresponding conductor CR. Similarly, the stator 720 according to the first modified example of the fifteenth modification is comprised of a second insulating layer 728 mounted on the outer surface of at least each second protrusion 726 extending from the second end plate 725 made of a conductive material; the outer surface of each second protrusion 726 is in contact with the corresponding conductor CR. The first insulating layer 728 may be mounted on at least a predetermined region of the outer major surface of the first end plate 725; the predetermined region of the outer major surface of the first end plate 725 is in contact with the corresponding conductor CR. Similarly, the second insulating layer 728 may be mounted on at least a predetermined region of the outer major surface of the second end plate 725; the predetermined region of the outer major surface of the second end plate 725 is in contact with the corresponding conductor CR.

This configuration of the stator 720 according to the first modified example makes it possible to reliably implement insulation of the stator winding assembly 721 to ground. Even if there is damage in the outer insulating layer of a portion of at least one conductor CR, which is engaged with a corresponding pair of the first protrusions 726 so that the bending radius of the portion is small, it is possible to maintain the insulation of the stator winding assembly 721 to ground.

Figure 84A:
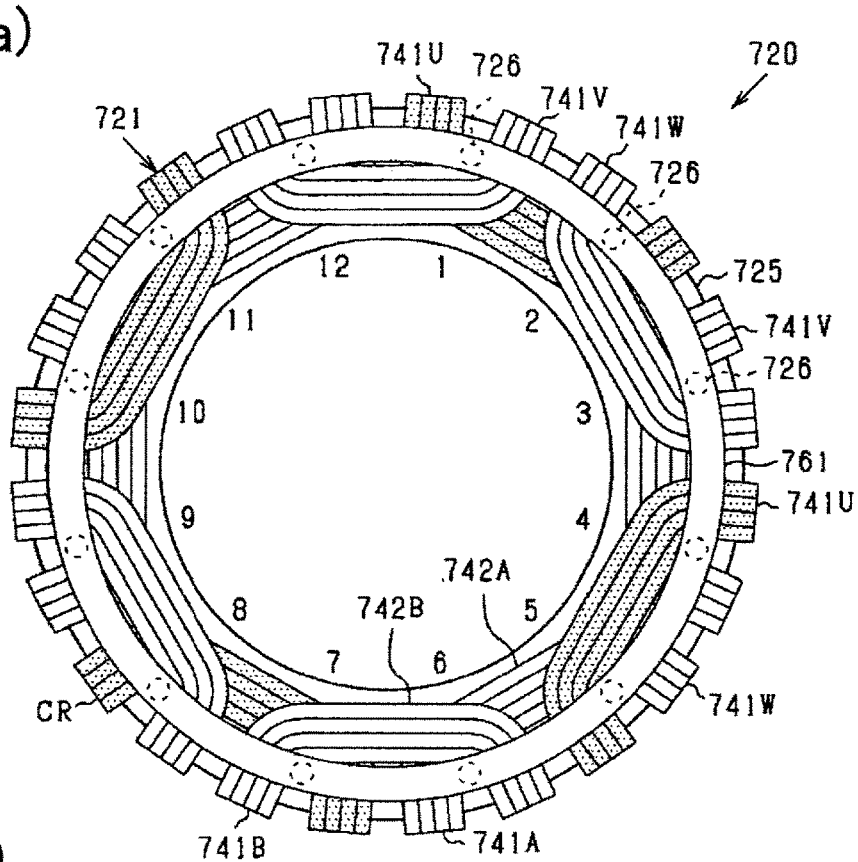
FIG. 84(a) is a plan view of a stator according to the second modified example of the fifteenth modification.
Figure 84B:
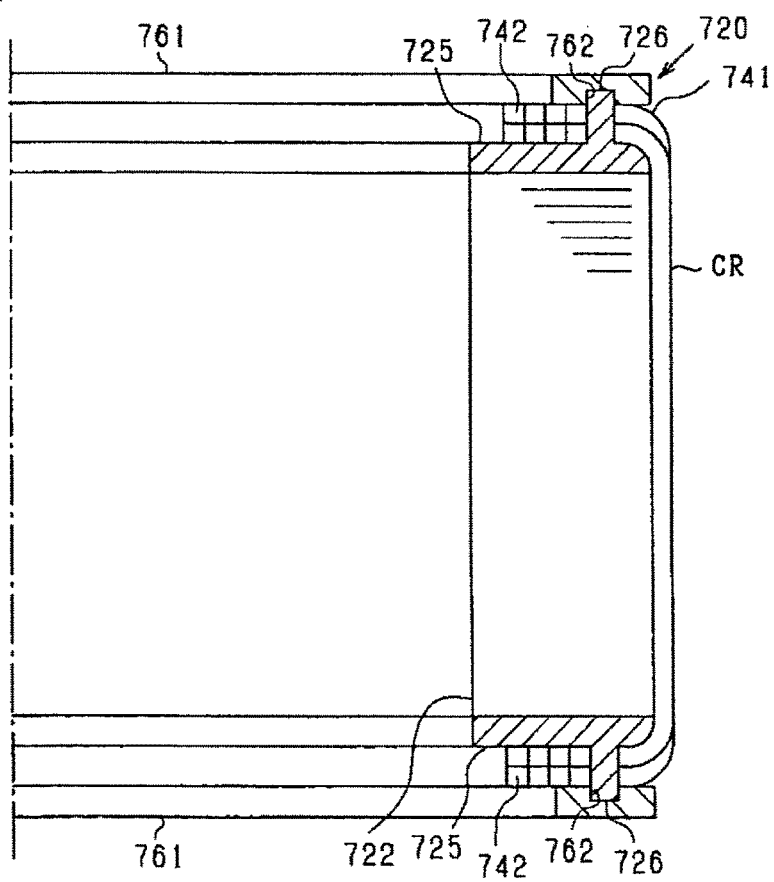
FIG. 84(b) is a side view of the stator according to the second modified example of the fifteenth modification.

In a stator 720 according to the second modified example of the fifteenth modification, as illustrated in FIGS. 84(*a*) and 84(*b*), each of the first protrusions 726 has an extending end. A first annular member 761 is mounted to the extending ends of the respective first protrusions 726. The first annular member 761 is located to abut or face the first bridge of each of the winding segments 741. Similarly, each of the second protrusions 726 has an extending end. A second annular member 761 is mounted to the extending ends of the respective second protrusions 726. The second annular member 761 is located to abut or face the second bridge of each of the winding segments 741.

Each of the first and second annular members 761 is made from, for example, a non-magnetic material.

The first annular member 761 has a plurality of holes or recesses 762 that are axially aligned with the respective first protrusions 726. The extending ends of the respective first protrusions 726 are fitted in the respective holes or recesses 762, so that the first annular member 761 is secured to the first protrusions 726. The first annular member 761 may be secured to the first protrusions 761 using one of known securing methods.

Similarly, the second annular member 761 has a plurality of holes or recesses 762 that are axially aligned with the respective second protrusions 726. The extending ends of the respective second protrusions 726 are fitted in the respective holes or recesses 762, so that the second annular member 761 is secured to the second protrusions 726. The second annular member 761 may be secured to the second protrusions 761 using one of known securing methods.

The configuration of the stator 720 according to the second modified example makes it possible for the first annular member 761 to hold the first bridges 742 of the first protrusions 726 from an opposite side of the first end plate 725. Similarly, the configuration of the stator 720 according to the second modified example makes it possible for the second annular member 761 to hold the second bridges 742 of the second protrusions 726 from an opposite side of the second end plate 725.

The above configuration of the stator 720 according to the second modified example therefore prevents the winding segments 741 engaged with the first and second protrusions 726 from being distributed in the axial direction of the stator core 722.

Figure 85:
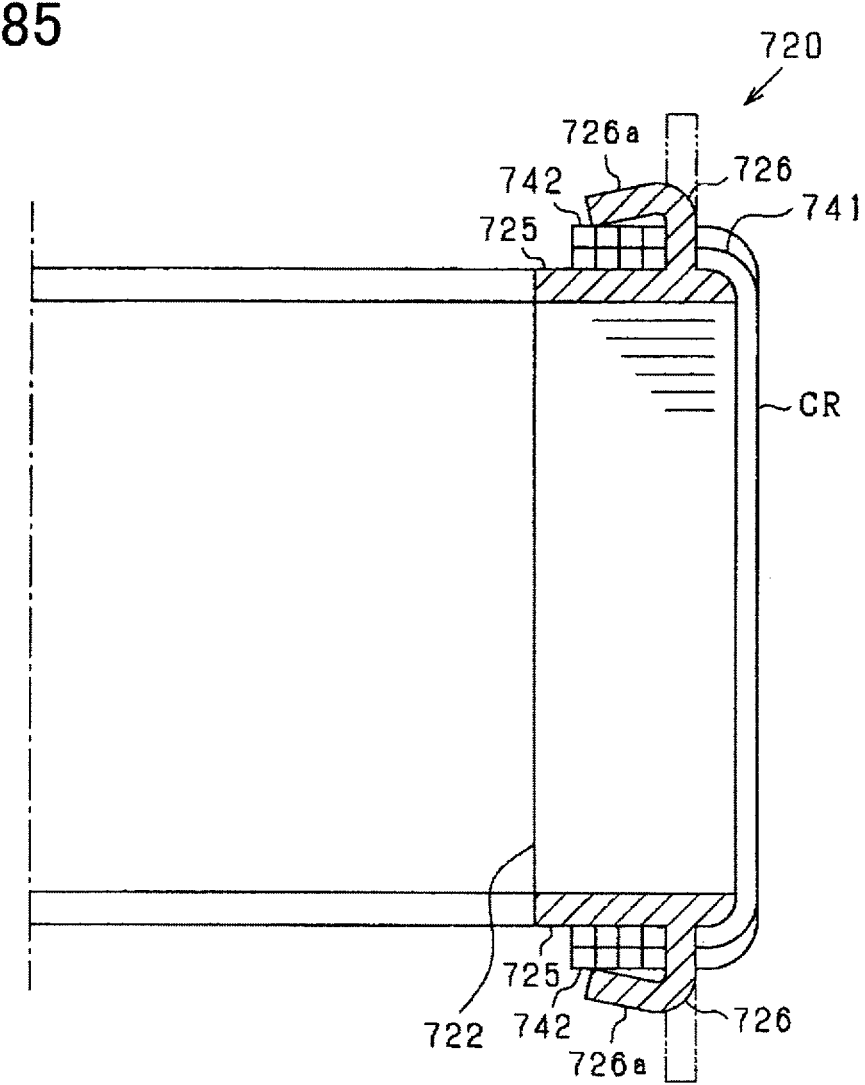
FIG. 85 is a longitudinal sectional view illustrating the structure of a stator according to the third modified example of the fifteenth modification.

In a stator 720 according to a third modified example of the fifteenth modification, as illustrated in FIG. 85, each of the first protrusions 726 has
  (i) An end,
  (ii) An engagement portion with which the conductor CR of a corresponding one of the winding segments 741 is engaged
  (iii) A first margin 726*a* located closer to the end than to the engagement portion
Similarly, each of the second protrusions 726 has
  (i) An end,
  (ii) An engagement portion with which the conductor CR of a corresponding one of the winding segments 741 is engaged
  (iii) A second margin 726*a* located closer to the end than to the engagement portion The first margin 726*a* of each of the first protrusions 726 is located to abut or face the first bridge 742 of the conductor CR of a corresponding one of the winding segments 741. Similarly, the second margin 726*a* of each of the second protrusions 726 is located to abut or face the second bridge 742 of the conductor CR of a corresponding one of the winding segments 741.

The configuration of the stator 720 according to the third modified example makes it possible for the first margins 726*a* to hold the first bridges 742 of the winding segments 741 from an opposite side of the first end plate 725. Similarly, the configuration of the stator 720 according to the third modified example makes it possible for the second margins 726*a* to hold the second bridges 742 of the winding segments 741 from an opposite side of the second end plate 725.

The above configuration of the stator 720 according to the third modified example therefore prevents the winding segments 741 engaged with the first and second protrusions 726 from being distributed in the axial direction of the stator core 722.

The above configuration of the stator 720 according to the third modified example also makes it possible for the first and second margins 726*a* to hold the winding segments 741.

The first margin 726*a* of each of the first protrusions 726 is bent radially inward to hold the first bridge 742 of a corresponding one of the winding segments 741, and the second margin 726*a* of each of the second protrusions 726 is bent radially inward to hold the second bridge 742 of a corresponding one of the winding segments 741.

This enables each conductor CR to be reliably engaged with a corresponding adjacent pair of the first protrusions 726 and with a corresponding adjacent pair of the second protrusions 726 while preventing an increase in the length of the stator 720 in the axial direction.

The first margin 726a of each of the first protrusions 726 may be divided into two margin portions, and the divided two margin portions of each of the first protrusions 726 are bent opposingly to face the first bridge 742 of a corresponding one of the winding segments 741. Similarly, the second margin 726a of each of the second protrusions 726 may be divided into two margin portions, and the divided two margin portions of each of the second protrusions 726 are bent opposingly to face the second bridge 742 of a corresponding one of the winding segments 741.

A stator core 722 of a stator 720 according to the fourth modified example of the fifteenth modification has an outer surface section and a polygonal shape in a transverse cross section perpendicular to the axial direction thereof, so that the outer surface section has outer sides. The winding segments 741 are wound along the outer sides of the stator core 722.

As described above, the winding segments 741 are wound along the outer peripheral surface of the stator core 722 to be used for an outer-rotor rotating electrical machine, so that the multiply wound conductors CR along the outer peripheral surface of the stator core 722 may have larger intervals there between in the circumferential direction of the stator core 722. This may result in the multiply wound conductors CR being distributed in the circumferential direction of the stator core 722.

From this viewpoint, as described above, the stator core 722 according to the fourth modified example of the fifteenth modification has the polygonal shape with the outer sides in a transverse cross section perpendicular to the axial direction thereof.

In addition, each of the first protrusions 726 is arranged at a predetermined first circumferential position on the outer major surface of the first end plate 725, and the first circumferential position of each of the first protrusions 726 is axially aligned with a corner of a corresponding adjacent pair of the outer sides of the outer surface portion of the stator core 722.

Similarly, each of the second protrusions 726 is arranged at a predetermined second circumferential position on the outer major surface of the second end plate 725, and the second circumferential position of each of the second protrusions 726 is axially aligned with a corner of a corresponding adjacent pair of the outer sides of the outer surface portion of the stator core 722.

Figure 86A:
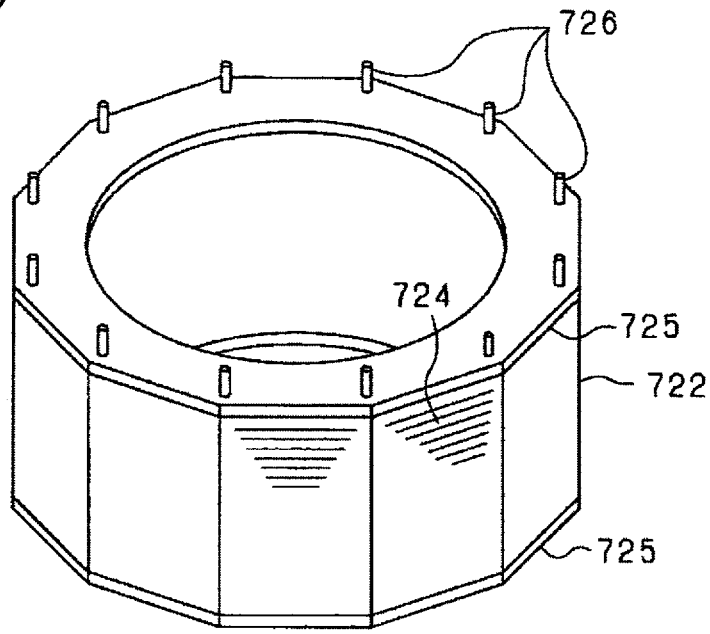
FIG. 86(a) is a perspective view illustrating the structure of each of a stator core and an end plate according to the fourth modified example of the fifteenth modification.

Specifically, as illustrated in FIG. 86(a), the stator core 722 according to the fourth modified example of the fifteenth modification has a regular polygonal shape with twelve outer sides in a transverse cross section perpendicular to the axial direction thereof; the number (twelve) outer sides is identical to the number of the first protrusions 726, and also to the number of the second protrusions 726.

As illustrated in FIG. 86(a), each of the first protrusions 726 is arranged at a predetermined first circumferential position on the outer major surface of the first end plate 725, and the first circumferential position of each of the first protrusions 726 is axially aligned with a corner of a corresponding adjacent pair of the twelve outer sides of the regular polygonal shape.

Similarly, each of the second protrusions 726 is arranged at a predetermined second circumferential position on the outer major surface of the second end plate 725, and the second circumferential position of each of the second protrusions 726 is axially aligned with a corner of a corresponding adjacent pair of the twelve outer sides of the regular polygonal shape.

In the stator 720 according to the fourth modified example of the fifteenth modification, the pair of conductor portions 723 of the conductor CR of each winding segment 741 are wound along a corresponding one of the twelve outer sides, i.e., flat outer sides, of the stator core 722.

Figure 86B:
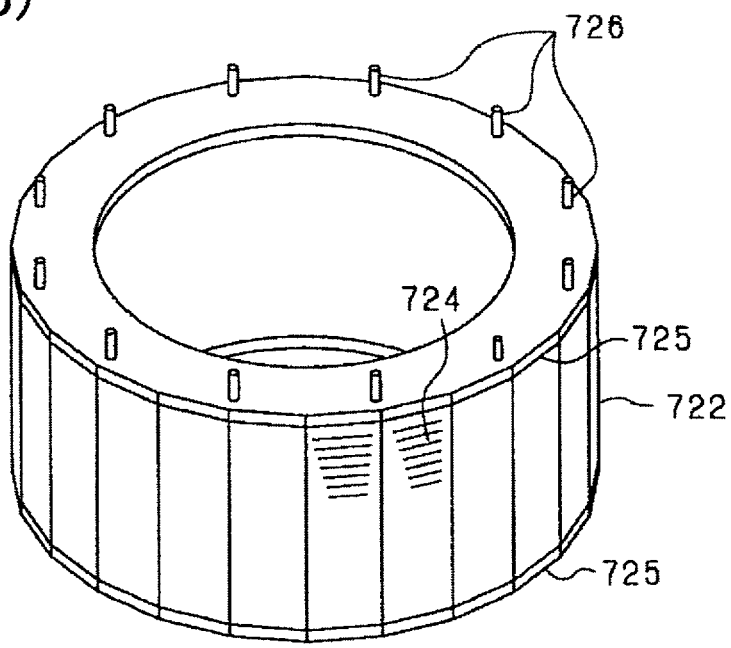
FIG. 86(b) is a perspective view illustrating the structure of each of a stator core and an end plate according to the fifth modified example of the fifteenth modification.

Alternatively, as illustrated in FIG. 86(b), a stator core 722 according to the fifth modified example of the fifteenth modification has a regular polygonal shape with twenty-four outer sides in a transverse cross section perpendicular to the axial direction thereof; the number (twenty-four) outer sides is twice the number of the first protrusions 726, and also twice the number of the second protrusions 726.

In the fifth modified example of the fifteenth modification, each of the first protrusions 726 is preferably arranged at a predetermined first circumferential position on the outer major surface of the first end plate 725, and the first circumferential position of each of the first protrusions 726 is axially aligned with a corner of a corresponding adjacent pair of the twenty-four twelve outer sides of the regular polygonal shape.

Similarly, each of the second protrusions 726 is preferably arranged at a predetermined second circumferential position on the outer major surface of the second end plate 725, and the second circumferential position of each of the second protrusions 726 is axially aligned with a corner of a corresponding adjacent pair of the twenty-four outer sides of the regular polygonal shape.

As a specific configuration of the stator 720 according to the fifth modified example of the fifteenth modification, as illustrated in FIG. 86(b), the first circumferential positions of the respective first protrusions 726 are axially aligned with alternate corners of the twenty-four twelve outer sides of the regular polygonal shape.

Similarly, as the specific configuration of the stator 720 according to the fifth modified example of the fifteenth modification, as illustrated in FIG. 86(b), the second circumferential positions of the respective second protrusions 726 are axially aligned with alternate corners of the twenty-four twelve outer sides of the regular polygonal shape.

In the stator 720 according to the fifth modified example of the fifteenth modification, the pair of conductor portions 723 of the conductor CR of each winding segment 741 are wound along a corresponding one of the twenty-four outer sides, i.e., flat outer sides, of the stator core 722.

Figure 87:
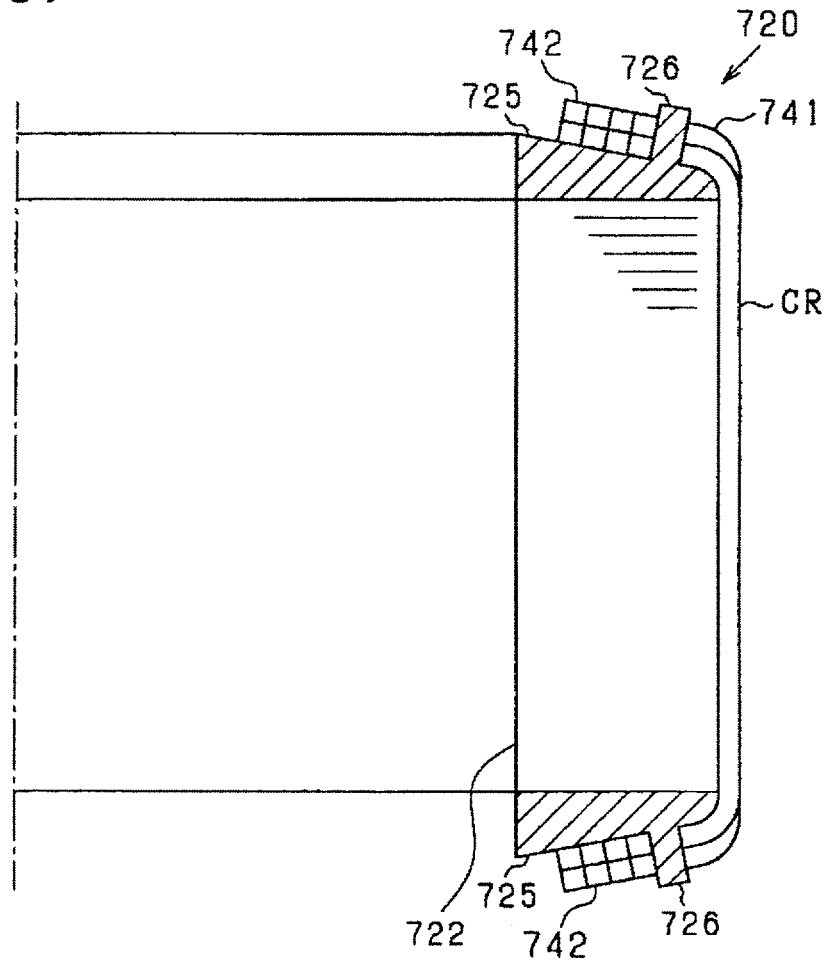
FIG. 87 is a longitudinal sectional view illustrating the structure of a stator according to the sixth modified example of the fifteenth modification.

In a stator 720 according to the sixth modified example of the fifteenth modification, as illustrated in FIG. 87, the outer major surface of each of the first and second end plates 725 are inclined with respect to a direction perpendicular to the axial direction of the stator core 722.

For example, as illustrated in FIG. 87, the inclined outer major surface of the first end plate 725 results in each first protrusion 726 being inclined to extend radially outward with respect to the axial direction of the stator core 722. Similarly, as illustrated in FIG. 87, the inclined outer major surface of the second end plate 725 results in each second protrusion 726 being inclined to extend radially outward with respect to the axial direction of the stator core 722. However, each first protrusion 726 may be configured to extend in the axial direction of the stator core 722 although the outer major surface of the first end plate 725 is inclined with respect to the direction perpendicular to the axial direction. Similarly, each second protrusion 726 may be configured to extend in the axial direction of the stator core 722 although the outer major surface of the second end plate 725 is inclined with respect to the direction perpendicular to the axial direction.

In particular, the extending end of each of the first and second protrusions 726 is arranged without protruding radially outside the outer peripheral surface of the stator core 722. In this arrangement, each of the first and second bridges 742 of each winding segment 741 is bent at an external obtuse angle with respect to the corresponding conductor portions 723.

Figure 88:
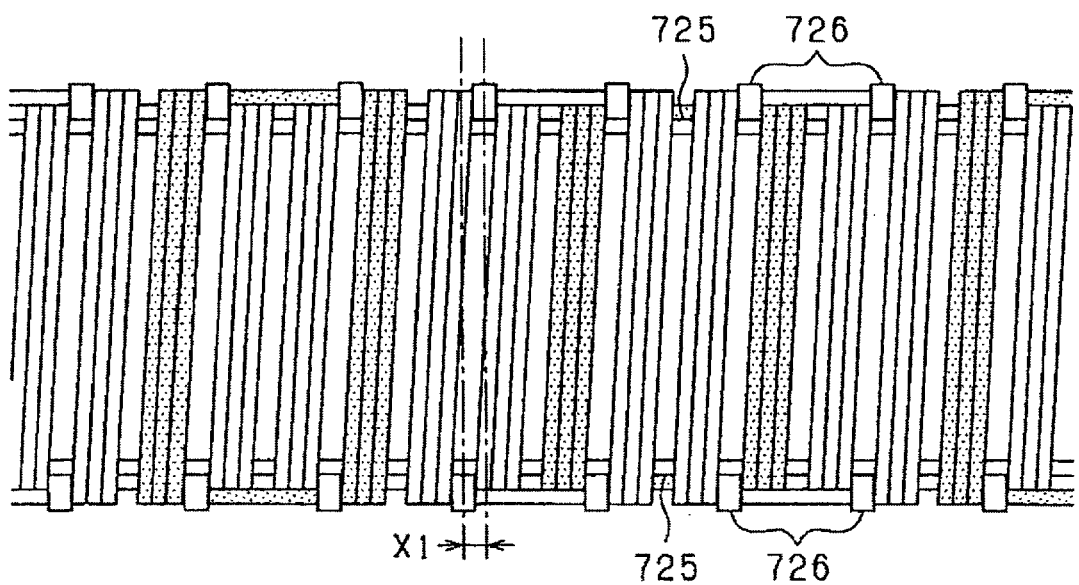
FIG. 88 is a front view illustrating the structure of a stator according to the seventh modified example of the fifteenth modification.

In a stator 720 according to the seventh modified example of the fifteenth modification, as illustrated in FIG. 88, the conductor portions 723 of each winding segment 741 are skewed with respect to the axial direction of the stator core 722. In the seventh modified example of the fifteenth modification, the circumferential position of each of the first protrusions 726 on the first end plate 725 deviates by a length X1 from that of the corresponding one of the second protrusions 726 on the second end plate 725.

Each conductor CR is wound around the corresponding pair of the first protrusions 726 and the corresponding pair of the second protrusions 726, resulting in the corresponding skewed winding segment 741 being assembled to the stator core 722.

The stator winding assembly 721 according to the fifteenth modification is wound around the stator core 722 in full pitch winding, but may be wound around the stator core 722 in short pitch winding.

Figure 89:
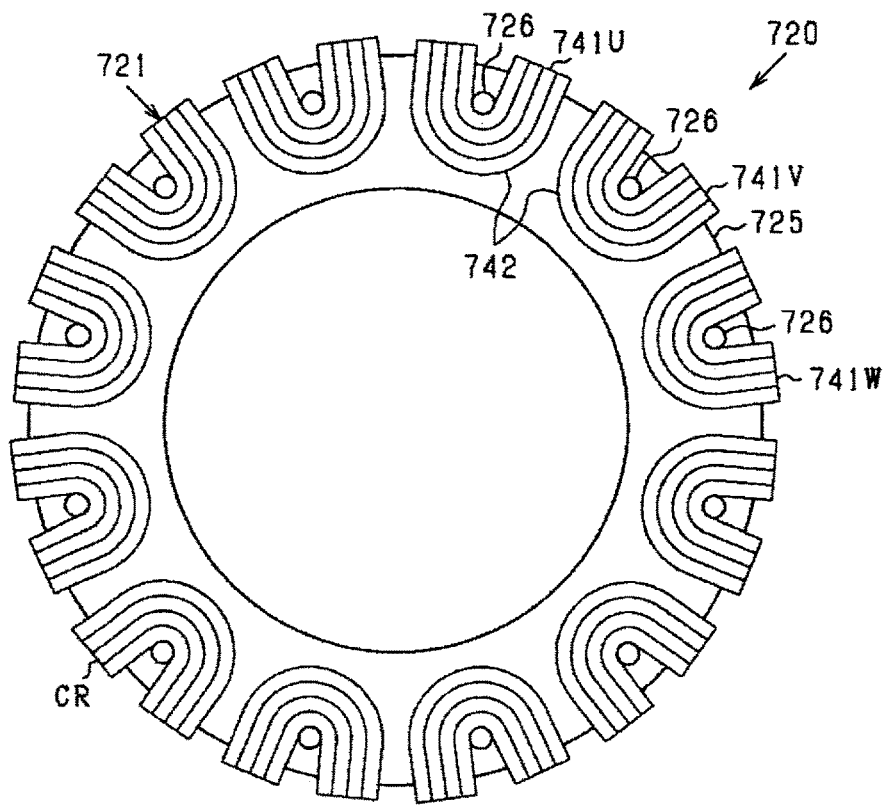
FIG. 89 is a plan view illustrating the structure of a stator according to the eighth modified example of the fifteenth modification.

FIG. 89 is a plan view illustrating the structure of a stator 720 according to the eighth modified example of the fifteenth modification; the stator 720 includes the stator winding assembly 721 that is wound around the stator core 722 in short pitch winding.

Specifically, as illustrated in FIG. 89, the winding segments 741 are arranged in the circumferential direction of the stator core 722, and the conductor CR of each winding segment 741 is wound along the outer peripheral surface of the stator core 722 while being engaged with a corresponding one of the first protrusions 726 and a corresponding one of the second protrusions 726. This results in the winding segments 741 whose number is identical to the number of the first protrusions 726 and the number of the second protrusions 726 being assembled to the stator core 722. In particular, plural sets of the U-, V-, and W-phase winding segments 741U, 741V, and 741W are arranged in the circumferential direction of the stator core 722.

Each first protrusions 726 may be separately mounted on the outer major surface of the first end plate 725, and configured to be extensible in its length direction. For example, the conductor CR of each winding segment 741 is wound around a corresponding adjacent pair of the first protrusions 726 while each of the first protrusions 726 marginally extends from a standard length, and, after winding, each of the marginally extended first protrusions 726 shrinks down to the standard length.

The fifteenth modification may be implemented as an inner-rotor type rotating electrical machine in place of an outer-rotor type rotating electrical machine. In such an inner-rotor type rotating electrical machine, the stator winding assembly 721 of the stator 720 according to the ninth modified example of the fifteenth modification is assembled to a radially inner peripheral surface of the stator core 722.

Figure 90:
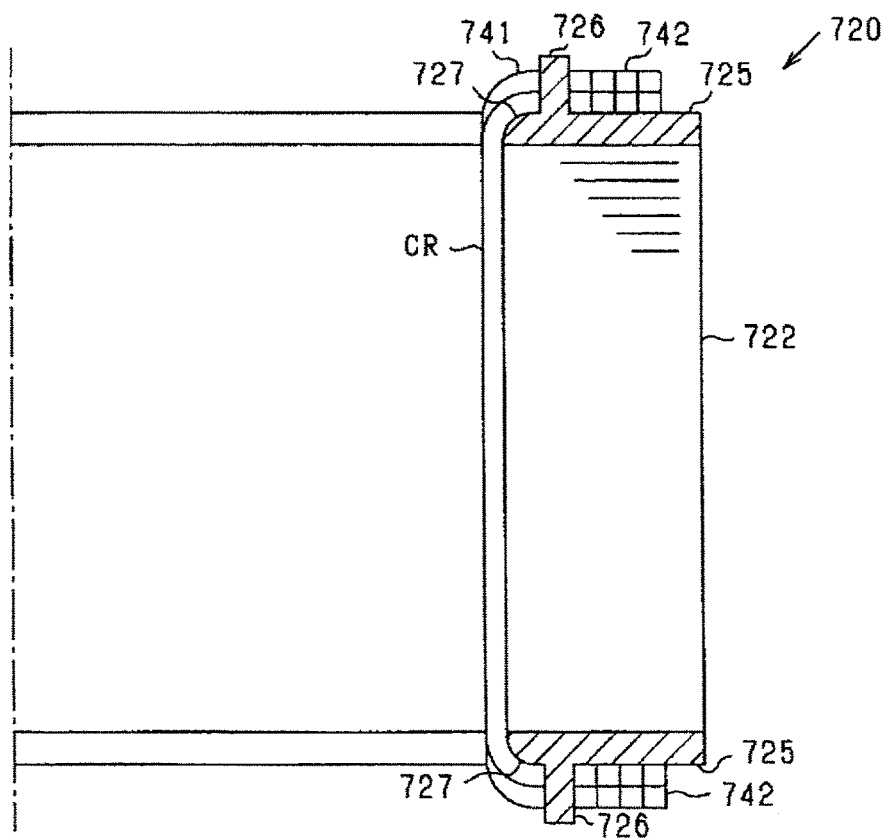
FIG. 90 is a longitudinal sectional view illustrating the structure of a stator according to the ninth modified example of the fifteenth modification.

Specifically, as illustrated in FIG. 90, the conductor CR of each winding segment 741 is multiply wound around a corresponding adjacent pair of the first protrusions 726 and around a corresponding adjacent pair of the second protrusions 726 while (i) being engaged with the corresponding adjacent pair of first protrusions 726, (ii) being engaged with the corresponding adjacent pair of second protrusions 726, and (iii) axially extending along the inner peripheral surface of the stator core 722.

The inner diameter of each of the first and second end plates 725 is set to be identical to the inner diameter of the stator core 722. The inner corner of each of the first and second end plates 725, which is farther from the stator core 722 than the outer corner is, may be configured as a rounded corner 727.

In the stator 720 according to the ninth modified example of the fifteenth modification, the conductor CR of each winding segment 741 is wound around a corresponding adjacent pair of the first protrusions 726 and around a corresponding adjacent pair of the second protrusions 726 while being gradually bent along the rounded corners 727 of the respective first and second end plates 725 from the first direction parallel to the axial direction of the stator core 722 to the second direction perpendicular to the first direction.

This results in the conductor CR of each winding segment 741
(1) Extending along the inner peripheral surface of the stator core 722 with being in intimate contact with the inner peripheral surface thereof.
(2) Preventing stress on the conductor CR due to an excessive small bending radius of the conductor CR The stator core 722 may include protrusions, such as teeth, extending from a back yoke thereof. In this modification, the stator winding assembly 721 may be assembled to the back yoke of the stator core 722.

The above rotating electrical machines 700, each of which is designed as a revolving-field type rotating electrical machine whose field generator serves as a rotor, may be designed as a revolving-armature type rotating electrical machine whose armature serves as a rotor.

The disclosure of the specification is not limited to the disclosed embodiments. The disclosure of the specification can include not only the disclosed embodiments but also skilled-person's modifications based on the disclosed embodiments. For example, the disclosure of the specification is not limited to combinations of the components and/or elements disclosed in the disclosed embodiments, and therefore can be implemented by various combinations within the disclosed embodiments.

The disclosure of the specification can include additional elements to the disclosed embodiments. The disclosure of the specification can include the disclosed embodiments from which one or more components and/or elements have been removed. The disclosure of the specification can include replacement of one or more elements or components in one of the disclosed embodiments with one or more elements or components in another one of the disclosed embodiments. The disclosure of the specification can include combinations of one or more elements or components in one of the disclosed embodiments with one or more elements or components in another one of the disclosed embodiments.

The disclosed technical scopes of the disclosure of the specification are not limited to the descriptions of the disclosed embodiments. Some of the disclosed technical scopes of the disclosure of the specification are shown by the descriptions of claims, and various changes of the disclosed technical scopes within the equivalent meanings and/or equivalent scopes of the descriptions of the claims should be therefore accepted.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An armature comprising:
   a multiphase stator winding assembly comprising multiphase stator windings, each of the multiphase stator windings comprising a plurality of winding segments;
   a tubular cylindrical armature core having first and second ends in an axial direction thereof, and having a radially inner peripheral surface and a radially outer peripheral surface;
   a pair of first and second end plates secured to the respective first and second ends of the armature core, each of the first and second end plates having an outer major surface;
   a plurality of first protrusions extending from the outer major surface of the first end plate in the axial direction of the armature core, the first protrusions being arranged on the outer major surface at predetermined intervals in a circumferential direction of the armature core; and
   a plurality of second protrusions extending from the outer major surface of the second end plate in the axial direction of the armature core, the second protrusions being arranged on the outer major surface at predetermined intervals in the circumferential direction of the armature core,
   each of the winding segments comprising a conductor,
   the conductor of each of the winding segments of each of the multi-phase windings being wound along the armature core while:
   being engaged with a corresponding at least one of the first protrusions and a corresponding at least one of the second protrusions; and
   extending along one of the radially inner and outer peripheral surfaces of the armature core.

2. The armature according to claim 1, wherein:
   at least each of the first and second protrusions is made from a non-magnetic material.

3. The armature according to claim 1, wherein:
   each of the first and second protrusions has a portion that is in contact with the conductor of a corresponding one of the winding segments of a corresponding one of the multiphase windings; and
   each the first and second protrusions includes an insulating layer mounted to at least the portion thereof.

4. The armature according to claim 1, wherein:
   the conductor of each of the winding segments of each of the multi-phase windings is wound along the armature core while:
   being engaged with a corresponding at least one of the first protrusions and a corresponding at least one of the second protrusions; and
   extending along the outer peripheral surface of the armature core;
   the armature core has an outer diameter;
   each of the first and second end plates has an outer diameter that is identical to the outer diameter of the armature core;
   each of the first and second end plates has a rounded outer corner located farther away from to the armature core than an inner corner thereof is.

5. The armature according to claim 1, wherein:
   the conductor of each of the winding segments of each of the multi-phase windings is wound along the armature core while:
   being engaged with a corresponding at least one of the first protrusions and a corresponding at least one of the second protrusions; and
   extending along the inner peripheral surface of the armature core;
   the armature core has an inner diameter;
   each of the first and second end plates has an inner diameter that is identical to the inner diameter of the armature core;
   each of the first and second end plates has a rounded inner corner located farther away from the armature core than an outer corner thereof.

6. The armature according to claim 1, wherein:
   each of the winding segments of each of the multiphase windings includes a pair of first and second bridges,
   the first bridge being located to face the outer major surface of the first end plate and extending in the circumferential direction of the armature core,
   the second bridge being located to face the outer major surface of the second end plate and extending in the circumferential direction of the armature core;
   each of the first and second protrusions has an end;
   the armature further comprises:
   a first annular member mounted to the ends of the respective first protrusions; and
   a second annular member mounted to the ends of the respective second protrusions,
   the first annular member being located to abut or face the first bridge of the conductor of each of the winding segments; and
   the second annular member being located to abut or face the second bridge of the conductor of each of the winding segments.

7. The armature according to claim 1, wherein:
   each of the winding segments of each of the multiphase windings includes first and second bridges,
   the first bridge being located to face the outer major surface of the first end plate and extending in the circumferential direction of the armature core,
   the second bridge being located to face the outer major surface of the second end plate and extending in the circumferential direction of the armature core;
   each of the first protrusions has:
   an end;
   an engagement portion with which the conductor of a corresponding one of the winding segments of a corresponding one of the multiphase windings is engaged; and
   a first margin located closer to the end than to the engagement portion,
   the first margin of each of the first protrusions being located to abut or face the first bridge of the conductor of a corresponding one of the winding segments of a corresponding one of the multiphase windings; and
   each of the second protrusions has:
   an end;
   an engagement portion with which the conductor of a corresponding one of the winding segments of a corresponding one of the multiphase windings is engaged; and a second margin located closer to the end than to the engagement portion, the second margin of each of the second protrusions being located to abut or face the second bridge of the conductor of a corresponding one of the winding segments of a corresponding one of the multiphase windings.

8. The armature according to claim 1, wherein:
the first protrusions are arranged on the outer major surface of the first end plate at regular intervals in the circumferential direction of the armature core;
the second protrusions are arranged on the outer major surface of the second end plate at the regular intervals in the circumferential direction of the armature core;
the second protrusions are respectively numbered 1 to n;
the winding segments of the respective multiphase windings include
n/2 first winding segments, the conductor of each of the n/2 first winding segments being wound along:
  a corresponding pair of an odd-numbered first protrusion and a following even-numbered first protrusion in the first protrusions; and
  a corresponding pair of an odd-numbered second protrusion and a following even-numbered second protrusion in the second protrusions;
n/2 second winding segments, the conductor of each of the n/2 second winding segments being wound along:
  a corresponding pair of an even-numbered first protrusion and a following odd-numbered first protrusion in the first protrusions; and
  a corresponding pair of an even-numbered second protrusion and a following odd-numbered second protrusion in the second protrusions;
each of the n/2 first winding segments includes first-layer bridges as the first and second bridges thereof;
each of the n/2 second winding segments includes second-layer bridges as the first and second bridges thereof; and
the second-layer bridges of each of the n/2 second winding segments are arranged to overlap an adjacent pair of the first-layer bridges in the axial direction of the armature core.

9. The armature according to claim 1, wherein:
the multiphase windings are three-phase windings;
adjacent ends of two first bridges of different phases included in the first bridges of all the phases are interposed between each adjacent pair of the first protrusions on the outer major surface of the first end plate; and
adjacent ends of two second bridges of different phases included in the second bridges of all the phases are interposed between each adjacent pair of the second protrusions on the outer major surface of the second end plate.

10. An armature comprising:
a multiphase stator winding assembly comprising multiphase stator windings, each of the multiphase stator windings comprising a plurality of winding segments;
a tubular armature core having first and second ends in an axial direction thereof, and having an outer surface portion;
a pair of first and second end plates secured to the respective first and second ends of the armature core, each of the first and second end plates having an outer major surface;
a plurality of first protrusions extending from the outer major surface of the first end plate in the axial direction of the armature core, the first protrusions being arranged on the outer major surface at predetermined intervals in a circumferential direction of the armature core; and
a plurality of second protrusions extending from the outer major surface of the second end plate in the axial direction of the armature core, the second protrusions being arranged on the outer major surface at predetermined intervals in the circumferential direction of the armature core, wherein:
each of the winding segments comprises a conductor,
the conductor of each of the winding segments of each of the multi-phase windings is wound along the armature core while:
being engaged with a corresponding at least one of the first protrusions and a corresponding at least one of the second protrusions; and
extending along the outer surface portion of the armature core;
the number of the first protrusions is n, n being an integer more than or equal to 2;
the number of the second protrusions is n;
the armature core has a polygonal shape in a transverse cross section perpendicular to the axial direction thereof, the outer surface portion of the armature core with the polygonal shape in the transverse cross section having n or 2×n sides;
each of the first protrusions is arranged at a predetermined first circumferential position, the first circumferential position of each of the first protrusions being axially aligned with a corner of a corresponding adjacent pair of the sides of the outer surface portion of the armature core; and
each of the second protrusions is arranged at a predetermined second circumferential position, the second circumferential position of each of the second protrusions being axially aligned with a corner of a corresponding adjacent pair of the sides of the outer side surface of the armature core.

* * * * *